(12) United States Patent
Ghassabian

(10) Patent No.: US 9,304,602 B2
(45) Date of Patent: Apr. 5, 2016

(54) SYSTEM FOR CAPTURING EVENT PROVIDED FROM EDGE OF TOUCH SCREEN

(75) Inventor: Benjamin Firooz Ghassabian, Jerusalem (IL)

(73) Assignee: KEYLESS SYSTEMS LTD., Jerusalem (IL)

( * ) Notice: Subject to any disclaimer, the term of this patent is extended or adjusted under 35 U.S.C. 154(b) by 65 days.

(21) Appl. No.: 13/516,737

(22) PCT Filed: Dec. 20, 2010

(86) PCT No.: PCT/IL2010/001075
§ 371 (c)(1),
(2), (4) Date: Jun. 17, 2012

(87) PCT Pub. No.: WO2011/073992
PCT Pub. Date: Jun. 23, 2011

(65) Prior Publication Data
US 2012/0326984 A1    Dec. 27, 2012

Related U.S. Application Data

(60) Provisional application No. 61/294,382, filed on Jan. 12, 2010.

(30) Foreign Application Priority Data

| Dec. 20, 2009 | (IL) | 202852 |
| Dec. 31, 2009 | (IL) | 203090 |
| Jan. 27, 2010 | (IL) | 203560 |
| Feb. 11, 2010 | (IL) | 203922 |
| Apr. 13, 2010 | (IL) | 205052 |
| Apr. 25, 2010 | (IL) | 205329 |
| Jun. 9, 2010 | (IL) | 206257 |
| Jul. 20, 2010 | (IL) | 207114 |
| Aug. 11, 2010 | (IL) | 207545 |
| Aug. 17, 2010 | (IL) | 207665 |
| Sep. 14, 2010 | (IL) | 208140 |
| Oct. 14, 2010 | (IL) | 208740 |
| Oct. 18, 2010 | (IL) | 208790 |
| Nov. 9, 2010 | (IL) | 209218 |
| Nov. 14, 2010 | (IL) | 209305 |
| Nov. 18, 2010 | (IL) | 209416 |
| Nov. 21, 2010 | (IL) | 209484 |

(51) Int. Cl.
*G06F 3/041* (2006.01)
*G06F 3/023* (2006.01)
*G06F 3/0488* (2013.01)

(52) U.S. Cl.
CPC ............ *G06F 3/0236* (2013.01); *G06F 3/0237* (2013.01); *G06F 3/04883* (2013.01); *G06F 3/04886* (2013.01)

(58) Field of Classification Search
CPC .............. G06F 3/0416; G06F 3/04886; G06F 3/04883; G06F 2203/04808; G06F 1/1626; G06F 3/0488; G06F 3/0236; G06F 3/0482; G06F 3/04845
USPC .......................................... 345/163, 168, 173
See application file for complete search history.

(56) References Cited

U.S. PATENT DOCUMENTS

| 8,089,778 B2 * | 1/2012 | Wang et al. .................... 361/796 |
| 2001/0028365 A1 * | 10/2001 | Ludolph ....................... 345/764 |

(Continued)

OTHER PUBLICATIONS

PCT Search Report PCT/IL2010/001075.

*Primary Examiner* — Stephen Sherman
(74) *Attorney, Agent, or Firm* — Dekel Patent Ltd.; David Klein

(57) ABSTRACT

A data entry system, having an input interface adapted to identify a plurality of user interactions. The system includes a processor adapted to associate user interactions identified by the input interface with a plurality of letters of the alphabet, such that all the letters of the alphabet are assigned to at most eight user interactions. Most of the letters are assigned to specific user interactions according to one or more features of their shape in their printed form, such that most of the letters assigned to each user interaction have the same shape feature.

36 Claims, 47 Drawing Sheets

(56) References Cited

U.S. PATENT DOCUMENTS

| | | |
|---|---|---|
| 2004/0177179 A1 | 9/2004 | Koivuniemi |
| 2005/0017957 A1* | 1/2005 | Yi ................................. 345/173 |
| 2006/0284852 A1* | 12/2006 | Hofmeister et al. .......... 345/173 |
| 2007/0152980 A1 | 7/2007 | Kocienda |
| 2008/0207188 A1* | 8/2008 | Ahn et al. .................... 455/418 |
| 2008/0316183 A1* | 12/2008 | Westerman et al. .......... 345/173 |
| 2009/0199130 A1* | 8/2009 | Tsern et al. ................... 715/810 |
| 2010/0050076 A1* | 2/2010 | Roth ............................. 715/702 |
| 2010/0164959 A1* | 7/2010 | Brown et al. ................. 345/473 |
| 2011/0209099 A1* | 8/2011 | Hinckley et al. .............. 715/863 |

\* cited by examiner

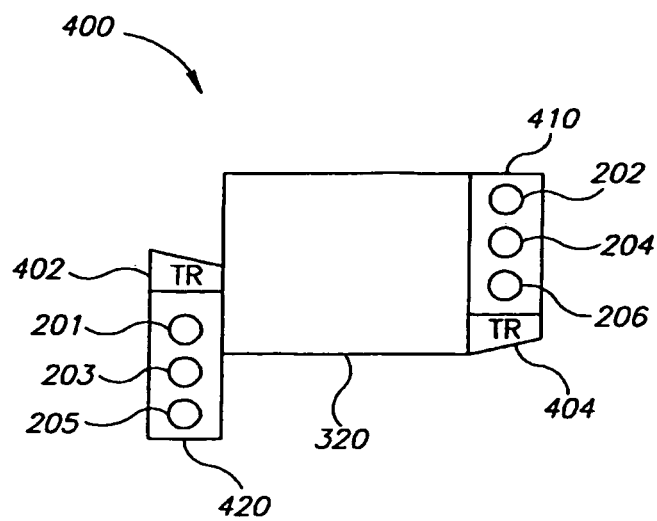
FIG.4
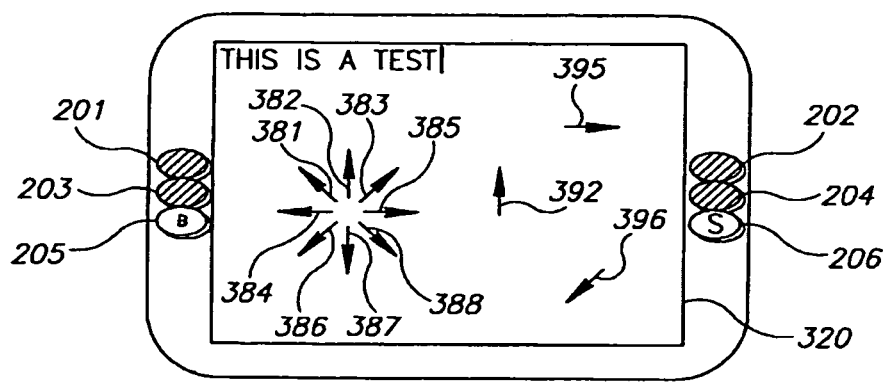
FIG.5
FIG.6

SYSTEM FOR CAPTURING EVENT PROVIDED FROM EDGE OF TOUCH SCREEN

RELATED APPLICATIONS

The present application claims priority from Israeli patent applications: 202852 filed 20 Dec. 2009; 203090 filed 31 Dec. 2009; 203560 filed 27 Jan. 2010; 203922 filed 11 Feb. 2010; 205052 filed 13 Apr. 2010; 205329 filed 25 Apr. 2010; 206257 filed 8 Jun. 2010; 207114 filed 20 Jul. 2010; 207545 filed 11 Aug. 2010; 207665 filed 17 Aug. 2010; 208140 filed 14 Sep. 2010; 208740 filed 14 Oct. 2010; 208790 filed 18 Oct. 2010; 209218 filed 9 Nov. 2010; 209305 filed 14 Nov. 2010; 209416 filed 18 Nov. 2010; 209484 filed 21 Nov. 2010; and claims the benefit, under 35 USC 119(e), of U.S. provisional application Ser. No. 61/294,382 filed 12 Jan. 2010, the disclosures of which are all incorporated herein by reference in their entirety.

This application is also related to various prior PCT publication, including WO01/131788, titled "Integrated Keypad System", WO03/007288 titled "Features to Enhance Data Entry Through a Small Data Entry Unit", WO04/095414 titled "System to Enhance Data Entry in Mobile and fixed Environment", WO05/122401 titled "System to Enhance Data Entry in Mobile and fixed Environment", WO07/114,833 titled "Data Entry System", WO08/114,086 titled "Combined Data Entry Systems", WO09/027,817 titled "Improved Data Entry System", PCT/IL2009/000790 titled "Data Entry System", PCT/IL2009/000794 titled "Data Entry System", and PCT/IL2010/000098 titled "Data Entry System" the disclosures of all of which are also incorporated herein, by reference, in their entirety.

FIELD OF THE INVENTION

The present invention relates to data input devices and particularly to devices and methods for entering letters and other symbols.

BACKGROUND OF THE INVENTION

Mobile devices including cellular phones, personal digital aids and miniature computers are widely used as they are easily carried around and can perform many tasks. One problem of the mobile devices is text entry, which is problematic due to their small size. One solution for text entry in mobile devices is using a limited key set in which at least some of the keys are ambiguously associated with a plurality of letters. Upon receiving a sequence of key strokes, a word dictionary is consulted to guess the word intended by the user. Such a solution is described, for example, in U.S. Pat. No. 5,818,437 to Grover et al., titled: "Reduced Keyboard Disambiguating Computer" and in US patent publication 2003/0193478 to Ng et al., titled: "Reduced Keyboard System that Emulates QWERTY-type Mapping and Typing", the disclosures of which are incorporated herein by reference in their entirety.

The arrangement of the letters on the keys is an important concern. On the one hand, it is desired to organize the letters on the keys in a manner which maximizes the probability that the system will guess the words intended by the user. On the other hand, it is desired to select an arrangement which will allow users to easily find the key to be actuated for each letter. Two known arrangements of letters are commonly used: the QWERTY arrangement and the telephone keypad arrangement in which the keys are arranged according to the order of the alphabet. US patent publication 2006/0018699 to Rak et al., titled "Keyboard Apparatus", the disclosure of which is incorporated herein by reference in their entirety, suggests using the QWERTY arrangement.

Another problem of mobile devices is entering symbols other than the alphanumeric characters. The number of keys on the mobile devices is limited and various methods have been suggested to allow simple entering of symbols with limited keys. Still there is a need for better solutions.

US patent publication 2006/0123354 to Volovitz, the disclosure of which is incorporated herein by reference, describes a data entry system in which mode keys are used to change the meaning of other keys of the data entry system.

Chinese patent publication 101286096 describes keys that become mode keys in response to pressing a first mode key.

Some mobile devices receive user input through a touch screen. Touch screens are also used on non-portable devices. US patent application 2007/0097092 to Jung et al., titled: "Method of using a Touch Screen and user interface apparatus employing the same", the disclosure of which is incorporated herein by reference in its entirety, describes using a touch screen with a plurality of zones having identical keys for different users.

US patent publication 2009/0073002 to Alvarado describes a scheme in which the letters of the alphabet are entered by straight line traces on a touch screen. The touch screen is divided into various cells and traces in different locations are given different interpretations.

US patent publication 2002/0180797 to Backman uses a combined method of strokes and key presses to enter words. The strokes are assigned to the vowels and to shortcuts.

U.S. Pat. No. 7,519,748 to Kuzmin, titled: "Stroke-Based Data Entry Device, System and Method", describes a method in which strokes are associated with letters for input. The strokes are interpreted according to their direction and their starting zone.

U.S. Pat. No. 7,170,496 to Middleton, describes an input method using gestures of a data entry system. The system provides feedback in the form of the symbol corresponding to the gesture currently entered, so the user can change the gesture if necessary.

These methods require that the user remember the associations between the strokes and the letters, which may be problematic for some users.

Several other input methods may be used with a keyboard having few keys wherein to each of at least some of said keys more than one symbol such as character or letter are ambiguously assigned. In such keypads, generally an interaction such as a pressing action on a key may ambiguously correspond to any of the symbols assigned to the key (such key may be called an "ambiguous key").

According to one method, a multi-tap scheme in which the user indicates the intended letters by using different numbers of taps on the same key may be used for disambiguation. Use of a multi-tap scheme, however, is slow and inconvenient to many users.

According to another method, in order to enter one of the symbols (such as a letter) among the group of symbols assigned to a key, the user may provide a predefined interaction with the key such as a pressing action on the key and provide a speech information corresponding to the symbol (such as speaking the appellation of the letter) for selecting the letter among the letters that are assigned to the key, and wherein the speech information may be detected and analyzed based on at least one of, the user's voice and/or the user's lip movements. According to one method symbols such as letters having ambiguously resembling predefined speech and that are hard to distinguish from each other through their corresponding speech may be separated from each other being assigned to different keys.

The data entry systems providing precise characters may be combined with the principles of a word predictive system based on key presses alone, to provide a highly accurate data/text entry system using few keys. The principles of word predictive systems based on key presses alone (e.g. T9) are known by people skilled in the art.

Methods for text entry using word predictive systems in which at least one letter is input unambiguously and other letters can be input ambiguously, are known. WO 2009/027817 (to Ghassabian) describes a data entry system that uses a system having two keypads. The first keypad has all the letters of an alphabet distributively assigned to a small number of keys (e.g. four) such that at least two of the letters are assigned to at least one of said keys of the first keypad keys. The second keypad (for example a telephone-type keypad) generally also includes all of the letters of the alphabet of the language, distributively assigned to at least some of its keys such that at least two of the letters are assigned to at least one of the keys of the second keypad set of keys. Typically, the letters are distributed such that an ambiguous key of the first keypad and an ambiguous key of the second keypad have preferably at most one common letter/character. For entering a letter precisely, the user may first press on the key of the first keypad to which said character is ambiguously assigned. The system may predict an undesired character. The user then may press on the key of the second keypad to which the desired character is also ambiguously assigned. As described, said pair of keys may have at most one common character which in this case is the desired character. The system thus provides said the desired character.

For entering a word the user uses/taps-on the corresponding keys of the first keypad and the system predicts a corresponding word (if the word is in the dictionary), or a chain of characters (if the word is not in the dictionary). A correction procedure may be performed by the user when the system offers (predicts) an undesired word, in which the first keypad is used for character entry and the second keypad is used to replace one (or more) ambiguous character of the predicted word by one (or more) precise character (to correct a wrongly predicted set of characters). By using key-presses of two keypads, the data entry system may provide precise character identification, with the unique character common to the two keys being unambiguously selected thereby. By considering the ambiguous characters and the precise character(s) provides as described, the system may propose another word to the user.

Word predictive systems based on key press information use at least a dictionary of words that may also include a database the corresponding key presses for each word.

Data may be input through means other or additional to key presses. For example, a user may perform gliding actions upon a touch sensitive screen to duplicate or imitate key interactions.

SUMMARY OF THE INVENTION

An aspect of some embodiments of the invention relates to an input interface adapted to identify user interactions and to associate at least some of the user interactions with characters. A small number of the user interactions (e.g., not more than 8, not more than 6 or even not more than 4) are associated ambiguously with all the letters of the Latin alphabet. The letters are assigned to the user interactions according to their shapes, in a manner which allows the user to quickly translate the shape of a letter to the interaction with which it is associated.

In some embodiments, the letters are assigned to the user interactions according to whether they have large and/or small arcs, the number of legs they have touching the bottom line and/or whether they have a top or bottom horizontal line.

Optionally, one or more of the user interactions is associated only with letters having a specific shape characteristic. For example, in one embodiment, one of the user interactions is associated only with letters having two legs, i.e., with some or all of A, H, K, N, R, W and X. Alternatively or additionally, one of the user interactions is associated only with letters having a top or bottom horizontal line, i.e., some or all of B, E, F, L, P, R, T, Z.

In some embodiments, one of the user interactions is associated with all the letters meeting a specific shape feature. For example, in one embodiment, one of the user interactions is associated with all the letters having a large arc, i.e., with C, D, G, O, Q.

In accordance with some embodiments, the user interactions are each assigned a shape rule and each user interaction is assigned the letters meeting its rule. Optionally, the rules are given an order of precedence, such that if a letter meets two shape rules it is assigned to the user interaction having the rule with a higher precedence.

In some embodiments, four user interactions are associated with all the letters of the Latin alphabet. A first user interaction is assigned two leg letters with highest precedence. A second user interaction is assigned large arc letters with next to highest precedence. A third user interaction is assigned letters with a top or bottom horizontal bar and a lowest precedence interaction is assigned letters with an odd number of contact points with the bottom line.

In some embodiments, a small number of variations relative to the shape rules are allowed in order to allow for other considerations. For example, variations from the shape rules may be used to avoid letters assigned to a same user interaction in a second assignment of letters to user interactions, e.g., in accordance with the telephone keypad assignment, from being assigned to the same user interaction.

In some embodiments, the letters of the Latin alphabet are assigned to four user interactions in the following groups: AHKNRX, CDGOQUW, BELPTZ, and FIJMSVY.

An aspect of some embodiments relates to a method of defining a location of a keyboard on a touch surface of an input interface of a device. The method includes identifying a simple sweeping gesture on the touch surface, that is not identified by the operating system of the device and positioning the keyboard around the location in which the simple sweeping gesture is provided. Using a gesture not identified by the operating system avoids the simple gesture from being interpreted as performing a different task than the keyboard calibration.

In an exemplary embodiment, the gesture comprises performing substantially the same sweeping gesture concurrently at two different locations. Optionally, the keyboard has two different parts and each of the sweeping gestures indicates the location of a different part. In some embodiments, the simple sweeping gesture comprises a downward movement along the touch surface.

An aspect of some embodiments relates to an input interface with a touch surface defining a plurality of letter zones which are each associated with a plurality of letters. User sweeping gestures from the letter zones in predetermined directions, regardless of the starting location of the sweeping gesture in the letter zone are interpreted as input of a specific one of the letters of the letter zone, according to the direction.

In some embodiments, the letter zones are soft keys which when pressed indicate ambiguous input of all the letters associated with the soft key letter zone.

An aspect of some embodiments relates to an input interface with a touch surface defining a plurality of soft keys each associated ambiguously with a plurality of symbols. When touching a soft key, the symbols corresponding to the touched key are displayed in a large form on a display of the device, possibly the touch surface being the display.

Alternatively or additionally, a special character menu associated with the soft key, which serves as a menu selection for those special keys, is displayed.

An aspect of some embodiments of the invention relates to an input interface including a touch surface on which a plurality of soft keys are defined. The input interface is adapted to interpret a pressing on a soft key as ambiguously entering a plurality of characters in the alternative, and to interpret a directed sweep movement on the touch surface beginning, ending and/or passing through the soft key, as an unambiguous selection of a specific character.

Thus, the user is provided with the flexibility of selecting between ambiguous entry of a plurality of symbols and precise entering of a single character on a position by position basis.

Optionally, the directed movements through the soft key (e.g., beginning, ending or passing) are interpreted as corresponding to specific ones of the plurality of characters associated ambiguously with pressing the key. This makes the task of the user in determining the characters associated with the key simpler.

An aspect of some embodiments of the invention relates to an input interface including a touch surface adapted to identify user sweep movements on the surface and associate the sweeps with functions according to their direction and a current menu. The current menu is determined according to a received user input provided separately from the sweep movement. In some embodiments of the invention, the received user input determining the current menu, is received before the sweep movement. Alternatively or additionally, the user input determining the current menu is received concurrently with the sweep movement.

The received user input determining the current menu may be, for example, pressing a key or providing a directed sweep movement on the touch surface. Possibly, the menus are nested in accordance with a tree model to at least three, four or even more levels.

Optionally, the input interface defines at least four menus or even at least six menus. Optionally, each menu provides different interpretations to up to 8 or 9 sweep directions, although menus with more or fewer different interpretations may be used.

In some embodiments, at least some of the menus assign entrance of a specific symbol to one or more directions and assign functions, such as edit functions (e.g., copy, paste, cut), menu selection and/or function keys, to one or more other directions of the same menu.

An aspect of some embodiments of the invention relates to an input interface including a touch surface adapted to interpret directed sweep movements according to their direction, as compared to a corresponding menu. The menu is selected responsive to a time or length attribute of the sweep movement. In some embodiments, different menus are assigned to sweep movements of different lengths. Alternatively or additionally, different menus are assigned to sweep movements having different entry times or different durations of interaction of the user with the touch surface before beginning the sweep movement and/or after completing the sweep movement. For example, if a user presses on the touch surface and immediately begins the sweep movement along the surface, the sweep movement is interpreted according to a first menu, while if the user waits at least a predetermined duration while contacting the surface and only then begins the sweep movement, the sweep movement is interpreted as relating to a different menu.

Optionally, the corresponding menu also depends on the location on the touch surface from which the sweep movement starts.

An aspect of some embodiments of the invention relates to an input interface adapted to receive user interactions to which a plurality of symbols are assigned ambiguously. The input interface is adapted to display reminders of the symbols ambiguously associated with the user interactions, in a two dimensional array of the symbols. Optionally, the symbols are arranged in the two dimensional array in accordance with well known arrangement of symbols, such as the telephone pad arrangement. Alternatively or additionally, the symbols are arranged in the displayed reminders of a first set of user interactions according to their assignment arrangement in a second set of user interactions. For example, an input interface may receive the letters of the alphabet through two different sets of user interfaces: a first set in which four keys are assigned all the letters of the alphabet and a second set in which the keys are assigned to a telephone keypad arrangement. In such an example, the display reminders of the first set are optionally arranged in a two dimensional array in which the letters are arranged in their positions in the keypad arrangement.

In some embodiments of the invention, the two dimensional arrays have at least a 3 rows and 3 columns. Optionally, the letter arrangement may include empty spaces between displayed letters, such that the symbols correspond to desired positions, even when some positions do not have corresponding symbols.

Optionally, the user interactions comprise actuations of soft and/or hard keys. The display reminders may be displayed on the keys, adjacent the keys and/or at a different location. The display reminders may be displayed continuously or may be displayed when needed, for example when contact of a user with the soft key is identified.

An aspect of some embodiments of the invention relates to an input interface adapted to receive two different sets (e.g., a first set and a second set) of user interactions corresponding to a same set of symbols, for example at least the letters of an alphabet. The symbols corresponding to the user interactions of the first set are displayed with at least one feature indicative of the arrangement of the symbols in the second set. The indicative feature may aid users to more quickly identify a second-set user interaction corresponding to a specific symbol and/or when the user is familiar with an arrangement of the second set to more quickly identify the first-set user indication corresponding to the symbol.

In some embodiments, the indicative feature comprises a color. Optionally, the symbol display for each of the first set user interactions is assigned a different color and the symbols displayed for the second set user interactions are displayed color coded with the color of the user interaction of the first set that includes the symbol.

Alternatively or additionally, the indicative feature includes the position of the symbol in the second set of user interactions. For example, when the second set of user interactions includes actuations of keys in a given key arrangement (e.g., the telephone keypad arrangement) and/or of sweep gestures on a touch pad in different directions, the display of the symbols assigned to a first-set user interaction is arranged such that each symbol is positioned in the display according to its location in the keys or sweep directions of the second set.

An aspect of some embodiments of the invention relates to an input interface including a set of soft keys and a set of hard keys which are assigned the same input tasks. Optionally, the sets of hard and soft keys include at least four hard keys and four soft keys that respectively have the same function. In some embodiments, the set of hard keys is together assigned at least all the letters of an alphabet, e.g., the Latin alphabet and hence also the corresponding soft keys are assigned all the letters of the alphabet. In some embodiments of the invention, the hard keys are positioned on one or more sides of a touch screen or other touch pad and the corresponding soft keys that have the same function are positioned on the touch screen adjacent the hard keys. The provision of both hard keys and soft keys allows the user to decide which key to use such that users finding it more convenient to use hard keys may use hard keys, while users preferring soft keys get their choice. Alternatively or additionally, the soft keys may be used for sweeping gestures in addition to their input task.

An aspect of some embodiments of the invention relates to an input interface including a touch screen. A plurality of symbol zones (e.g., soft keys) assigned to one or more symbols are defined on the touch screen. Sweep gestures related to a symbol zone, for example beginning and/or ending in the letter zone, are assigned inputs according to their related symbol zone, while sweep gestures not related to any of the symbol zones are given different interpretations.

In some embodiments of the invention, sweep gestures related to a symbol zone are interpreted as providing a new symbol, while sweep gestures not related to a symbol zone are interpreted as correcting a previously entered symbol.

An aspect of some embodiments of the invention relates to an input interface providing two different sets of user interactions corresponding to the letters of the Latin alphabet. A first set has the user interactions arranged in a manner similar to the QWERTY keyboard arrangement. Optionally, some or all of the user interactions of the first set that correspond to letters, correspond to a plurality of letters mostly adjacent each other in the QWERTY arrangement. A second set has the user interactions arranged in a manner similar to the telephone keypad arrangement. In some embodiments, a small number of letters (e.g., up to four or up to six) in the first set are in locations different from the QWERTY arrangement in order to provide better compatibility between the first and second sets of user interactions. Alternatively, a small number of letters in the second set are out of place.

An aspect of some embodiments of the invention relates to an input interface including a touch screen on which soft keys corresponding to an alphabet are displayed in two groups. The input interface is adapted to adjust the locations of the groups of soft keys in response to specific user sweeping movements on the touch screen in a manner which allows the user to adjust the location of each group of soft keys on the touch screen separately.

An aspect of some embodiments of the invention relates to a device including an input interface having a touch screen adapted to give different interpretations to different sweep gestures on the screen. Optionally, sweep gestures beginning from an edge of the touch screen is given a different interpretation than sweep gestures beginning at points within the touch screen. For example, sweep gestures beginning at a right and/or left edge of the screen may be interpreted as adjusting locations of soft keys on the touch screen, while sweep gestures on other locations are interpreted as inputting data, controlling a mouse and/or performing other tasks.

In some embodiments of the invention, a thin window is defined along one or more edges of the touch screen such that sweep gestures beginning at the edge of the touch screen are events directed by an operating system of the device to be handled by a process associated with the thin window and not by a general process which handles sweep gestures not assigned to any specific window. Optionally, the thin window has a width of less than 50 pixels, less than 20 pixels or even less than 10 or 5 pixels. In some embodiments of the invention, is barely viewable by the user or even not viewable at all.

An aspect of some embodiments of the invention relates to an input interface having a touch pad, which identifies sweep gestures on the touch pad and interprets them as corresponding to various tasks and/or inputs according to their parameters, such as current menu, start location, direction, length and/or duration. The input interface is adapted to identify continued contact with the touch pad after completing the gesture and interpret such continued contact as an input or command additional to that of the sweep gesture or prolonging the input or command of the sweep gesture.

In some embodiments of the invention, a sweep gesture interpreted as a "shift" or other menu selection command takes effect as long as the contact with the touch pad after completing the gesture continues.

In other embodiments, a sweep gesture interpreted as entering one or more symbols (e.g., letters, digits, characters) is interpreted as being repeated every predetermined period as long as the contact with the touch pad at the end of the sweep gesture continues.

Optionally, when a task and/or input is indicated by a user contact with the touch pad at a different location, in addition to the sweep gesture, the interpretation of the continued contact does not require continued contact at the different location.

An aspect of some embodiments of the invention relates to an input interface including a touch surface adapted to interpret user interactions with the touch surface as corresponding to various characters. After the input of some characters, automatically or upon a command from the user, the input interface displays to the user a completion menu, not continuously provided, of completions and/or additions to the input character or to a current input word and the user may select the completion from the menu.

In some embodiments of the invention, the selection of an input from the completion menu is performed by a sweep gesture in a direction of the desired input in the displayed menu.

Optionally, the display of the completion menu is selected by the user by touching the touch surface at a location not assigned to a specific soft key. In some embodiments of the invention, the touching of the touch surface to select the completion menu is performed before the contact with the touch surface for entrance of the completed character is discontinued. The selection from the completion menu is optionally performed by a sweep gesture from the point of touching the touch surface, without discontinuing the contact with the touch surface between the contact with the touch surface and the selection from the completion menu. In some embodiments of the invention, one of the options of the completion menu may be display of additional options. Alternatively or additionally, after selecting from the completion menu, the user is allowed to request display of an additional completion menu, or the additional completion menu is displayed automatically.

The completion menu may provide word suffixes selected from a dictionary for the inputted current word, and/or commonly used completion sequences, such as sequences used in Internet addresses (e.g., corn, net after entering a period) and/or the current date or time.

In some embodiments, the completion menu may be used to complete specific symbols, for example for selection of Pinyan symbols for Chinese characters, accent symbols for Latin characters and/or pronunciation marks for Hebrew letters.

An aspect of some embodiments of the invention relates to an input interface including a touch surface adapted to identify user finger swipes on the touch surface and to give different interpretations to swipes in different directions. At least some of the swipes are interpreted as control functions, such as copy, paste, or shift.

An aspect of some embodiments of the invention relates to an input interface including a screen, adapted to display entered text including letters and other characters and symbols in a first word processing window. One or more most recently entered words are optionally displayed in a second window, before their display in the first window or in parallel to their display in the first window, allowing separate control of the display of the current words not under constraints imposed by the word processing window.

In some embodiments, the second window is positioned in a fixed location on the screen. Alternatively, the second window is moved along the first window according to the location of the current words in the first window.

An aspect of some embodiments of the invention relates to a data entry unit which receives user selections of keys of the second keypad of the invention in form of at least the well known 12 key telephone keypad in the form of gliding actions (e.g. vectors) which indicate respective positions of keys in at least the 12 key telephone pad. For example, the vectors may be interpreted as relating to the key to which the vector points if its start point is at the middle 5 button of the telephone keypad. According to one embodiment of the invention, said second keypad may be a predefined imaginary keypad model which may not be shown to the user on a screen and said press/gliding actions on the screen duplicates interactions with the keys of said imaginary keypad.

The first and second keypads of the invention may have any number of keys and any configuration of letters on the keys as long as they comply with the principles of distribution of characters (e.g. letters) as described in detail (e.g. any of the (letter) keys of the first keypad and any of the (letter) keys of the second keypad preferably have at most one common character/letter).

There is therefore provided in accordance with an embodiment of the invention, a data entry system, comprising an input interface adapted to identify a plurality of user interactions, a processor adapted to associate user interactions identified by the input interface with a plurality of letters of the alphabet, such that all the letters of the alphabet are assigned to at most eight user interactions, and most of the letters are assigned to specific user interactions according to one or more features of their shape in their printed form, such that most of the letters assigned to each user interaction have the same shape feature.

Optionally, the shape feature of at least one of the user interactions comprises the number of legs the letter has in its printed form. Optionally, the shape feature of at least one of the user interactions comprises whether the letter has an uneven number of legs.

Optionally, the shape feature of at least one of the user interactions comprises whether the letter has a large or a small arc. Optionally, the shape feature of at least one of the user interactions comprises whether the letter has a large arc. Optionally, the shape feature of at least one of the user interactions comprises whether the letter has an upper or lower horizontal line.

Optionally, the shape feature of at least one of the user interactions comprises whether the letter has a lower horizontal line. Optionally, at least one of the user interactions is associated only with the letters having a specific feature shape.

Optionally, one of the user interactions is associated only with letters having two legs.

Optionally, at least one of the user interactions is associated with all the letters having a specific feature.

Optionally, one of the user interactions is associated all the letters having a large arc.

Optionally, the user interactions with which the letters are associated are interpreted as ambiguously entering all the letters with which they are associated.

Optionally, the user interactions with which the letters are associated are interpreted as a first step of selecting unambiguously one of the letters associated with the user interactions.

Optionally, the user interactions comprise pressing of keys.

Optionally, the user interactions comprise sweeping gestures on a touch surface in different directions. Optionally, none of the user interactions are assigned a plurality of letters assigned to a same key in the telephone keypad.

There is further provided in accordance with an embodiment of the invention, a data entry system, comprising a touch screen, a processor, an operating system running on the processor adapted to interpret sweeping gestures on the touch screen and perform tasks responsive to the sweeping gestures and an input module running on the processor adapted to identify a specific sweeping gesture not identified by the operating system and to define a location of a keyboard on the touch screen responsive to the identified sweeping gesture.

Optionally, the input module is adapted to identify two gestures provided concurrently at different locations on the screen. Optionally, the input module is adapted to define a first portion of the keyboard at a location of a first one of the two gestures and a second portion of the keyboard at a location of a second one of the two gestures. Optionally, each portion of the keyboard includes fewer than 5 keys. Optionally, the two gestures are the same in direction.

There is further provided in accordance with an embodiment of the invention, a data entry system, comprising a touch surface and a processor adapted to define a plurality of letter zones, each assigned a plurality of letters, on the touch surface, to identify sweeping gestures on the touch surface beginning from the touch surface and to associate the identified sweeping gestures with one of the letters associated with the letter zone at which it begins, according to the direction of the gesture, without relation to the starting point of the sweeping gesture in the letter zone.

Optionally, the processor is adapted to define the letter zones as soft keys which when actuated are interpreted as input of all the letters assigned to the actuated zone, ambiguously. Optionally, the processor is adapted to define four letter zones associated with all the letters of the alphabet.

There is further provided in accordance with an embodiment of the invention, a data entry system, comprising an input interface adapted to receive a plurality of different user interactions, a processor adapted to assign symbols to the user interactions, at least some of the user interactions being assigned a plurality of letters and markings for a plurality of the user interactions indicating the assignment of letters to the user interaction, the markings including a two dimensional array of letters.

Optionally, the markings for the plurality of the user interactions include a 3×3 array of letter positions. Optionally, the markings for at least one of the user interactions include an empty array position between two letters.

Optionally, letters in the markings for the user interactions are arranged according to the arrangements of the letters in the telephone keypad.

Optionally, the user interactions comprise key actuations and the markings are placed on the keys. Alternatively, the user interactions comprise key actuations and the markings are placed not on the keys.

There is further provided in accordance with an embodiment of the invention, a method of receiving user data entry, comprising receiving a first user interaction, by a data entry system; inputting one or more characters corresponding to the first user interaction, receiving a second user interaction, by the data entry system. immediately after receiving the first user interaction, the second user interaction being a sweep gesture on a touch pad of the system, in a specific direction; and inputting an auxiliary input to the one or more characters, responsive to the direction of the second user interaction and to the one or more characters.

Optionally, the second user interaction is received before the first user interaction is completed. Optionally, the second user interaction is received before contact with an input interface of the system for entering the first user interaction is terminated. Optionally, the first user interaction comprises actuation of a soft key. Optionally, the second user interaction comprises a sweep gesture entered after actuating the soft key without releasing the actuation before beginning the sweep gesture.

Optionally, the first user interaction comprises a sweep gesture on a touch pad of the system. Optionally, the first and second user interactions are received through a touch pad of the data entry system, wherein the second user interaction comprises a sweep gesture beginning at a different location on the touch pad, than the ending point of the first user interaction.

Optionally, the second user interaction is started before the contact with the touch pad for the first user interaction is terminated. Optionally, the auxiliary input comprises an accent marking for the one or more characters. Optionally, the auxiliary input comprises a word completion for a current word including the one or more characters.

Optionally, the method includes receiving a third user interaction, by the data entry system, immediately after receiving the second user interaction, the third user interaction being a sweep gesture on a touch pad of the system, in a specific direction and inputting a further auxiliary input to the auxiliary input, responsive to the direction of the third user interaction and to the auxiliary input.

There is further provided in accordance with an embodiment of the invention, a data entry system, comprising a touch screen and a processor adapted to provide on the touch screen a keyboard of soft keys including one or more mode keys, wherein responsive to a mode key being pressed, the processor displays on the touch screen an arrangement of special characters not included in the keyboard and wherein the processor is adapted to identify sweep gestures on the touch screen and to interpret the sweep gestures according to a most recent actuated mode key.

Optionally, the keyboard of soft keys includes at least letter keys arranged as in a QWERTY keyboard.

Optionally, the keyboard of soft keys includes at least letter keys arranged as in a telephone keypad. Optionally, the one or more mode keys comprises a punctuation mode key corresponding to punctuation marks.

Optionally, the arrangement of special characters displayed responsive to the mode key comprises at least six special characters. Optionally, the arrangement of special characters displayed responsive to the mode key comprises not more than twelve special characters.

There is further provided in accordance with an embodiment of the invention, a data entry system, comprising a touch pad, an input interface adapted to receive user interactions; and a processor adapted to identify different user interactions received by the input interface and associate them with respective groups of characters, and to identify letters corresponding to complex sweep gestures on the touch pad based on handwriting recognition and to apply the identified letter to an input position selected responsive to a location of the complex sweep gesture on the touch pad.

Optionally, the input interface is adapted to receive the user interactions through the touch pad. Optionally, the input interface is adapted to receive the user interactions through soft keys.

Optionally, the processor is adapted to handle characters determined from complex sweep gestures on a most recently actuated soft key differently than from gestures not on the most recently actuated soft key. Optionally, the processor is adapted to handle characters determined from complex sweep gestures on a most recently actuated soft key as relating to a currently inserted character and to complex gestures not on any soft key as correcting a previously entered letter.

BRIEF DESCRIPTION OF FIGURES

Exemplary non-limiting embodiments of the invention will be described with reference to the following description of embodiments in conjunction with the figures. Identical structures, elements or parts which appear in more than one figure are preferably labeled with a same or similar number in all the figures in which they appear, in which:

FIG. 4 is a schematic illustration of a mobile unit with a detachable keypad, in accordance with an exemplary embodiment of the invention;

FIG. 5 is a schematic illustration of entering data to a mobile device using sweeping acts, in accordance with an exemplary embodiment of the invention;

FIG. 6 is a schematic illustration of a key arrangement, in accordance with an exemplary embodiment of the invention;

FIGS. 46-47A are schematic illustration of methods of letter presentation on the keys of the first keypad, in accordance with some exemplary embodiments of the invention.

DETAILED DESCRIPTION OF EMBODIMENTS

Figure 1:
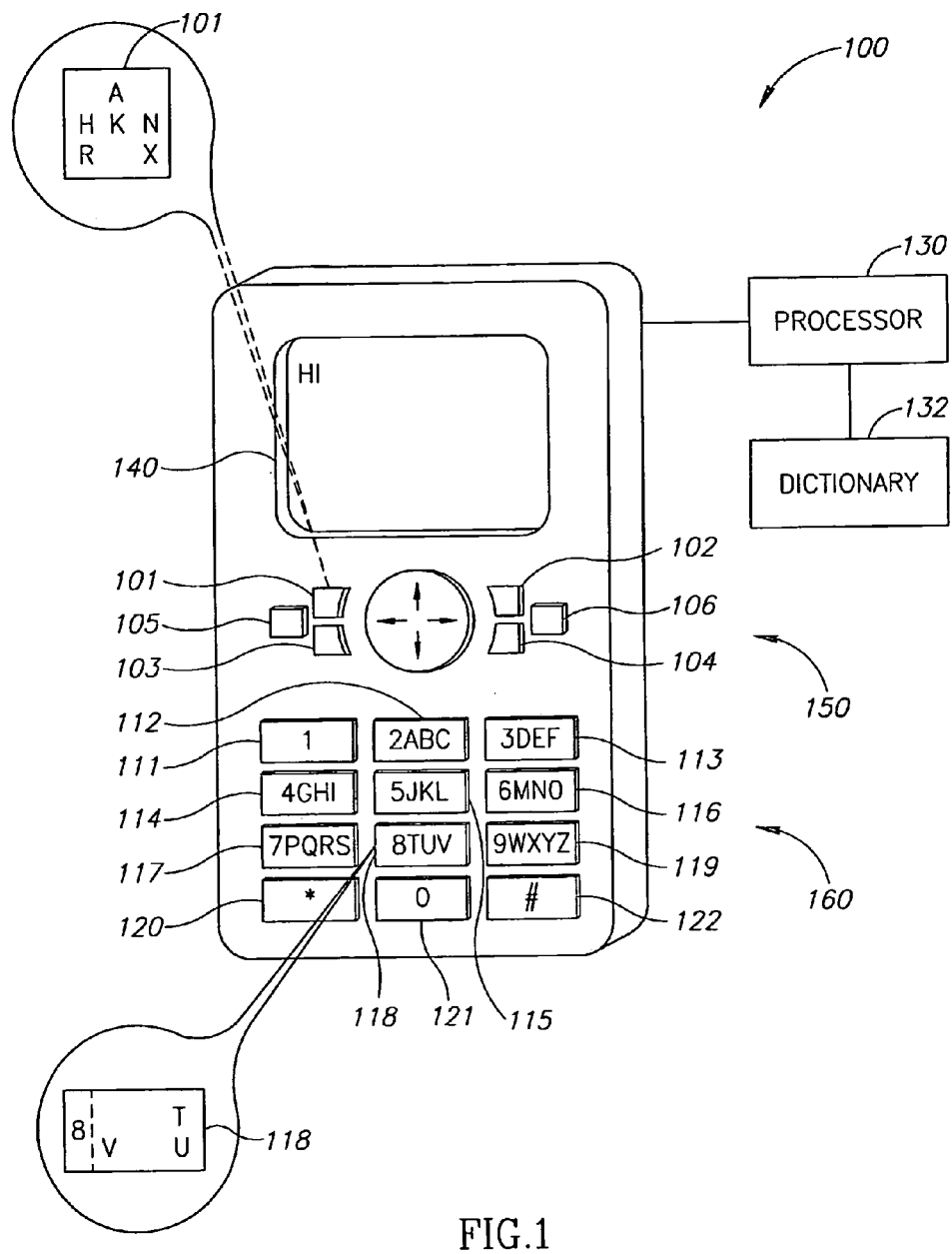
FIG. 1 is a schematic illustration of a mobile phone, in accordance with an exemplary embodiment of the invention.

According to a preferred embodiment of the invention, the system may include a first set of input signals provided for example through a first set of few keys (e.g. the first keypad) wherein at least the letters of one (e.g., or more) language are distributively and ambiguously assigned to at least some (e.g. preferably four) of said few keys such that to each of said at least some of said few keys more than one of said letters are ambiguously assigned (e.g. ambiguous keys). Preferably, said letters are distributed on said keys such that when a user presses the keys corresponding to the characters (e.g. letters) of a desired word (e.g. first input information) mostly the desired word is proposed to the user by the system based on said key presses (e.g. said first input information) alone. It is understood that in some cases the desired word may not be proposed as a first choice to the user (e.g. the desired word may not have the highest priority among the words that correspond to the same key presses) and the system may propose another word (e.g. a non desired word that has a higher priority).

According to a preferred embodiment, the system may include at least a second set of input signals provided for example through a second set of keys (e.g. the second keypad) such as a telephone-type keypad keys wherein to at least some of the keys of said second set of keys at least the letters of the same one (e.g., or more) language are distributively assigned such that to each of said at least some of said keys of the second set of keys more than one of said letters are ambiguously assigned.

According to one embodiment of the invention, the letters on said few (e.g. four ambiguous) keys of said first set of keys and the letters on said additional/second set of keys (e.g. telephone-type keypad) may be distributed such that a (e.g. any) key of said ambiguous (letter) keys of said first keypad and a (e.g. any) key of said ambiguous (letter) keys of said second keypad may have at most one common character (e.g. letter).

Thus, by pressing a key of a first set of keys and a key of the second set of keys for a specific character/letter or for a specific character location within a word (e.g. a word may have one or more characters), the user indicates a specific letter/character (e.g. the common letter/character) unambiguously. In other words, in order to enter a precise character/letter the user may first press the key of the first keypad corresponding to said character/letter and then press the key of the second keypad also corresponding to said desired character/letter, or vice-versa. By considering said key presses and the fact that there is at most one common character on the two keys, the system precisely selects/enters the desired (e.g. the common) character/letter.

By using key-presses of two keys, the data entry system of the invention thus provides precise character identification, with the unique, character common to the two keys being unambiguously selected thereby. Although having utility on its own, the system as described hereinabove may usefully be used together with a software based word predictive system wherein ambiguous key selections are compared with words within a database including words and corresponding key press information as known, to predict or confirm the user's intention. The principles of such word predictive systems are known to those skilled in the art.

As an example, in order to enter a desired word, according to one method the user may first provide a first input information by pressing the (ambiguous) keys of the first keypad corresponding to the characters of the desired word. The system may propose a word from the database corresponding to the first input information. In accordance with one method, the word suggested is the word having the highest priority among the words corresponding to the input information. If the proposed word is not the desired word, the user may proceed with what is referred to herein as a correction procedure providing additional input information by pressing a key of the second keypad corresponding to one of the characters, eventually, the first character, of the desired word. By relating the key presses of the first and the second keypad corresponding to the character, and the fact that there is at most one character common to both selected keys, the character is precisely and unambiguously selected, and the system precisely recognizes the character. By considering the combined input information, the system proposes another word from the database corresponding to the combined information. If the new word proposed by the system is not the desired word, the user may provide additional input information, e.g. by pressing the key of the second keypad corresponding to another character preferably the next character of the desired word, and so on, until the system proposes the desired word.

According to another method, the user may first provide precisely at least one character of the desired word as described above, and additionally press the ambiguous keys of the first keypad that (non-uniquely) correspond to the remaining characters of the desired word. By precisely recognizing at least one character of the word and by also considering the ambiguous key presses corresponding to the remaining characters of the word, the system is able to more accurately predict the desired word and proposes it to the user. If the proposed word is not the desired word, the user may provide additional pressing actions on the keys of the second keypad corresponding to the additional characters of the desired word until the system predicts/proposes the desired word.

If the desired word is not in the dictionary, then, in addition to the first input information provided through the first keypad, generally, the user presses the keys of the second keypad corresponding to all of the letters of the desired word.

Preferably, the first keypad of the invention has generally less (letter) keys (e.g. preferably four letter keys) than the second keypad (e.g. a telephone type keypad having eight letter keys). This is because the main portion of a text may be entered through the first keypad without the need of using the second keypad. Obviously, having/using less keys makes the text entry easier and faster.

The data entry system and correction thereof as described hereinabove is a very fast and easy system. Briefly stated, according to a preferred method, the user types the desired word through the first keypad. Generally, the system proposes the right (e.g. desired) word. If not the user begins to retype the word using the second keypad. If the word is in the dictionary, most of the time, the system proposes the word as soon as retyping the word through the second keypad commences. If the word is not in the dictionary, the user generally retypes all of the letters/characters of said word. With such word predictive data/text entry system, the user does not have to worry about if the word is or is not in the dictionary database. He knows that at some point during typing/using the first keypad (e.g. the system may also include a word completion method) or during the retyping procedure using the second keypad the system will propose the desired word.

According to one aspect, the system may include an In-Word characters selection means to navigate on the characters of the word and select one of them for example further correction. Said navigation may be made automatically by the system or arbitrarily by the user.

System Overview

FIG. 1 is a schematic illustration of a mobile phone 100, in accordance with an exemplary embodiment of the invention. Mobile phone 100 comprises a plurality of input keys and an output screen 140. Each input key may be used by a user to provide one or more input signals, which represent letters, numbers, other symbols and/or control functions. In order to simplify the data entry task while limiting the number of keys, at least some of the input signals are ambiguously associated with a plurality of characters. A processor 130 receives indications of the input signals actuated by the user and selects one character for each received input signal, optionally using an internal word dictionary 132, which lists words with respective ratings of frequency of use.

In some embodiments of the invention, the keys of mobile phone 100 are included in two main groups, a first group 150 and a second group 160, which each has keys associated with all the letters of the alphabet. The letters are optionally distributed between the keys in each group, such that each pair of a key from the first group 150 and a key from the second group 160 has only a single letter in common. Thus, by pressing a first group key and a second group key for a specific character location, the user indicates a specific letter unambiguously. While generally processor 130 guesses the words intended by the user based on the first keys only, when this does not occur the user can easily use the second keys to indicate the precise letters desired. In other embodiments, one or more pair of first and second keys may have more than one letter in common, in order to reduce the number of keys required. Optionally, the letters in common are ones which are generally not interchangeable in words (e.g., Q and V), such that processor 130 will nearly always guess which letter is intended, using dictionary 132. In these embodiments, a mode key may be used to enter a mode in which specific letters can be entered unambiguously.

In an exemplary embodiment of the invention, first group 150 includes four keys, 101, 102, 103 and 104, assigned all the letters of the Latin alphabet. For example, in one embodiment, key 101 is assigned the letters HEBLXQ, key 102 is assigned the letters FARMZT, key 103 is assigned the letters GOVSYCK and key 104 is assigned the letters JUINWDP. Other letter arrangements may be used on the four keys 101-104 and/or the letters may be arranged on a different number of first group keys. Optionally, the letters are arranged in a manner which minimizes the chances of a sequence of key strokes corresponding to more than one frequently used word, for example by placing each of the vowels A, E, I and O on a different key. Keys 105 and 106 are optionally used for entering a space and a backspace, respectively.

In some embodiments of the invention, second group 160 includes twelve keys arranged in the standard numeric keypad arrangement used in many mobile telephones, with three columns of four rows. Optionally, the digits are assigned to keys 111-119 and 121 and the letters of the Latin alphabet are assigned to eight keys, keys 112-119. It is noted that the first group (150) and second group (160) may include any suitable number of keys, and the letters of the alphabet may be distributed in each group between any suitable number of keys.

In another exemplary embodiment, the letters are assigned to the first group 150 and/or the second group 160 according to their shapes, in a manner which allows the user to quickly translate the shape of a letter to the key it belongs. Optionally, for a set of four keys 101-104 to which all the letters of the alphabet are assigned, a first key 101 is assigned round letters, e.g., CGJOQU, a second key 102 is assigned two leg letters, e.g., AHKNRWX, a third key 103 is assigned letters having a top or bottom horizontal line, e.g., BDEFLSZ, and a fourth key 104 is assigned letters having an odd number of legs, e.g., IMPTVY. In an alternative embodiment, the shapes of the lower case letters are considered in distributing the letters between the keys. For example, a first key 101 may be assigned letters going below the line, e.g., gjpqy, a second key 102, the remaining letters extending above the upper line, e.g., bdfhiklt, a third key 103 letters having a round lower part, e.g., ceorsu, and a fourth key 104 the remaining letters, e.g., amnuvwxz.

In some embodiments of the invention, the letters are assigned to the first group keys and/or to the second group keys in an order which is familiar to many users, such as the order of the alphabet and/or the QWERTY keyboard order. For example, for six keys corresponding to all the letters of the alphabet, each key may be assigned the letters of half a row of the QWERTY keyboard. Possibly, small variations from the user familiar key order are made, for example when such variations are expected to enhance the correct guessing of intended words using dictionary 132.

While it is best to use the exact QWERTY keyboard arrangement or the exact arrangement of some other familiar keyboard, in some cases small variations from the exact familiar keyboard arrangement may be used in order to avoid having a pair of a first group letter key and a second group letter key having more than one letter in common.

In order to allow quick access to at least some special characters, each of keys 101-104 may be assigned one or more special characters, completing the number of symbols assigned to each key to eight or to nine. Alternatively, each key 101-104 is assigned a single special character. The special characters on keys 101-104 with the letters are optionally those most used while typing words, for example "," (comma), "_" (underscore), "-" (hyphen) and "&" (ampersand). Alternatively, period may be used instead of one of the other symbols.

In a text entering mode, a current character position, referred to herein also as a cursor position, is defined on display 140. Optionally, in entering a word, the user presses a sequence of first group keys 101-104. When the user presses a first group key 101-104 for the first position of the word, the cursor position is associated with all the letters associated with the pressed key. One of the associated letters is displayed in the cursor position on display 140, for example a letter which in itself is a word or a letter which is most commonly used. The cursor position is then moved to an adjacent character position. When the user presses another first group key, the now current cursor position is associated with all the letters associated with the pressed key and one of the letters is displayed in the cursor position on display 140. The letter displayed for the cursor position is optionally selected based on all the keys pressed for the current word and not only the key pressed for the current cursor position. In addition, the letters displayed for the other character positions of the current word are optionally updated according to all the keys pressed for the current word.

After completing entering a word with the first group keys, processor 130 generally guesses the word intended by the user. In those cases in which the word was not guessed correctly, the user can enter additional information using the second group keys. In some embodiments of the invention, when the cursor is positioned at the end of a word, a press on a second group key refers to the first character position of the word associated with a plurality of letters (referred to herein as not disambiguated). Following the pressing of the second group key, the character position is associated only with the letter in common to the letters of the first group key and the second group key pressed for the character position. This letter is displayed on display 140 for the character position. Optionally, the letters displayed for the entire word are updated accordingly, based on the contents of word dictionary 132. The user may then press additional second group keys for subsequent character positions of the word, when processor 130 was still not able to guess the intended word.

This process may be repeated, if necessary, until the entire word is entered again, this time using the second group keys.

In other embodiments of the invention, when a second group key is pressed it refers to the last character position of the word that was not disambiguated, rather than to the first letter of the word. It is noted that in some embodiments, the user may press second group keys before entering an entire word, for example when the user knows in advance that the word will not be guessed correctly by processor 130. It is noted that the processor 130 is configured to apply a second input signal provided by a second group key to a different position within the current word than a first input signal provided by a first group key, from a same cursor location.

When a second group key is pressed while the cursor is in the middle of a word, with further letters of the word already entered on its right, the second group key optionally applies to the character position immediately to its left. Alternatively, as at the end of the already entered letters of the word, also when in the middle of a word, the second group keys pressed apply to the first not disambiguated character position of the word.

Backspace

In some embodiments of the invention, in addition to backspace key 105, which cancels all information regarding a character position to which it is applied, an additional key is assigned a second backspace function for removing a second-group key disambiguation act, while leaving the character position associated with the letters of a first-group key. Optionally, when the second backspace function is applied to a character position associated with a plurality of letters, the second backspace function has no affect. Alternatively, when the second backspace function is applied to a character position associated with a plurality of characters, it operates as backspace key 105 and removes the association of the character position with the group of letters. Alternatively to two different backspace keys, a single backspace key is used. When applied to a disambiguated character position the backspace function removes the disambiguation and when applied to a multi-letter character position it removes the group of letters from being associated with the character position.

The second backspace function may optionally be applied several times in sequence until the entire current word is moved back to its original ambiguous form. In some embodiments of the invention, an undo button or input signal, which cancels the most recent input regardless of whether it was a first group key or second group key is provided in addition to or instead of the backspace key.

Cursor Position

Optionally, a user can select a cursor position using a mouse control or by positioning the cursor near the position to be selected. The selected cursor position may optionally be anywhere on the screen not necessarily in the most recently entered word. Pressing a first key for the selected cursor position optionally replaces the data of the current cursor position with the letters of the first key. Pressing a second group key for the selected position optionally replaces any disambiguation information associated with the cursor position, with the disambiguation by the pressed second key, leaving the first key information of the cursor position unchanged. Alternatively, second group keys take no affect in single letter character positions. Further alternatively, the letters of the second group key replace the current letter or letters of the character position.

Optionally, after pressing a first key for the position, the cursor position of mobile phone 100 remains in the same location, in case the user wants to perform disambiguation using a second group key. In contrast, when a second group key is pressed, the current cursor optionally moves to the next character position, to the next character position including a letter or to the next not disambiguated character position.

In some embodiments of the invention, the user can control the character position affected by the second group keys, separately from the cursor location which affects the character position that will be affected by a pressed first group key. Optionally, a correction point indicator points to a character position within the word, which will be corrected by the second group keys. In some embodiments of the invention, the correction point indicator is displayed on display 140, for example as a dot above or below the letter in the character position to which the indicator points. Optionally, the user can move the correction point indicator within the current word, for example by pressing a first sequence of two first group keys to move the indicator to the right and a second sequence to move the indicator to the left.

Dictionary

Optionally, when a user writes a word by disambiguation using the second keys, the word is added to the dictionary, so that the processor will guess the word next time it is used. Optionally, at first the new word is assigned a relatively low priority, such that it is chosen only if original dictionary words that match the letters of the word are not available. In some embodiments, each time the user enters the word, the priority of the word is raised.

Optionally, a key of mobile phone 100 or a key combination (e.g., keys 103 and 104 pressed together) is assigned to a fixation act which tells processor 130 that the guess letter for the current character position is correct. Alternatively, the fixation act indicates to processor 130 that the guess letters for all the letters of the current word up to the current location are accurate and these locations are disambiguated accordingly. Possibly, two different key combinations are assigned to letter and word fixation acts.

First—Second Options

In some embodiments of the invention, the first group 150 keys are used to enter letters and the second group keys are used for disambiguation. Optionally, when a second group key is pressed for a character position not associated with a group of letters entered by a first key, the character position is associated with a digit associated with the pressed second key or with a symbol, function or other key meaning associated with the second key.

In other embodiments of the invention, the second group keys are used to enter letters and the first keys are used only for disambiguation. In still other embodiments, the user may initially enter letters through either the first or second keys as desired by the user, possibly switching between the first and second keys even during entering of a specific single word. In some embodiments of the invention, the operation mode of processor 130 as to whether letters are initially entered through the first keys, the second keys or both, is user adjustable.

Mode Keys

Optionally, one or more of the first group keys and/or the second group keys serve as mode keys which change the function of one or more other first group keys and/or second group keys. One or more mode keys optionally change the case of the letters entered by the first group keys and/or the second group keys to upper case. In some embodiments of the invention, the mode keys change the functions of the second group keys to various symbol modes for entering symbols other than letters.

In an exemplary embodiment of the invention, one or more dedicated mode keys whose sole function is to move between modes, are used. Alternatively or additionally, one or more keys have two for more different functions depending on how they are actuated. For example, a short press on a key may have a first function, such as inputting letters or other symbols, while a longer press on the key has a different function, such as a mode key function. Alternatively or additionally, a key has a first function when pressed once and a different function when pressed twice within a short period. Further alternatively or additionally, a key has a different function when pressed together with another key. For example, in some embodiments, when a first group key is pressed and a second group key is subsequently pressed before the first group key is released, the pressing of the first group key is interpreted as a different function than if pressed without the subsequent pressing of the second key.

In some embodiments, the first group keys have two functions: a regular function for entering letters, as discussed above, and a mode key function which controls the functions of the second group keys. Possibly, also one or more second group keys have a mode key function, for example when there are more modes than first group keys. In other embodiments, the second group keys serve as mode keys which change the functions of the first group keys. In still other embodiments, the mode keys change the functions of both first and second group keys.

Optionally, when a mode key function is actuated, processor 130 moves into a symbol mode in which all actuations of the second keys are interpreted according to the symbol mode instead of their regular function, until a different symbol mode is entered or the symbol mode is otherwise released, for example by actuating the mode key function again or by pressing a first group key such as the space key 105. In some embodiments of the invention, processor 130 leaves the symbol mode when a key other than one belonging to the symbol mode is pressed. Alternatively, processor 130 leaves the symbol mode after a single actuation of a second group key. Further alternatively, the symbol mode is in effect only when the mode key is held pressed. In some embodiments, the user may instruct processor 130 to leave the symbol mode even if none of the second group keys were actuated during the symbol mode, for example because the user changed his mind.

In an exemplary embodiment of the invention, the six first group keys 101-106 define six different symbol modes which carry the various symbols and/or functions available on standard QWERTY computer keyboards. The symbols are optionally distributed between groups according to a common theme to allow them to be easily found by users. In one specific possible arrangement, the six mode groups include:

a text symbol group including the symbols _ " ' $ ; : & ? ! @,
an arithmetic symbol group including the symbols + # − / \ * | = ( ) %
a commands group including arrows, Tab, caps lock keys
a rare symbol group including the symbols < > [ ] { } ' ~
a function group including the function keys F1-F12; and
a computer function group including esc, prtsc, Pause, PgUp, Ctrl, Alt keys.

It is noted that the above arrangement is just an example and other arrangements may be used. More mode groups may be defined for other symbols, for example, for letters of mathematical symbols provided by mathematical editors, foreign alphabets or even for the Latin alphabet letters for users interested in single letter keys. Furthermore, one or more groups may be assigned to commonly used sequences of letters, such as "tion", "ture" and "tice".

The second keys may also correspond to functions not generally included on keyboard keys, such as functions included in menus (e.g., copy, paste, exit).

In some embodiments, one or more keys may be included in a plurality of groups to allow them to be easily found by users, for example the parenthesis may be find in both text and arithmetic groups. Other particular symbols which may be included in several groups include, for example, "space", "backspace" and period which are commonly used.

In some embodiments of the invention, when entering a specific mode, processor 130 displays on screen 140 the layout of the symbols of the keys in the specific mode for the user's convenience. The layout is optionally displayed on a side of screen 140 farther from the mode key causing processor 130 to enter the specific mode. The layout display is optionally removed when processor 130 leaves the specific mode.

Optionally, the user may set whether the layout is displayed or not, possibly controlling the display for each mode separately.

Some symbols and/or sequences which are used frequently may be assigned to shortcuts, for example, to a special press on one of the keys, to a pressing combination on a plurality of keys or to additional keys of mobile phone 100. In some embodiments of the invention, such shortcuts may be associated with a sequence of ambiguous letters.

Optionally, in order to enter capital letters using the first group keys 101-104, the user presses a long press on one or both of keys 105, 106, which indicates to processor 130 to move into a capital letter mode. Optionally, when a capital letter is to be used, the guess letters for the position are always displayed capitalized even if the guess letter changes.

Figure 2:
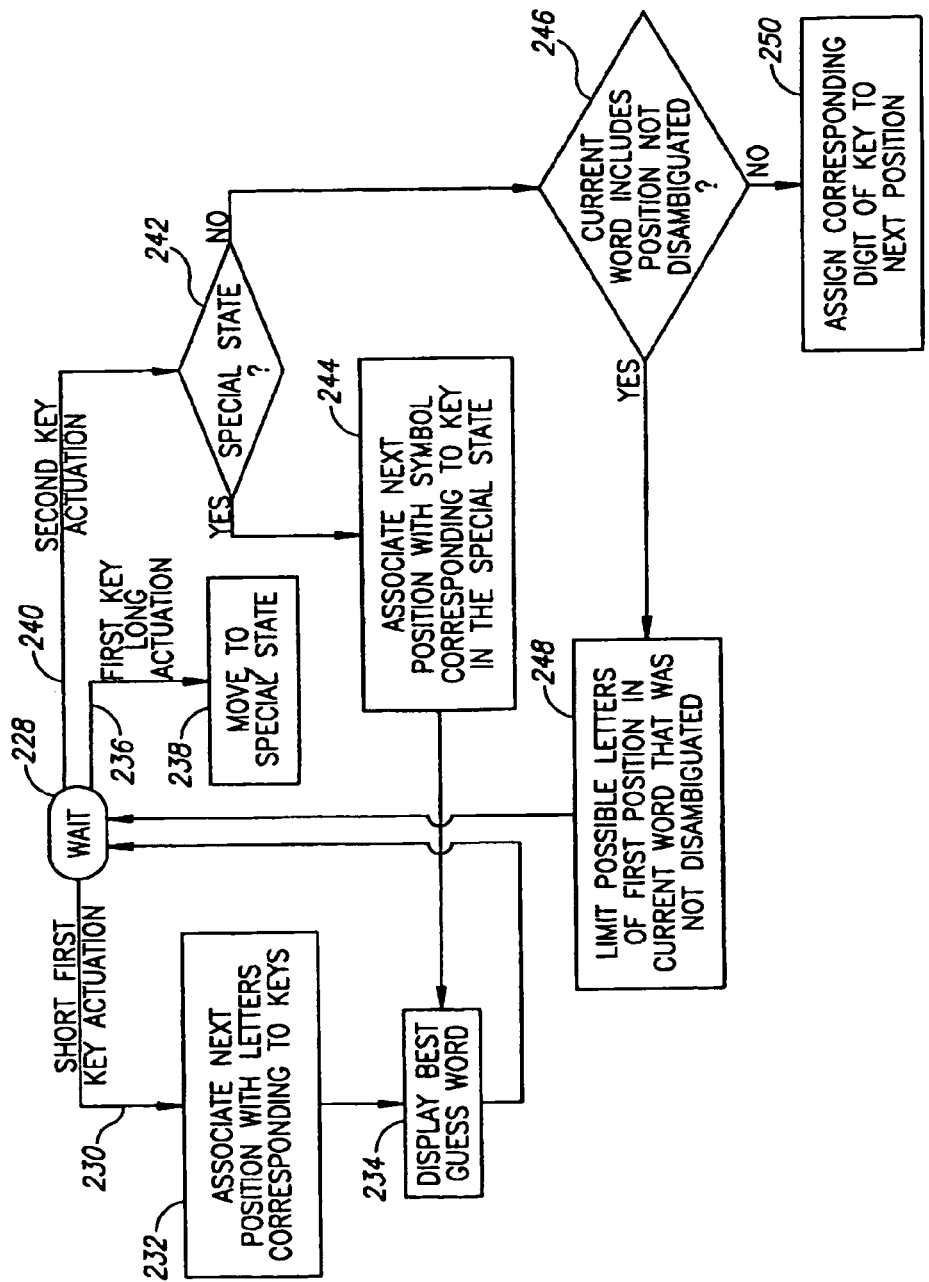
FIG. 2 is a flowchart of acts of a data entry system, in accordance with an exemplary embodiment of the invention.

FIG. 2 is a flowchart of acts of a data entry system run on processor 130, in accordance with an exemplary embodiment of the invention. When in a text entry state, for example for entering a short message (SMS), the data entry system remains in a wait state (228) in which it waits for key actuations. When (230) a letter key of the first keypad 150 is actuated for a short period, the next character position is associated (232) with all the letters corresponding to the actuated first group key. Processor 130 then optionally selects and displays (234) a best match word for the current input sequence. Optionally, the displayed word is selected by selecting the most popular word that matches the available information on the input sequence.

When (236) a key of the first group is actuated for a period longer than a predetermined duration, the processor moves (238) into a symbol mode in which the second group keys are given special character interpretations. Optionally, the predetermined length is of a duration substantially longer than normally used by users entering data, such that only purposeful long actuation of the key will be interpreted as a state change. In some embodiments of the invention, the processor remains in the symbol mode, until the key is released. Alternatively, the processor remains in the symbol mode until a different mode key is actuated. Optionally, in this alternative, one of the first keys is associated with moving into the regular mode.

When a second key is actuated (240), processor 130 optionally determines whether (242) it is currently in a symbol mode. If (242) processor 130 is in a symbol mode, the next word position is associated (244) with the symbol corresponding to the actuated second-group key in the specific symbol mode. In some embodiments of the invention, the processor then reselects the word to be displayed (234). It is noted, however, that some states may correspond to symbols not included in words of the dictionary 132 and therefore their combination to the current word will not result in a known dictionary word. In such cases, the display may be updated only for the current position. Alternatively or additionally, the fact that the position of the recently added symbol does not include a letter is used in selecting an updated best guess word.

If (242) when the second key is actuated (240) processor 130 is not in a symbol mode, the processor optionally determines whether (246) the current word includes positions that ambiguously correspond to a plurality of letters and were not disambiguated. If (246) there are such non-disambiguated positions in the current word, the letters corresponding to the second key are used to limit (248) the first position in the word that was not yet disambiguated. In some embodiments of the invention, each pair of first and second keys have in common only a single letter, such that the disambiguation results in a specific letter. Alternatively, pairs of first and second keys may have a plurality of letters in common, for example up to two or three letters in common. This option allows reducing the number of letters in the first and/or second group of keys.

If (246) there are no non-disambiguated positions in the current word, the next position in the current word is optionally assigned (250) a digit corresponding to the pressed second group key. Alternatively, any other set of symbols, for example any of those used in one of the symbol modes, may be associated with the second group keys in cases in which there are no non-disambiguated positions in the current word. Further alternatively, when there are no non-disambiguated positions in the current word, the next character position is associated with all the letters corresponding to the actuated second-group key. This alternative allows the user to choose dynamically whether to begin writing with the first keys and disambiguate with the second keys or to write with the second keys and disambiguate with the first group keys. This option is especially useful for users accustomed to using a keypad of the second group keys 160.

In some embodiments, when a first key is pressed and held down while a second key is pressed, the letter or symbol in common to the pressed first and second keys is entered unambiguously. Optionally, also pressing a second key and holding it pressed while a first key is pressed has the same effect.

Key Markings

The letters corresponding to each of keys 101-104 are optionally engraved on the keys and/or somewhere else on the casing of mobile phone 100. Alternatively, the corresponding letters are displayed on screen 140 at times when input of letters is expected or upon an instruction from the user. For example, one of the keys of mobile phone 100 may control the display of the letter arrangements of keys 101-104 on screen 140. The letter arrangements of the keys may be displayed at a predetermined location on screen 140 or may move along with the writing so as to be near the cursor location on screen 140 and/or so as not to interfere with seeing the written text. In some embodiments, the letters corresponding to the keys are not displayed at all, allowing using the entire touch pad 320 for output.

Optionally, the letters corresponding to first group keys 101-104 are displayed for each key in their order in the alphabet, so as to allow the user to find a desired letter quickly. Alternatively, the letters of each keys are displayed grouped together in words or syllables which are easier to remember that meaningless letter arrangements. For example, keys 101-104 may be marked with: "bel hq x", "c sky gov", farm tz" and "up wind j". Alternatively or additionally, the letters are arranged in eight imaginary/virtual columns each containing at most one of the letters of the alphabet that is located on the corresponding key (e.g. 2-9) of a standard telephone keypad. Accordingly, the letters of a key 101-104 may be displayed with a gap in the middle, corresponding to a second group key for which the first group key does not have a letter in common.

In another embodiment, the letters are marked on the keys or elsewhere in a 3×3 matrix. Optionally, each letter is in its location in a known arrangement, such as the arrangement in a telephone keypad, as illustrated by enlarged key 101 of FIG. 1. In some embodiments, the symbols are marked on the keys of the first group 150, in the order in which they appear on the keys of the second group 160. Alternatively or additionally, the symbols are marked on the keys of the second group 160, in the order in which they appear on the keys of the first group 150. Optionally, when the keys of the first group (or second group) are arranged with a gap between them, as is the case in FIG. 1, also the letters printed on the keys of the second group 160 are printed with a similar gap, as illustrated by the expanded view of key 118 in FIG. 1.

Alternatively or additionally to displaying the layout of the first group keys 101-104 on display 140, the letters and/or symbols associated with the second group keys are displayed. The arrangement of the second group keypad may be displayed continuously or may be displayed only at specific times, for example when the user did not press a key for a predetermined time and/or when the backspace was used. In some embodiments, the second group keypad arrangement is displayed responsive to a user instruction. Optionally, the arrangement displayed is the current arrangement according to the current mode which interprets the second keys.

In order to aid the user in identifying where letters and/or other symbols are located on the keys of the first group 150 and/or the second group 160, the display of some or all of the letters and/or other symbols in one of the groups optionally hints to the location of the letter or other symbol in the other set. Optionally, the keys 101-104 of the first group 150 are assigned colors and the display of the letters for the keys of the second group 160 are colored or provided with a background color matching the key carrying the letter in first group 150. Hinting in the other direction may also be used, for example assigning colors or shapes to the keys of second group 160 and displaying the letters on the keys 101-104 of the first group 150 with a color, color background, background shape, adjacent shape or other hint to the key carrying that letter in second group 160. Other hints may also be used, such as the location of the letter in the display.

Display Differentiation of Ambiguous Character Positions

As mentioned above, in some embodiments, during entrance of letters using ambiguous keys, processor 130 presents in each character position on display 140 a single letter, selected from the group of letters with which the character position is associated. In some embodiments of the invention, the letters are displayed in a manner which differentiates between character positions associated with a plurality of letters, for which the displayed letter is only a guess and between character positions associated with a single letter. For example, different colors or different font sizes may be used to differentiate between single letter and multi-letter character positions. Further possibilities include surrounding letters with a frame, shading, blinking or color background. In some embodiments of the invention, a marking such as a star or line are displayed above, below or otherwise adjacent letters of multi-letter character positions. Alternatively or additionally, markings are displayed adjacent letters of single letter character positions.

Alternatively to marking all multi-letter character positions, entire words that include one or more multi-letter characters are marked using any of the above methods. Further alternatively, only the first letter of the word that corresponds to a multi-letter character position is marked.

In some embodiments of the invention, the markings used for multi-letter character positions are associated with the keys generating the multi-letter group for the character position. For example, character positions for which the user pressed key 101 may display their guess letter in a first color, character positions for which the user pressed the key 102 display a letter in a second color, etc. Optionally, positions associated with a single letter, for example because the user performed for them disambiguation with a second group key, are displayed in a default color, e.g., black. Alternatively or additionally, each key is assigned a different symbol which is displayed next to the letters representing character positions associated with the letters of the key.

Alternatively or additionally, processor 130 displays for recently entered character positions corresponding to a plurality of letters, some or all the letters to which the character position corresponds. Optionally, at the character position, processor 130 displays the letter currently guessed for the character position, based on the portion of the word entered so far. Beneath or above the character position, in the main window in which the selected and disambiguated letters are displayed, processor 130 optionally displays a letter row or column including the other letters associated with the character position. Thus, the user can easily determine whether a mistake was made in pressing the wrong key or the processor does not have enough information to guess the intended word. The letters in the letter row or column are optionally presented differently from the letter in the character position, for example being in a different color, a different font and/or a different size (e.g., smaller). Optionally, when a plurality of letter columns are displayed next to each other they are displayed in a manner such that they are not read together, for example in different colors, different fonts, different sizes and/or with gaps between the columns.

In some embodiments of the invention, the letter column of a position does not include the selected letter appearing in the character position as it is already shown. In other embodiments, the selected letter appears also in the letter column to allow easier identification by the user, particularly when the letters of the column are in a different size from the selected letter.

The order of the letters in the letter column (or row) is optionally selected without relation to the letters of other character positions of the same word, and generally the letters in the different columns do not usually form words. Each letter in the letter column is optionally included only once. In an exemplary embodiment of the invention, the letters are organized in the columns according to their order in the alphabet. Optionally, the letters are organized in the columns in eight rows, each row corresponding to a key of the telephone-type keypad.

In some embodiments of the invention, the user can control whether the symbols and/or letter columns are displayed. Alternatively or additionally, the system displays the symbols and/or letter columns automatically when the user may be confused, for example when the user presses the backspace key. In some embodiments of the invention, the letter columns are displayed only responsive to a press of the user on a letter, to which press the system responds by displaying the column of the pressed letter or of all the letters of the word. Possibly, responsive to the press, the selected letter or the word of the selected letter is enlarged on the display. Alternatively, the user glides with his finger over a word for which the columns are desired.

Key Arrangements

The arrangement of keys shown in FIG. 1 is brought as an example and many other arrangements including keys of various shapes (e.g., round, square, half circle) in various arrangements (e.g., rows, columns, circle, ellipse) may be used. Optionally, the keys of the first group and/or of the second group are arranged such that a single finger or two fingers can touch all the keys of the group concurrently, so that the user can press all the keys without looking at the keypad.

In some embodiments of the invention, the displayed letters in the letter columns are presented as soft keys which the user may press to associate their respective character position with the selected letter. The letter column soft keys may be provided instead of, or in addition to, the second group keys. Optionally, in these embodiments, the letter columns of the current word are presented larger than the letter columns of previous words, in order to allow easy access to the soft keys of the letters of the columns. Optionally, the user does not need to use the soft keys of the letter columns but rather may use them if desired.

Soft Keys

Figure 3A:
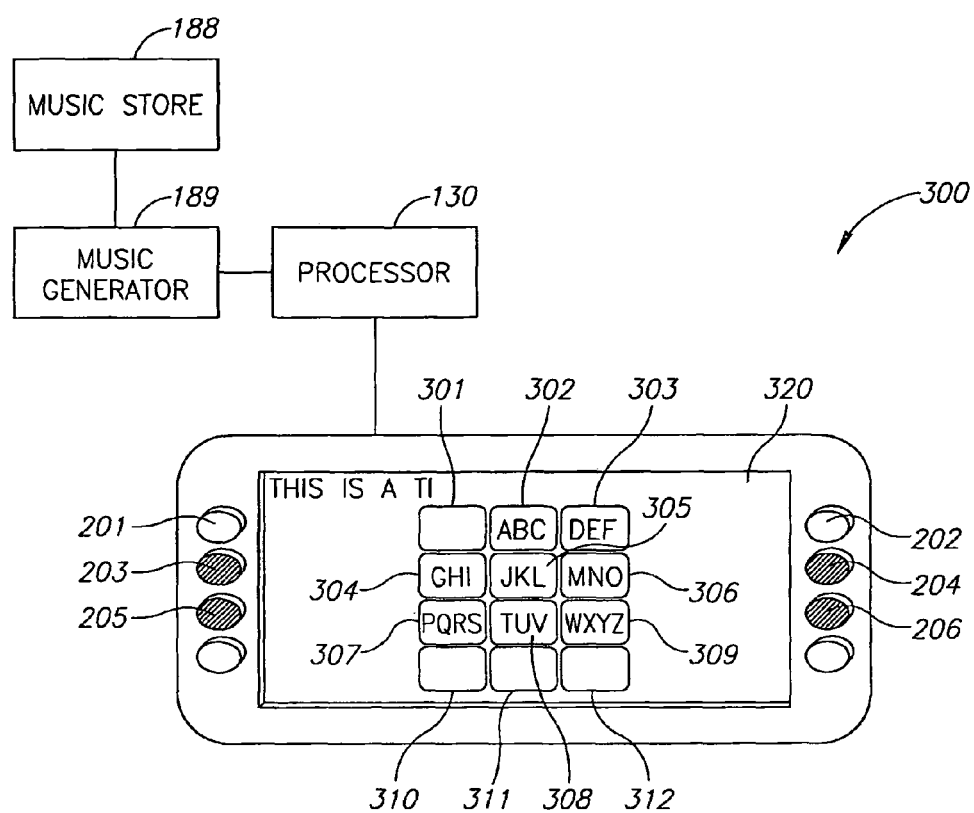
FIG. 3A is a schematic illustration of a mobile device, in accordance with another exemplary embodiment of the invention.

FIG. 3A is a schematic illustration of a mobile device 300, in accordance with an exemplary embodiment of the invention. Mobile device 300 includes hard keys 201-206 for the first group of keys and a touch screen 320. The second group keys are soft keys 301-312 displayed on touch screen 320. Thus, mobile device 300 may have very few hard keys, for example less than ten or even less than eight hard keys. In some embodiments of the invention, also the first group keys are soft keys displayed on touch screen 320, such that mobile device 300 may have less than four hard keys or even may not have hard keys at all. Keys 201-206 optionally have the same functions as keys 101-106 (FIG. 1), respectively, although they are arranged differently.

The second group keys 301-312 may be shown permanently on screen 320, at least whenever in a text entry mode, or may be displayed only when the user requests their display, for example by pressing a control key. In some embodiments of the invention, the second group keys 301-312 are displayed permanently in a small arrangement and are enlarged when their use is expected, for example when the user presses one of the small keys or when entering a special key mode. When a first group key is pressed, the second group keys 301-312 are optionally removed entirely from the display or are made small, until the next time they are required, so that they do not take up too much space on screen 320.

In some embodiments of the invention, second group keys 301-312 are displayed in the center of screen 320. Alternatively, second group keys 301-312 are displayed on one side of the screen or at the top and/or bottom of the screen 320. For example, the second group keys may be displayed in one or two horizontal rows on the top and/or bottom of screen 320. In some embodiments, the second group keys 301-312 are displayed at the opposite side from the key that instructed them to be displayed, e.g., a mode key. Optionally, keys 301-312 move along screen 320 as data is entered, so as not to interfere with seeing the displayed entered data.

In some embodiments of the invention, the first group keys are soft keys in addition to, or instead of the second group keys. The first group keys may all be positioned together adjacent each other on the touch screen 320 or may be separated into two different areas on the touch screen, for example on the right and left sides of screen 320. While the soft keys are shown as being presented on a large touch screen, in other embodiments the soft keys may be presented on a touch pad which is not used for display and/or may be provided on a plurality of small touch surfaces, each of which presents a single soft key or a plurality of soft keys. The touch surfaces may all present the same number of keys or different touch surfaces may present different numbers of keys. When a second-group key is pressed and not released for a long time, the function of the key is optionally repeated until it is released. The repeating of a function of a key when held pressed may be performed also for the first group keys in those embodiments in which a long press on the key does not have a different function than the short press. Alternatively, processor 130 may differentiate between three or more lengths of holding a key pressed. A short press on a first group key 201-204 enters a set of letters, a longer press serves as a mode key and an even longer press enters the set of letters repeatedly until the key is released. In an exemplary embodiment of the invention, a short press on a first group key enters the characters associated with the key, a longer press enters into a first symbol mode, for example a mode of numerical digits and an even longer press enters a different symbol mode, such as a function key mode.

The principle of different pressing durations may be used also for second group keys. For example, in one or more symbol modes, a short duration press on each key may be associated with a first function while a longer press is associated with a different function. For example, a mode associated with both digits and function keys F1-F12 may be provided. A short press on one of the second group keys enters the corresponding digit, while a long press enters the corresponding function key (e.g., F7).

In order to allow use of the entire screen 320 for display of data while it is used for soft keys, in some embodiments, screen 320 may not show the locations of the soft keys but rather the user is trusted to remember them. This is especially practical when there is only a limited number of soft keys, such as when using screen 320 for no more than six or four soft keys. Alternatively or additionally, the locations of the soft keys may be calibrated dynamically according to the user acts. For example, at the beginning of a text entry session the user may indicate the desired location of the keys, for example by entering an X shape or a single tap pressing on a specific point, such as the center of the desired keyboard. A short sweeping gesture in the direction of one of the four keys, from a center point at which the four keys meet, may be used both to indicate the layout of the keys and to actuate the key. The system optionally identifies the short sweeping gesture and according to its direction identifies the actuated soft key. In addition, the starting point of the sweeping gesture is identified as the meeting point of the four keys and accordingly their locations are fixed until a next calibration. The space and backspace soft keys are optionally fixed at the bottom left and right corners of the touch pad or at any other suitable location.

Optionally, the calibration method may be used at any time to move the keyboard to a different location.

In some embodiments of the invention, the calibration is performed by sweeping gestures beginning at edges of the touch pad. Optionally, in order to avoid mistakes, the user is required to providing sweeping gestures from right and left (or top and bottom) edges concurrently to indicate calibration of the location of the keys.

Optionally, in order to avoid the need to reprogram an operating system of mobile phone 100, thin bar shaped windows, possibly not seen by the user or barely seen by the user are defined on the edges of the touch screen 320. When the user begins a sweeping gesture at the edges of the touch screen the system initiates an event which is transferred to a process corresponding to the bar windows and performs the calibration.

In some embodiments of the invention, the soft keys of the first group 150 are provided in two sub-groups on opposite sides of the touch screen. Both sub-groups may be calibrated together or the user may calibrate the position of each sub-group separately, for example in order to see text underneath the sub-group of keys.

In an exemplary embodiment, short gestures are gestures of a length less than the radius or diameter of a key. Alternatively, for gestures starting from a specific key, short sweeping gestures are ones that do not exit the borders of the key in which they originated.

In some embodiments of the invention, a compromise is provided between complete marking of the locations of the soft keys and no marking at all, in the form of small hints to the locations of the keys.

Figure 3B:
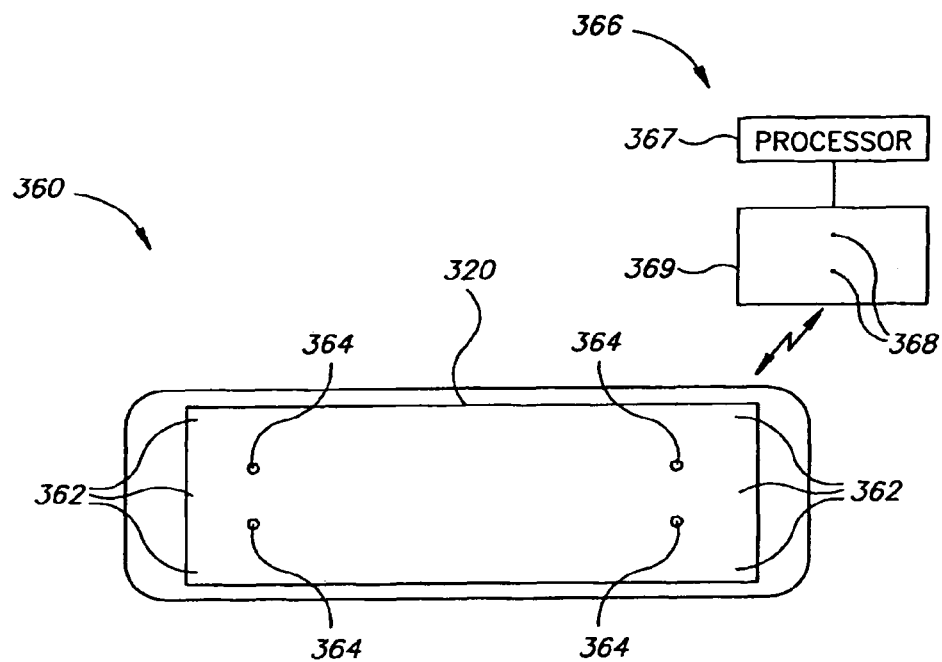
FIG. 3B is a schematic illustration of a data entry device and an auxiliary data entry unit, in accordance with an embodiment of the invention.

FIG. 3B is a schematic illustration of a data entry device 360, in accordance with an embodiment of the invention. Instead of including hard keys, device 360 includes soft keys 362 on the right and left of the touch screen 320. Dots 364 are displayed on screen 320 at the corners of keys 362 adjacent the center of screen 320. Thus, four dots 364 indicate the locations of the six keys, making their identification easier. It is noted that other markings may be used, such as short continuous or dotted lines along a portion of the border between adjacent keys and/or between the keys and the center of screen 320.

FIG. 3B also illustrates the possibility of using an auxiliary small data entry unit 366 which communicates with device 360. Device 360 may be a computer which is heavy and auxiliary data entry unit 366 is used by the user for data entry. In other embodiments, data entry unit 366 may be used with a desk top computer, a notebook computer or any other device. Data entry unit 366 may communicate with the main device through wires or wirelessly, using any method known in the art.

Unit 366 optionally comprises a touch pad 369 and a processor 367. Processor 367 optionally differentiates between sweeping gestures, described herein below in detail, and pressing acts on touch pad 369. Touch pad 369 is optionally divided into six key areas, corresponding to keys 201-206 of FIG. 3A, and processor 367 identifies for each user-press the actuated key. Optionally, two dot markings 368 are provided on the touch surface to help the user orient fingers in pressing on the keys. Alternatively, two bulges are used so the user can feel them.

In some embodiments of the invention, the guessing of intended characters based on the input information from the user is optionally performed by processor 367 within unit 366. In other embodiments, the guessing is performed by a processor of device 360.

Auxiliary unit 366 may be very simple and very inexpensive to produce. Optionally, touch pad 369 is not a touch screen and unit 366 does not include any hard keys. Processor 367 is optionally dedicated only for the data reception and possibly the character guessing. In other embodiments, the auxiliary unit may include additionally hard keys and/or a touch screen.

In some embodiments of the invention, auxiliary unit 366 is battery operated. Optionally, unit 366 has a USB connection (or any similar connection type) through which the battery is charged. Alternatively or additionally, auxiliary unit 366 communicates with data entry device 360 through a USB connection. A long USB wire may be used to allow connection to the computer while auxiliary unit 366 is in the users hand.

In some embodiments of the invention, auxiliary data entry unit 366 is of a small size, for example having an area of less than 10 square centimeters or even less than 5 square centimeters.

In some embodiments, auxiliary data entry unit 366 is integrated into a USB memory stick. Thus a single pocket sized device serves both as a storage unit for important data and as a keyboard for entering information. Auxiliary data entry unit 366 can be connected to any computer through a USB slot and the user can then access the information stored in unit 366 and use the keys and/or touch screen of unit 366 to interact with the accessed data.

When the soft keys of the first group are divided between two different locations on screen 320, the user optionally provides a calibration signal for each portion of the keypad separately. Alternatively, the user provides a calibration signal for one portion of the first keypad and the location of the other portion is set accordingly, for example so that they are symmetrical relative to a middle axis of screen 320.

In some embodiments of the invention, processor 130 accepts calibration signals, such as a tap or sweeping move of a finger, only if it is provided by a specific finger, based on fingerprint comparison or finger width. For example, whenever a press with a thumb is identified it may be interpreted as a calibration signal, while pressing with other fingers are interpreted as regular data input. This prevents inadvertent calibration and/or mix-up between data entry and calibration. In addition, fingerprint identification may be used as a security measure to prevent use of mobile device 300 by unauthorized users. In other embodiments, calibration signals are received from any finger.

Identification of different fingers or different finger orientations may be used also in data entry. Instead of assigning the keys specific areas on screen 320, different finger presses anywhere on the touch screen are interpreted as different keys. For example, pressing with the tip of the finger may be interpreted as key 201, the wide face of the finger as key 202, with the narrow side of the finger as key 203 and pressing with the thumb as key 204.

In some embodiments of the invention, processor 130 determines which finger is touching screen 320 and accordingly controls which of the first and second keypads is being accessed by the user. Using a first finger or first finger orientation is interpreted that the user is pressing a key from the first group 150, while a second finger or finger orientation is used to indicate the user is pressing a key from the second group 160.

It is noted that the first and second groups of keys may have different numbers of keys than those described above, according to the specific needs of the users. Particularly, the second group of keys may have different numbers of keys in different symbol modes as required. For example, in a punctuation mode the second group may include 10 or 12 keys, while in a Greek alphabet mode, the second group may include a key for each Greek letter. In some embodiments, in one or more modes, the second group keys include a plurality of sets of twelve keys, each set organized in an array of three columns and four rows, even if some of the keys are not used. Optionally, the groups of 12 keys are separated from each other such that they are distinct. As the 12 keypad arrangement is very well known, organizing the keys in groups of 12 keys in a 3×4 arrangement may make it easier for the user to identify the keys needed.

In some embodiments of the invention, processor 130 is adapted to identify pressing on two different virtual keys on screen 320 concurrently and provide a different input than if only one virtual key is pressed. The user may optionally press on the two virtual keys with any two fingers. Alternatively, different pairs of two fingers pressing on screen 320 are given different interpretations.

In some embodiments of the invention, in addition to allowing the use of second group keys (and their equivalents) for disambiguation, when an ambiguous key is pressed the system may display soft keys for each of the ambiguous letters for selection. Alternatively or additionally, soft keys for disambiguation are displayed, automatically or upon a user command, when a user selects a previous character position for disambiguation thereof. In some embodiments of the invention, the soft keys displayed correspond to the last actuated first group key. In other embodiments, the soft keys displayed are of the first non-disambiguated character position in the current word, regardless of the cursor position, as is now described with reference to FIG. 3C.

Figure 3C:
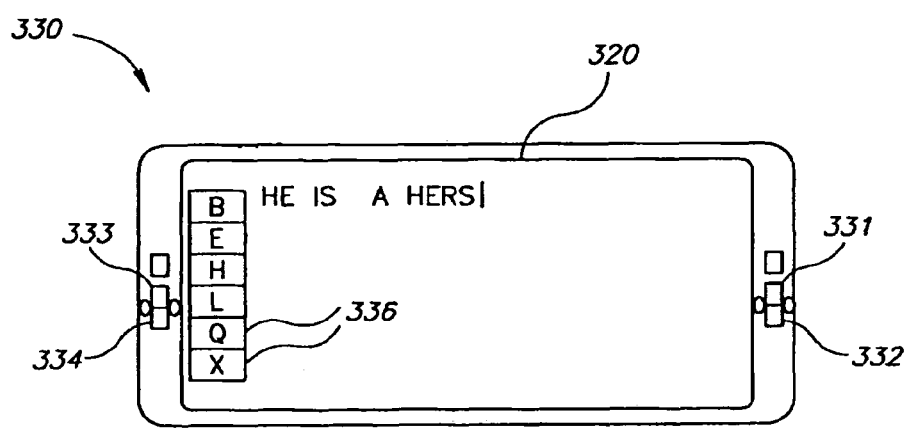
FIG. 3C is a schematic illustration of a data entry device, in accordance with another exemplary embodiment of the invention.

FIG. 3C is a schematic illustration of a data entry device 330, in accordance with another exemplary embodiment of the invention. Device 330 is similar to device 300, but has a different arrangement of keys. Optionally, the letters of the alphabet are assigned to four of the keys, optionally to two keys on each die of screen 320. Optionally, the two keys on each side to which the letters are assigned, are keys 331-334 which form the columns in the key arrangements on each side.

FIG. 3C illustrates an embodiment in which during entering a word, soft keys 336 for letters of one of the actuated keys are displayed on the screen to allow disambiguation instead of using the second group keys. In the example shown, the user has pressed for the current word on the first group keys corresponding to the letter sets HEBLXQ, HEBLXQ, FARMZT and GOVSYCK. Assuming the following dictionary content words and respective scores:

| | |
|---|---|
| Beak | 292 |
| Berg | 196 |
| Bets | 276 |
| Hero | 2300 |
| Hers | 2526 |
| Leak | 558 |
| Leas | 684 |
| Lets | 928 |
| Lxfy | 10 |
| Xeac | 4223 | in response to this key sequence, processor 130 guessed the word XEAC, which has the highest score. Optionally, during the actuation of the first group keys of the word, soft keys corresponding to the letters HEBLXQ are displayed, as these letters are associated with the first character position of the word. Assuming the user is interested in the word "hero", the user pressed on the soft key of the letter H, causing processor 130 to select the word "hers". In addition, processor 130 displays the soft keys corresponding to the second character position of the word, and the user can press on the letter E. Processor 130 will then display the soft keys corresponding to the letters of the third character position and so on until the word is entirely disambiguated or the correct word was reached. It is noted that during this entire procedure, the cursor remains after the letter S at the end of the current word and it is not necessary to move the cursor to correct the word. When a space signal is entered by the user, indicating the word was properly entered, the soft keys are optionally removed from screen 320 until a next time a word is entered.

Detachable Keyboard Unit

In some embodiments of the invention, the keys of the first keypad and the keys of the second keypad are all included in a single mobile unit. Alternatively, some of the keys are included in a separate detachable unit. For example, the first keys may be included in a main unit while the second keys are included in a detachable unit. In some embodiments of the invention, the keys of first keypad are distributed between two detachable units.

FIG. 4 is a schematic illustration of a mobile unit 400 with a detachable keypad, in accordance with an exemplary embodiment of the invention. Mobile unit 400 comprises a screen 320 and two key units 410 and 420 on opposite sides of the screen 320. In one embodiment, a first key unit 410 is permanently attached to screen 320, while a second key unit 420 is detachable so that it can be conveniently held in the left hand of the user while mobile unit 400 is held in the right hand. Optionally, key unit 420 is slideably detachable from mobile unit 400, which has a respective railing to which it is attached. Alternatively, other attachment devices may be used, such as snaps, Velcro or buttons.

In some embodiments of the invention, unit 420 communicates wirelessly with mobile unit 400, for example using a transceiver 402 of unit 420 which communicates with a respective transceiver 404 of mobile unit 400. The transceivers 402 and 404 may operate using the Bluetooth protocol or any other suitable short range protocol. Alternatively, key unit 420 may be connected through wires to the main portion of mobile unit 400, for example through a USB connection which may also charge a battery of mobile unit 400. Also, a wireless USB connection may be used.

It is noted that in other embodiments, in addition to unit 420 or instead of unit 420, unit 410 may be detachable.

Mobile unit 400 may be a cellular phone, PDA or any other communication or input device. In some embodiments of the invention, mobile unit 400 is a limited purpose keyboard device for entering text into an adjacent computer or television. In these embodiments, mobile unit 400 may be used for text entry by a user leaning back or lying down. In such cases, screen 320 may be much smaller, for example for displaying only a single line of text, or mobile unit 400 may not include a screen at all, and the user can view the input text on the screen of a main device receiving the input text.

Sweeping Gestures

Instead of using soft keys on screen 320, other user gestures may indicate the various input signals. In some embodiments of the invention, processor 130 identifies straight line sweeping gestures on screen 320 and according to their direction, length and/or other attributes, associates each identified sweeping gesture with one or more symbols or functions.

In some embodiments of the invention, the sweeping gestures are used for the functions of the first group keys or the second group keys, instead of providing soft keys of the respective group on screen 320. The sweeping gestures are optionally in directions selected according to a known arrangement of the keys of the group, such that a user accustomed to a specific key arrangement can easily adapt to using the sweeping actions. For example, instead of providing a 12 key telephone keypad arrangement, processor 130 is adapted to associate sweeping acts according to their directions, with the keys of the known telephone keypad arrangement.

Use of the sweeping gestures allows the user to provide input anywhere on the screen, instead of confining the user input to a specific area on the screen.

Optionally, in embodiments in which processor 130 is adapted to identify sweeping gestures, soft keys are not provided on screen 320 in order to avoid sweeping gestures from being interpreted as pressing on soft keys. Alternatively, screen 320 is divided into a plurality of zones, a zone for sweeping gestures and one or more zones with soft keys. For example, the soft keys may be placed around the outskirts of screen 320, while the center of screen 320 is used for sweeping gestures. In another example, screen 320 is divided into right and left halves. One half is used for soft keys and the other for sweeping gestures.

FIG. 5 is a schematic illustration of entering data to mobile device 300 using sweeping gestures, in accordance with an exemplary embodiment of the invention. Instead of pressing on soft keys 301-312 (FIG. 3A), the user provides straight line sweeping gestures, represented by arrows 381-388. Each sweeping gesture corresponds to the key in the direction from key 305 to the desired key on a standard telephone keypad or a variation thereof. For example, to enter the letters DEF of key 303, the user provides a sweeping motion on screen 320 in the direction of arrow 383, in a diagonal between the right and the upward directions. Similarly, a sweeping gesture in the direction of arrow 382 represents the letters ABC, in the direction of arrow 384 represents the letters GHI, in the downward direction of arrow 387 represents letters TUV and in the direction of arrow 388 represents the letters WXYZ. In some embodiments of the invention, to enter the letters JKL the user taps once or twice on the screen at any point, indicating the middle of the standard telephone keypad. Alternatively, the letter organization 370 shown in FIG. 6 is used, and the letters JKL are entered by a sweeping gesture in the direction of arrow 381. Alternatively, the sweeping gesture in the direction of up and to the left indicated by arrow 381, corresponding to the key of the digit "1" on the telephone keypad, is not associated with letters, but rather is interpreted as a backspace act canceling disambiguation of the previous character position.

Optionally, the sweeping gestures are required to start in a specific predetermined location, so that inadvertent sweeping gestures are not interpreted as input. In some embodiments of the invention, the location of the sweeping gestures on the screen may be calibrated by the user. In other embodiments, the sweeping gestures may be provided anywhere on screen 320, such that sweeping gestures following arrows 392, 395 and 396 have the same effect as those of arrows 382, 385 and 386, respectively. These embodiments allow the user more flexibility.

In other embodiments, the sweeping gestures are directed from the location of the desired key to the center of the keypad. In these embodiments, arrow 392, for example, corresponds to the letters TUV and arrow 395 corresponds to the letters GHI.

Letter organization 370 (FIG. 6), or any other letter organization used, may be displayed on screen 320, may be engraved or otherwise posted on the casing of mobile device 300 or may not be provided at all, based on the assumption that users know the organization by heart. In some embodiments of the invention, letter organization 370 is not shown on screen 320 regularly, but is shown when the user touches screen 320, as such touching indicates the user probably wants to enter data. Optionally, the letter organization 370 is shown at a predetermined location on the screen or at a location which is currently vacant. Alternatively, letter organization 370 is displayed at the location where the user touched the screen, allowing the user to sweep his finger toward the direction of the displayed desired letters, from the point where the finger originally touched the screen. The user may optionally control if and/or how letter organization 370 is displayed.

Alternatively or additionally to displaying letter organization 370 responsive to the user touching the screen, guiding lines are displayed showing the user the path on which the sweeping gestures are to be performed. Further alternatively or additionally, border lines between the sectors of the different sweeping gestures are displayed.

Figure 7:
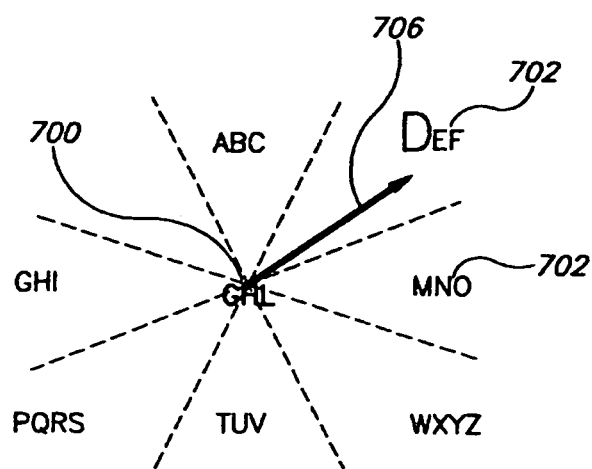
FIG. 7 is a schematic illustration of a display responsive to a user touching a screen, in accordance with an exemplary embodiment of the invention.

FIG. 7 is a schematic illustration of a display responsive to a user touching the screen, in accordance with an exemplary embodiment of the invention. Optionally, responsive to a user touching screen 320 at point 700, letters 702 are displayed around point 700, together with grid lines 704 showing the sectors in which sweeping gestures will be interpreted as relating to the respective letters. The user can then easily perform, for example, sweeping gesture 706 within the grid lines of the letters DEF.

Instead of displaying all the letters in letter organization 370, processor 130 determines which letter will be used for each sweeping gesture for the current character position, given that it already is related to a plurality of letters from a first key actuation, and only these letters are displayed. Displaying only a single letter makes the task of identifying the desired sweeping gesture much easier. In other embodiments, all the letters are displayed, but the letter corresponding to the character position is highlighted. In still other embodiments, for each sweeping gesture direction, processor 130 displays the word that will be selected for the current word character position sequence, if the sweeping gesture is selected. In cases in which a single sweeping gesture is required to receive the desired word, this makes the selection of the sweeping gesture very simple as the user sees the desired word in the direction of the required sweeping gesture. In some embodiments of the invention, processor 130 displays both the letter and the guessed word, for the convenience of the user, in case more than one sweeping gesture is required to achieve the desired word.

Figure 8:
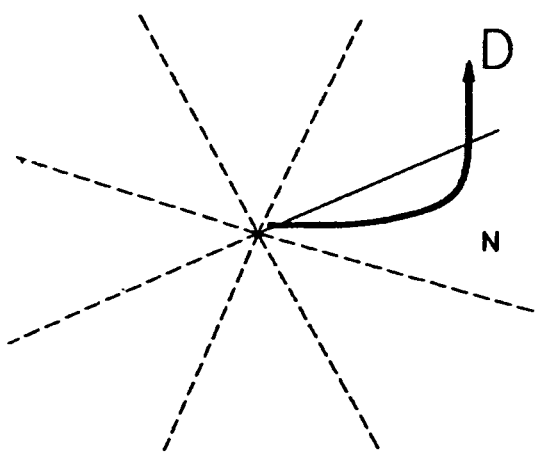
FIG. 8 is a schematic illustration of correction of a sweeping gesture in progress, in accordance with an exemplary embodiment of the invention.

In still other embodiments, the letter or letters are displayed not when the user touches the screen but when the sweeping gesture begins or ends, and only the letter or letters corresponding to the entered sweeping gesture are displayed. The user is optionally given a chance to easily correct his sweeping gesture if necessary, responsive to the display of the letter corresponding to the sweeping gesture. For example, in embodiments in which the gesture is determined based on the relative direction between the beginning and ending point, the user may change the direction of the sweeping gesture in the middle, as illustrated by FIG. 8, to change from an erroneous entering of the letter N to entering the letter D. Alternatively or additionally, when processor 130 identifies an abrupt slowdown in a sweeping gesture, the sweeping gesture is ignored, as the abrupt slowdown is generally indicative of a hesitation by the user. Similarly, in some embodiments of the invention, if an abrupt lifting of the finger is identified responsive to the display (e.g., within a predetermined short period from the display), the sweeping gesture is ignored. The speed threshold for differentiating between regular and aborted sweeping gestures may be predetermined or may be based on learning the operation habits of the user of the specific device.

Optionally, when the user begins a backspace sweeping gesture, processor 130 displays the current word that will be affected by the backspace act, possibly highlighting the letter in the character position which will be affected. A similar display may be performed for the backspace direction in embodiments in which letters are displayed in all directions or in some of the directions.

In an exemplary embodiment of the invention, when the user touches the screen, the key arrangement for all sweeping directions, is displayed. When the user begins the sweeping gesture, the letters for all directions are removed from the display, except for the direction of the sweeping gesture in progress.

In some embodiments of the invention, each sweeping gesture must begin from a state in which the user's finger does not touch the screen 320. In performing the sweeping gesture, the user presses his/her finger against the screen, glides the finger in the required direction and removes the finger from the screen. In other embodiments, the sweeping gesture does not require removing the finger from the screen when it is completed. Rather, a sequence of a plurality of sweeping gestures, referred to herein as a complex gesture, may be provided by the user without lifting the finger from the screen. Optionally, each time the user changes the direction of the movement of the finger on screen 320, processor 130 considers the turn point as the end of a previous gesture and the beginning of a new sweeping gesture, whose direction is evaluated relative to this point. Alternatively, the direction of each straight line segment of the complex sweeping gesture is evaluated relative to the starting point of the entire complex gesture.

A single complex gesture may be used to enter an entire word, or several complex gestures may be used to enter a single word in parts. Furthermore, a word may be entered by one or more complex gestures together with one or more single position sweeping gestures.

In some embodiments of the invention, when a sweeping gesture is a very long straight line it is considered as two separate sweeping gestures in the same direction. Alternatively, long sweeping gestures are considered the same as short sweeping gestures, as not always can users easily control the lengths of their sweeping gestures. Further alternatively, when the sweeping gestures are used to represent keys of a keypad of more than nine keys, processor 130 may differentiate between sweeping gestures representing keys in similar directions, such as keys 307 and 310 or keys 308 and 311 of FIG. 3A, based on the length of the sweeping gesture. In other embodiments, the keys are arranged such that each key has a unique direction which is not generally interchanged with the other directions. For example, the key model which governs the sweeping gestures may have keys arranged in an octagon or in any of the key arrangements described in US patent publication 2007/0109276 to Kim, the disclosure of which is incorporated herein by reference in its entirety.

Long sweeping gestures may be interpreted as long presses on their corresponding key. For example, in an embodiment in which a short press on a key provides a digit and a long press enters a function key, the user may indicate a short press by entering a short sweeping gesture and a long press by a long sweeping gesture. Alternatively, the gestures corresponding to short and long presses on the same key may be differentiated using other methods. For example, while short presses may be represented by simple straight lines, longer presses may be represented by wiggled lines, a loop at the end of the line or any other suitable marking.

Optionally, if the user's finger is identified as remaining touching screen 320 without moving after a sweeping gesture, the function of the gesture is repeated until the user's finger is removed from screen 320, in a manner similar to the press and hold function known in the art for keyboard keys. In some embodiments of the invention, the repetition is of the last function entered, even if a sequence of letters was entered in one complex sweeping gesture. Alternatively, the entire sequence of letters or functions entered by the last sweeping gesture is repeated until the user's finger is lifted. For example, if the user performed a complex gesture which operated as pressing keys 201, 202 and 204 in a sequence, if the user keeps his finger touching screen 320 at the end of the sequence, processor 130 acts as if keys 201, 202 and 204 are repeatedly pressed in sequence.

Alternatively to interpreting crooked sweeping gestures as formed of a plurality of straight lines, each representing a different key press, in some embodiments of the invention, crooked sweeping gestures are interpreted based on their beginning and ending points, as if they were a straight line between the beginning and ending point.

In some embodiments, crooked sweeping gestures are interpreted as separate sweeping gestures having a totally different meaning than the straight lines from which they are formed. Optionally, crooked sweeping gestures are used as shortcuts representing a plurality of keys.

Figure 9:
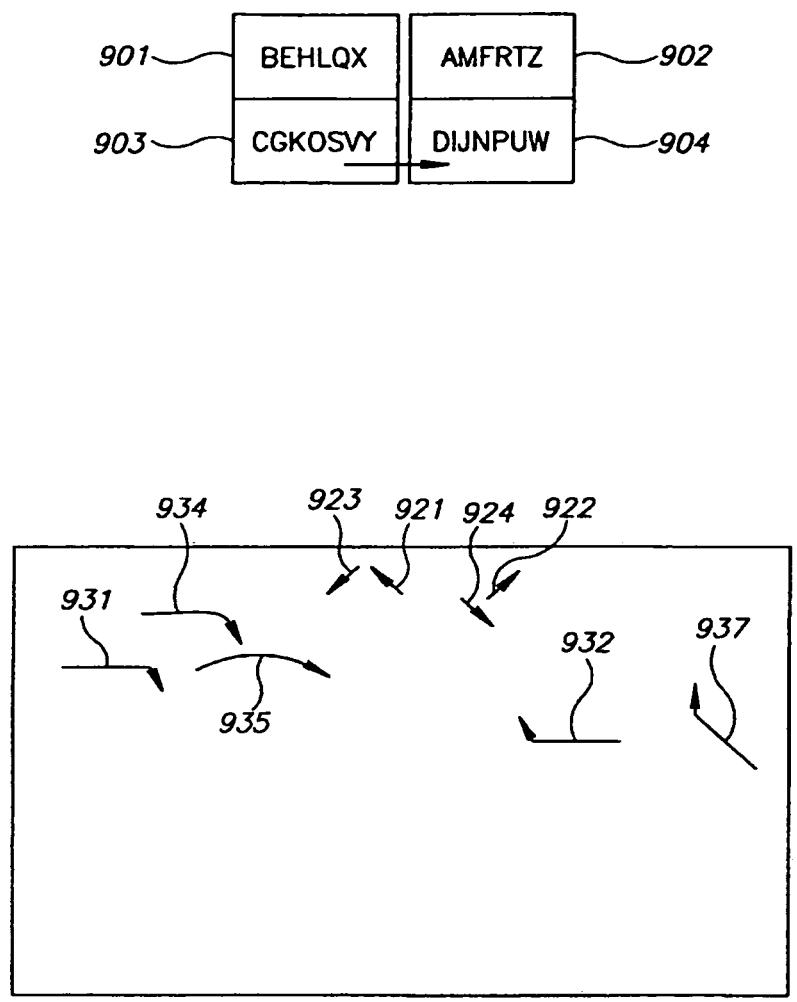
FIG. 9 shows a four key arrangement together with various sweeping gestures entered by users, in accordance with an exemplary embodiment of the invention.

FIG. 9 shows a four key arrangement together with various sweeping gestures entered by users, in accordance with an exemplary embodiment of the invention. A sweeping gesture downward and to the left in the direction of arrow 921, is optionally interpreted by processor 130 as equivalent to pressing on a button corresponding to the letters in box 901. Similarly, sweeping gestures in the directions of arrows 922, 923 and 924 are optionally interpreted as entering the letters in boxes 902, 903 and 904, respectively. The space and backspace functions are optionally represented by short sweeping gestures to the right and left, respectively. Optionally, to perform the mode key tasks, the model sharing the first keys 201-206 for both entering letters and mode keys is used. For a specific mode key task, the same sweeping gesture as used for the letters on the key of the specific mode key task is used, but with a variation indicating its mode key task, such as performing the sweeping gesture much slower or pausing at the end of the sweeping gesture while pressing on screen 320. Alternatively or additionally, different start points or different zones are used to indicate the mode according to which the sweeping gesture is to be interoperated. If necessary, additional sweeping gestures may be used for further modes, such as up and down gestures not otherwise used. In some embodiments of the invention, the duration of the sweeping gesture, the time between touching the touch pad and beginning the sweeping gesture and/or the time for which the touch surface is contacted after the completion of the gesture are used to differentiate between different modes or commands.

In an exemplary embodiment of the invention, when desired to enter letters for two character positions at once, an arrow from the direction of the column of the desired first box, followed by an arrow in the direction of the row of the desired second box may be used. For example, a sweeping gesture in the direction of arrow 931 is optionally interpreted as entering the letters of box 903 followed by the letters of box 904. As shown, the sweeping gesture is formed of a long portion and then a short portion. In other embodiments, the sweeping gesture may be formed of a short gesture and then a long gesture or of similar length gestures. A sweeping gesture in the direction of arrow 932 is optionally interpreted as corresponding to box 902, and then box 901. A sweeping gesture in the direction of arrow 937 is optionally interpreted as corresponding to box 904 and then box 901.

It is noted that any other convention may be used in defining the meaning of complex sweeping gestures. For example, arrows 931 and 932 may be interpreted to correspond to a box in the column toward which the long portion of the gesture is directed followed by the box in the row toward which the short portion is directed. Optionally, for robustness, sweeping acts following arrows 934 and 935 are interpreted as arrow 931.

In some embodiments of the invention, the sweeping gestures are used to represent only some of the functions of the second keys, such as the letter groups, while digits and/or symbols in symbol modes are provided using soft keys. In other embodiments, the sweeping gestures replace all the functions of the keys they represent. Optionally, the user may decide whether to use sweeping gestures or soft keys.

In some embodiments of the invention, if a sweeping gesture is provided in a first sector corresponding to a first set of letters, but very close to a second sector, processor 130 selects based on the contents of dictionary 132, whether to use the letters of the first sector or the neighboring sector. Optionally, the letters of the neighboring sector are given a low priority such that they are used only if the letters of the first sector do not match a word at all or are very unlikely relative to a very likely word for the neighboring sector.

In some embodiments of the invention in which processor 130 is configured to identify sweeping gestures on screen 320, the screen is not used to control a mouse pointer, in order not to confuse processor 130. Alternatively, a switch controllable by the user indicates whether to interpret finger movements on screen 320 as text entry or as mouse movements. Further alternatively or additionally, processor 130 evaluates the movements according to their speed. Fast movements are optionally interpreted as sweeping gestures representing keys, while slow movements are optionally interpreted as mouse movements. Optionally, the speed of the sweeping gesture is determined at the end of the sweeping gesture. Acts performed by processor 130 during the entry of the sweeping gesture are optionally reversed, if necessary, when a sweeping gesture starting at a high rate is completed at a slow rate. Alternatively, the speed is determined as the average speed or the speed at the beginning of the sweeping gesture. It is noted that in other embodiments, the association between speed and specific keys may be set differently, for example associating fast gestures with the mouse control and slow movements with data entry.

Alternatively or additionally to differentiating based on speed, screen 320 is divided into a plurality of zones and processor 130 interprets sweeping gestures in different zones on the screen, differently. Optionally, in one zone the movements are used to control the mouse and in the other the movements are interpreted as gestures representing keys. In other embodiments of the invention, the user is required to use different pressure levels for different meanings, for example using more pressure for key actuation than for mouse movements.

In still other embodiments, processor 130 determines if sweeping gestures relate to mouse control or character entry based on whether the user is in the middle of entering a word. Optionally, when in a symbol mode or when in the middle of entering a word, sweeping gestures are interpreted as referring to second-group key functions, and otherwise the sweeping gestures are used to control a mouse cursor.

Alternatively or additionally to using finger movements to control a mouse cursor, finger movements may be used to control movement of the text entry cursor and/or the disambiguation cursor. Optionally, a sweeping gesture of the finger in a specific direction moves the cursor in that direction. The extent of moving the cursor is optionally proportional to the length of the gesture, for example a single cursor position for each centimeter of the sweeping gesture. The sweeping gestures may control the cursor movement only to the left and to the right or may also be used for up and down movements. Diagonal sweeping gestures are optionally ignored or are interpreted according to their closest horizontal or vertical angle.

Processor 130 optionally determines whether to move the mouse or a cursor based on the sweeping gestures being in different zones, having different widths and/or any other differentiation methods described above or combinations thereof.

Optionally, the left and right mouse buttons are implemented by pressing on screen 320 at any point on the screen.

The pressing for the left and right mouse buttons optionally differ according to the time the finger is held on screen 320 according to predefined rules, such as a very short press for the text entry button 305 (FIG. 3A), a longer press for a left mouse button and an even longer press for a right mouse button.

Another possible method of differentiating between sweeping gestures corresponding to keys and mouse movements is the width of the object passing over screen 320. Optionally, sweeping gestures entered by a stylus or a single finger are interpreted as corresponding to keys, while thick gestures entered by two fingers are considered as mouse movements. The width threshold differentiating between key entries and mouse control movements may be set at substantially any suitable width, possibly by the user. In an exemplary embodiment of the invention, a thin stylus is used for gestures corresponding to keys and a single finger is used to control a mouse. The width threshold is optionally set accordingly between the width of the stylus and the width of a finger. In other embodiments, the threshold width is set between the width of a finger when placed flat on screen 320 versus the width of a finger when its tip is placed on screen 320.

Optionally, sweeping gestures are evaluated according to their width when the gesture begins, in cases in which the width changes over time. Alternatively, the width at the end of the sweeping gesture or the average width is used. It is noted that different widths of sweeping gestures may have other interpretations, for example differentiating between gestures relating to the first keypad and gestures relating to the second keypad.

Separate zones could also be used instead of using mode keys. Instead of presenting a single copy of, for example, a 12-key telephone keypad, a plurality of copies of the telephone keypad could be provided, with or without being displayed, each copy associated with characters of a different symbol mode. In other embodiments, the screen is divided into a plurality of zones for sweeping gestures and the gestures are interpreted differently in each zone. For example, sweeping gestures in a first zone may be interpreted as corresponding to keys of first group 150, while sweeping gestures of a second zone are interpreted as corresponding to keys of second group 160. Alternatively or additionally, sweeping gestures of one or more zones may be interpreted as corresponding to keys in a symbol mode (such as a caps-lock mode or a mathematical symbol mode), avoiding the need to press a mode key.

In an exemplary embodiment of the invention, one of the zones is assigned to sweeping acts which correspond to mode keys. Alternatively, specific sweeping acts are assigned to the mode key functions, such as sweeping acts which are longer than regular sweeping gestures. Different types of sweeping gestures may also be used to differentiate between other groups of keys. For example, in embodiments in which sweeping acts may be used for both first group and second group keys, the user may use relatively short sweeping gestures for the first group keys and longer sweeping acts for the second group keys, or vice versa. In other embodiments, the sweeping gestures differ in their shape. For example, straight and curved sweeping acts may be differentiated by processor 130, and each type of sweeping act may be assigned different groups of keys. In one embodiment, straight diagonal sweeping gestures are assigned to first group keys, while straight horizontal and vertical sweeping gestures and curved sweeping gestures are used to indicate the keys of the second group.

It is noted that separate zones may also be used in order to reduce the complexity of identifying sweeping gestures of different directions. For example, rather than identifying sweeping gestures in eight different directions, sweeping gestures may be identified in two different zones, and in each zone sweeping gestures in four directions are identified. In one embodiment, gestures in diagonal directions are provided on the right side of the screen and sweeping gestures in horizontal and vertical directions are provided on the left side of the screen The different zones could all be used for soft keys, could all be used for sweeping gestures or one or more could be used for sweeping gestures while one or more others are used for soft keys. In an exemplary embodiment of the invention, a first zone displays soft keys of the first keypad and the rest of the area of the screen 320 not occupied by the first keypad is considered a second zone in which sweeping gestures corresponding to second keypad keys are received.

Optionally, sweeping gestures extending between zones are ignored. Alternatively, sweeping gestures are interpreted according to their start location or end location. Further alternatively, sweeping gestures are associated with the zone including the majority of their length.

Another method to differentiate between sweeping gestures for different symbol modes is requiring use of different fingers, numbers of fingers or combinations of fingers. For example, sweeping gestures using a right thumb may relate to a first group of symbols, while sweeping gestures with three fingers relate to a second group of symbols.

Processor 130 optionally identifies the different combinations of fingers based on the relative positions and/or orientations of the fingers. For example, a sweeping gesture with both the forefinger and the pointer finger of the right hand is easily distinguishable from a sweeping gesture with the pointer finger and the pinky. In this example, processor 130 optionally determines whether the lower finger (the forefinger or pinky) is on the right or the left of the higher finger (the pointer finger). Alternatively or additionally, processor 130 uses fingerprint recognition and/or the area or width of the finger to identify which finger or fingers of the user are contacting screen 320 and accordingly selects the symbol mode to which the sweeping gesture corresponds.

Sweeping Gestures for Disambiguation

Alternatively or additionally to using sweeping gestures to indicate specific keys, sweeping gestures may be used to select a single letter, symbol or function from the multiple letters (or symbols or functions) associated with a soft key. Optionally, pressing on a soft key ambiguously enters the letters associated with the key, while entering a sweeping gesture beginning from the location of the soft key enters a single letter associated with that sweeping direction for that key. In some embodiments, the keys are first group keys 101-104 and the specific letters associated with the directions of the sweeping gestures starting from each key are assigned according to the key arrangement of the second group keys, as discussed above, for example with reference to FIG. 6. Thus, in addition to or instead of, the possibility of separately entering for a specific cursor position both a first group key press and a second group sweeping gesture, the user may enter the first group key press and the second group gesture at the same time.

Optionally, in order to indicate the center key 378 of model 370 of FIG. 6, the user presses the key 101-104 for a long duration which allows the system to differentiate between a regular press which is interpreted as corresponding ambiguously to the letters associated with the key and a long press corresponding to a specific single letter. In some embodiments, sweeping gestures from first keys to indicate specific letters are used in addition to sweeping gestures for indicating second group 160 keys. Any of the methods discussed above regarding differentiating between different interpretations of sweeping gestures may be used to differentiate between sweepings in this embodiment. For example, sweeping gestures starting from first group soft keys or an area assigned to the first group 150 soft keys are interpreted as precise letters while sweeping gestures starting in other areas of touch screen 320 are interpreted as referring to second group 160 keys. Sweeping gestures from pressed keys may be used also for second group keys or other keys of a data entry device. Particularly, sweeping gestures from keys to select particular symbols may be used also in number and/or symbol modes.

In some embodiments, a data entry device has both a set of first group 150 hard keys and a set of first group 150 soft keys, allowing the user to decide which set of keys to use. Possibly, both sets of first group keys are active in parallel, allowing the user to switch between the sets as desired. For example, the user may normally use the hard keys, but when entering a precise letter using a sweeping gesture is desired, the user may move to the corresponding soft keys. Optionally, the hard keys are located next to touch screen 320 and the corresponding soft keys are located on screen 320 adjacent their corresponding hard keys. Possibly, the closest zone on the screen 320 to each hard key is its corresponding soft key. In other embodiments, the locations of the soft keys may be calibrated by the user using any of the methods described herein.

Extended Character Sets

While in the above description the first and second key groups had the Latin alphabet letters in common, the same principle may be used for other characters including other alphabets, digits and symbols. In one embodiment of the invention, each first group key includes also a single non-letter symbol in its group of ambiguous characters. In the second group keys, the symbols are optionally associated with key 301, allowing fast disambiguation when necessary.

Figure 10:
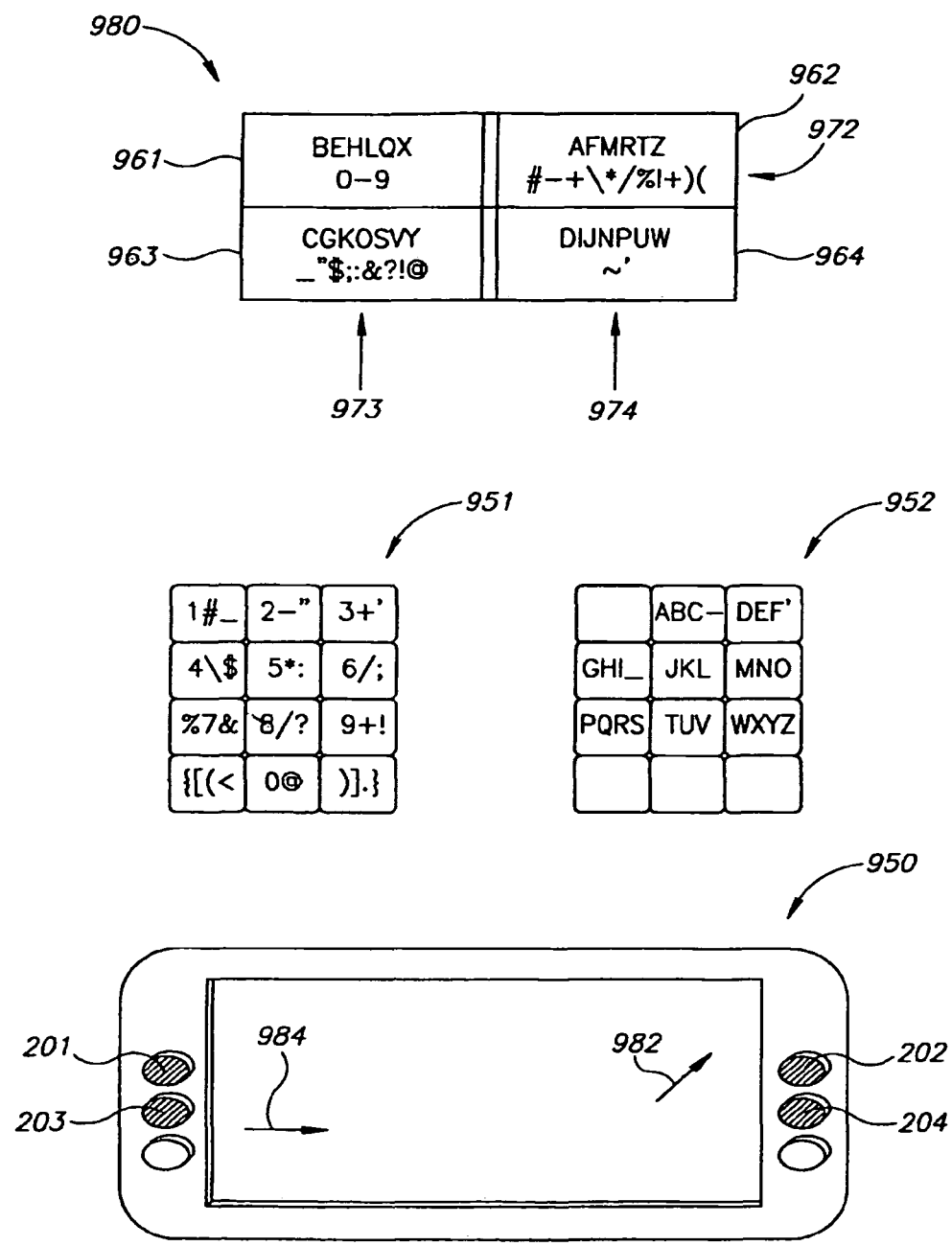
FIG. 10 shows a key arrangement for a mobile device, in accordance with an exemplary embodiment of the invention.

FIG. 10 shows a key arrangement for a mobile device 950, in accordance with an exemplary embodiment of the invention. Keys 201-204 are assigned the symbols shown in symbol arrangement 980, with the symbols of box 961 corresponding to key 201, the symbols of box 962 corresponding to key 202, etc. In this example, each key corresponds ambiguously to a set of letters and to other symbols. For example, key 201 corresponds ambiguously to the digits 0 to 9 in addition to a group of letters, key 202 corresponds ambiguously to the arithmetic characters 972 (e.g. the arithmetic symbol group of characters discussed above in relation to the mode keys) in addition to the set of letters, key 203 corresponds ambiguously to the punctuation characters 973 (e.g. the text symbol group of characters) in addition to its set of letters, and key 204 corresponds ambiguously to the rare characters 974 (e.g. the "RARE" group of characters) in addition to its set of letters.

Mobile device 950 recognizes two second group keypads 951 and 952. Preferably, the characters on the keys 201-204 of the first keypad are distributed on the keys of the second virtual keypads 952 and 951, such that any key of the first keypad has at most one common character with any of the second group keys.

Predefined tapping or sweeping actions (e.g. 982) on the right side of the touch screen optionally correspond to interacting with the keys of the second group keypad 952, and predefined tapping or sweeping actions on the left side (e.g. 984) of the touch screen optionally correspond to interacting with the keys of the second group keypad 951. Optionally, in guessing which character to use for character positions for which a second group key was not actuated, preference is given to the letters. Alternatively, the letters and other symbols are given equal preference, depending on their rating in dictionary 132. In some embodiments of the invention, in order to select a letter for disambiguation, the user presses the screen on the right zone and responsive thereto the layout 952 is displayed. The user than performs a sweeping gesture corresponding to the desired letter. Similarly, when the user wants to enter a digit or symbol in the disambiguation, the user presses on the screen in the left zone and the key arrangement 951 is displayed to direct the sweeping gesture. Other display methods described herein may also be used as well as other display methods known in the art.

These embodiments are particularly useful when database 132 is adapted to learn new words frequently used by the user. Such words may be, for example, passwords, URL addresses, slang and unofficial SMS symbol talk, formulas, computer programming language expressions, etc. While in the first time these "words" are entered the user will in many cases need to enter the entire word twice, once with the first group keys and then with the second group keys (or their equivalents), the next time the same word is entered, there is a fair chance it will be guessed by processor 130.

The inclusion of all the digits on a single first group key makes it easier to remember which key is to be pressed for a digit. In other embodiments, however, the digits are distributed between the first group keys to increase the chances an intended number is identified.

When the embodiment of FIG. 10 is used with display of soft keys described above with reference to FIG. 3C, soft keys may be displayed for all the letters and symbols on the pressed first group key. Alternatively, soft keys are displayed only for the non-letter characters and the user performs disambiguation of letters by sweeping gestures.

Using First Key Combinations Instead of Second Keys

Combinations of first group keys may be used as shortcuts for tasks which users may want to do in a simpler way then using mode keys and the second keys or their equivalents (e.g., sweeping gestures).

Optionally, pairs of first group keys pressed together are given meanings of tasks which are used relatively frequently. In some embodiments, pairs of first group keys have the functions of arrow keys which allow navigating the cursor around the display and/or navigating a correction point indicator around the display. In other embodiments, pairs of first group keys do not have any function.

In some embodiments of the invention, pairs of first group keys may be used to perform the functions hereinabove assigned to the second group keys. Accordingly, all the input tasks described above may be achieved with only six keys. Optionally, when a user presses one key and while it is held pressed he presses another key, the pressing of the two keys is considered a separate act than a short or long press on one of the keys. Accordingly, in these embodiments, processor 130 is adapted to identify three different patterns of actuations of first group keys:

1) a short press on a key—interpreted as a set of letters, a space or backspace 2) a long press on a key—interpreted as a mode change 3) pressing a key and while it is held pressed pressing a second key—interpreted as a second group key.

Using the four keys 201-204 provides 12 unique sequences of pressing one of the keys and then another of the keys while the previous is held pressed. These 12 unique sequences may be associated with the 12 keys of the second group keypad in any correlation. In some embodiments of the invention, a correlation which allows the user to intuitively correlate between the first key sequences and the second keys, is used.

In an exemplary embodiment of the invention, the correlation between the first key sequences and the second group keys is based on the direction from the first-group key that was pressed and held to the first-group key that was pressed subsequently. For example, pressing and holding key 201 (FIG. 3A) and subsequently pressing key 202 defines an arrow pointing to the right. Pressing and holding key 203 and subsequently pressing key 202 defines an arrow pointing to the corner in the upper right. Each arrow is optionally interpreted as corresponding to the second-group key of key arrangement 370 (FIG. 6) to which an arrow of that direction points from the center 378. Accordingly, pressing and holding key 202 and subsequently pressing key 204 before key 202 is released, refers to the key carrying the letters TUV. If processor 130 is in a letter mode, it will take as its input the letters TUV. If it is in a symbol mode it will take as its input the symbol or symbols associated with that key.

Using this correlation limits the second group of keys to only eight keys instead of 12 keys which are possible, but has the advantage of being intuitive to the user.

It may be desired to be able to enter 12 second group keys using the first group keys. In some embodiments of the invention, instead of using long presses on the first keys 201-204 to enter various symbol modes, long presses on keys 201-204 are associated with the functions of keys 305, 310, 311 and 312 (FIG. 3A), respectively, of the second key group.

In other embodiments, the six keys 201-206 (FIG. 3A) are used to generate arrows corresponding to all 12 keys of the known telephone keypad arrangement. The sequences of keys (202,201), (204,203) and (206,205) generate a virtual left arrow which corresponds to key 304. The sequences (201, 202), (203,204) and (205,206) correspond to key 306, the sequences (204, 202), (206, 204), (203,201) and (205,203) correspond to key 302 and the sequences (201,203), (203, 205), (202,204) and (204,206) correspond to key 308. Sequences (201,204), (203, 206) correspond to key 309, sequences (203, 202) and (205, 204) correspond to key 303, sequences (202,203) and (204,205) correspond to key 307 and sequences (204,201) and (206,203) correspond to key 301. Sequence (201,206) corresponds to key 312, sequence (202,205) corresponds to key 310 and sequences (202,206) and (201,205) correspond to key 311. Optionally, sequences (205,201) and (206,201) which define a virtual long arrow upward correspond to key 305. The sequences (206,201) and (205,202) may be undefined or may be used for other tasks, such as entering symbol modes (instead of or in addition to long presses on the first keys), caps lock or a partial backspace which removes disambiguation signals.

The same principal of arrows defined by the order of pressing keys may be used with other arrangements of the first group keys. For example, with relation to keys 101-106 shown in FIG. 1, the key pair (104,101) optionally corresponds to key 301 and key pair (102,101) optionally corresponds to key 304. Although arrows in the directions of keys 310, 311 and 312 are not provided by this arrangement, other pairs may be used for these keys, such as (106,105) for key 311, as this is the longest arrow available, (106,103) for key 310 and (105,104) for key 312.

The above embodiments and methods may be combined with various other methods of data entry, such as any of the methods described in PCT publications WO01/131788, titled "Integrated Keypad System", WO03/007288 titled "Features to Enhance Data Entry Through a Small Data Entry Unit", WO04/095414 titled "System to Enhance Data Entry in Mobile and fixed Environment", WO05/122401 titled "System to Enhance Data Entry in Mobile and fixed Environment", WO07/114,833 titled "Data Entry System", PCT application IB2007/004481, and PCT application IB2008/ 002263, the disclosures of all of which are incorporated herein by reference in their entirety.

As another example, when a user indicates a previously entered word, which was not completely disambiguated yet, the system may display for selection one or more words which may be used instead of the word guessed by processor 130.

Figure 11:
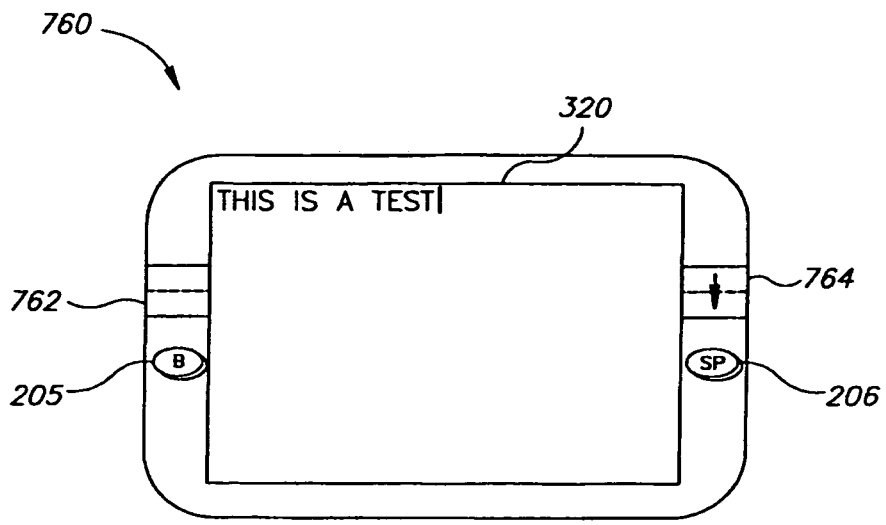
FIG. 11 is a schematic illustration of a data entry device, in accordance with an exemplary embodiment of the invention.

FIG. 11 is a schematic illustration of a data entry device 760, in accordance with an exemplary embodiment of the invention. Device 360 includes in addition to screen 320, two touch pads 762 and 764 and two hard keys 205 and 206. Presses on touch pads 762 and 764 optionally serve as first group keys, while sweeping gestures on the pads optionally serve instead of the second group keys. The sweeping gestures on touch pads 762 and 764 may be interpreted to have the same function or may have different functions, corresponding to different zones discussed above.

In view of touch pads 762 and 764, screen 320 need not be a touch screen and therefore may be made cheaper. In other embodiments, screen 320 is a touch sensitive screen and finger movements on screen 320 control a mouse pointer. Alternatively, mouse control is performed on one or both of touch pads 762 and 764 and sweeping gestures on screen 320 are interpreted as alternatives to second group keys.

In some embodiments of the invention, the number of keys provided included in a data entry device may be reduced by differentiating between different finger orientations when Pressing keys. For example, the keys may be soft keys and in identifying pressing on the screen the area of the pressing finger is determined to identify whether the press was performed with the tip of the finger or the flat portion. Using such finger orientation identification allows, for example, utilizing touch pads 762 and 764 as single keys which are not identified by the area being pressed, but rather by one or more attributes of the pressing finger.

In some embodiments of the invention, a speech recognition system is added to the above described data entry systems or is used instead of the second group keys. For example, in order to enter a special character, the user may press (e.g. and-hold) the key corresponding to the group that includes the desired character and provide a predefined speech relating to the desired symbol such as speaking said symbol so the system recognizes said speech and selects the desired symbol among that group of symbols. Preferably, for better accuracy, symbols included in a single symbol group, do not have similar names which can be confused in speech recognition. Allowing the user to use either second group keys or speech signals, allows the user flexibility to accommodate to different environments (e.g. very noisy environments, in a meeting).

Figure 12:
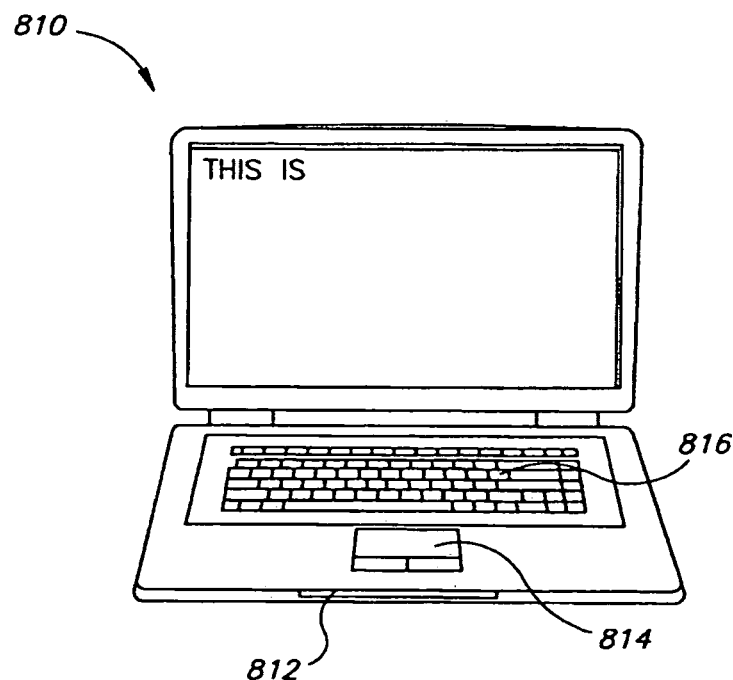
FIG. 12 is a schematic view of a notebook computer, in accordance with an exemplary embodiment of the invention.

FIG. 12 is a schematic view of a notebook computer 810, in accordance with an exemplary embodiment of the invention. Notebook computer 810 comprises a keyboard 816 and a mouse pad 814. A sensor strip 812 on the front side of computer 810 identifies when the user's hands touch and/or lean on the sensor strip. In an embodiment of the invention, gestures on mouse pad 814 are related to only when the user touches sensor strip 812. This avoids cases in which inadvertent contact with mouse pad 814 interferes with the user's work.

Any of the embodiments above may be implemented by an integral input interface of various devices, such as mobile phones, PDAs and general purpose computers. In some embodiments, the above embodiments may be implemented by a stand alone input interface device connected through wires and/or wirelessly to a separate device to which the input is supplied. In some embodiments, the stand alone input interface performs the character selection tasks and transfers the resulting letters to the separate device. Alternatively, some or all of the letter selection tasks are performed by the separate device receiving the input and/or by an intermediate unit.

Music Generator

In some embodiments, mobile device 300 comprises a music generator 189. While music generator 189 is shown as a separate unit from processor 130, it may be implemented by processor 130. Music generator 130 is adapted to play music files selected from a music storage 188, while a telephone conversation is being conducted and to mix the played music, serving as background music, with the speech signals passing on the telephone conversation. Optionally, mobile device 300 provides a menu from which the user may select a desired music file to be the tip of the finger or the flat portion. Using such finger orientation identification allows, for example, utilizing touch pads 762 and 764 as single keys which are not identified by the area being pressed, but rather by one or more attributes of the pressing finger.

In some embodiments of the invention, a speech recognition system is added to the above described data entry systems or is used instead of the second group keys. For example, in order to enter a special character, the user may press (e.g. and-hold) the key corresponding to the group that includes the desired character and provide a predefined speech relating to the desired symbol such as speaking said symbol so the system recognizes said speech and selects the desired symbol among that group of symbols. Preferably, for better accuracy, symbols included in a single symbol group, do not have similar names which can be confused in speech recognition. Allowing the user to use either second group keys or speech signals, allows the user flexibility to accommodate to different environments (e.g. very noisy environments, in a meeting).

FIG. 12 is a schematic view of a notebook computer 810, in accordance with an exemplary embodiment of the invention. Notebook computer 810 comprises a keyboard 816 and a mouse pad 814. A sensor strip 812 on the front side of computer 810 identifies when the user's hands touch and/or lean on the sensor strip. In an embodiment of the invention, gestures on mouse pad 814 are related to only when the user touches sensor strip 812. This avoids cases in which inadvertent contact with mouse pad 814 interferes with the user's work.

Any of the embodiments above may be implemented by an integral input interface of various devices, such as mobile phones, PDAs and general purpose computers. In some embodiments, the above embodiments may be implemented by a stand alone input interface device connected through wires and/or wirelessly to a separate device to which the input is supplied. In some embodiments, the stand alone input interface performs the character selection tasks and transfers the resulting letters to the separate device. Alternatively, some or all of the letter selection tasks are performed by the separate device receiving the input and/or by an intermediate unit.

Music Generator

In some embodiments, mobile device 300 comprises a music generator 189. While music generator 189 is shown as a separate unit from processor 130, it may be implemented by processor 130. Music generator 130 is adapted to play music files selected from a music storage 188, while a telephone conversation is being conducted and to mix the played music, serving as background music, with the speech signals passing on the telephone conversation. Optionally, mobile device 300 provides a menu from which the user may select a desired music file to be played and a volume at which it is to be played. Alternatively or additionally, the user may program music generator 189 to automatically sound a specific music file or a randomly selected file from a predetermined group of music files, each time a conversation with a specific remote telephone number is established. The user may, for example, sound happy music as background to conversations with one friend and sad music as background to conversations with a different friend. In some embodiments, different music or music attributes may be used depending on who established the call and/or the location of mobile device 300, for example as determined by an internal GPS (not shown).

Optionally, music generator 189 may be programmed to automatically sound music files in other cases, for example when the user is entering a text message. Alternatively or additionally, music generator may present text messages or video files to the user when certain events occur, for example when a specific user calls.

Figure 13:
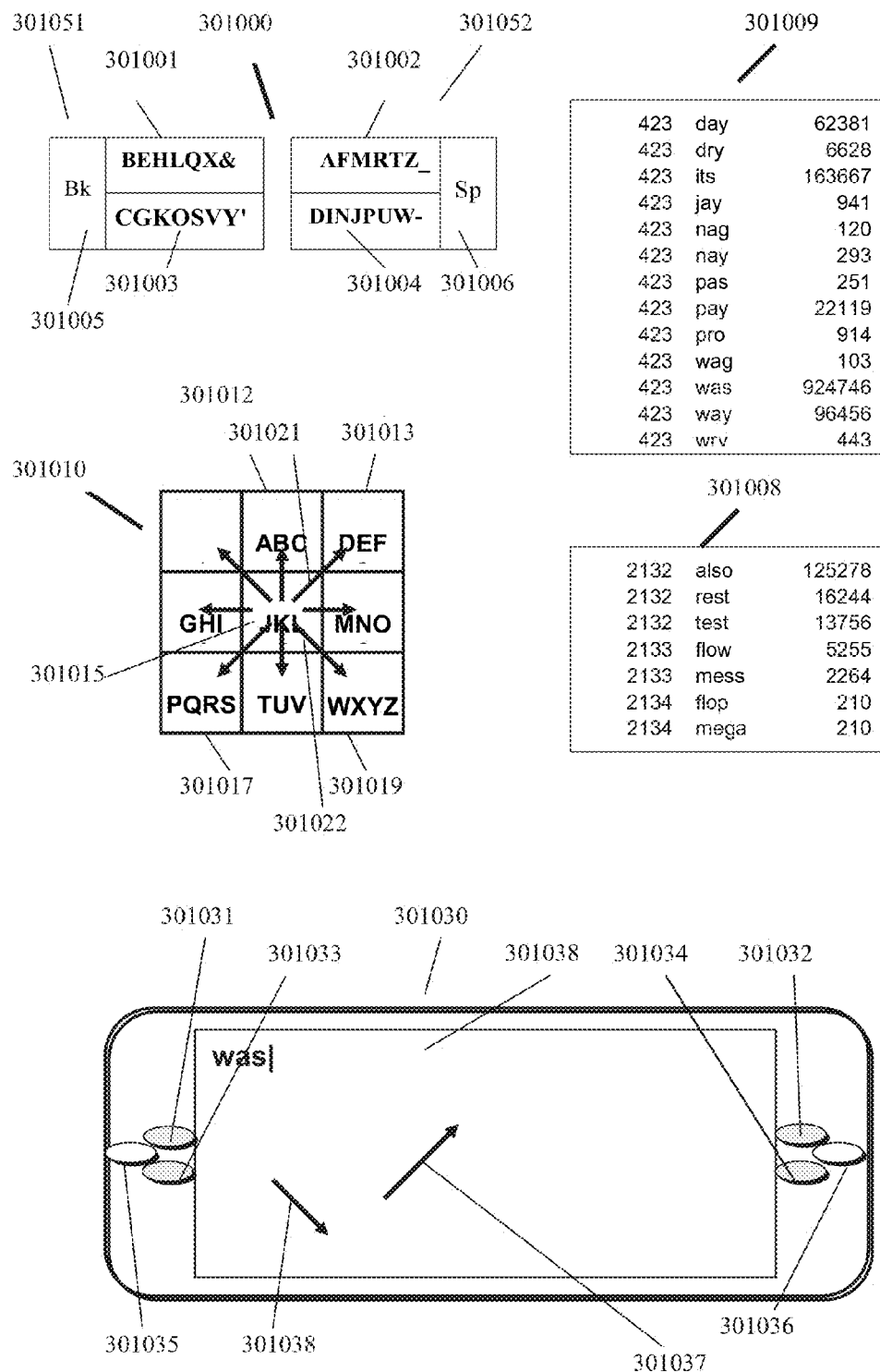
FIG. 13 is a schematic illustration of a first and a second keypad and portions of the word database and a device using those features.

FIG. 13 shows as an example, an exemplary first keypad 301000 as described above wherein to four of its keys 301001-301004 all of the letters of the English language are distributively assigned. The keypad 301000 also includes two additional keys 301006, 301005 to respectively provide Space character and BackSpace function.

FIG. 13 also shows an exemplary second keypad 301010 of the invention which in this example is a telephone-type keypad wherein all of the letters of the English language are also distributively assigned to eight of its keys.

As an example, by considering the portion of the database of words 301009 used by the system, in order to enter the word "day" the user may press on ambiguous keys 301004, 301002, 301003. The system may propose/predict the word "was" which corresponds to said key presses and has the highest priority among the words of the database corresponding to said key pressing actions. At this time the user may proceed to the correction procedure of the invention and press on the key 301013 of the second keypad 301010 to which the first character (e.g. "d") of the desired word is assigned. By considering the key pressing action corresponding to the first character of the desired word provided on the key 301001 of the first keypad 301000 and on the key 301013 of the second keypad 301010, the systems understands that the only common character (e.g. "d") on said keys is precisely the first character of the desired word. By considering said character and the key press information corresponding to the remaining characters of the desired provided through the first keypad the system proposes the word "day" which corresponds to the combined information provided by the user and has the highest priority among the words of the database corresponding to said combined information.

As described above, the interaction with the keys of a keypad may be duplicated of imitated by providing gliding or swiping actions preferably on a touch sensitive surface or in the air. For example, if the device relating to the data entry system of the invention has a touch sensitive surface and the second keypad of the invention is an imaginary telephone-type keypad model, according to one embodiment of the invention, providing a tapping action on any location on said surface may duplicate a taping action on the center key of said keypad to which the characters "JKL5" are generally assigned. In order to duplicate an interaction with another key of said keypad, the user may provide a gliding action on the touch sensitive wherein said gliding action duplicates a gliding action departing from the center key of the imaginary second keypad towards the desired key of said keypad.

As an example, FIG. 13 shows a device 301030 having a touch screen 301038 and using the data entry system of the invention. Said device includes/uses the first keypad being split in two portions wherein the first portion includes the keys 301031, 301033, 301035 duplicating the keys 301001, 301003, 301005 of the keypad 301000, and the second portion includes the keys 301032, 301034, 301036 duplicating the keys 301002, 301004, 301006, of said keypad 301000. The device 301030 also uses an imaginary keypad model 301010 which is in the form of a telephone-type keypad and is used as the second keypad. In the example of the entry of the word "day", after the user presses the corresponding keys of the first keypad of the device, the system may propose the word "was". In order to duplicate/imitate the pressing action on the key 301013 of the imaginary second keypad, the user may provide the gliding action 301037 that duplicates a gliding action departing from the center letter key 301015 of the imaginary keypad model 301010 towards the desired key 301013. The system recognizes that the user interacts with the key 301013 of the imaginary keypad model, and based on the principles as described in detail, proposes the word "day".

Also as an additional example, the gliding action 301038, duplicates the imaginary gliding actions 301022, which corresponds to interacting with the keys 301019 of the imaginary keypad model 301010.

Symbols such as special characters, commands, and functions, of PC keyboard and/or customized, may be grouped in different categories based on their characteristics (e.g. digits 0-9, punctuations, arithmetic characters, PC commands, etc.). Each group may be assigned to a different mode instance provided by providing a predefined type of interaction (e.g. a long, double, strong, pressing action) other than another the predefined type of interaction (e.g. a short, soft, tapping/pressing action) which is used/required with the keys of at least the first keypad for entering ambiguous characters such as letters. According to one embodiment, after the system enters into a corresponding mode, the system shows each of the symbols of the corresponding group on one of the keys of an on-screen keyboard for example in the form of a telephone-type keypad. The user then may provide a pressing action, or a gliding action on or corresponding to the desired key shown on the screen. FIGS. 302A to 302F are shown to describe as an example the "mode" keys of the invention in detail.

Figure 14:
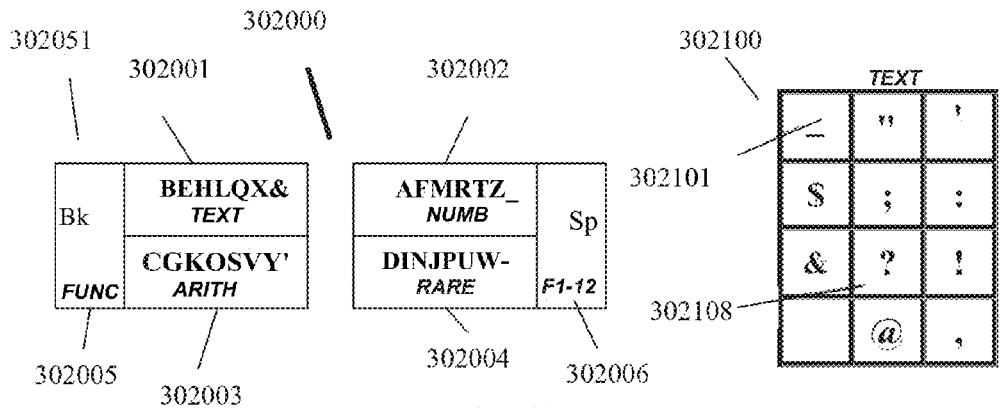
FIGS. 14A-14F are schematic illustration of different group of symbols in different mode instances, in accordance with some exemplary embodiments of the invention.

FIG. 14A shows as an example, the first keypad 302000 similar to the one shown in FIG. 13. In this example, the special symbols used with the data entry system are grouped in six categories, "TEXT" (e.g. mostly punctuation mark characters), "NUMB" (e.g. mostly digits 0-9), ARITH (e.g. mostly arithmetic characters), "RARE" (e.g. mostly other and/or rarely characters), "FUNC" (e.g. mostly PC and/or customized functions), and "F1-F12". Each of said groups is assigned, respectively, to one of the keys 302001-302006 of the first keypad 302000. The appellation of each group is printed on the corresponding key.

As an example, if the user desires to enter a punctuation mark character "?" which belongs to "TEXT" group, according to one embodiment, he may press and hold the key 302001 for a predefined laps of time to enter the system in the mode instance corresponding to said group. The system may show each of the characters of said group on one of the keys of an on-screen (e.g. telephone-type) keypad 302100. In this example, the symbol "?" is shown on the key 302108. According to one method, in order to enter the symbol "?", if the screen is touch sensitive, then the user may press the key 302108 or he may provide another interaction such as a gliding action to duplicate said key interaction. If the screen is not touch sensitive, and the device uses a physical telephone-type keypad as the second keypad, then the user may press the corresponding key of said physical keypad.

Also as another example, in order to enter the symbol "_", the user may press (e.g. and hold) the key 302001 and press then press the key 302101 if the screen is touch sensitive.

FIGS. 14B to 14F show five more groups of symbols, corresponding to five more modes assigned to the keys 302002 to 302006, respectively. For example, in order to enter arithmetic character "=", the user may press and hold the key 302003 corresponding to the "ARITH" mode of the first keypad 302000, and for example, after the system shows the second keypad 302300 as shown in FIG. 14C showing the locations of the symbols of "ARITH" group on said second keypad, the user interacts with the corresponding key 302309 to enter his desired special character "=".

According to one embodiment of the invention, the words of the database of the system may include any symbol such as letters, numbers/digits, punctuation characters, etc. Obviously, in many cases such as when the first keypad of the invention has only few keys such as four keys, one second keypad of the invention may not be enough to include all of said ambiguous symbols/characters such that, preferably, any ambiguous key of the first keypad and any ambiguous key of the second keypad have at most one common symbol/character. For example, if the first keypad of the invention has four ambiguous keys only and the words of the database of the system include substantially any of the characters available on a PC keyboard then having at least an additional (e.g. at least one more) second keypad may become necessary. This is because each key of the first keypad may, preferably, include at most a number of characters which does not exceed the number of keys of the second keypad or vise-versus.

Using a device having a touch-sensitive surface wherein tapping/gliding actions on a first side of said touch-sensitive surface corresponds to interacting with a first second keypad of the invention, and tapping/gliding actions on at least a second side of said touch-sensitive surface corresponds to interacting with at least an additional second keypad of the invention may permit the entry of any word having any (type of) character.

Figure 15:
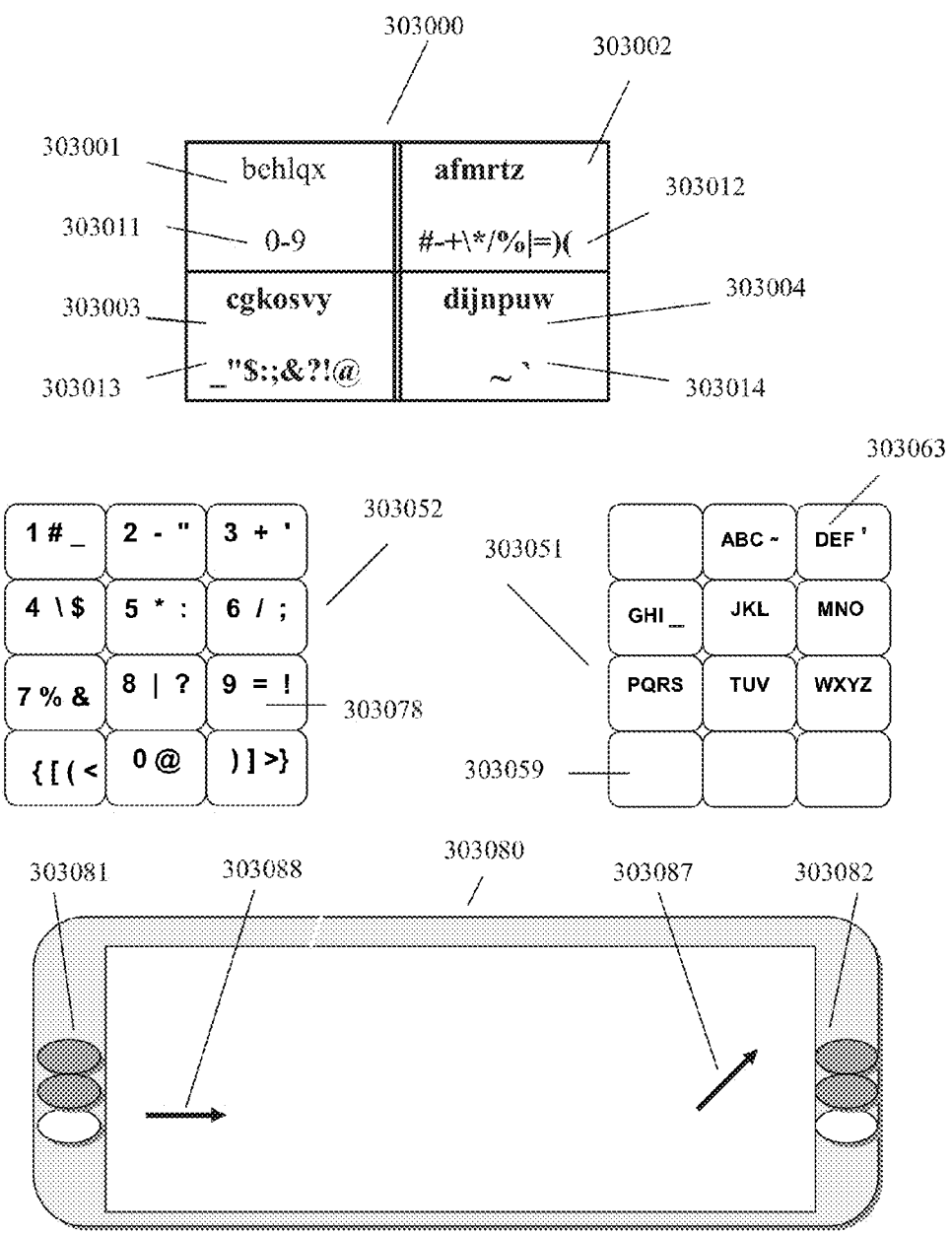
FIGS. 15-15A are schematic illustration entry of words including special characters, in accordance with some exemplary embodiments of the invention.

FIG. 15 shows as an example, a first (virtual) keypad of the invention 303000 having four ambiguous keys 303001-303004 as shown in many embodiments before. In this example, in addition to letters each key includes other ambiguous characters. For example, key 303001 includes the digits 0 to 9 (e.g. the "NUMB" group of characters 303011), key 303002 includes the arithmetic characters 303012 (e.g. the "ARITH" group of characters), key 303003 includes the text punctuation characters 303013 (e.g. the "TEXT" group of characters), and key 303004 includes the rare characters 303014 (e.g. the "RARE" group of characters). Preferably, the characters available on the keys of the first keypad are also distributed on the keys of two second keypads 303052, 303051, such that any pair of keys consisting of an ambiguous key of the first keypad and an ambiguous key of any of the second keypads, have at most one common character. In this example, in addition to the first keypad of the invention (e.g. split into two portions 303081, 303082 wherein its four ambiguous keys duplicate the ambiguous keys 303001-303004 of the virtual keypad 303000), the device also includes the two (e.g. virtual) second keypads 303051 and 303052 (e.g. which may be considered as two second keypad models). In this example, predefined tapping/gliding actions (e.g. 303087) on the right side of the touch screen of the device 303080 may correspond to interacting with the keys of the second keypad 303051 (e.g. the first second keypad), and predefined tapping/gliding actions (e.g. 303088) on the left side of the touch screen of the device 303080 may correspond to interacting with the keys of the second keypad 303052 (e.g. the additional/second second keypad).

Figure 15A:
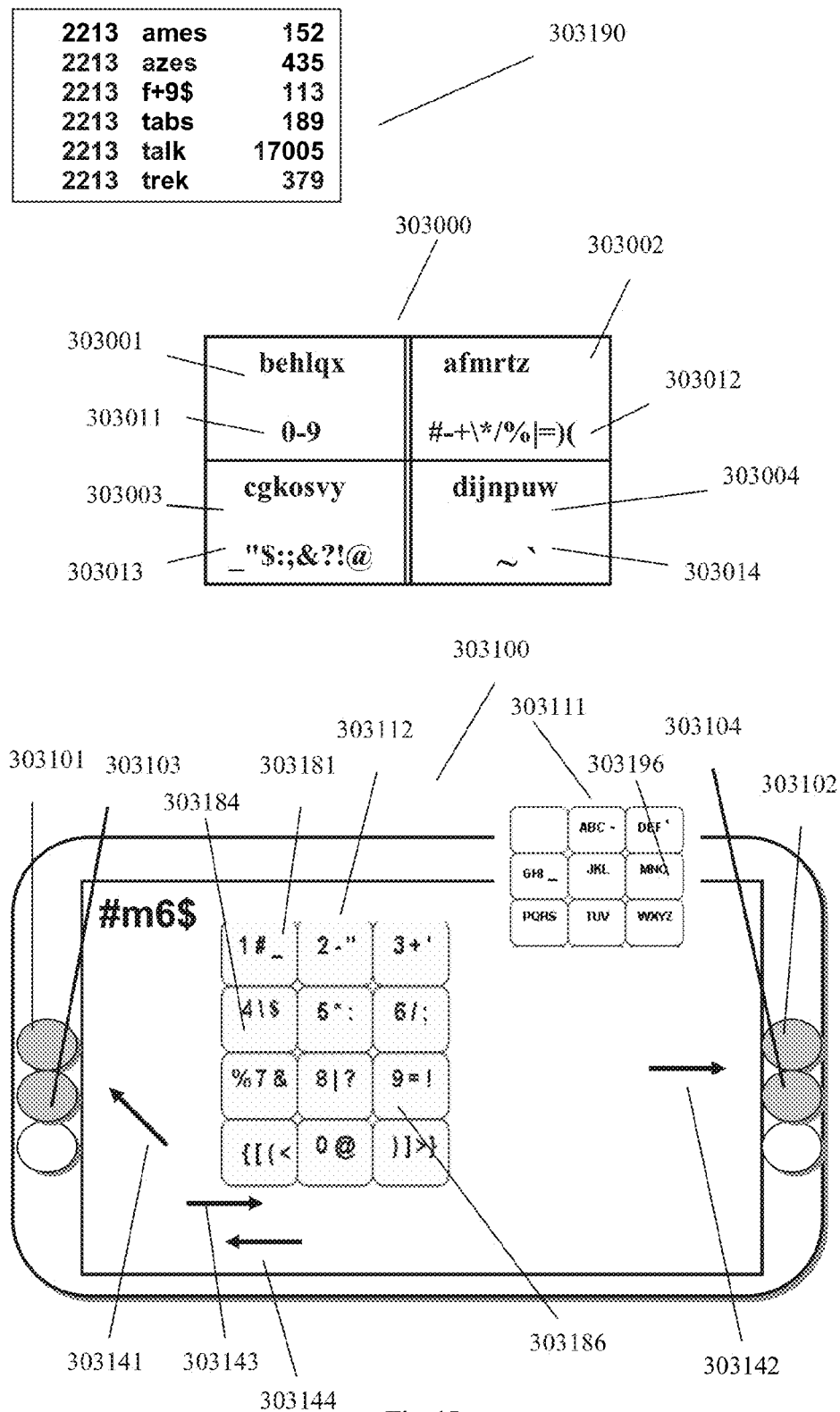

As an example of the above mentioned embodiment, FIG. 15a shows a device 303100 having the data entry system of the invention that includes a (split) first keypad of the invention as shown before, wherein four of its keys 303101-303104 duplicate the four ambiguous keys 303001-303004 of the keypad model 303000. The system also includes two (e.g. virtual) second keypads 303111 and 303112, wherein in this example the first second keypad 303111 mostly includes the letters of the alphabet and the second (e.g. additional) second keypad 303112 includes many of the special symbols distributed on its keys as described above. By considering the portion 303190 of the database of the system, according to a first example, in order to enter the word "f+9$" that is included within the dictionary database, the user may first press the corresponding keys 303102, 303102, 303101, 303103, of the first keypad corresponding to the characters of the desired word. The system may propose the word "talk" corresponding to said pressing actions and having the highest priority. The user may provide a gliding action (not shown) on the right side of the screen to duplicate interacting with the key of the second keypad that corresponds to the first character (e.g. "f") of the desired word. In this example, the only word that corresponds to said combined information is the word "f+9$". The system proposes said word.

With continuous description of the embodiment, according to a second example, in order to enter the word "#m6$" which does not exist in the dictionary, the user may first press the corresponding keys 303102, 303102, 303101, 303103, of the first keypad corresponding to the characters of the desired word. The system may propose the word "talk" corresponding to said pressing actions and having the highest probability. At this time the user begins to reenter said word through the keys of the second keypads. For this purpose, the user:

first provides a gliding action 303141 on the left side of the screen that corresponds to interacting with the key 303181 of the corresponding second keypad 303112. The only common character between the key of the 303102 and the key 303181 is the character "#". The system enters said precise character.

the user then provides a gliding action 303142 on the right side of the screen that corresponds to interacting with the key 303196 of the corresponding second keypad 303111. The only common character between the key of the 303102 and the key 160181 is the character "m". The system enters said precise character.

the user then provides a gliding action 303143 on the left side of the screen that corresponds to interacting with the key 303186 of the corresponding second keypad 303112. The only common character between the key of the 303102 and the key 160181 is the character "6". The system enters said precise character.

the user then provides a gliding action 303144 on the left side of the screen that corresponds to interacting with the key 303184 of the corresponding second keypad 303112. The only common character between the key of the 303102 and the key 160181 is the character "$". The system enters said precise character.

The desired word is being displayed on the screen and preferably added to the word database of the system so that next time that the user desired to enter said word, it can be entered faster.

QWERTY Arrangement

According to one embodiment of the invention, the first keypad of the invention may have six letter keys arranges in two columns and three rows. The distribution and arrangement of the letters on said six keys may be such that to resemble to the arrangement of the letters on a PC keyboard such as a QWERTY keyboard. According to one method, the second keypad of the invention may be a keypad having ambiguous letter keys such as a telephone type keypad with minor modifications such that a key of the first keypad and a key of the second keypad have at most one character/letter in common.

Figure 16:
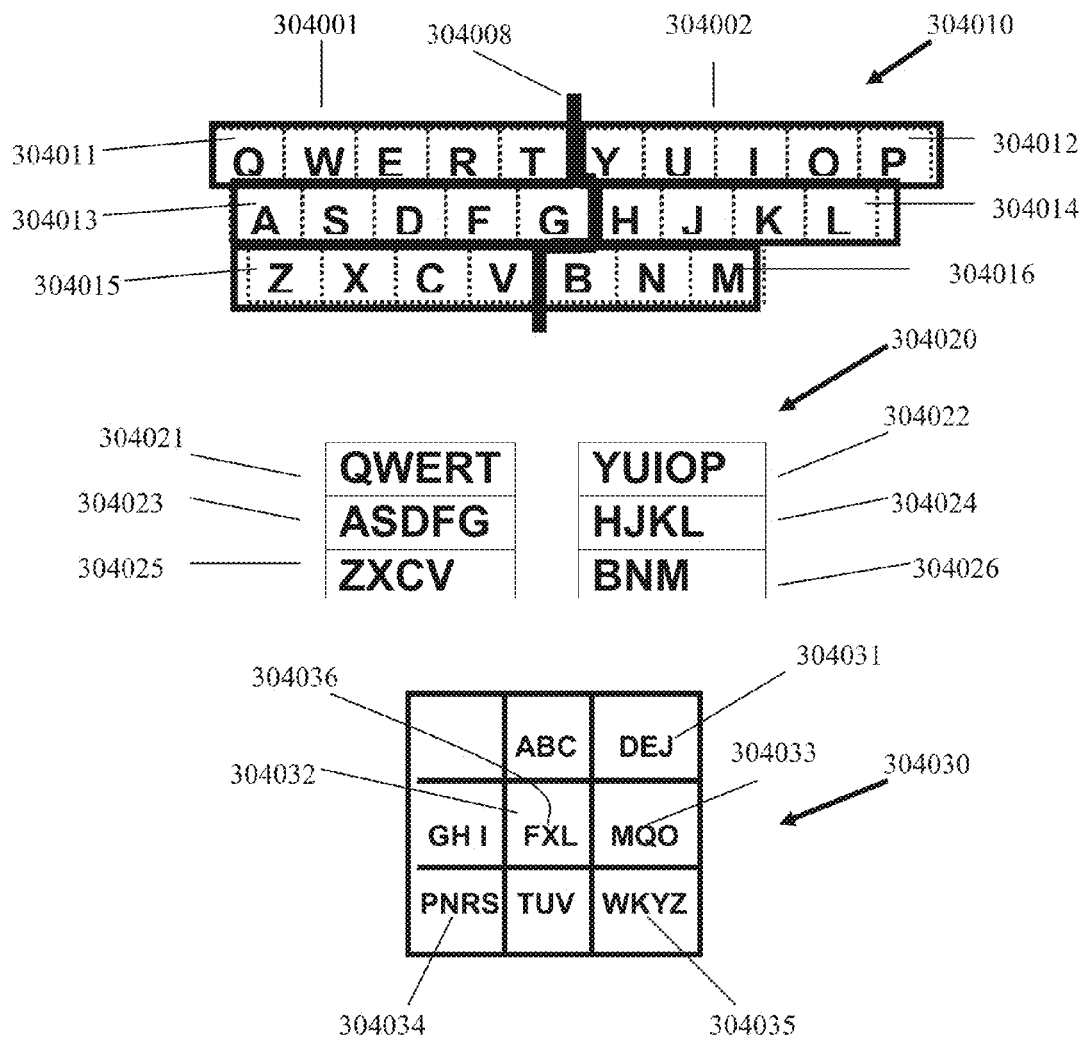
FIGS. 16-16A are schematic illustration letters of the first keypad in a QWERTY arrangement, in accordance with some exemplary embodiments of the invention.

As an example, FIG. 16 shows the letter keys of a QWERTY keyboard 304010 wherein said letter keys are divided into two columns 304001-304002 (e.g. by a separator 304008) and three rows forming six group of letters 304011-304016. The letter keys are separated in two columns such that the keys on the left column are usually pressed by the left hand of a typist and the keys on the right column are usually pressed by the right hand of a typist. FIG. 16 also shows a first keypad of the invention 304030 having six ambiguous letter keys 304021-304026 wherein each of said keys representing ambiguously one of the corresponding letter groups 304001-304006, accordingly. As an example, a typist knows that the letter "D" is on the middle row of the letter keys of the QWERTY keyboard and that he usually enters it through his left hand, therefore in order to enter said letter ambiguously through the keypad 304020 he will press the middle left key 304023 of said keypad.

The keypad 304020 may be used as the first keypad of the invention used with the word predictive data entry system of the invention having a first and (at least) a second keypad. As shown in the current figure, in this example, the second keypad of the invention is a telephone-type keypad with slight modifications 304030 such that each of the keys of the first keypad and each of the keys of the second keypad have at most one common character/letter.

In the embodiment above, although the first keypad has more than four letter keys (e.g. 6 letter keys), because the arrangement of the letters on said six keys resemble to the arrangement of the letters of a PC keyboard such as the QWERTY keyboard, therefore the user can begin to type fast and easy immediately without the need of a learning period to get used to the locations of letters on the keys of the first keypad. On the other hand, the location of letters on the keys of the second keypad which preferably is a telephone-type keypad (with slight modifications) is also a familiar layout, therefore the overall system may become very user friendly. It is understood, that the first keypad of the invention may include additional keys such as two keys for entering Space and BackSpace characters.

In the example above, which is only one example of such layout modification, in the keypad 304030 the location of the letters in each of the pair of letters "F" 304032 and "J" 304031, "X" 304036 and "K" 304035", "N" 304034 and "Q" 304033, are being swapped between them.

Figure 16A:
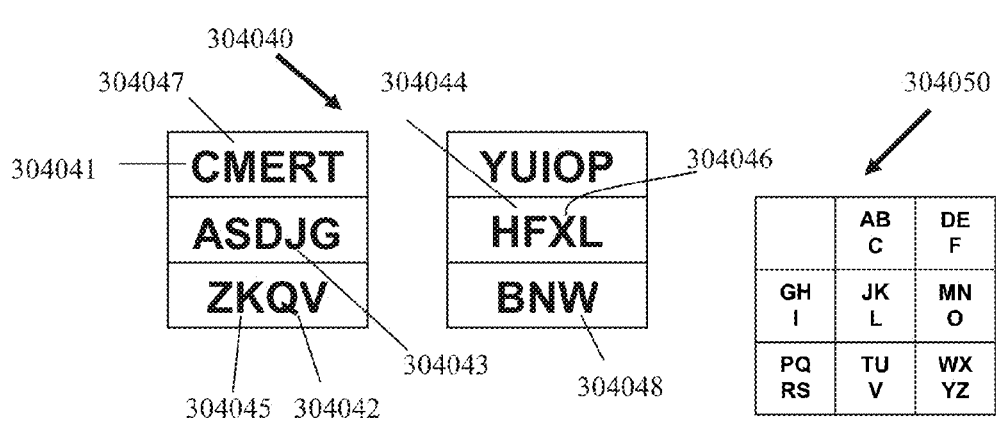

Alternatively, according to another embodiment of the invention, the first keypad of the invention may have six ambiguous letter keys wherein the letter distribution may remind a PC keyboard such as a QWERTY layout with slight modification, and the second keypad may be a telephone-type keypad with no letter arrangement modification. FIG. 16a, shows an example of such embodiment wherein the letter assignment to the keys of the first keypad 304040 resemble to the letter assignment to the keys of the first keypad 304020 of FIG. 16 with slight modification. In this example, the location of the letters in each of the pair of letters "M" 304047 and "W" 304048, "X" 304046 and "K" 304045", "C" 304041 and "Q" 304042, "F" 304044 and "J" 304043, on the first keypad are being swapped between them, accordingly. In this example, the letters being swapped between them have resembling shape so that the user can easily get used to the layout change.

Also, in this example, the second keypad is a telephone-type keypad 304050 with no modification.

Alternatively, according to another embodiment both the first keypad having six keys reminding the arrangement of the letters on a PC keyboard and the second keypad of the invention being a telephone type keypad may be slightly modified in their respective letter arrangements.

Entering (Directly) Precise Letters

According to one embodiment of the invention, the data entry system of the invention (e.g. using a first and a second keypad) may include a method for entering precise characters (e.g. directly) without entering into the correction procedure of the invention. If the keys of the first keypad of the invention are touch sensitive keys, then a gliding/swiping action on and/or departing from an ambiguous key of the (first) keypad to which a desired letter/character is assigned, duplicating a gliding action departing from the center letter key (e.g. the key to which the digit "5" is assigned) of an imaginary second keypad such as a telephone-type keypad) towards a key to which also said desired letter is assigned may provide the desired letter. Because said key of the first keypad and said key of the imaginary keypad have at most one character/letter in common said character said desired character may be precisely entered by the system. In the current embodiment, when a gliding action is being provided, the touching point (e.g. the beginning point of the gliding action) on said key may be interpreted by the system as corresponding to the center letter key of the imaginary telephone keypad to which the digit "5" and/or the letters "JKL" are generally assigned, and based on that the gliding direction and the corresponding key of the second keypad is recognized. Obviously, the departing point may be anywhere on the corresponding key of the (first) keypad.

Figure 17:
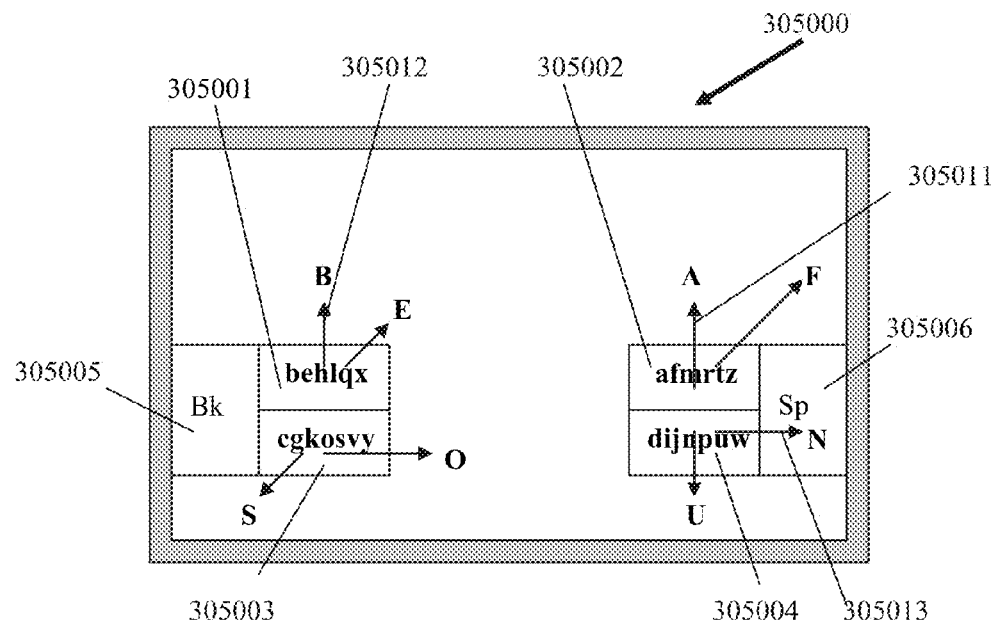
FIGS. 17-17A are schematic illustration of using gliding actions from the keys to enter/insert precise characters, in accordance with some exemplary embodiments of the invention.

With continuous description of the current embodiment, FIG. 17 shows as an example, a device 305000 having a touch sensitive surface including a first keypad of the invention as shown and described previously in this application, having four ambiguous letter keys 305001-305004. The keypad also has two additional keys 305005, 305006 as described before (e.g. for Sp and BkSp, mode keys, etc.)

In this example, in order to enter the letter "a" precisely (and directly), the user may provide a gliding action 305011 on and/or departing from the ambiguous key 305002 to which the letter "a" is ambiguously assigned duplicating a gliding action departing from the center letter key of a telephone-type keypad towards the key of said telephone-type keypad to which the letter "a" is ambiguously assigned. Also for example, in order to enter precisely the letter "b", the user may provide a gliding action 305012 on/departing from the key 305001 upward, and in order to enter precisely the letter "n", the user may provide a gliding action 305013 on/departing from the key 305004 to the right direction (e.g. from the center key of the telephone keypad towards the key of said keypad having the digit "6" and the letters "mno"). In the example of FIG. 17, some other gliding actions departing from different keys in several directions for entering the letters "E", "F", "S", "O", and "U" are also shown as examples.

With continuous description of the current embodiment, according to one method, in order to enter any on the letters "jkl" which are located on the center letter key of a telephone keypad, the user may provide a long pressing action on the corresponding key of the first keypad and then release it. For example, a long pressing action on the key 305001 and releasing said key may correspond to entering precisely (and directly) the letter "l", and a long pressing action on the key 305003 and releasing said key may correspond to entering precisely the letter "k", and a long pressing action on the key 305004 and releasing said key may correspond to entering precisely the letter "j".

According to another method, as described in this and previous patent applications filed by this inventor, the letters "jkl" may be assigned to the key of the telephone-type keypad (e.g. used as the second keypad of the invention) to which the digit "1" is assigned. In this case, in order to enter precisely any of the letters "JKL", the user may provide a gliding action on and/or departing from the corresponding key of the first keypad in a direction duplicating a gliding action departing from the center key of an imaginary telephone-type keypad towards the key to which the digit "1" is (e.g. and in this method, also the letters "JKL" are) assigned.

Figure 17A:
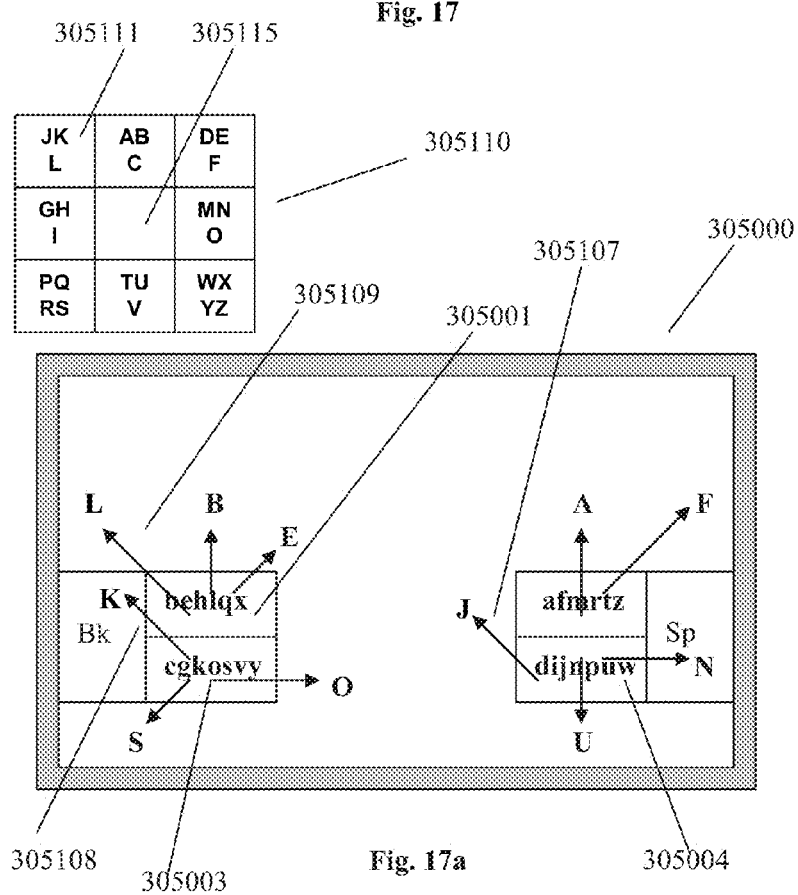

With continuous embodiment of the invention, as an example, FIG. 17a shows the device 305000 having a touch-sensitive surface and a imaginary second keypad 305110 wherein the letters "JKL" are assigned to the key 305111. In this example, providing the gliding action 305107 departing from the key 305004, which its trajectory duplicates a gliding action departing from the key 305115 of the imaginary second keypad toward the key 305111 of said keypad may provide precisely the letter "J". Also, providing the gliding action 305108 departing from the key 305003, which duplicates a gliding action departing from the key 305115 toward the key 305111 of the imaginary second keypad may provide precisely the letter "K". Also, providing the gliding action 305109 departing from the key 305001, which duplicates a gliding action departing from the key 305115 toward the key 305111 of the imaginary second keypad may provide precisely the letter "L".

Obviously, the method of entering (directly) precise characters as described above may be used with the word predictive data entry systems of the invention. As an example, during the entry of a word the user may enter precise characters without entering into a correction procedure for entering said precise characters.

Figure 18A:
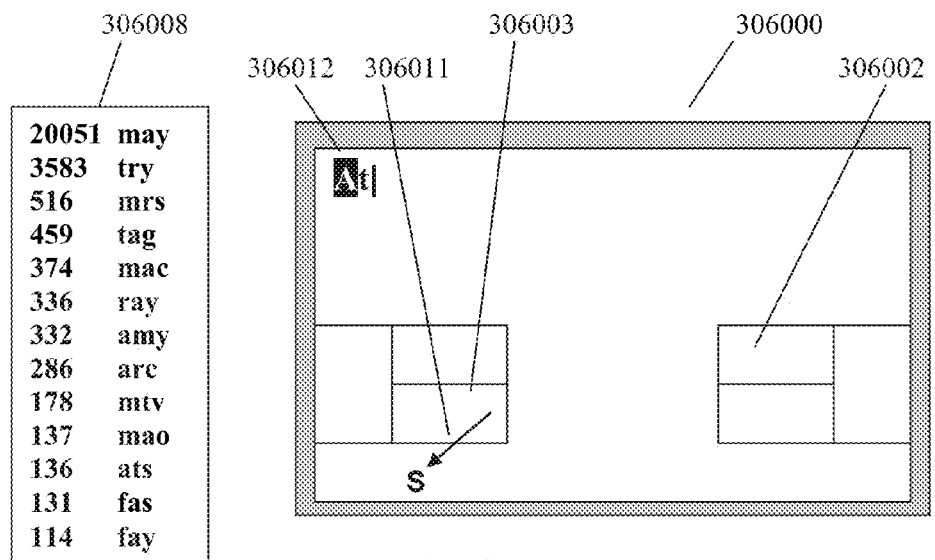
FIGS. 18A-18C are schematic illustration of correcting and inserting characters of a word, in accordance with an exemplary embodiment of the invention.
Figure 18B:
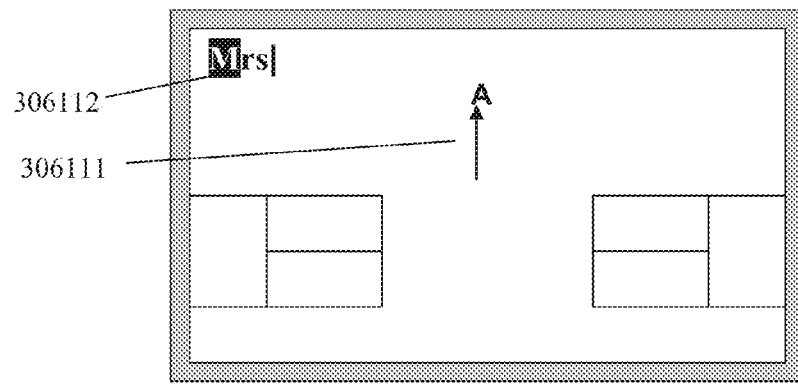
Figure 18C:
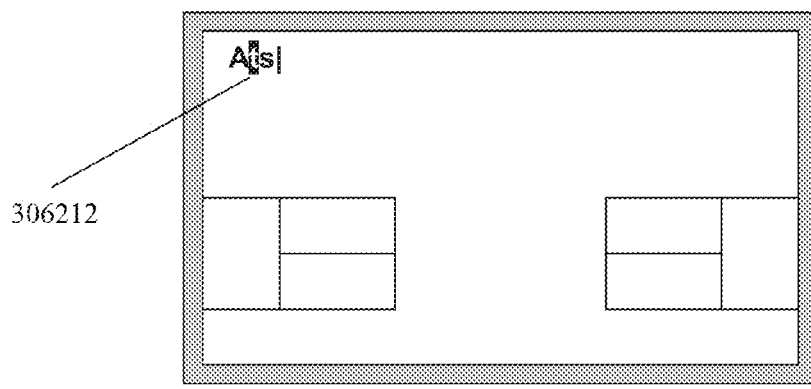

According to one embodiment of the invention, during the entry of a word using the word predictive system of the invention using a first and (at least) a second keypad of the invention, providing gliding actions on and/or departing from the letter keys of the first keypad of the invention may provide corresponding precise characters, and providing gliding actions outside said letter keys may correspond to the correction procedure of the invention. As an example, FIG. 18a shows a device 306000 and features resembling to the device 305000 and the features shown in FIG. 17. FIG. 18 also shows a portion of an exemplary dictionary 306008 of the invention. As an example, after the user provides two (fast) pressing/taping actions on the ambiguous key 306002, the system may propose the word "at" which corresponds to the input signals provided by the two taping actions (e.g. the first input information) on said key 306002. The first letter 306012 of the proposed word may automatically be selected/marked by the system. At this time, if the user provides a gliding action 306011 departing from the key 306003 wherein said gliding action duplicates a gliding action departing from the center letter key of a telephone type keypad towards the key to which the letters "PQRS" are assigned, then the system may relate said gliding action 306011 to providing the letter "s" and adds said information to the first input information provided previously. By considering/combining the first input information ambiguously corresponding to the two beginning characters of the desired word and the third character which is the precise letter "s" which is the third character of the desired word, then as shown in FIG. 18b, the system may propose the word "mrs" which corresponds to said combined information and has the highest priority among the words of the dictionary corresponding said combined information. Preferably, the system may keep to select/mark the first ambiguous letter 306112 of the proposed word. At this time, if the user provides a gliding action departing from out of the letter keys of the first keypad such as the gliding action 306111 towards a desired direction (e.g. in this example, upward), then as shown in FIG. 18*c*, the system predefinely may enter into the correction procedure of the invention and may relate said gliding action to the ambiguous letter selected/marked by the system and accordingly provide the letter "a". By considering the combined information provided by the user until then, the system may provide the word "ats" which corresponds to said combined information and has the highest priority among the words (and/or stems) corresponding to said combined information. At this time, preferably, the system selects/marks the next ambiguous letter 306212 of the proposed word. Obviously, if desired word is longer than the proposed word, the user may provide additional ambiguous key presses information, and/or additional (direct, or through correction procedure) precise characters corresponding to his desired word.

According to one embodiment of the invention, the keys of the first keypad of the invention may also be used for entering (directly, as described above) special symbols such as special characters. commands, etc., by providing the corresponding gliding actions on and/or departing from said keys.

As an example, after the user enters the system into a desired mode instance by for example providing a long pressing action on the corresponding key of the first keypad, preferably without removing his finger from the screen, he may provide a gliding action corresponding to the desired symbol on and/or departing from said key in the corresponding direction.

According to another embodiment of the invention, a short gliding action on and/or departing from a key (of the first keypad) in a predefined direction may correspond to entering a corresponding precise letter, and a longer gliding action on and/or departing from a key (of the first keypad) in the same predefined direction may correspond to entering a corresponding special symbol in a mode instance assigned to said key.

After the system enters into a mode instance, the system may show the symbols of said mode instance and their corresponding location on the second keypad of the invention (e.g. a telephone keypad), on the screen of the device so that the user see his desired symbol and provide the corresponding gliding action.

According to one method, if the letters "JKL" are assigned to the center key of the second keypad of the invention (e.g. a telephone type keypad), then providing a long pressing action on a key of the first keypad and releasing it may correspond to the similar character which is also on said key of the first keypad. In this case the mode instance may not include a special symbol on the center key of the second keypad of the invention.

According to another method, if the letters "JKL" are not assigned to the center key of the second keypad of the invention (e.g. a telephone type keypad), then providing a long pressing action on a key of the first keypad and releasing it may correspond to a special symbol which is predefinely assigned to the center key of the second keypad of the invention in the corresponding mode instance.

According to one embodiment of the invention, the system may have two (e.g. identical) sets of first keypads, one used for entering ambiguous characters and one used for entering precise characters in the manner described above. The first keypad for entering ambiguous characters may include hard keys and the first keypad for entering precise characters may have touch-sensitive keys such as touch pad keys or on-screen keys (e.g. or vise versus). According to one design, the hard keys may be click buttons for entering ambiguous characters and the soft keys may be touch pad keys located on the top of (e.g. and around) said hard keys for entering precise characters as described.

The system of entering precise characters based on gliding actions on and/or departing from each of the keys of the first keypad of the invention as described above may be extremely beneficial for entering out-of-dictionary words. The user may enter a word (e.g. that he knows it is not included within dictionary) precise character by precise character, by a single swiping action (e.g. a long pressing action if the character is on the center key of the second keypad) provided for each of said characters. Said word then may automatically be added to the dictionary.

Dialing

Dialing by text has been described in different patent applications by this inventor. Obviously, searching a target such as a person (e.g. based on different text such as his name, address, etc.) may be done through the media search described earlier and/or by using the system for entering direct precise characters as described above. According to one method, based on said text information provided, the system implemented in a device may first search the target in the device's database and if it does not find it may send said text information to the remote center for the same purpose. The next steps has been described and been shown by examples before.

Entering Precise and Ambiguous Special Characters

Method 1—Entering Precise Special Characters which are not Part of a Word

As mentioned before, quick tapping/pressing actions on a (letter) key of the first keypad of the invention may be related to entering ambiguous letters/characters assigned to said key, and a long pressing action or a gliding action on or departing from said/a key, wherein said gliding action 1 preferably begins shortly after the user touches said key, may correspond to entering a precise character such as a letter assigned to said key.

Also as mentioned before, according to one embodiment of the invention, a long pressing action on a key may enter the system into a mode instance corresponding to said key. Then, if the user continues his interaction (e.g. preferably without removing his finger from the key/touch-sensitive-surface) by providing a gliding action in a predefined direction, preferably when the user ends his gliding action, said gliding action may be related by the system to entering a corresponding precise symbol such as a special character assigned to said key.

Figure 19:
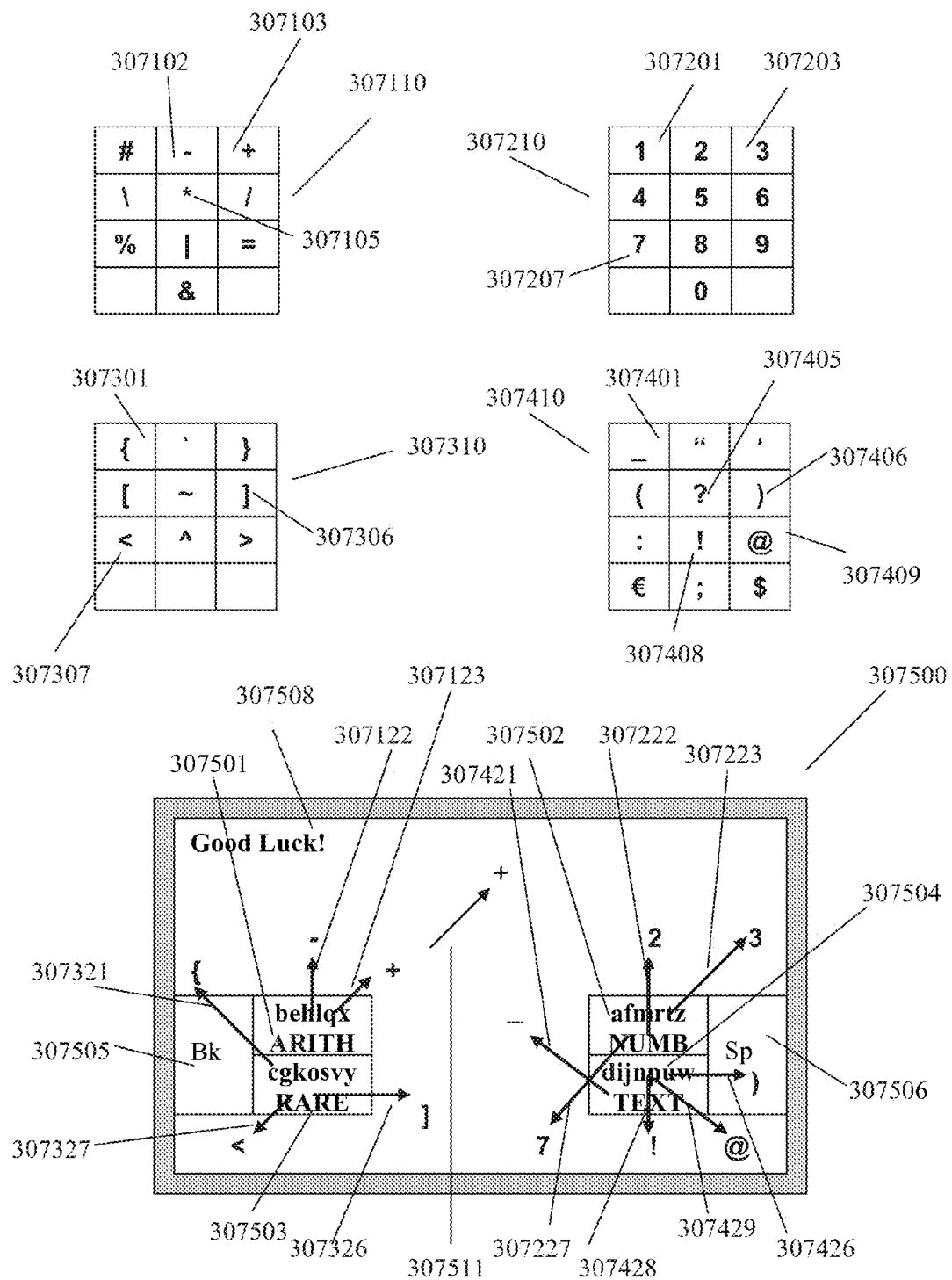
FIG. 19 is a schematic illustration of entering ambiguous and precise special characters, in accordance with an exemplary embodiment of the invention.

With continuous description of the current embodiment, as an example, FIG. 19 shows a device 307500 with a touch screen which includes the keys 307501-307506 of the first keypad of the invention. In this example, if the user provides quick pressing actions on the letter keys 307501-307504, the system relates said actions to entering a word ambiguously. For example, by considering the portion 306008 of the word database of the system as shown in FIG. 18*a*, if the user provides quick pressing actions on the keys 307502, 307502, 307503, the system proposes the word "may" corresponding to said input information and having the highest priority among the words corresponding to said input information. On the other hand, according to an example of the current embodiment, if the user presses and holds the key 307501 for at least a predefined laps of time (e.g. longer than said quick pressing actions), then the system may enter into the mode instance (e.g. the ARITH mode) which in this example corresponds to said key. In this example, the second keypad of the invention is based on an imaginary telephone-type keypad model. The imaginary keypads 307110, 307210, 307310, 307410, show respectively the symbols (e.g. special characters) assigned to the keys 307501, 307502, 307503, 307504, in the corresponding mode instances (e.g. ARITH, NUMB, RARE, TEXT, respectively) of the imaginary keypad model. The symbols of the ARITH mode are shown on the keys of the keypad instance 307110. After the system enters into said mode, according to one example, if the user (e.g. continues his interaction and) provides a gliding action 307122 to duplicate interacting with the key 307102 of the keypad model in said ARITH instance, then the system enters the special character "−" assigned to said key. Accordingly, after the system enters into said ARITH mode, according to another example, if the user (e.g. continues his interaction and) provides a gliding action 307123 corresponding to the key 307103 of the keypad model in said instance, then the system enters the special character "+" assigned to said key. Also accordingly, as an additional example, after the system enters into the TEXT mode by pressing and holding the key 307504 of the first keypad, according to one example, if the user (e.g. continues his interaction and) provides a gliding action 307429 corresponding to the key 307409 of the keypad model 307410 in the TEXT instance, then the system enters the special character "@" assigned to said key. FIG. 19 also includes additional examples for entering some other special characters.

Preferably, the current embodiment may be used for entering precise special characters which are not part of the characters of a word. For example, at the end of the entry of the phrase "Good Luck" the user may enter the special character "!" 307508 by providing a predefined interaction such as press and holding the corresponding key 307504 for entering the system into the TEXT mode instance and provide the gliding action 307428 (e.g. corresponding to interacting with the key 307406 of the imaginary keypad in the TEXT mode instance) departing from said key 307504.

It must be noted that according to one method, the special character/symbol assigned to the center key of the second keypad in one or more of the instances may be entered by providing a different interaction such as for example, a back and forth gliding action ending on or closed to the departing point of the gliding action on or departing from said key, etc.
Method 2—Entering Precise Special Characters which are Part of a Word According to one embodiment of the invention, Method 1 described above may be slightly modified and be used for entering quickly/directly precise special characters during the entry of a word that includes special characters through the word predictive data entry system of the invention. According to one method, such method may be similar to said Method 1 for entering a precise special character, but with an additional interaction before/during/after each interaction used for entering a symbol/precise character through Method 1 (or vise versus). As an example, a predefined interaction such as press and holding action with/on a letter key of the first keypad, then press and holding another key of the first keypad may enter the system into the mode instance assigned to said another key wherein said mode instance is used for entering precise special characters of a word during the entry of said word through the word predictive system of the invention. The user then may provide a gliding action on or departing from said another key such that to duplicate a gliding action departing from the center key of the second keypad towards the key of the second keypad to which said symbol/special character is assigned. As an example, by considering FIG. 19, during the entry of a word through the word predictive system of the invention, if said word includes the special character ")" which is assigned to TEXT mode instance and the user desires to enter said character precisely, according to one method, the user may first provide an initial interaction such as press and holding a key other than the key 307504 to which the TEXT mode instance is assigned. The user then may press and hold the key 307504 to enter the system into the TEXT mode instance for entering precise special characters of the desired word to be entered, and then provide the gliding action 307506 corresponding to the desired character ")" which is assigned to the key 307406 of the imaginary keypad model in the instance 307410. Said special character along with other input information such as ambiguous key presses provided for the entry of the desired word may be considered by the system to predict the desired word.

According to one embodiment, preferably, the Method 2 just described is preferably used for adding precisely a special character in a location where the caret/cursor is located during the entry of a word.
Other Methods Creating, entering and correction procedure for entering words including special characters through the word predictive system of the invention have been described before and shown through FIGS. 15-15a. Said method requires interacting on different zones for entering different categories of characters. The method described and shown before in FIGS. 15-15a is preferably used where the In-Word character selection means is located to for example replace an ambiguous character with a precise special character. If said system is used in conjunction with the Method 1 and/or Method 2 described above in the system, then, the departing point of interaction/gliding location in the method shown through the FIGS. 15-15a may preferably be outside the zones of the keys of the first keypad of the invention.

According to an alternative method (e.g. hereafter called the Alternative Correction Method for Entering Precisely Special Characters) providing a predefined interaction on a key of the first keypad for entering the system into a desired mode instance and then providing a gliding action corresponding to a special character in said instance provided from outside the zones of the first keypad of the invention may be used by the correction procedure of the invention for replacing a selected ambiguous character (during the entry of a word) by said precise special character.

As a first example of the embodiments and methods for entering (precise characters) just described, by considering the portion 303190 of the dictionary of words of the invention of FIG. 15a which includes words with special characters, according to a first example, in order to enter the word "f+9$", the user may first (short) press the keys 307502, 307502, 307501, 307503. The system may propose the word "talk" having the highest priority and automatically select the letter "t". At this time, for example, the user may navigate within the letters of the proposed word and select the ambiguous character "a". At this time, according to the Alternative Correction Method for Entering Precisely Special Characters as described above, the user may proceed to the correction procedure of the invention in order to replace the character "a" by the precise character "+" of the desired word. The user may enter the system into the corresponding mode instance by providing a long pressing action on the key 307501 which corresponds to ARITH mode, and provide a gliding action 307511 on the screen of the device departing from outside the zones of the first keypad of the invention, wherein said gliding action being provided in the direction corresponding to duplicating interaction (described in detail before) with the key 307103 of the second keypad of the invention 307110 in the ARITH mode to which the special character "+" is assigned. By considering the combined input information the system replaces the character "a" by character "+" and may propose the word "f+9$" which is the only word of the database that corresponds to the combined input information.

As a second example of the embodiments and methods just described, according to Method 2, in order to enter the word "f+9$", the user may first provide a (short) pressing action on the key 307502 to provide a first character ambiguously. He then press and hold a (letter) key of the first keypad (other than the key 307501) such as the key 307502, then provide a long press on the key 307501 to enter the system into the corresponding mode which in this example is the ARITH mode. At this time the user may continue his interaction by providing a gliding action 307123 on or departing from the key 307501 in the direction that duplicates a gliding action departing from the center key 307105 of the imaginary second keypad of the invention in ARITH mode instance towards the key 307103 to which the special character "+" is assigned. The system enters said character "+" precisely. The user then may (short) press on the keys 307501 and 307503 (e.g. corresponding to the two remaining ambiguous characters of the desired word). By considering the combined information provided by the user for entering the desired word the system predicts the word "f+9$" which is the only word of the dictionary that corresponds to said combined information.

It must be noted that the different methods described for entering precisely special characters can be swapped and assign to any of the interactions as described above or to other types of interactions designed by people skilled in the art.

According to one embodiment of the invention, during the entry of a word, if the user moves (manually) the In-Word selection means (moving a selection means inside a word has been described before in detail) and selects a letter/character of a word, then providing a precise character/letter or a precise special character may (predefinely) replace said selected character by said precise character and the system may consider said replacement and may propose/predict another word based on the overall input information corresponding to said word provided until that moment.

The methods of entry of one or more precise characters at any moment and any (cursor/caret) position during the entry of an ambiguous word through a word predictive system may resolve the problem of fluctuation of non desired words/stems proposed by the system during the entry of a desired word. For example, by entering (easily and directly) one or more precise letters of a word, in most cases the system may be able to predict correctly other characters of the desired words during the entry of the desired word. This greatly overcomes the fundamental problem of the word predictive systems which is characters fluctuations during the entry of a desired word. In addition, the system permits to easily enter short/customized word created by the users of SMS, formulas, passwords, URLs, etc.

In order to ease finding a letter corresponding to one of the (e.g. four) ambiguous letter keys of the first keypad of the invention for example by a beginner, according to one embodiment of the invention, each of the ambiguous letters/characters of each of said keys may be printed on a tag in a 3×3 matrix. The location of each letter on the corresponding matrix may be the same as the location of the same letter on the telephone-type keypad key.

Figure 20:
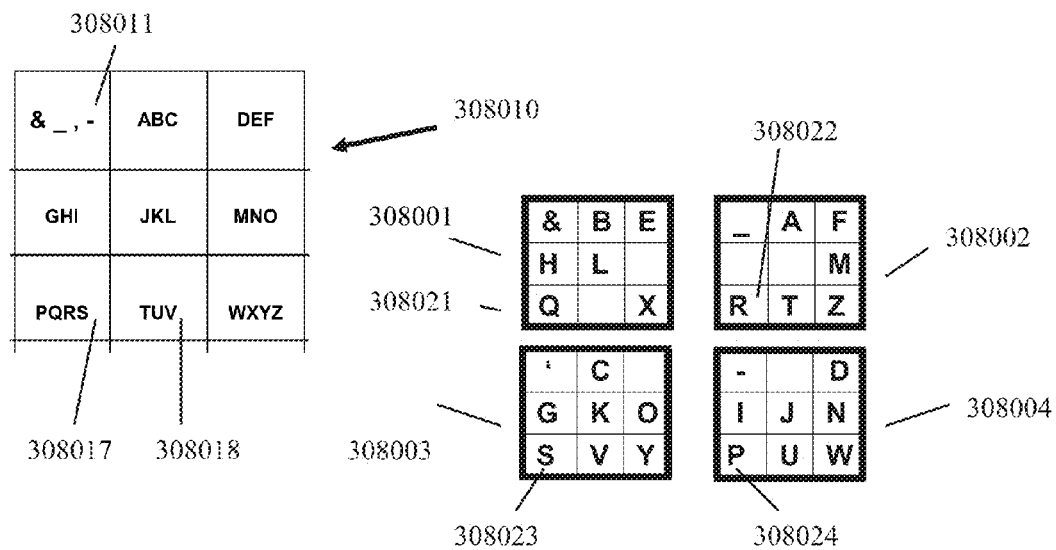
FIGS. 20-21 are schematic illustration of showing the letters on keys typically based on a telephone keypad letter arrangement, in accordance with an exemplary embodiment of the invention.

As an example, FIG. 20 shows a 3×3 matrix 308010 (e.g. the main matrix) showing a telephone keypad letter arrangement. FIG. 20 also shows four tags 308001-308004, each tag including the ambiguous characters of one of the four ambiguous keys of the first keypad of the invention according to one embodiment of the invention. According to this embodiment, the letters on each of the tags are also arranged in a 3×3 matrix such that the location of each letter within a matrix on a tag resembles to the location of the same letter within the (main) matrix 308010.

Finding Location of Letters on 4K

The tags may be printed on each of the corresponding keys of the first keypad and/or they may be printed on other locations such as on the body of the corresponding electronic device or on the screen of said device. According to this method, a beginner user of the data entry system of the invention who is familiar with the arrangements of the letters on a telephone keypad may easily find a desired letter on a tag (and its corresponding key of the first keypad). For example, if the user desires to press the key of the first keypad of the invention corresponding to the letter "p", he knows that said letter is located on the left key of the third row (e.g. key having "pqrs7") of the telephone keypad (or the key 308017 of the matrix 308010). As such, the user may find said letter on one of said printed tags of the first keypad wherein he knows that the location of said letter is on one of the same locations 308021-308024 (e.g. third row on the left) on one of said tags 308001-308004, respectively. The user then may press the corresponding key of the first keypad.

(&_,-) to Upper Left Key

In the example of FIG. 20, also, each of the exemplary four special characters (&_,-) used within the words of an English word database are assigned to the upper left key/location 308011 of the telephone type keypad matrix 308010, and in the same location within the corresponding key of the first keypad of the invention.

Entering precise characters by providing gliding actions on and/or departing from one of the keys of the first keypad of the invention (or vise versus) has been described in detail. According to one embodiment of the invention, if said gliding action is a (predefined) short gliding action (e.g. in any direction), then it may correspond to the letter located on the center letter key of the second keypad of the invention (e.g. of the telephone type keypad), and if said gliding action is a (predefined) long gliding action in a direction, then it may relate to the Corresponding letter in said direction as described earlier in detail.

Short Gliding for the Center Letter

Figure 21:
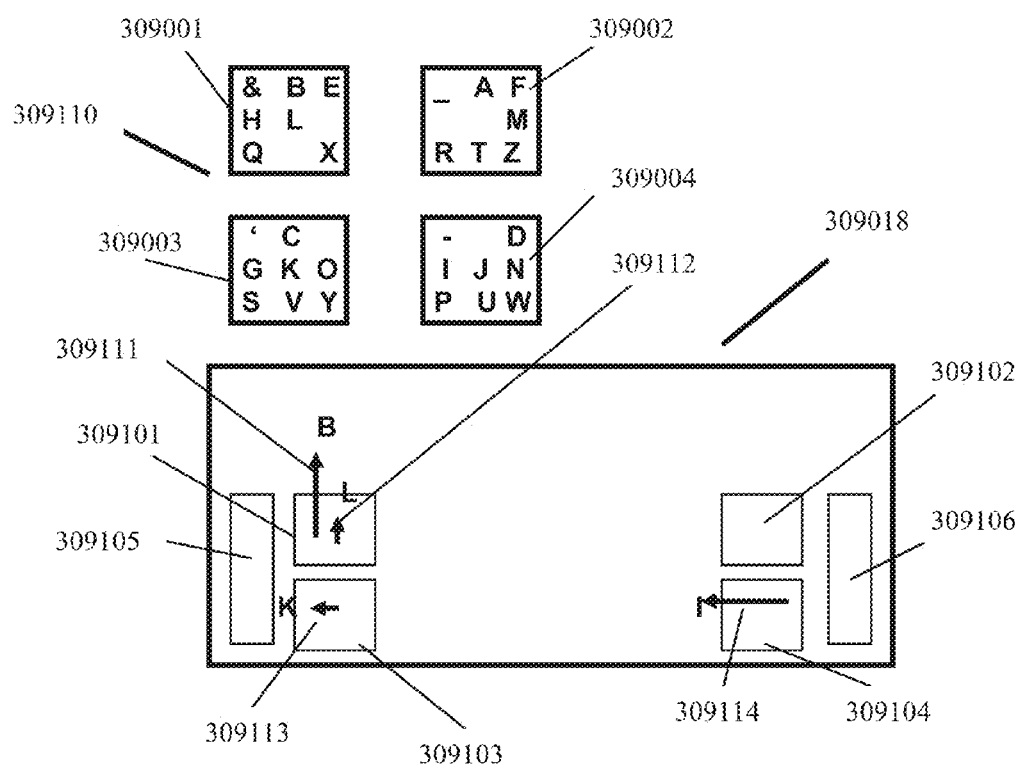

With continuous embodiment of the invention, as an example, FIG. 21 shows four tags 309001-309004 corresponding to respective (e.g. on-screen) keys 309101-309104 of the device 309018. As an example, providing a short gliding action 309112 towards a/any direction (e.g. in this example, it is provided towards upward) on/from the key 309101 of the first keypad may correspond to the center letter (e.g. the letter "l") of the corresponding second keypad (e.g. in this example, telephone keypad) of the invention or of the corresponding tag 309001. Also in this example, the longer gliding action 309111 provided towards upward may correspond to the character "b" located on the corresponding key of a telephone-type keypad or of the corresponding tag 309001. Also as example, accordingly, the short gliding action 309113 and the long gliding action 309114 may correspond to the letters "k" and "i", respectively.

According to one method, said short gliding action is a gliding action provided on a corresponding key and not exiting said key, and said longer gliding action is a gliding action departing from a key and ending outside said key.

The embodiment just described may replace the need of providing long pressing action on a key to enter precisely the center letter.

It must be noted, that showing the letters on each of the keys of the first keypad of the invention in a (e.g. 3×3) matrix tag has also the advantage to showing to the use the direction of the gliding action needed when departing from a corresponding key.

Figure 22A:
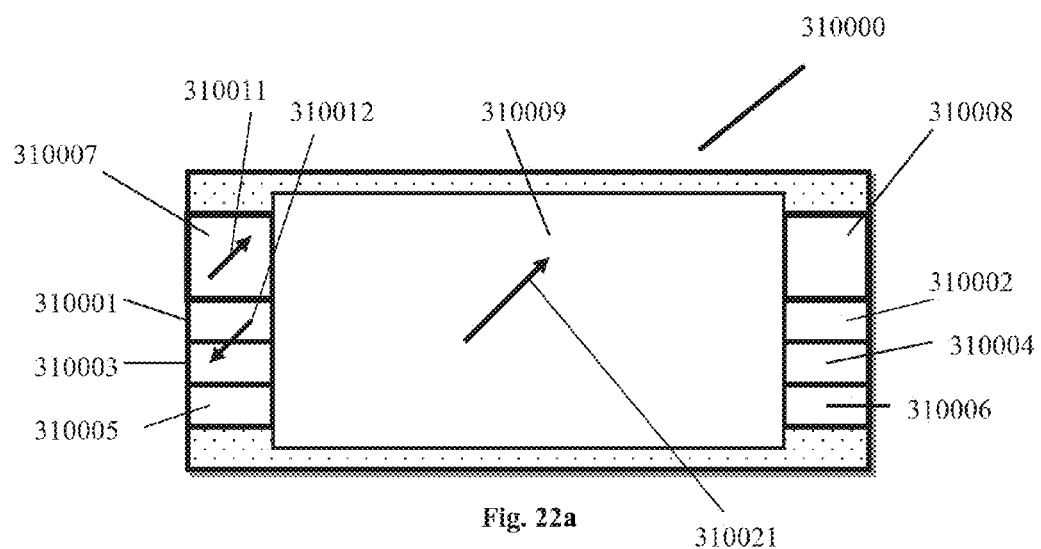
FIG. 22A is a schematic illustration of a device having a touch screen, and touchpads including the first keypad, in accordance with some exemplary embodiments of the invention.

Touch (Hard) Keys on Sides (Include Insertion)+Touch Sensitive Pads for Correction According to one embodiment of the invention, keys having touch sensitive surface, or one (or more) touch sensitive surface divided into different zones wherein each zone defining a key, may be used as the first keypad of the invention and also being used for entering precise characters based on the principles as they were described before. FIG. 22a shows as an example, a device 310000 having a touch sensitive display 310009. The device also has two touch sensitive surfaces (e.g. in this examples two touch pads each located on one side of the device) wherein each surface is (e.g. virtually) divided into three zones wherein each zone defining one of the six keys 310001-310006 of the first keypad of the invention. In this examples keys/zones 310001-310004 are ambiguous letter keys having letter assignments as shown on tags 308001-308004 of FIG. 20, respectively. As described for on-screen keys, taping on any of the letter keys/zones 310001-310004 ambiguously correspond to one of the letters/characters on said key/zone. To enter a character/letter precisely, the user may provide a gliding action from said key/zone based on the principles as described before in detail. For example, based on the principles of entering precise characters, providing a gliding action 310012 from/on the key 310001 to the lower left direction may correspond to the letter "q".

With continuous description of the current embodiment, the device 310000 may also include at least one sensitive zone such as a touch screen 310009, and/or one or more touch sensitive zones (e.g. pads) such as 310007, 310008, on one or more sides of the device to provide taping or gliding actions (e.g. 310021, and/or 31011) corresponding to the correction procedure of the invention.

2 Sets of 4ks (Hard+Soft)

Figure 22B:
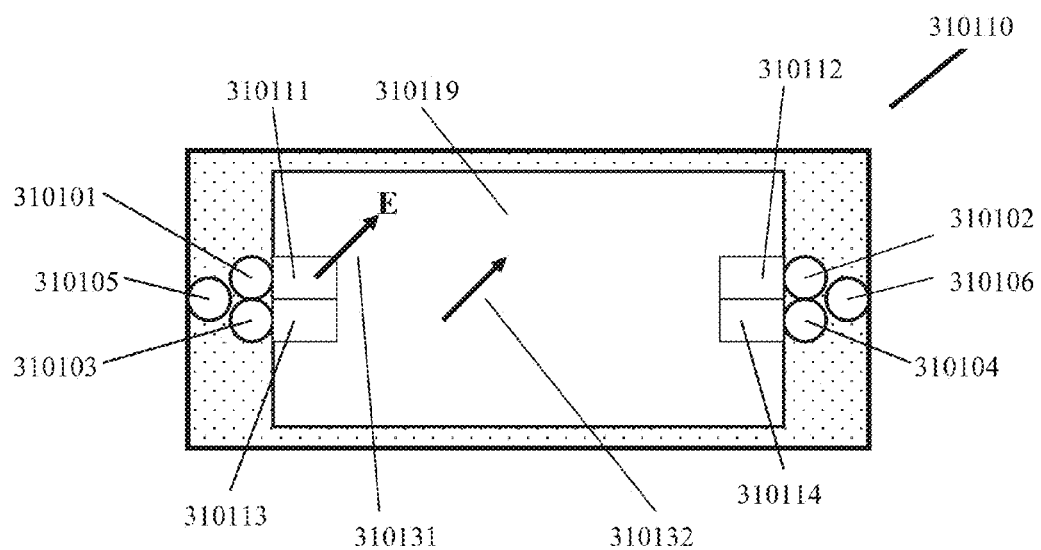
FIG. 22B is a schematic illustration of a device having a touch screen, and hard keys including the first keypad, in accordance with some exemplary embodiments of the invention.

According to one embodiment of the invention, in addition to the ambiguous keys (e.g. hard keys) of the first keypad of the invention, a device may also include some (e.g. four) touch sensitive (e.g. on-screen) keys used to at least provide precise characters. FIG. 22b shows as an example, a device 310110 having the first keypad of the invention having six (e.g. hard) keys 310101-310106 wherein four of said keys 310101-310104 are ambiguous letter keys. In this example, the device also includes four on-screen ambiguous letter keys 310111-310114 representing the same letters as the keys 310101-310104, respectively. According to an example of this embodiment, the user may short press/tap on the letter keys 310101-310104 to enter ambiguous character, and may use the keys 310111-310114 to provide taping and/or gliding actions for entering precise characters based on the principles as described earlier in detail. In this example, the gliding action 310131 is provided to enter the letter "e" precisely. Accordingly, the portion of the surface 310119 of the screen the device located outside the on-screen keys may be used to provide taping and/or gliding (e.g. 310132) actions for/during the correction procedure of the invention.

One of the advantages of the current embodiment of the invention is in that the device may not have a multi-touch display. In addition, most people prefer using hard tactile keys for entering text. In this example, a device with hard keys used by the first keypad, and a single touch screen is enough to provide ambiguous and precise characters as described.

According to one embodiment of the invention, a data entry unit mainly having or being of one touch sensitive surface including (dynamic or fixed) zones duplicating the keys of the first keypad of the invention for entering text, and preferably also including a zone outside said keys to provide the correction procedure of the invention may be manufactured. Said unit may be connected wirelessly or through wires to a corresponding computing device as its data/text entry unit.

It must be noted that the keys of the first keypad of the invention may dynamically defined during the user's interaction with a touch sensitive surface. Obviously, as a result, the zone outside said keys will also dynamically be defined and used for the correction procedure of the invention. The procedure of dynamically defining the keys of the first and/or second keypad of the invention on a touch sensitive surface has already been described in detail.

According to one embodiment of the invention, pressing on a key of the second keypad corresponding to a desired letter, and (then or simultaneously) pressing the key of the first keypad corresponding to the same character may cause the system to enter/add said single common character precisely. This procedure of entering precise character may be beneficial in devices having a physical telephone-type keypad as the second keypad of the invention. It must be noted that the embodiment just described permits to add a precise character in a word/text being entered, while pressing the key of the first keypad and then pressing a key of the second keypad results in correcting (e.g. replacing) the character predicted by the system based on the pressing the key of the first keypad, by a precise character.

As an example, if the user presses two keys of the first keypad, and then presses a key of the second keypad, the system may correct the first letter of the proposed word by replacing it by a precise character. On the other hand, if the user presses one key of the first keypad, then provides a pressing action on the key of the second keypad and while holding said key he presses the key of the first keypad, then the system adds a precise character to the ambiguous character located on the first position in the corresponding word.

The embodiment just described may be used to enter a precise character and/or its derivations, and or compound letters. For example, the user may press-and-hold a key of the second keypad and then press (e.g. and hold) a key of the second keypad. A timer may be used to calculate the time that at least one of said keys is being in pressed position, and based on that he may show to the user the corresponding precise character and its derivation and/or its corresponding compound letters. When the desired character is shown, the system may release the held key, and the system may enter said character.

Music Background

During a type of communication such as a telephone conversation or a text chat a media such as at least one music/song may be played as a background entertainment to said communication/conversation. Said music/song may be selected and played by any of the parties at any moment (e.g. before and/or) during said conversation. According to one method, at least one music/song may be assigned to a telephone number or to at least a predefined party such that each time a communication between the parties is taking place (e.g. when one of the parties calls the other party) said at least one media (e.g. music) being automatically played as the background media (e.g. song/music) during said communication such as conversation.

The method just described may also be expanded to other medias such as advertisement. It can also be expanded to any type of media means such as a video being played on one or more parties' instrument such as a phone/PC display/screen. according to another example, one or more messages may be printed on said display(s)/screen(s) during the communication/conversation.

Handset Connected to TV

The data entry system of the invention may permit mobile text entry easily and comfortably. As an example, most computing devices such as handheld devices include wireless connection such as Bluetooth or Wi-Fi. According to one method, the handheld device may be connected (wirelessly, or by wires) to a TV. The handheld device may also be connected (e.g. through Bluetooth protocol) to a data entry unit of the invention having or duplicating the first and the second keypad of the invention and using the data entry software of the invention. The data entry software may be integrated within the handheld device, and use the data entry unit of the invention as the input interface and the screen of the TV as the output interface. As an example, the user may lie back on a couch in the living room, use the data entry unit for entering text, and see the text on the screen of TV. In this example, the system, the processing procedure effectuates in the handheld device. As such, the user may type any text, including email or SMS, and if he desires, send them through the handheld.

Figure 23:
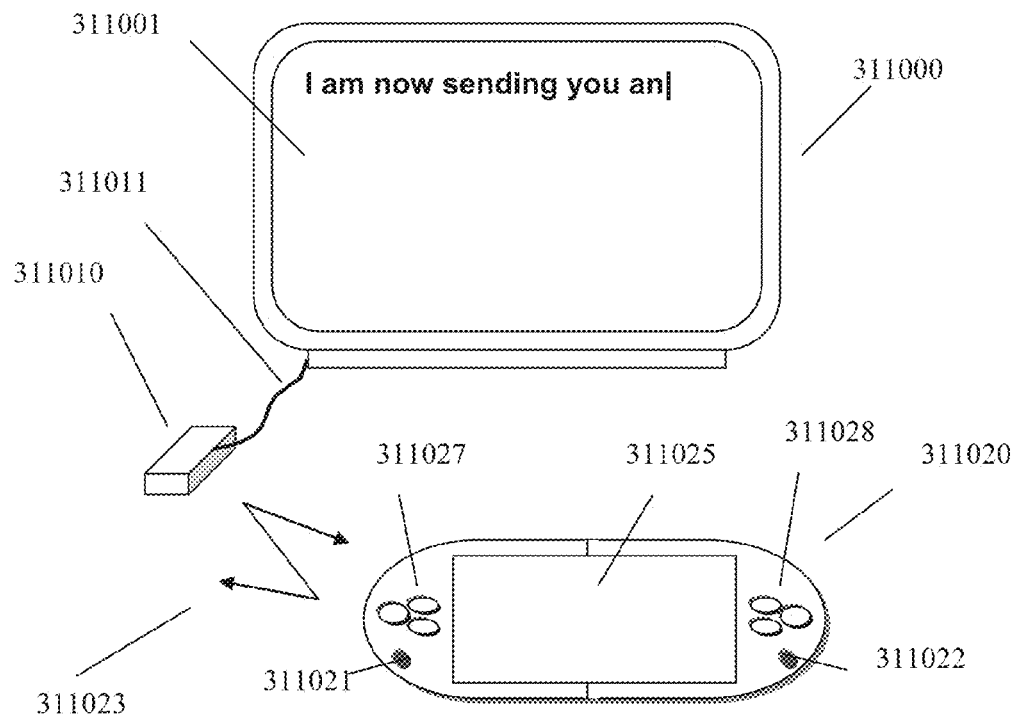
FIG. 23 is a schematic illustration of a data entry unit connected to another device, in accordance with some exemplary embodiments of the invention.

FIG. 23 shows as an example, a data entry unit 311020 of the invention having the keypad of the invention split into two portions 311027-311028, a touchpad/screen 311025, being wirelessly 311023 connected to the Smartphone 311010 data entry. Said Smartphone is also connected (e.g. in this example by wires) 311011 to a TV 311000 so that to print the text entered by the user to on the screen 311001 of the TV. The data entry unit 311020 may also include some buttons such to send, end, to send the text entered to a destination trough the Smartphone.

Another Method for Easing Finding a Letter on a Keypad

Another method for easing finding a letter corresponding to one of the (e.g. four) ambiguous letter keys of the first keypad of the invention for example by a beginner, is described hereafter. According to one embodiment of the invention, each of the letters on a key of the second keypad may be printed on said key such that to remind the location of said letter on a key of the first keypad.

Figure 24:
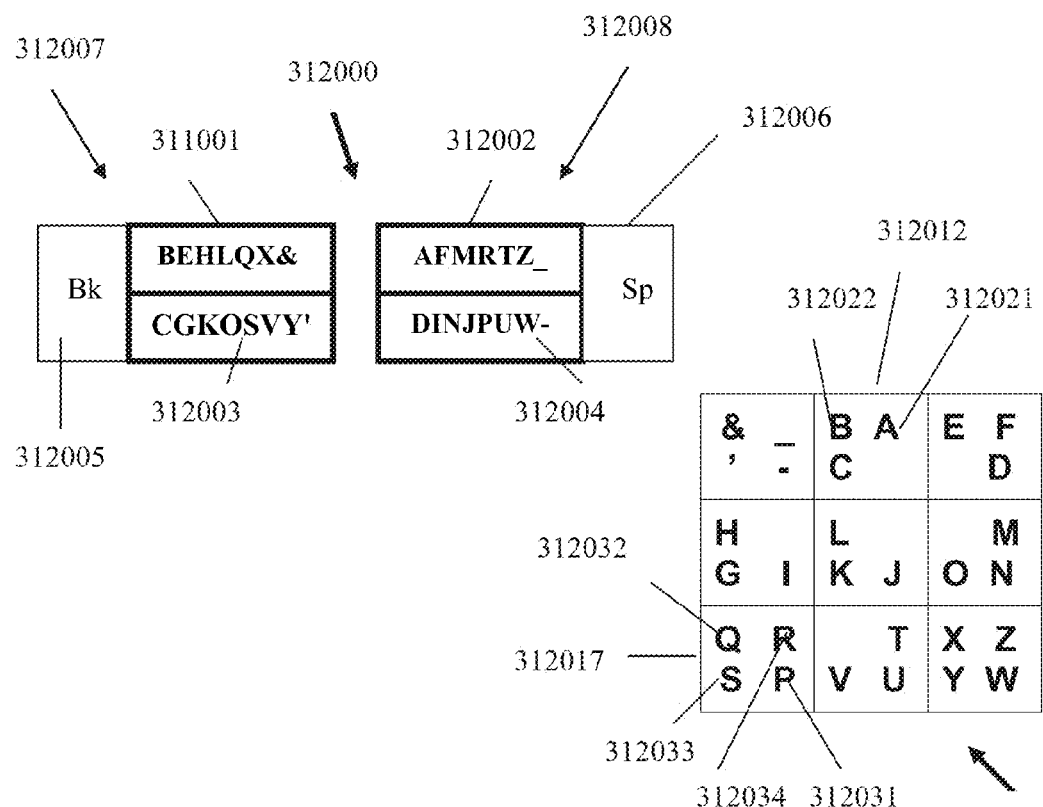
FIG. 24 is a schematic illustration of displaying the characters of the first keypad, in accordance with some exemplary embodiments of the invention.

As an example, FIG. 24 shows a first keypad of the invention 312000 having four letter keys 312001-312004, and the letter keys of a second keypad of the invention 312020 being a telephone type keypad. In this example, each of the letters on a key of the telephone keypad is printed on a location on said key that reminds the location of the key of the first keypad to which said letter is also assigned. For example, the lower left letter 312033 on the key 312017 of the second keypad (e.g. the letter "S") is also located on the lower left key 312003 of the first keypad 312000. Accordingly, the lower right letter 312031 on the key 312017 of the second keypad (e.g. the letter "P") is also located on the lower right key 312004 of the first keypad 312000, the upper left letter 312032 on the key 312017 of the second keypad (e.g. the letter "Q") is also located on the upper left key 312001 of the first keypad 312000, and the upper right letter 312034 on the key 312017 of the second keypad (e.g. the letter "R") is also located on the upper right key 312002 of the first keypad 312000. Also for example, the upper left letter 312022 on the key 312012 of the second keypad (e.g. the letter "B") is also located on the upper left key 312001 of the first keypad 312000, and the upper right letter 312031 on the key 312012 of the second keypad (e.g. the letter "A") is also located on the upper right key 312002 of the first keypad 312000, and so on.

It is understood that the second keypad of the invention may be an imaginary (e.g. virtual) keypad model, and the location of the letter on each key of said keypad may be printed on a physical tag on for example the device, or it may be printed on the screen of the corresponding device. In this embodiment a single tag 312020 shows the location of a letter/character on both, the corresponding key of, the first keypad and the corresponding key of the second keypad.

Calibration of KP

Dynamic keys and some methods of calibration (e.g. for dynamically indicating the location of a keypad on a touch sensitive surface) have already been described before. Other methods of calibration may be considered. According to one embodiment of the invention, for calibration purpose, the user may first provide a predefined interaction such as a gliding action beginning/departing from, for example, a predefined edge of the touch sensitive surface such as the touch screen of the device towards inside of the sensitive surface/screen. According to one method, the system may locate at least one portion of the (first) keypad on for example said side on the surface/screen or it may locate said at least one corresponding portion on the location where the user removes his finger from the screen after providing the gliding action, etc. If the gliding action is related to locating one corresponding portion of the keypad on the screen, then according to one method, to locate the other portion of the keypad on the screen, the user may provide the same principle (e.g. a gliding action departing from the opposite edge) on the other side of the screen.

According to another method, providing a gliding action as described on one side of the screen results in providing the both portions of the dynamic keypad on the screen (e.g. each portion on an opposite side), (e.g. preferably in a symmetric relationship).

If the keypad is constituted of one portion, then said gliding action provided on any side on the screen may correspond to locating the whole keypad on the corresponding location on the touch sensitive surface.

Figure 25A:
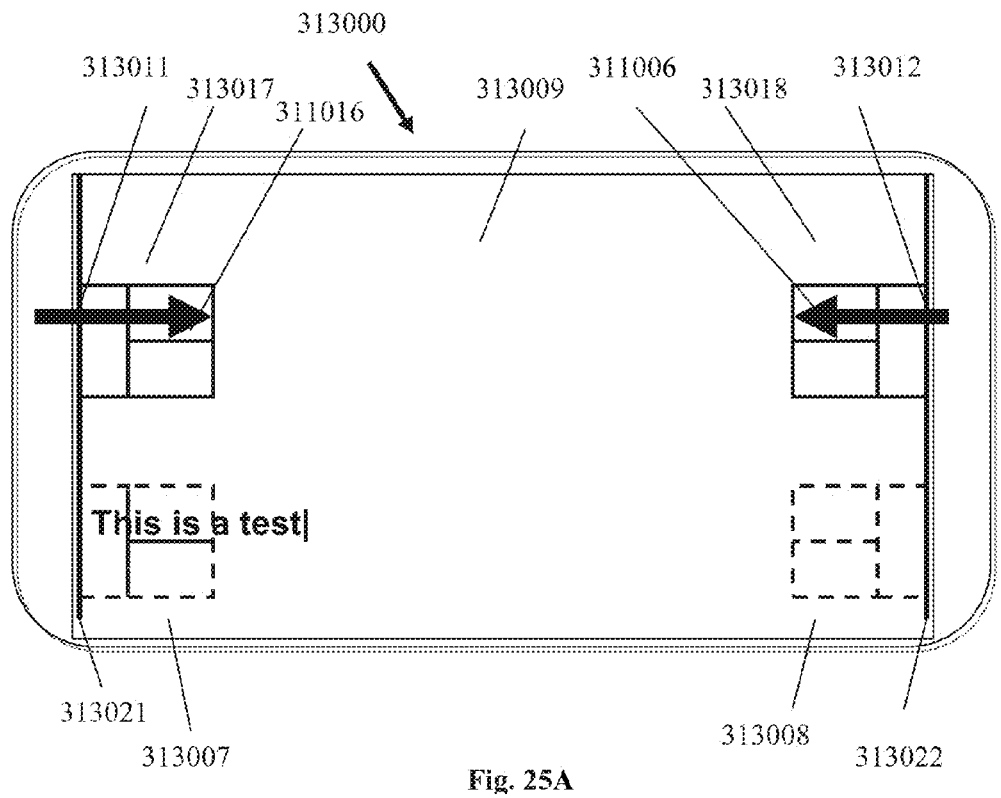
FIGS. 25A-25B are schematic illustration of recalibrating the keys of the first keypad, in accordance with some exemplary embodiments of the invention.

FIG. 25A shows as an example, a device 313000 having a touch sensitive surface such as the touch screen 313009. Each of the two portions 313007 and 313008 of the first keypad of the invention is located on a predefined location on an opposite side of the screen 313009. If the user desired to change the location of (a portion of) said keypad, he may provide a gliding action 311006 departing from the edge 313012 of the screen (e.g. obviously, the gliding action may begin from out of the screen but the system considers the departing point from the edge of the screen) towards his desired location inside the screen. In this example, the keypad of the invention has two portions, and the user may provide a gliding action 311006, 311016 for each of the portions on its corresponding side. During the gliding action, the system may dynamically show and drag the corresponding portions of the keypad on the screen. When user removes his finger(s) from the screen, then the system may locate each of the portions 313017 and 313018 on the corresponding location on the screen 313009, and deletes the previous keypad (e.g. portions 313007 and 313008) which were located at on the default locations on the screen.

According to one embodiment, at any moment, the user may provide an interaction such as pressing simultaneously at least two keys on the same side/portion of the dynamic keypad and providing a quick gliding action (e.g. towards the corresponding default location) on the screen and the system deletes the (portions of the) dynamic keypad on its current location and locates it (locates its portions) at its (their) default position(s) on the screen.

It must be noted that in order to not confuse the system regarding the purpose of the gliding action, the sides of the touch, sensitive surface may include a portion on each side used only/mainly by the system, in form of a bar 313021, and a bar 313022 (e.g.) on each corresponding side of the screen such that said gliding action(s) begin(s) from said bar(s) and not from a portion of the screen which is also used by other means/functions such as the mouse.

According to another method of calibration, instead of providing a gliding action, a long pressing action on one or two sides of the screen (e.g. for example, simultaneously, on said bars) may predefinely be used for the same purposes of calibration procedures described above. Accordingly, the system may locate each of the portions of the first keypad next to the pressing point on the bar on the corresponding side on the screen.

Copy Paste

The data entry system of the invention permits to use both the first and the second keypad as on screen keypads that may not be shown to the user. For example, the (few) keys of the first keypad may be transparent or dynamic, and the interactions with the keys of the second virtual/imaginary keypad may be provided through tapping/gliding actions, therefore the system may use the whole screen for the output such the text window. According to one embodiment, in order to access the portion of text which may be located under the keys of for example the first keypad (e.g. for the purpose of for example, COPY, PASTE, etc.), the user may be able to move said keys from their current location to another location on the screen so that to access said portion of the text which is under the current keys. For such purpose according to one method, the user may provide a predefined interaction such as for example pressing and holding at least two keys of the first keypad (e.g. preferably on the same side/portion) and providing a gliding action (e.g. dragging them) to remove said (e.g. portion of the) keypad from its current location to another desired or predefined location on said screen. To bring back said (e.g. portion of the) keypad to its original/previous location the user may provide a predefined interaction such as press and holding at least two keys of said keypad as described and provide a fast gesture on the screen for example, towards the original/previous location of said (e.g. portion of the) keypad. The system then may automatically locate said (e.g. portion of) the keypad on its original location on the screen.

Figure 25B:
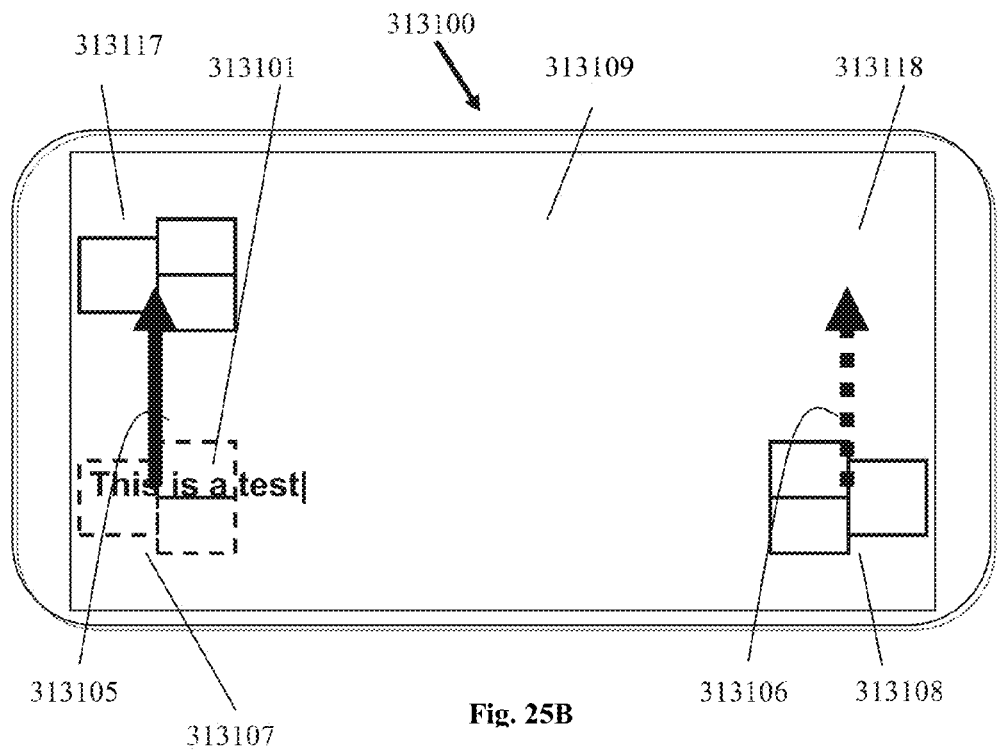

As an example, FIG. 25B shows a device 313100 having a touch screen 313118 on which the first keypad of the invention having two portions 313107 and 313108 is located. In this example, a portion 313101 of a text is located under the keys of one portion 313107 of the keypad. In this example, if the user provides a pressing and/or gliding action on or departing from the keys of that portion 313107, the system may relate said interaction as being related to the keys of the keypad. If for example, the user desires to copy a portion of the text which is under the a/the key(s) of said portion 313107, according to one method, he may simultaneously press on at least two keys of said portion and provide a gliding action 313105 towards another location on the screen. said pressing and gliding action may result in dragging the whole portion 313107 to another location 313117 corresponding to the gliding action. By removing the keys from the portion 313101 of the text the user may access to said portion 313101 and provide the desired interaction with it.

According to one method, when the user provides a dragging/gliding action 313105 on a first portion 313107 of the keypad, preferably the system also provides a dragging action 313106 on portion 313108 on the other (e.g. opposite) side of the screen so that relocate the portion 313108 to a new location 313118, accordingly, such that the two portions of the keypad in their new locations on the screen may have the same relationship as they had in their previous locations on the sides, relating to each other.

Entering Precise Char Using $2^{nd}$ Keypad MODEL

Figure 26:
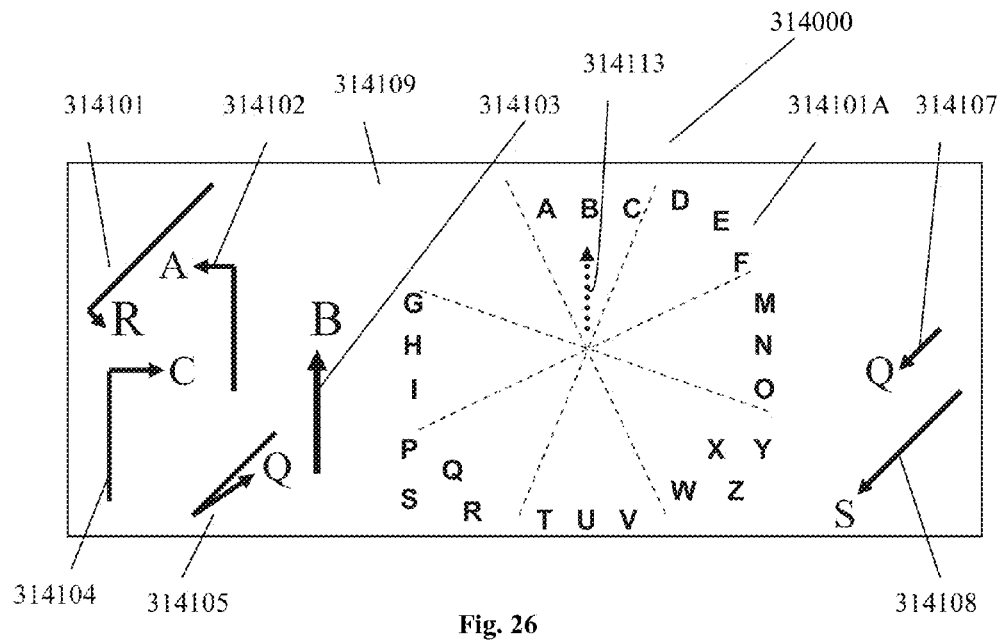
FIG. 26 is a schematic illustration of entering precise characters, in accordance with some exemplary embodiments of the invention.

Different methods for entering precisely a desired character has been described before. According to one embodiment of the invention, the user may enter precisely any character through a gliding action. For example, for such purpose as shown in FIG. 26, if the second keypad is an imaginary or virtual telephone-type keypad 314101, by using a touch sensitive surface 314109 of a device 314000, after the user touches the touch sensitive surface 314109, he may provide a gliding action in the direction of the desired key. A straight gliding action in the direction of a key may be assigned to a predefined character assigned to said key. For other characters, said gliding straight action may be followed by another gliding action, for example, towards another letter on said key as it is shown on a tag (physically, or virtually) on said key.

With continuous description of the current embodiment, as shown in FIG. 26, the gliding action 314103 corresponds to the imaginary gliding action 314113 corresponding to the middle letter (e.g. "B") on the upper middle key of the predefined imaginary keypad 314101, and the gliding action 314102 corresponds to the imaginary gliding action 314112 corresponding to the left letter (e.g. "A") on the same upper middle key of the predefined imaginary keypad 314101. Accordingly, the gliding actions 314101, and 314104, and 314108, correspond to the letters "R", "C", and "S". In this example, the gliding action 314105 (e.g. back and forth) may correspond to the letter "Q" (e.g. the letters "S" and "Q" are in the same direction but the letter "Q" is closer to the center of the imaginary keypad). The gliding action 314105 may be replaced by the short gliding action 314107 (e.g. shorter than the long gliding action 314108 corresponding to the farer letter "S" in the same direction).

Obviously, the arrangement of the letters on each of the keys of the imaginary keypad, and their corresponding gliding actions may be considered differently by people skilled in the art.

Figure 27:
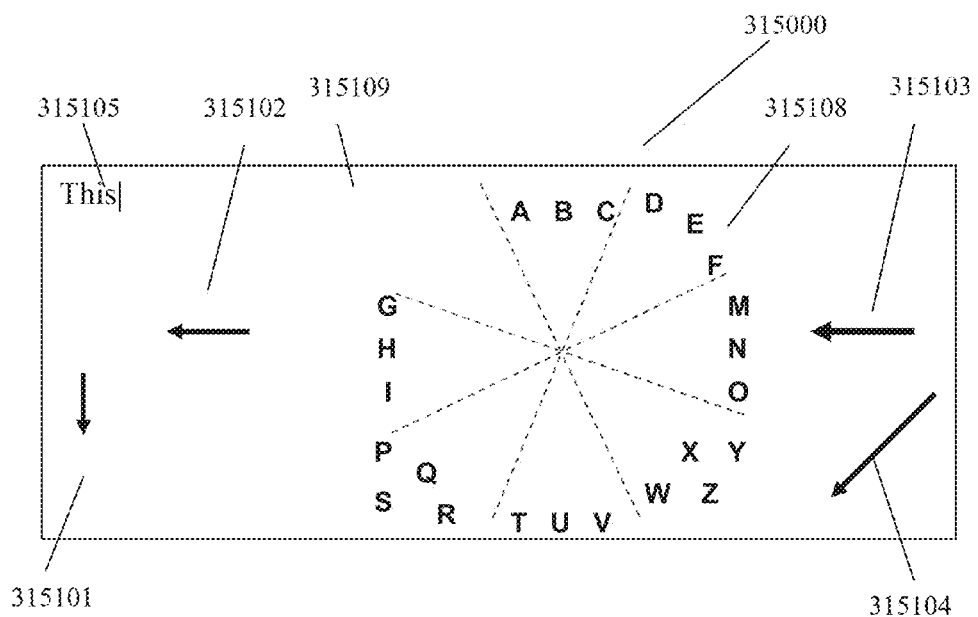
FIG. 27 is a schematic illustration of entering ambiguous characters, in accordance with some exemplary embodiments of the invention.

Gliding/taping interactions imitating/duplicating the pressing actions on the keys of a keypad may be used in other word predictive methods such as that used by T9. For example, as shown in FIG. 27, by considering a (virtual) telephone-type keypad model 315108 as the main input keypad, the user my provide the gliding/taping actions 315101-315104 corresponding to interacting with the ambiguous keys corresponding to the respective letters of the word "this", for example, anywhere on the touch sensitive surface/ screen 315109. The system may predict the word "this" 315105 which in this example has the highest priority among the words of the database corresponding to said ambiguous key interaction. The word predictive systems and methods of entering words through a (telephone) keypad are known to the public.

According to one embodiment of the invention, as shown in FIG. 27, the surface 315109 of the data entry input unit may substantially include one touch sensitive surface, for example, resembling to the surface 313109 of the device 313000 of FIG. 25A. Said touch sensitive surface 315109 may be of any kind such as a touch pad, touch screen, etc. Through said surface (interactions with) the virtual first and second keypads of the invention may be imitated/duplicated.

Using COLORS for $1^{st}$ and $2^{nd}$ KP (e.g. for Finding a Letter)

Distributing (and showing) the letters of an alphabet on few keys such as four keys may not look a familiar interface for users and may require some time for a beginner user to get used to the location of the letters on said keys. In order to overcome such shortcoming a user-friendly method may be implemented. According to one embodiment of the invention, instead of or in addition to showing the letters on the (e.g. four) keys of/on the first keypad a familiar keyboard such as a standard PC keyboard or a standard telephone keypad may having the letters of said language may be shown to the user. According to one method, each of for example the four letter keys of the first keypad may be represented by a different color, and each of the letters of the second keypad may be represented by the color of the key of the first keypad to which said letter is assigned. In order to enter a desired character the user may look at said character on the second keypad to see by which color it is represented. The user then presses the key of the first keypad which is represented by said color. Because the second keyboard is a familiar to the user, the user may quickly find/look-at his desired character on said keypad. The user will see the color by which said character is represented. Then because on the same time the user has a visual contact with the key of the first keypad being represented by the same color, the user can immediately interact with the key of the first keypad. Such procedure substantially does not require a mental effort.

Figure 28:
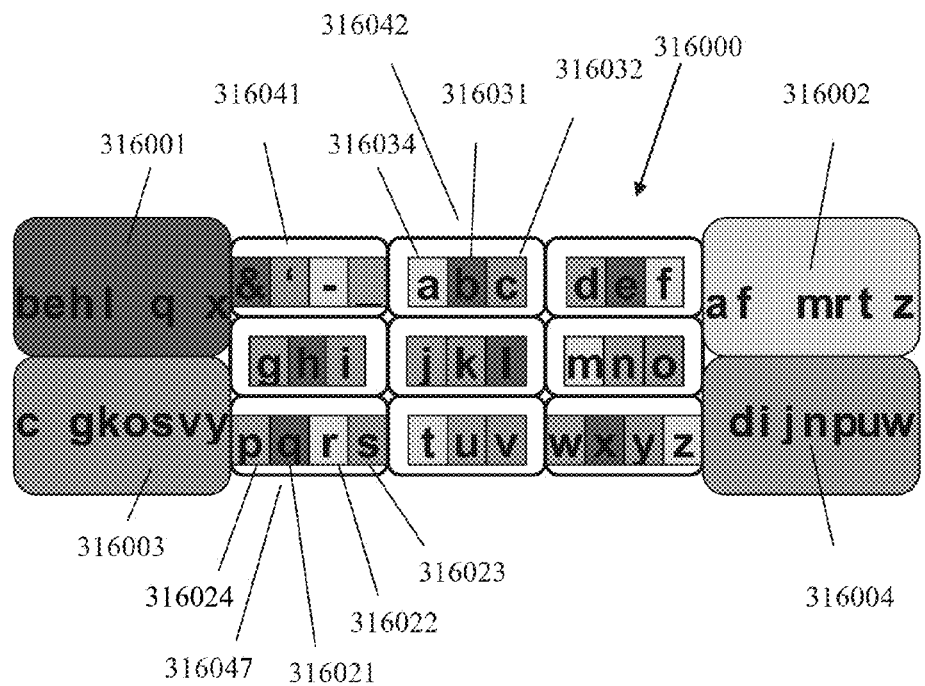
FIG. 28 is a schematic illustration of using colors to identify location of letters on the keys, in accordance with some exemplary embodiments of the invention.

With continuous description of the current embodiment, as an example, FIG. 28 shows the first keypad of the invention having four letter keys 316001-316004. Each of said keys is represented by (e.g. printed in) a different color. For example, the keys 316001-316004 are printed in red, yellow, green, and blue, respectively. FIG. 28 also shows a second keypad of the invention 316000 which in this example is a telephone-type keypad which is implemented in most mobile devices. Each of the letters on a key of the second keypad is represented by the color of the key of the first keypad to which said letter is also assigned. For example, the letters "pqrs" which are assigned to the key 316047 of the second keypad are in this example printed in blue 316024, red 316021, yellow 316022, and green 316023 frames respectively said colors being the colors of the keys 316004, 316001, 316002, and 316003 of the first keypad to which keys said letters are also respectively assigned. Other letters of the second keypad are printed in different colors based on the same principles. For example, also the letters "abc" which are assigned to the key 316042 of the second keypad are printed in yellow 316034, red 316031, and green 316032 frames, respectively.

With continuous description of the current embodiment, for example, if the user desires to enter the letter "p" (e.g. an ambiguous letter of a word), he may quickly look at the corresponding key 316047 of the second keypad which is familiar to most users of mobile devices and can immediately see his letter and its corresponding color 316024 which in the example is blue. At the same time (e.g. without mental effort) the user can also see the key of the first keypad 316004 relating to (e.g. in this example is printed in) the same color. The user can press said key 316004 of the first keypad to enter said (e.g. ambiguous) letter.

It must be noted that the letters on the keys of the first keypad are printed in an order such that, the first columns of the four letter keys of the first keypad together include all of the letters (i.e. "abc") of the first letter key 316041 of the telephone-type keypad, the second columns of the four keys of the first keypad together include all of the letters (i.e. "def") of the second letter key of the telephone-type keypad, and so on.

In the example above, some special symbols such as "&'-_" which may be included within the words of a database are assigned to the keys 316001, 316003, 316002, and 316004. They are also assigned to the key 316041 of the second keypad wherein each of them is related to the color of its corresponding key of the first keypad. In this example, said special letters are not printed on the keys of the first keypad.

By using the above-mentioned procedure, a beginner user which is familiar with the second keypad of the data entry system such as the telephone keypad can immediately enter text quickly through the first keypad which may be an unfamiliar keypad.

It is understood that the second keypad may be any familiar keyboard such as a QWERTY keyboard.

It is understood, that although letters are shown in a colored frame, any other method relating a letter to a corresponding color may be used. for example, the letters themselves of at least one of the first and the second keypad may be printed in the corresponding color.

Long/Short Glide for Precise Letter/Sp Char

According to another embodiment of the invention, a short gliding action on and/or departing from a key of the first keypad (and preferably ending outside said key) in a predefined direction may correspond to entering a corresponding precise letter, and a long gliding action on and/or departing from a key of the first keypad in the same predefined direction may correspond to entering a corresponding special symbol in a mode instance assigned to said key.

According to one method, a very short gliding action on or departing from a key may correspond to the corresponding letter on the center key of the second keypad of the invention. For example, if the second keypad is a telephone-type keypad, then said very short gliding action on a key of the first keypad may correspond to the corresponding letter among the letters "JKL". In the current embodiment, if a key of the first keypad has one of the letters of the center key of the second keypad, then preferably the second keypad in the mode instance corresponding to said key of the first keypad may not include a special symbol at its center key. On the other hand, if a key of the first keypad does not include any of the letters of the center key of the second keypad, then a mode instance (e.g. "NUMB" mode) having a special character such as a digit (e.g. digit "5") on the center key of the second keypad may be assigned said key. In this case providing said very short gliding action on said key may correspond to special character on said center key. The current embodiment may eliminate the need of a timer for calculating a long press for entering the system into a mode instance.

Figure 29:
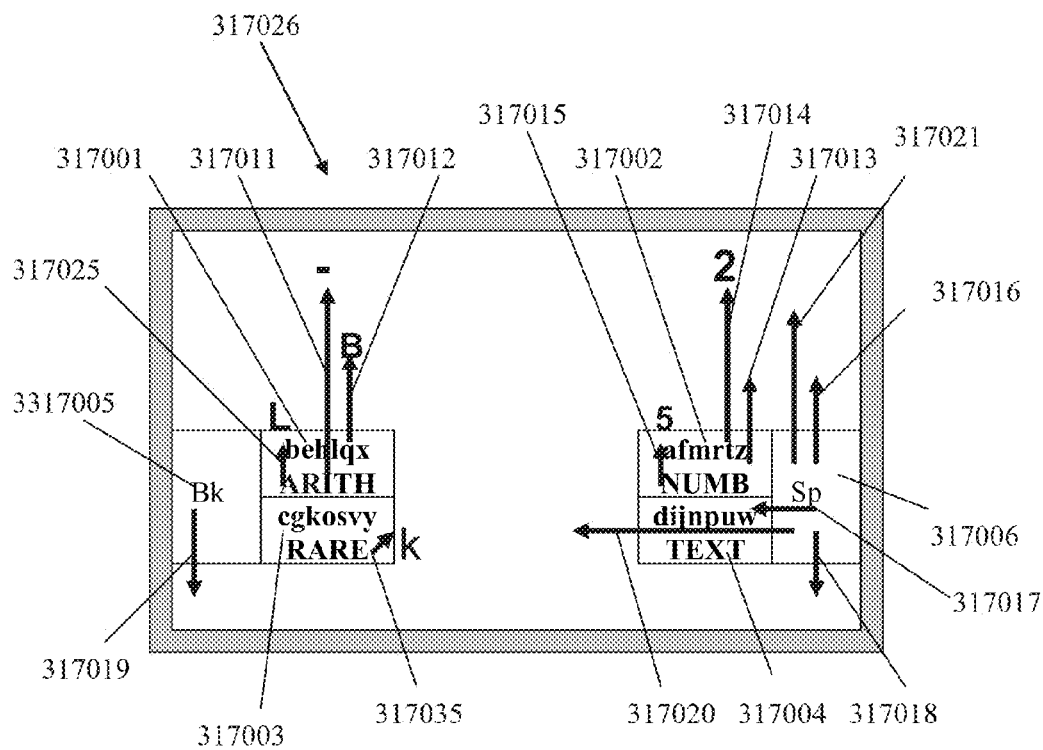
FIG. 29 is a schematic illustration of using short and/or long gliding actions to enter different characters, in accordance with some exemplary embodiments of the invention.

With continuous description of the current embodiment, as an example, FIG. 29 shows a device 317026 resembling to the device 317500 of FIG. 19. By considering a telephone-type keypad as the virtual/imaginary second keypad of the invention, an by also considering the mode instances of FIG. 19, as an example, providing the short gliding action 317012 departing from the key 317001 may correspond to entering precisely the letter "b", and providing the long pressing action 317011 from said key in the same direction may enter the character "-". In this example, providing the very short gliding action 317025 (e.g. in any direction) on/from said key 317001 which includes the letter "l" may correspond to entering precisely the letter "l" which is also included on the center key of the second keypad (e.g. in this example, a virtual telephone-type keypad). Also as an example, providing the very short gliding action 317035 (e.g. in any direction) on/from the key 317003 which includes the letter "k" may correspond to entering precisely the letter "k" which is also included on the center key of the second keypad (e.g. in this example, a virtual telephone-type keypad).

In the above-mentioned example, the mode instance "NUMB" (e.g. digits 0-9) may be assigned to the key 317002 of the first keypad which does not include any of the letters (e.g. "jkl") of the center key of the second keypad. In this case as an example, providing the short gliding action 317016 departing from the key 317002 may correspond to entering precisely the letter "a", and providing the long pressing action 317011 from said key in the same direction may enter the digit "2". In this example, providing the very short gliding action 317015 (e.g. in any direction) on/from said key 317002 which does not include any of the letters (e.g. "jkl") of the second keypad may correspond to entering the digit "5" which is also included on the center key of the second keypad (e.g. in this example, a virtual telephone-type keypad).

Gliding actions in different directions on/from the keys other than the letter keys may be assigned to other characters/functions preferably those used frequently. As an example, a short gliding action upward 317016 on/from the key 317006 may correspond to a dot ("."), and a short gliding action downward 317018 on/from the key 317006 may correspond to a comma (","). Also as an example, a long gliding action upward 317021, a long gliding action to the left 317020, a short gliding action to the left 317017, on/from said key 317006, a short gliding action downward 317019, and so on, may correspond to other special character and/or functions such as "CapsLock", Return", etc.

It must be noted, that although short gliding action was be explained to be used for entering letters, and long gliding action was be explained to be used for entering precise characters, obviously, the short gliding actions may be used for entering a first group of characters/characters and long gliding actions may be used for entering another group of characters/functions and/or vise versa.

It must be noted that according to one method, the letter/special character/symbol assigned to the center key of the second keypad in one or more of the instances may be entered by providing a different interaction such as for example:

- a back and forth gliding action ending on or closed to the departing point of the gliding action on or departing from said key, or;
- a long pressing action on said key of the first keypad, etc.

Making Words to Remember Letters Locations

Figure 30A:
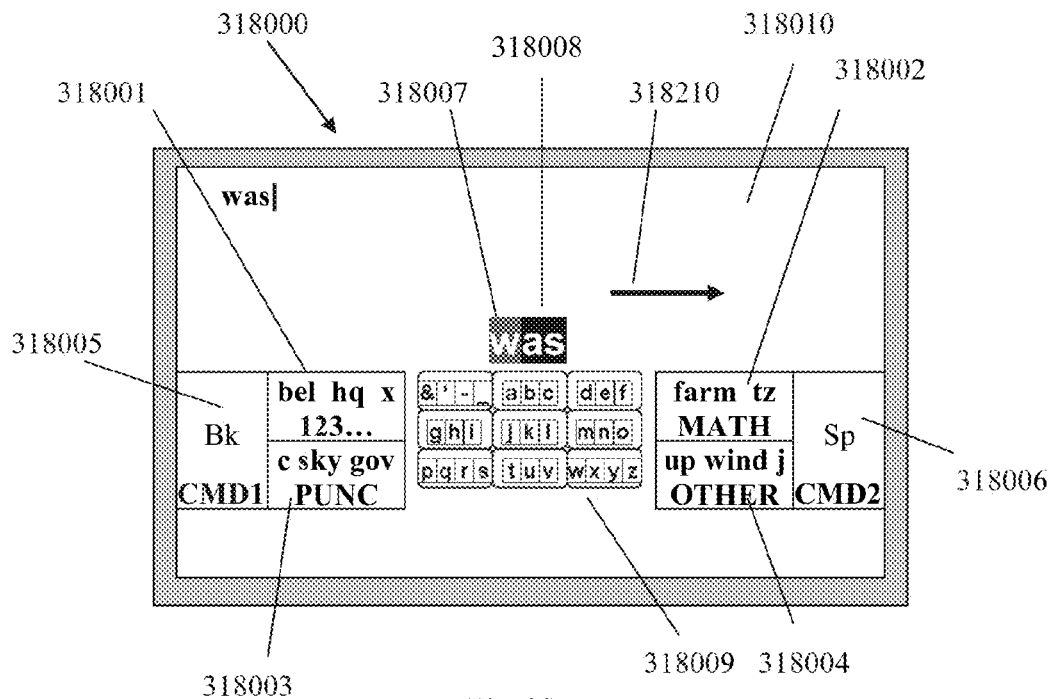
FIGS. 30A-30B are schematic illustration of combinations of using gliding actions for correction, in accordance with some exemplary embodiments of the invention.

Remembering the locations of the letters on the letter keys of the first keypad may be time consuming for some users. According to one embodiment of the invention, at least one word may be formed by considering the letters on a key. Therefore, the user can remember easily the location of a letter through said word. FIG. 30a shows as an example, the first keypad of the invention having four letter keys 318001-31004. In this example, the letters on each key are printed so as to form at least one word. For example, the key 318001 includes the words "bel, hq" and the letter "x", the key 318002 includes the words "farm" and the letters "t, z", the key 318003 includes the letter "c" and the words "sky, gov", and the key 318004 includes the words "wind, up" and the letter "j". Also the colors assigned to a key may be related to the words such that the user can remember easily the location of a word and the corresponding letters, on a key. For example, the key to which the word "sky" is assigned may be represented by the blue color, the key to which the word "farm" is assigned may be represented by the green color, the key to which the word "wind" is assigned may be represented by the yellow color, etc.

Showing Uncertain and Certain Characters (Bolded) in a Different Window

As mentioned before, in order to enter a word the user may press on the corresponding ambiguous (e.g. letter) keys of the first keypad. The system is word predictive. Each tap on a key may correspond to any of the letters/characters on said key. The taps for entering a desired word may correspond to a list of several words. Among them, the system predicts a word that is most commonly used. In most cases, the system predicts the right word.

Each proposed current word may stay "uncertain" (e.g. ambiguous) until it is confirmed by an end-of-the-word signal such as a Space character and/or a special character or function such as a dot, etc. Generally, uncertain words include uncertain (e.g. ambiguous) characters.

For ease of use and software programming, during entering a word/stem and before it is confirmed by the user, said word/stem may be shown with some helping details to the user. For example, it can be shown in a different location on the screen, with bigger fonts, colored characters, etc. According to one method, uncertain letters may be shown against a colored (e.g. black) background and certain characters may not have a background. When a user begins to type a word, preferably, the first uncertain letter/character of the current word may automatically be selected by the system and blink for further correction if needed. After the user enters into the correction procedure, the first correction action may be related to the blinking character (position) for changing said uncertain character to a (e.g. maybe another) certain (e.g. unambiguous) character (e.g. and eventually, proposes another word). The certain character may be printed without a background, and the next uncertain character may automatically be selected by the system and start blinking. The next correction interaction will be applied to the blinking back-grounded character.

Figure 30B:
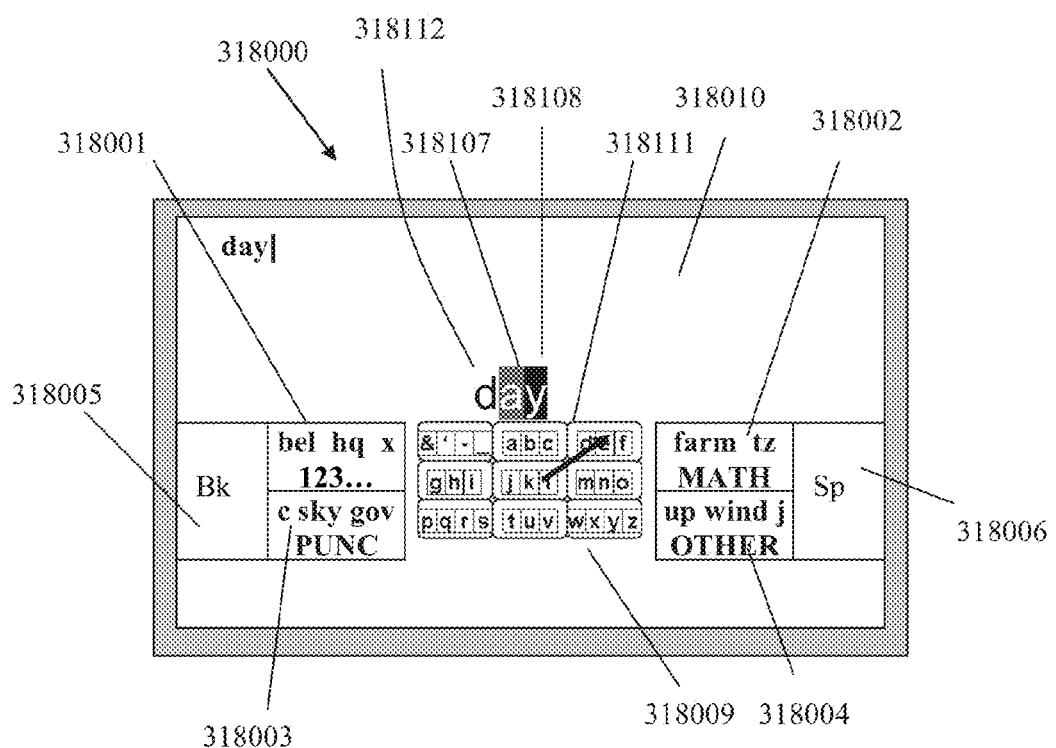

As an example, as shown in FIG. 30a, if the user desires to enter the word "day", he may first enter it through the first keypad by pressing on the corresponding keys 318004, 318002, and 318003 of the first keypad. The system may propose the word "was" 318008 because it is more frequently used than the word "day". In this example, each of the letters of the proposed word 318008 is uncertain. They may be presented to the user on a colored (e.g. black) background. The first ambiguous character 318007 of the proposed word may blink to inform the user that the next correction action may be related to/applied to the blinking character (location) 318007. The user may proceed to correcting said word and provides a gliding action corresponding to the letter "d" through the second keypad of the invention (e.g. a Telephone Keypad) 318009. The system may relate said interaction to the blinking character (position) 318007 and then as shown in FIG. 30b, it may replace the uncertain letter "w" by the certain letter "d" 318112 and may replace the proposed word "was" by a new word "day" 318108. The system may print the certain character "d" without background 318112 and the next uncertain character "a" 318107 of the new proposed word may be selected by the system and start blinking. The other uncertain character(s) of the proposed word (e.g. in this example, one character "y") may remain backgrounded (e.g. without blinking). If the user provides a new correction procedure, the system relates it to the new blinking character (position), and so on.

According to one method, when the user provides a correction procedure, the precise character resulting from the interaction may be shown on a location on the screen and blink.

Short Gliding Action

According to one embodiment of the invention, a taping action on any of the ambiguous (e.g. letter) keys of the first keypad may correspond to an uncertain character, and a (e.g. very) short gliding action on or departing (e.g. in any direction, or in a predefined direction such as upward) from said key may correspond to entering a precise (e.g. certain) character assigned to said key wherein said character is also assigned to the center key of the second keypad (e.g. a telephone-type keypad) of the invention.

Also, according to one embodiment, providing a very short gliding action on or departing (e.g. in any direction, or in a predefined direction such as upward) from the center key of the second keypad (e.g. a telephone-type keypad) of the invention may correspond to interacting with said key. For symbols on the other keys the user may provide a corresponding longer (e.g. longer than a predefined length) gliding action as described before.

With continuous description of the current embodiment, a taping action on the center key of the second keypad may not be related to entering a symbol. According to one method, the system may not respond to such interaction.

As an example, during the entry of a symbol such as a special character or a function, after providing the pressing action on the key of the first keypad corresponding to a desired mode/group, the user may touch/press the center key of the second keypad (e.g. if said second keypad is a fixed keypad, then the user may press on said key, but if the second keypad is a virtual keypad model then said pressing action may be provided anywhere on the screen. This matter has already been described in detail). At this time, the system may show the symbols corresponding to said mode on the keys of a second keypad. If the desired symbol is on the center key of the second keypad, then in order to enter said symbol the user may provide a short gliding action (e.g. in any direction such as the upward direction) on/from said center key. For symbols on the other keys the user may provide a corresponding longer gliding action as described before. According to one method, after the user touches/presses the center key, if he removes his finger from the screen without providing any gliding action, then nothing may happen (i.e., the system may not respond to that interaction).

According to another example based on the current embodiment, during the correction procedure, if the user taps/presses on the center key of the second keypad without providing a gliding action, the system may not relate said interaction to entering a character and eventually nothing may happen. In this example, if the user desires to interact with the center key of the second keypad he may be required to provide a (very) short gliding action on/from said key as described above.

According to one embodiment of the invention, if the user provides only a long pressing action on a key of the first keypad and removes his finger from the touch sensitive surface, then the system does not relate said interaction to entering a symbol and eventually does nothing.

Common Special Characters and Commands

Figures 31, 31A:
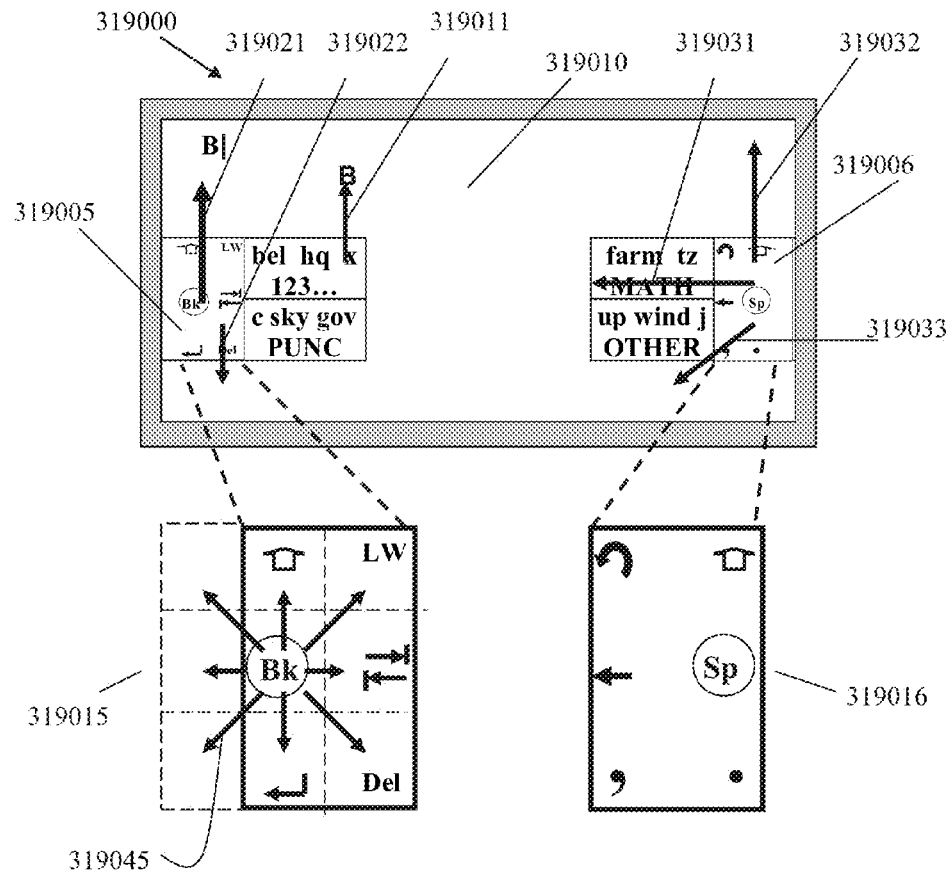
FIGS. 31-31A are schematic illustration of using functions, in accordance with some exemplary embodiments of the invention.

Some frequently used Special Characters and Commands may be assigned to interactions such as taping or gliding action in different (predefined) directions on or from the keys (preferably other than the letter keys) of preferably the first keypad. FIG. 31 shows as an example, a device having the first keypad of the invention having four letter keys, and two additional keys 319005 and 319006, to which some frequently used characters and commands are assigned. As an example, a pressing action anywhere on the key 319005 may correspond to the backspace ("Bk") function. Accordingly, a gliding action downward 319022 departing anywhere from said key may correspond to the Return () function, and a gliding (e.g. and holding) action upward 319021 departing anywhere from said key may correspond to the Shift function (⇧) function. Also as an example, a pressing action anywhere on the key 319006 may correspond to the space ("Sp") function, a gliding action 319033 departing anywhere from said key towards lower left side may correspond to the comma (",") character, a gliding (e.g. and holding) action upward 319032 departing anywhere from said key may correspond to Shift function (⇧), and a gliding action to the left 319031 departing anywhere from said key may correspond to deleting one word/stem to the left of the cursor, etc.

It is understood that although in this example (e.g. because the keys 319005, 310006, are close to the edge of the device) only five symbols on each key are considered to each being assigned to a gliding action in a different direction on/departing from the corresponding key, obviously, more symbols relating to more different gliding directions (e.g. such as those 319045 shown in enlarged exemplary key 319015) may be considered for each key. For better view, the key 319006 is also shown in larger dimension 319016.

In the left and the right tables below, an exemplary schema of the symbols respectively assigned to the keys 319005 and 319006, and the exemplary manner to enter them are described.

| BkSp | Bk | Press on Key |
|---|---|---|
| lock Word | LW | Changes all current characters of current word to Certain |
| Shift | ⇧ | Swipe and hold + press the letter key(s) |
| Tab | ⇄ | Swipe and remove your finger for one. Swipe and hold to repeat |
| Enter | ↵ | Swipe and remove your finger for one. Swipe and hold to repeat |
| Del | Del | Swipe and remove your finger for one. Swipe and hold to repeat |

| Sp | Sp | Press on Key |
|---|---|---|
| Undo | ↶ | Swipe |
| Shift | ⇧ | Swipe and hold + press the letter key(s) |
| Word BkSp | ← | Swipe and remove your finger to erases on word. Swipe and hold to repeat erasing words. |
| . | . | Swipe for on one word Swipe and hold to repeat |
| , | , | Swipe for one Swipe and hold to repeat |
| ⇧ | | |

In the examples in the tables above, according to one method, if the user provides one gliding action and at the end of the gliding action he removes his finger from the touch sensitive surface, then the system provides one symbol such as one "return" or one "tab" action. On the other hand, if at the end of the gliding action the user does not remove his finger from the touch screen surface then the system may repeat said symbol every one predefined laps of time until the user removes his finger from the touch sensitive surface.

Procedures of repeating a symbol such as a character or a function (e.g. moving a cursor/caret over several characters or up/down over several lines, repeating a Tab function several times, etc.) have been described before, and are being described in some more detail later in this application.

Shift

According to one method, a SHIFT action for capitalizing one or more letters may be performed by providing a gliding action (e.g. in a predefined direction such as 319021, or 319032) on preferably a key that does not include ambiguous letters such as the key 319005 or the key 319006 (respectively), and (e.g. simultaneously) pressing a desired letter key. As an example, providing a gliding and holding action 319032, and (e.g. simultaneously/then) providing a gliding action 319011 for entering the precise character "b" may result in capitalizing said letter to provide the letter "B".

According to one method, if the user provides a shift gliding action (e.g. 319032) and lifts his finger from the touch sensitive surface without providing a pressing action on a letter key, then the shifting actions cancels and the system does nothing.

With continuous description of the current embodiment, according to one method, if the user provides the gliding action corresponding to the shift function and ends the gliding action without lifting his finger from the corresponding key, he may then provide more than one pressing actions on and or gliding actions on or from one or more letter keys to provide several corresponding capitalized precise and ambiguous letters, respectively.

There is an advantage in assigning the Shift command to a gliding action rather than to a taping action on a key. When the user is typing fast, between entering two ambiguous characters by taping on the corresponding keys, he may for example provide a pressing action on the Space key to which the Shift function is also assigned. Providing said three consecutive pressing actions may be ambiguous for the system because in many cases the user may not lift his finger from the screen/surface before he provides a next taping action. The system may not recognize the user's intention whether he desires to provide a space character between the two letters or whether he intends to capitalize the last letter. By restricting the user to providing a different type of interaction such as a gliding action for the shift on the space or BkSp keys (and not a pressing action), the system may easily recognize the user's intention.

Special Characters and Commands

As described before in detail, symbols such as special characters and commands may be grouped in different groups and depending on their characteristics and each of the groups being assigned to (a predefined interaction with a key of preferably the first keypad. FIG. 31*a* shows as an example, most of the symbols of a PC keyboard and some customized functions being grouped in different groups and being assigned to the keys of the first keypad as printed on the keys 318001-318006 the first keypad of FIG. 30*a*. In this example, each of the characters of one group is represented by one key of a telephone-type keypad. In this example, some keys of the telephone keypad are not assigned to a symbol. In the example of FIG. 31*a*, the group of F1-F12 functions is not included. To include such group or additional new groups, said groups may be assigned to either another additional key, or to another type of interaction with a key, etc. For example, instead of two command keys, there may be only one command key such as 318005, and the F1-F12 group may be assigned to the other command key, for example to 318006.

How to Enter Derivative Characters

Methods of entering derivatives or related symbols of a character such as accented characters relating a non-accented character, or combined/compound characters relating to one character have been described before. An additional method for the same purpose is described hereafter:

According to one embodiment of the invention, after the user provides a gliding action corresponding to providing an unambiguous (i.e. a certain) character, for example either through the correction procedure or through a method of the entry of a precise character such as for example through providing a gliding action through the first keypad alone, (preferably, without removing his finger from the screen) and preferably when/after the system provides/proposes said precise character, the user may provide a (e.g. an additional) touching action (e.g. preferably, simultaneously) at another location on the screen/touch-sensitive surface. According to one method, if said character has one or more derivative characters such as accented characters or combined/compound characters, then at the new touching point or on another location relating to the new touching point, a new (e.g. an additional) second keypad such as a telephone-type keypad may appear on the screen. Said keypad may include at least some, preferably all, of the accented and/or combined/compound characters corresponding to said provided character. At this time, based on the gliding principles such as those of the invention, the user may provide a corresponding gliding action from said new touching point towards/relating to the desired derivative symbol on said new (additional) second keypad. The system enters said derivative symbol.

Figure 32A:
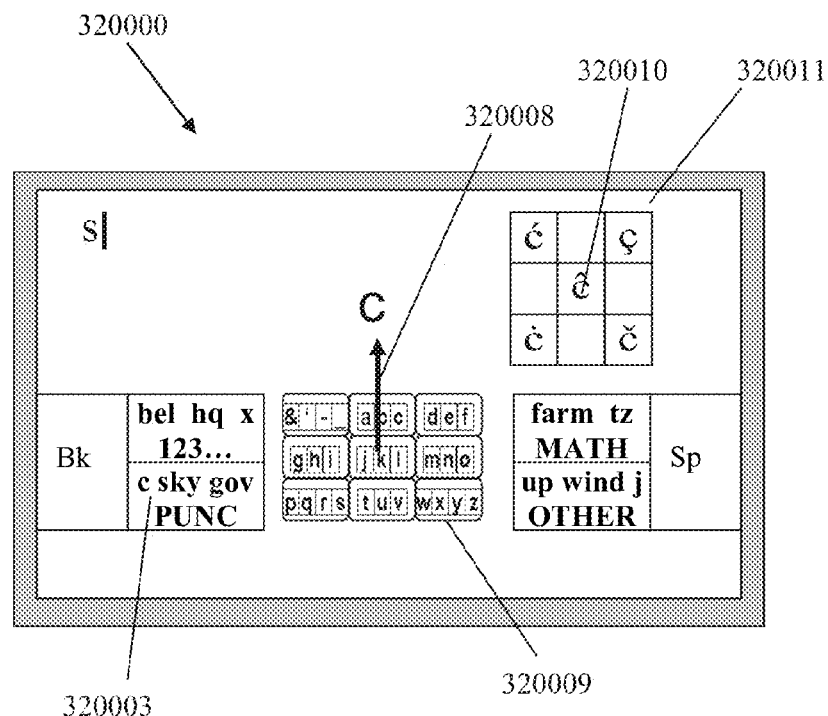
FIGS. 32A-32B are schematic illustration of entering accented letters, in accordance with some exemplary embodiments of the invention.
Figure 32B:
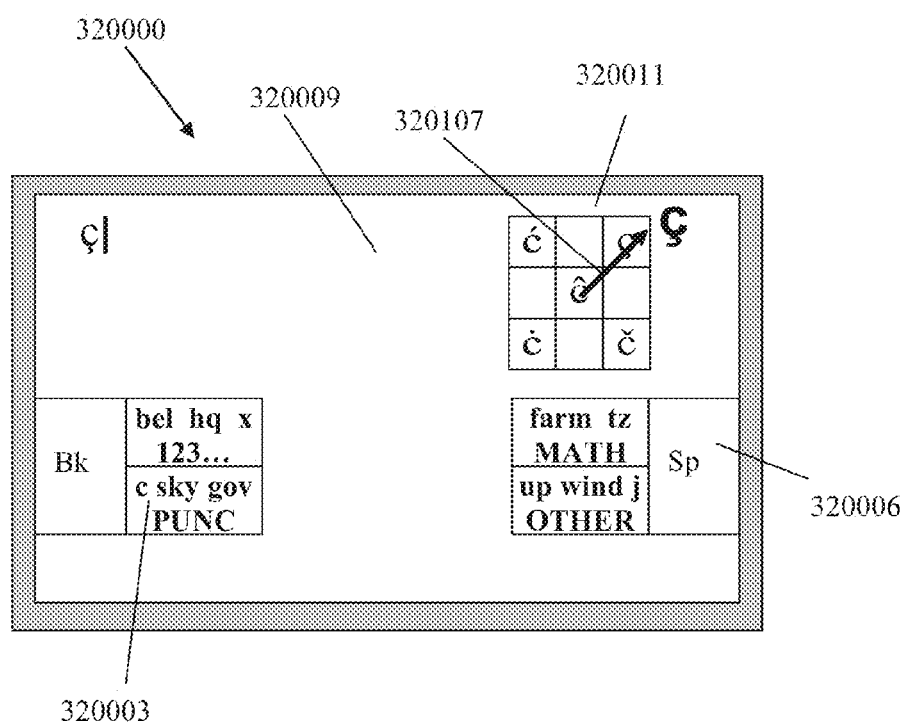

As an example, as shown in FIG. 32*a*, in order to enter the letter "ç" which is a derivative of the letter "c", the user may first provide the taping action on the corresponding key 320003 of the first keypad. The system may propose the letter "s" which in this example has the highest priority among the letters assigned to said key. The user then may proceed to the correction procedure by providing the gliding action 320008 corresponding to the letter "c" on the second keypad 320009 and system will show/propose said letter. The user then, may touch (e.g. preferably simultaneously, with another finger) anywhere on the screen (e.g. preferably outside the keys of the first keypad). At the touching point 320010, another keypad (e.g. a telephone-type keypad 320011) having derivative (e.g. accented) characters of said shown/proposed character "c" on its keys may appear on the screen. At this time, as shown in FIG. 32*b*, the user may provide the corresponding gliding action 320107 on or relating to a key to which his desired character is assigned on the new keypad and the system outputs said derivative character (e.g. "ç").

With continuous description of the current embodiment, based on the principle just described, other types of derivative characters such as "qu'" and "j'" as described in detail before, may also be entered similarly.

It must be noted, that according to one method, if the user does not provide any gliding action on the additional second keypad which is formed under the touching point or relating to the touching action, then the system does nothing.

The method just described, may be applied for entering any other tree-form data such as looking for media search, entering precise characters, entering commands into devices, etc. For example, at a first touching point on the screen, a media search system may show a different type of media on each key of the second keypad. The user may select his desired type of media such as "music" through a corresponding gliding action. Then with his other finger, the user may touch anywhere on the surface, and the system may provide a different derivative such as "band", "1970s" "1980s" "type of music", etc on each key telephone keypad, and so on. According to another example, it can also be used for entering commands or functions within menu bars, etc. For example, word processor menu bars may be assigned to telephone-type keypad keys. The user may select one of the bars by providing a corresponding gliding action. When the system selects said bar, then (preferably before removing his finger from the touch sensitive pad), the system may touch on a location on the screen and the system may open another preferably similar keypad with contents of the bar. The user selects one of them and so on.

Based on the same principles, also precise characters may be entered. For example, the letters of a language may be grouped in several forms and each of them may be assigned to a key of a (e.g. telephone-type) keypad. Through the same method, first the user may select one of the groups, and then one of the letters of the selected group. If said letter has derivatives, then at the next stage, the user may select one of them.

Repeating

According to one embodiment of the invention, at the end of providing a gliding action for entering a symbol such as a letter, special character, or a function such as the movement of a cursor (e.g. caret) in a text, etc, if the user stops said gliding and holds his finger in contact with the screen without removing it from the screen surface, then the system may repeat entering said symbol until the user removes/lifts his finger from the surface. If for providing a symbol a first and a second interaction on two different locations (e.g. on two different keypads) on the screen is being provided, then, according to one method, the user may remove his finger from the first location on the screen and the system may continue repeating said symbol until the user removes also his other finger from the screen.

As an example, by considering the device 318000 of FIG. 30a and the command group CMD1 symbols represented by the second keypad 319055 in said mode instance of FIG. 31a, if the user presses (e.g. and holds) the key 318005 and then provides a gliding action 318210, to move the cursor (caret) to the right, then different methods for moving said cursor in said direction may be considered. According to one method:

At the end of the gliding action, if the user removes his finger immediately from the screen, the system may move the cursor to the right over one character;

At the end of the gliding action if the user stops the gliding action without removing his finger from the screen, the system may move the cursor to the right over characters until the user removes his finger from the screen.

According to another method, as described previously, the length of the gliding action may define the number of characters over which the cursor will be moved in said direction.

Figure 33A:
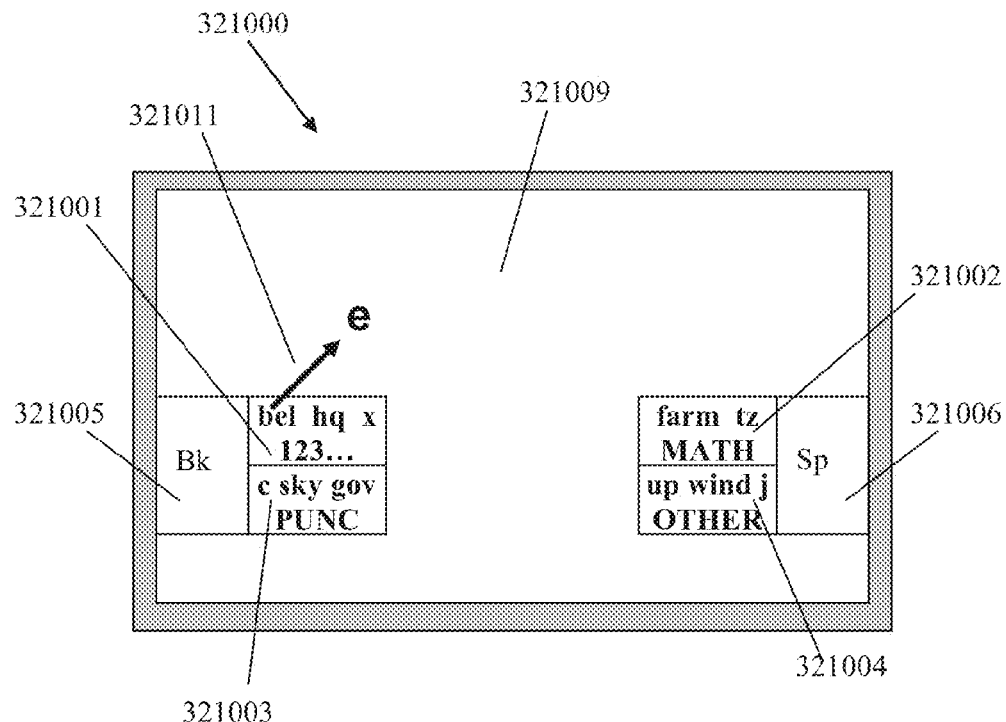
FIGS. 33A-33B are schematic illustration of entering accented letters, in accordance with some exemplary embodiments of the invention.

According to one embodiment of the invention, after a user provides a letter that has an accented derivative, if he desires to provide an accented derivative and for example touches the touch sensitive surface such as the touch screen, the system may show the second keypad of the invention wherein its keys include at least some of the accents corresponding to said letter. According to one method, the second keypad of the invention may include the accents that may be common for all of the characters having accented derivatives. This method may simplify the graphical user interface (e.g. GUI) because a single set of accents assigned to the keys of the second keypad may generally be used for entering accented characters of different characters. As an example, FIG. 33a shows a device 321000 having a touch screen 321009 and the first keypad of the invention having six keys 321001-321006.

Figure 33B:
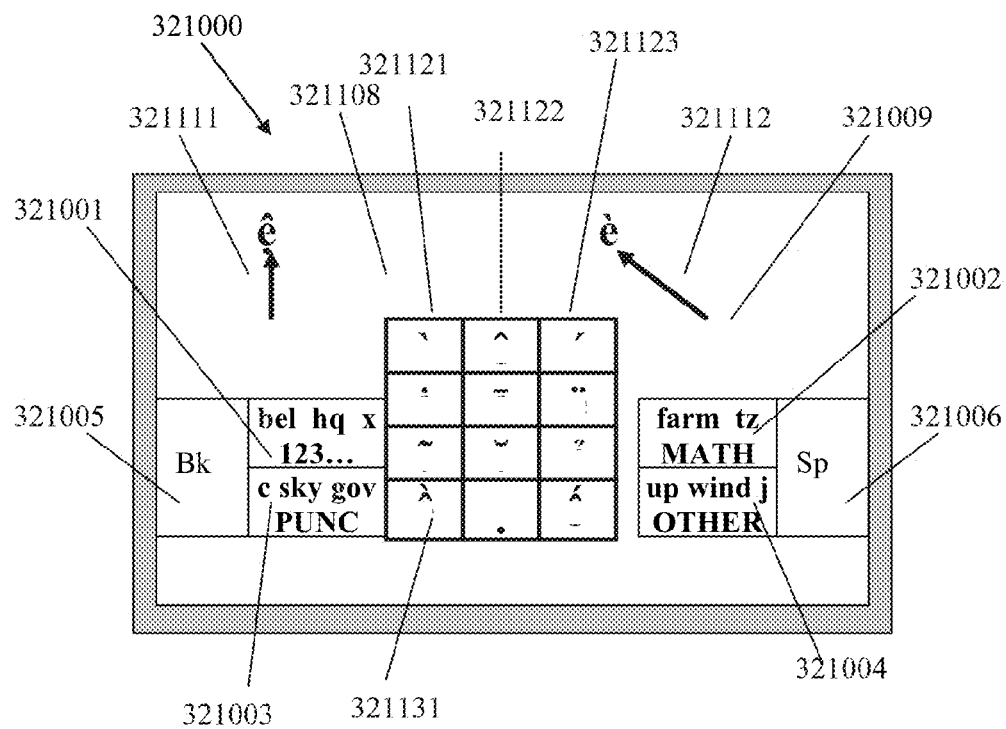

After the user provides a gliding action 321011 relating to the Certain/Stable character "e", then as shown in FIG. 33b, the user may touch the screen 321009 with for example another finger and the system shows the keys of the second keypad 321108 of the invention to which at least most of the accents of letters in for example different languages are assigned. At this time, in order to enter the letter "e" including a desired accented letter, the user may provide the appropriate gliding action 321112 corresponding to the desired accent "è" so that the system provide the desired letter "è". In this example, providing the gliding action 321111 may result in entering the accented character "ê". For sake of clarity, according to another example, if the user enters the letter "a" and then (e.g. while the cursor is immediately after said letter) touches the screen (e.g. outside the first keypad) then the system shows the second keypad with accents 321131 as described above. At this time if the user, for example, provides the gliding action 321111 then the system provides the accented letter "â".

In some languages an accented derivative of a character may include several accent symbols. For example, an accented letter of the letter "e" such as the letter "ề" may be presented by more than one accent symbols. In this case, according to one method, either said accents may be assigned to one of the keys 321131 of the second keypad, or for example at the end of providing the gliding action corresponding to the letter "e", the user may hold said finger on the screen and provide consecutive gliding actions 321122, 321121, corresponding to the plurality of accent symbols corresponding to the desired derivative "ề" of the letter "e".

It must be noted that the arrangement of the accented letters or the accents on the keys of the second keypad may be such that to be easy to remember them. For example, the letters "è", "ê", and "é", may respectively be assigned to the keys 321121, 321122, and 321123 so that they respectively correspond to the direction of their corresponding gliding actions " ↖↑↗ " for entering them.

Figure 34A:
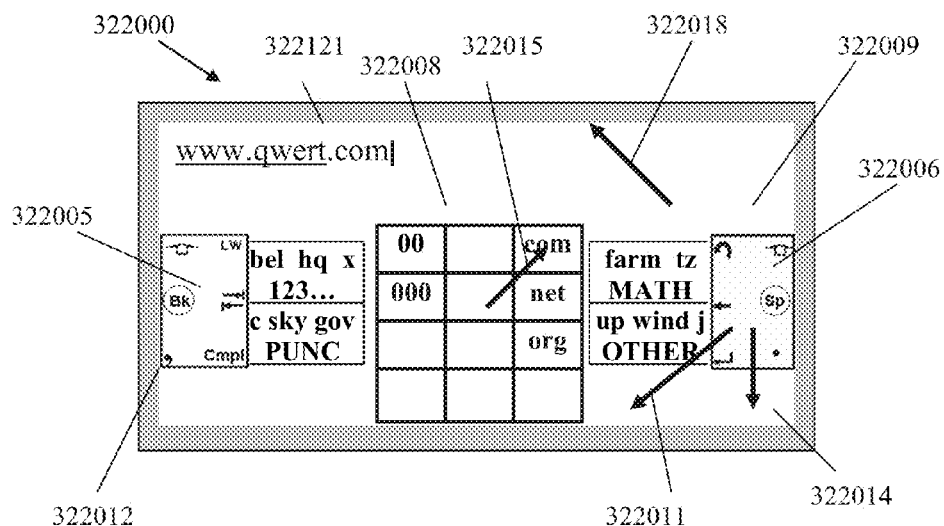
FIG. 34A is a schematic illustration of entering derivatives relating to a characters, in accordance with some exemplary embodiments of the invention.

The second keypad (model) of the invention may be used for entering "derivatives" of any symbol. For example, after the user provides the interaction for entering a dot character (i.e. "."), if the user touches the screen of the device in another location, then the system may show the keys of the second keypad of the invention to which several chain of characters that for example may begin with a dot character, are assigned. Then the user may provide the desired gliding action. As an example, FIG. 34a shows a device 322000 having a touch screen 322009 and the first keypad of the invention. In this example, in a manner described before, providing a gliding action 322014 by a user may relate to entering a period/dot. At this time, (e.g. without removing his finger from the screen) if the user touches the screen on a location preferably outside the first keypad, then the system may show the second keypad of the invention 322008 wherein to at least some of its keys some "derivations" of the character dot are assigned. At this time, as an example, providing the gliding action 322015 may provide the chain of character ".com", and according to another example, providing the gliding action 322018 provides the chain of character "0.00", and so on.

Note that in FIG. 34a, the gliding action 322011 corresponds to the "enter" function, and the gliding action 322012 corresponds to entering the character "," (e.g. comma character).

Word Completion

Figure 34B:
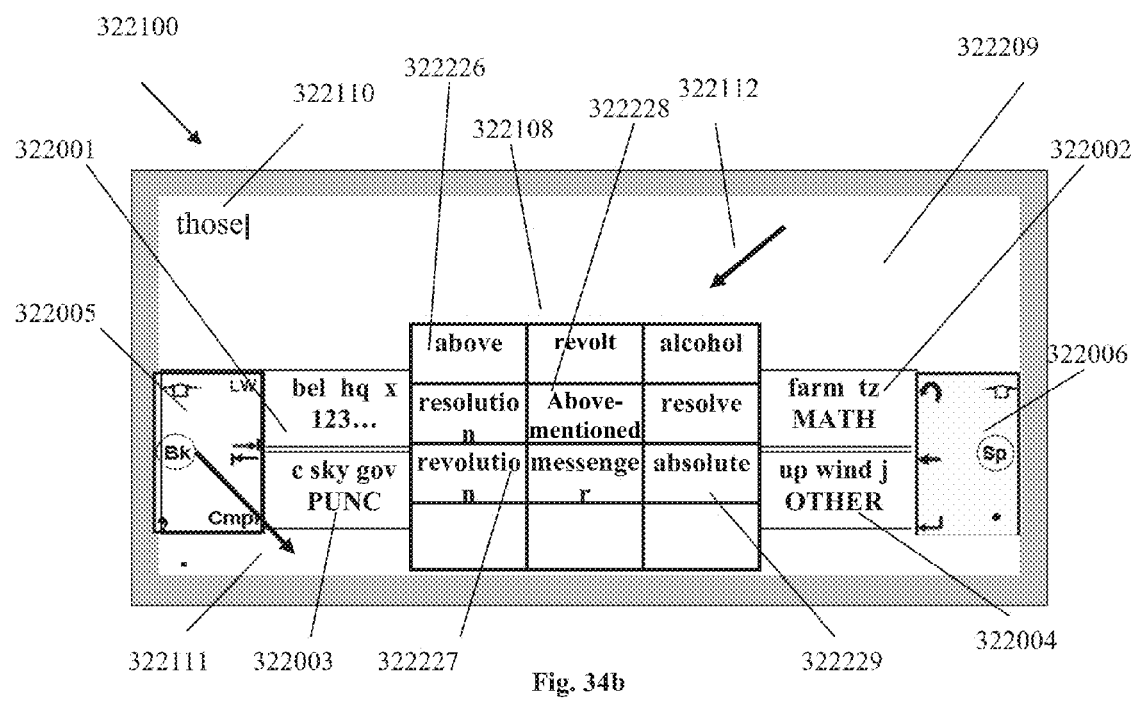
FIGS. 34B-34D, are schematic illustration of methods of word completion, in accordance with some exemplary embodiments of the invention.

According to one embodiment of the invention, the system may also include a method of word completion. During the entry of a word, the system may, automatically or based on user's demand, show to the user the words having at least the length of the portion of the current word being entered until that moment. Said words may be shown using the second keypad of the invention and being entered according to principles of the invention. As an example, FIG. 34b shows a device 322100 having a touch screen 322209 and the first keypad of the invention having six keys including four letter keys as are often shown and used in different figures of different embodiments. After pressing the keys 322002, 322001, 322003, 322003, and 322001 of the first keypad, the system may propose the word "those" 322110. At this time, the user may provide an interaction such as providing a gliding action 322111 which enters the system into word-completion mode and informs the system to show to the user some of the words/stems of the dictionary which their beginning characters have the same key pressing actions, and wherein said words/stems and that have the highest priorities among the corresponding words of the dictionary. Said words may be shown on the keys of the second keypad of the invention which preferably will be shown to the user after the user provides said word completion action/demand (e.g. said gliding action 322111). Then, if the desired word is on one of the keys of the second keypad, the user may provide the corresponding gliding action with for example, his other finger on the screen. As an example, if the desired word is the word "revolution" 322227, then the user may provide the gliding action 322112.

With continuous description of the current embodiment, according to a first method, the completing word having the highest priority (e.g., "absolute" 322229) may be proposed to the user based on the gliding action 322111 alone on a specific location before the second keypad appears. If said word is not the desired word, then the user may proceed to touching the screen with, for example, his other finger so that the system shows the second keypad with additional words.

In the example of FIG. 34b, the words "above" 322226 and "above-mentioned" 322228 are part of the list of words which are shown on the keys of the second keypad. According to a second method, the completing word proposed to the user based on the gliding action 322111 alone, may be a longer word having the same beginning characters as the proposed word. For example, if the user provides a correction procedure for replacing the word those by the word "above" and provides the gliding action 322111 for entering the system into the word completion instance, then the system may propose the word "above-mentioned" based on said gliding action 322111 alone.

Figure 34C:
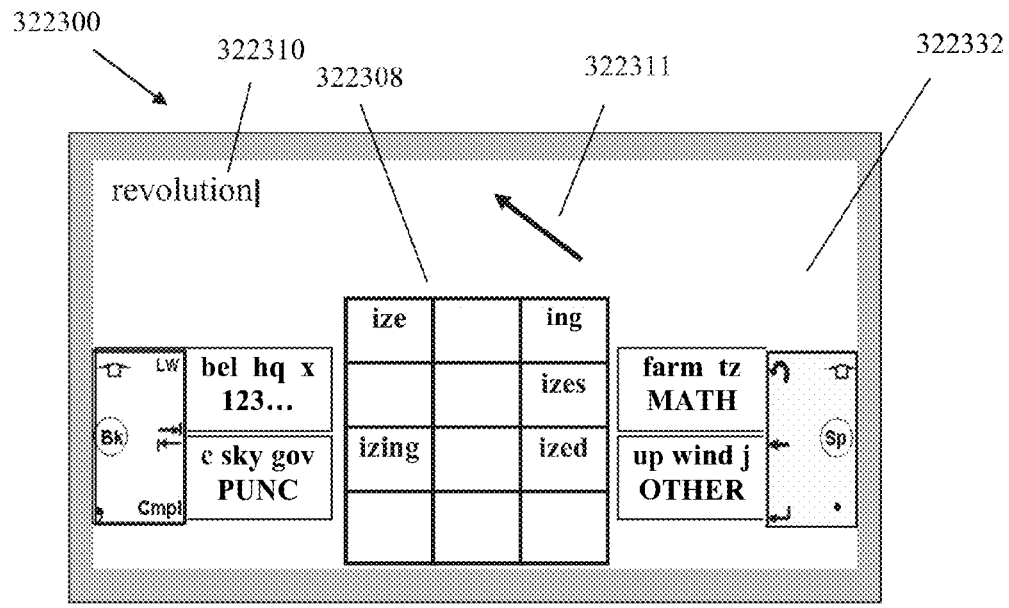

According to one embodiment of the invention, a word proposed through the word completion system may be a word that may have additional different completing stems. For example, in the example above, after the user selects the word revolution 322227 by providing a gliding action 322112, he may touch with his other on finger on another location, preferably outside the first keypad, on the screen. At this time, as shown in FIG. 34c, the system may open another second keypad of the invention 322308 showing different completing stems corresponding to the word "revolution" The user may then provide the desired gliding action. In this example, the user provides the gliding action 322311 corresponding to the stem "ize". The system then provides the word "revolutionize".

According to one embodiment of the invention, if several proposed words completing portions have similar beginning character/s (e.g. similar portion) but their remaining chains of characters being different, then said beginning characters may be shown as one choice on a second keypad key. After entering said portion by, for example, providing a corresponding gliding action, if the user touches on another location on the screen, then the system may show on different keys of another second keypad said different remaining chains of characters of said several word completing portions.

According tone embodiment of the invention, after entering the system into the word-completion and touching the screen, the system may show the second keypad with selected words/stems. If the desired word/stem is not on the keys of the said second keypad, the user may provide another touching action, preferably on another location on the screen, and the system may show another second keypad of the invention including additional corresponding words/stems (e.g. having less frequently use). And so on.

Chain of characters, for example, commonly used/included within various words of a language (e.g. a portion of a word) and that preferably begin with a same letter can also be entered based on the procedures using the second keypad of the invention as described above. For example, separately or in addition to the accented letters (if any) of a letter, chains of characters such as prefix, suffix, etc., beginning with said letter may be defined and being entered based on the procedures described above. As an example, when a user provides a "Certain"/precise character (e.g. through a corresponding swipe-and-holding action), the frequently used chain of character within words beginning with said letter may be shown on the keys of the second keypad of the invention which will appears on the screen. At this time, the user may enter one of said chain of characters if he desires. Along with said chain of character, the accented characters or other characters related to said precise character may also been shown on the keys of the second keypad.

Suffix/Prefix

Figure 34D:
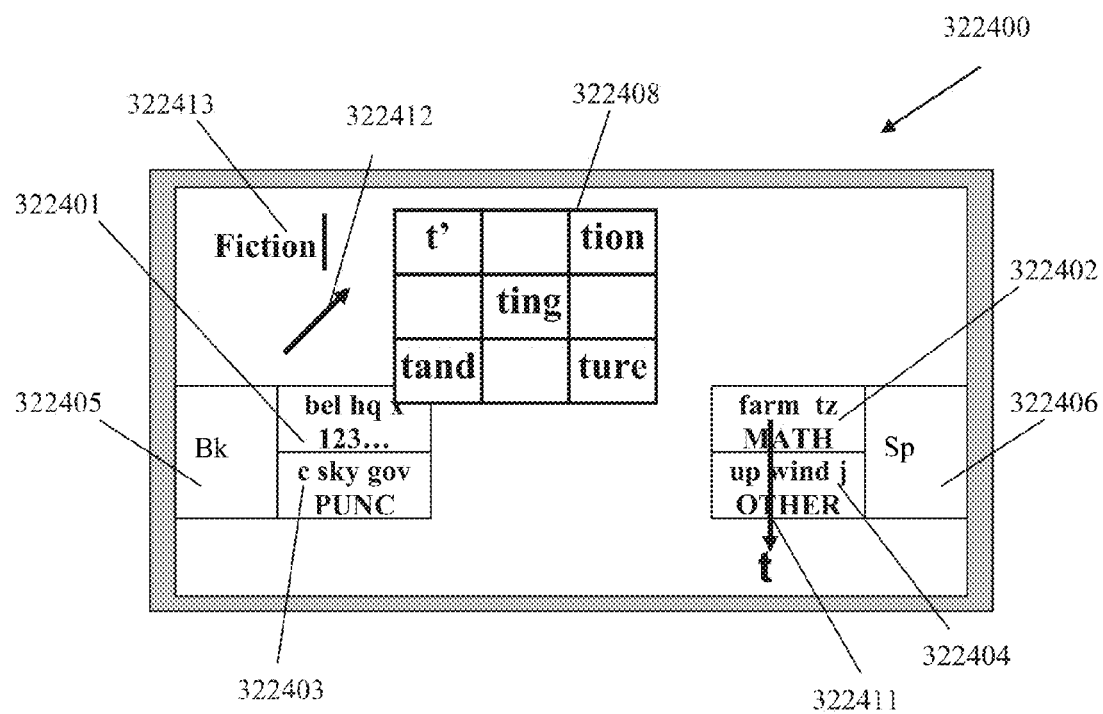

With continuous description of the current embodiment, FIG. 34d shows as an example, a device 322400 having a touch screen and the first keypad of the invention. As an example, after the user provides a gliding-and-holding action 322411 corresponding to the precise character "t" (e.g. in this application, the non-precise character may also be called "Unstable" character and the precise character may also be called "Stable" character). At this time, if the user touches on the screen (preferably outside the first keypad) preferably with another finger, then the system may show several chain of characters relating-to or beginning-with said letter "t" on the keys of the second keypad of the invention 322408. The user then may provide a corresponding gliding action (e.g. preferably, with said another finger) to enter or add his desired chain of characters to the current proposed word/stem. In this example, after the user enters the stem/word "fic", he may provide said glide-and-holding action 322411 corresponding to the letter "t", and then provide the 322412 for entering the portion-of-a-word (e.g. suffix) "tion".

In some embodiments in which suffix selection is supported, the processor is adapted to select for an entered key sequence, shorter words having more suffixes, rather than longer words which do not allow for many completion suffixes, even when the longer word has a higher ranking in the dictionary. Optionally, the shorter word is given an extra score and the shorter word is selected if the difference between the score of the shorter and longer word are smaller than the extra score.

Features to Permit Using the System with One Hand

Some of the features of the system requiring interactions with two fingers may be designed such that to require one finger interaction only. For example, the "shift" gliding action may be provided first and then the user may remove his finger from the screen and the next character being entered will be capitalized.

Figure 34E:
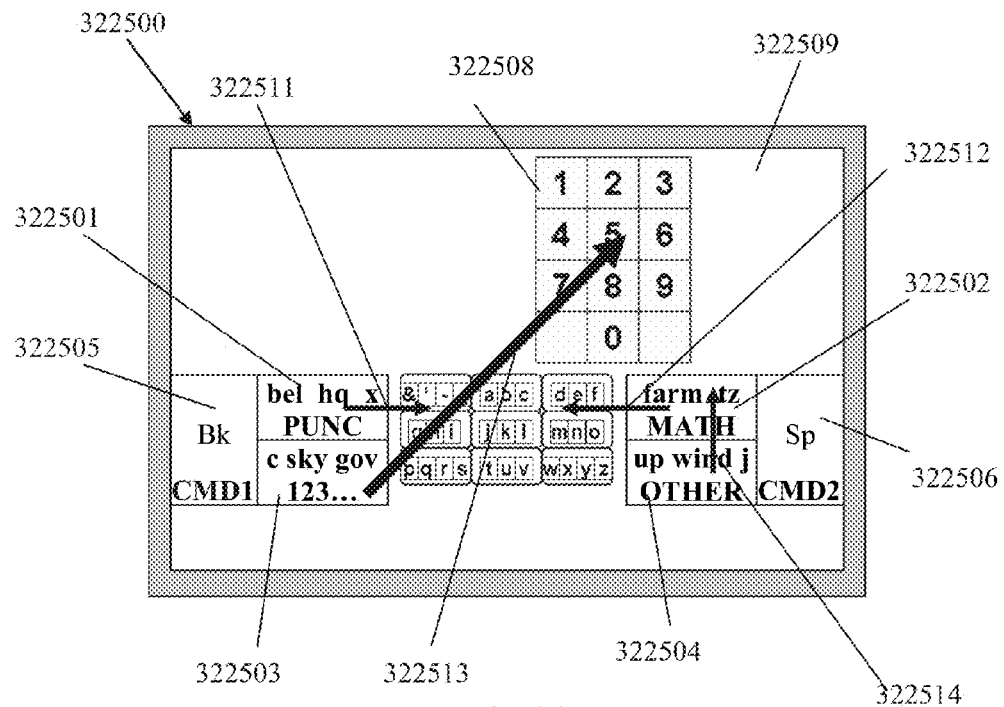
FIGS. 34E-34F, are schematic illustration of using features of the system with one hand, in accordance with some exemplary embodiments of the invention.

Generally, at least one of the gliding actions departing from any of the letter keys of the first keypad of the invention may not correspond to any precise letter. For example as shown in FIG. 34e, the gliding actions 322511-322514 respectively departing from the keys 322501-322504 may not correspond to any precise character on their respective keys. According to one embodiment of the invention, providing any of said gliding actions may correspond to entering the system into the mode instance assigned to its corresponding key. After providing such gliding action:

According to a first method, the user may remove his finger from the screen and the system may show him the corresponding second keypad of the invention including the characters of the corresponding mode. The user then may provide a gliding action anywhere on the screen to provide his desired special character.

According to a second method, if the user removes his finger from the screen nothing happens, but if he does not remove his finger from the glide ending point on the screen at least for a while, then the system may show him the corresponding second keypad of the invention including the characters of the corresponding mode. The user then may either provide a gliding action from said point (e.g. without removing his finger), or from anywhere on the screen to provide his desired special character.

Figure 34F:
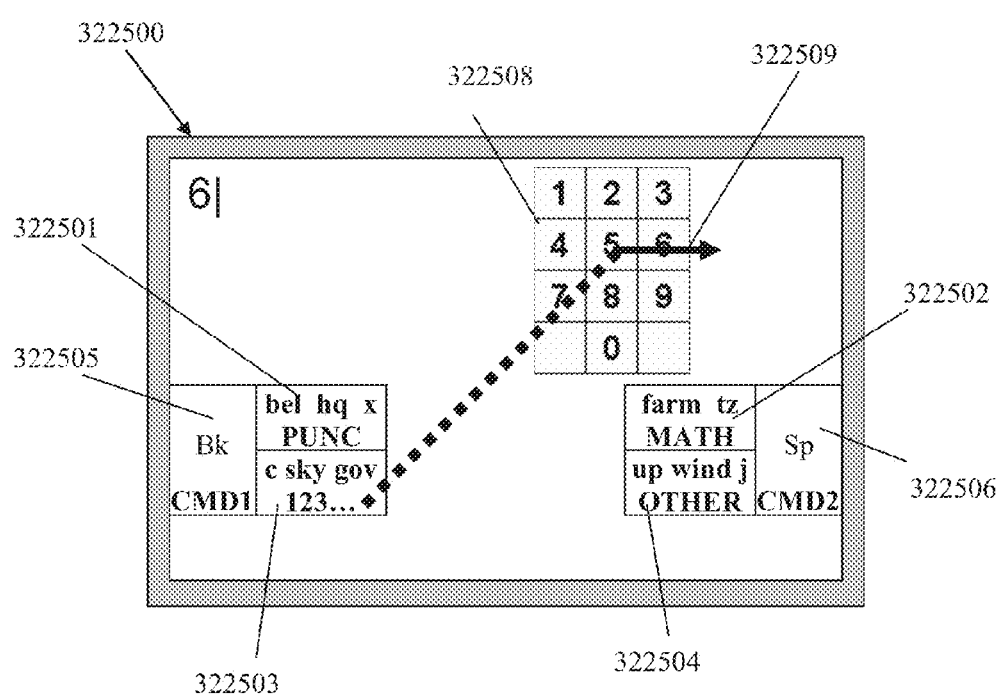

As an example, if the user provides the gliding action 322513 the system enters to the "123 . . . " mode (e.g. "NUMB" mode). According to one method, at the end of the gliding action the system my show to the system the second keypad wherein its keys include the digits 0-9. At this time, as shown as an example in FIG. 34f, providing the gliding action 322509 may correspond to entering the digit "6".

Full Keyboard Enhancement

The features of the invention such as the mode keys/instances, word completion, tree-based searches, etc., as described above, can be used to enhance other data entry systems. According to one embodiment of the invention, the first keypad of the invention may be a keyboard wherein at least most of its keys having one letter. For example, said keyboard may be based on a standard PC keyboard such as a QWERTY keyboard with some modification. Preferably, said keyboard may be an on-screen keyboard. Said some modification may be provided to make such keyboard more functional for entering special character and/or functions by integrating features of the data entry system of the inventions such as mode keys/instances, word completion, tree-based search, etc., as described before.

Figure 35:
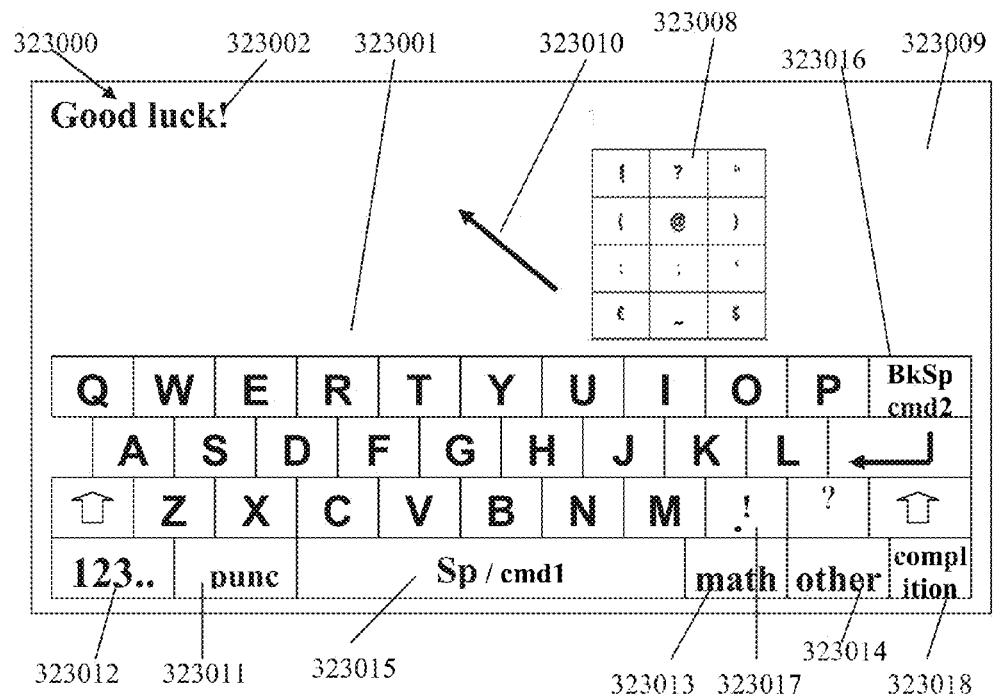
FIGS. 35-35D, are schematic illustration of integrating the features of the system in an on-screen full-sized keyboard, in accordance with some exemplary embodiments of the invention.

As an example, FIG. 35 shows a device 323000 having a touch-screen 323009 and a keyboard 323001 wherein its letters have a QWERTY arrangement. In addition to the letter keys, the keyboard may include keys 323011-323016 which support the mode instances of the invention. In this example, the CMD1 and CMD2 mode features are assigned to respectively, the Sp and BkSp keys but obviously each of them can have its own independent key.

When the user presses one of the keys such as the PUNC mode key, the system may open the second keypad 323008 of the invention wherein the punctuation mark characters are assigned to its keys (as described in detail before). At this time the user may provide a desired gliding action preferably anywhere on the screen, in this example 323010, so that to enter his desired character (e.g. in this example, "!" 323002).

If a mode instance is assigned to an existing key that is also used for other purpose, such as a Space key 323015, then in order to enter into said mode instance the user may provide an interactions other than for example a single-taping action which mostly is used for entering a space character. As an example, the user may press-and-hold the Space key and with another finger touch the screen. At this time the system may open the corresponding second keypad and the user may provide his desired gliding action preferably with said another finger.

All other features such as the accents, accented characters, other derivations of characters such letters of special characters, word completions, prefix, suffix, other related word portions, etc., may be (assigned to keys and be) entered in the same manners as described above.

Figure 35A:
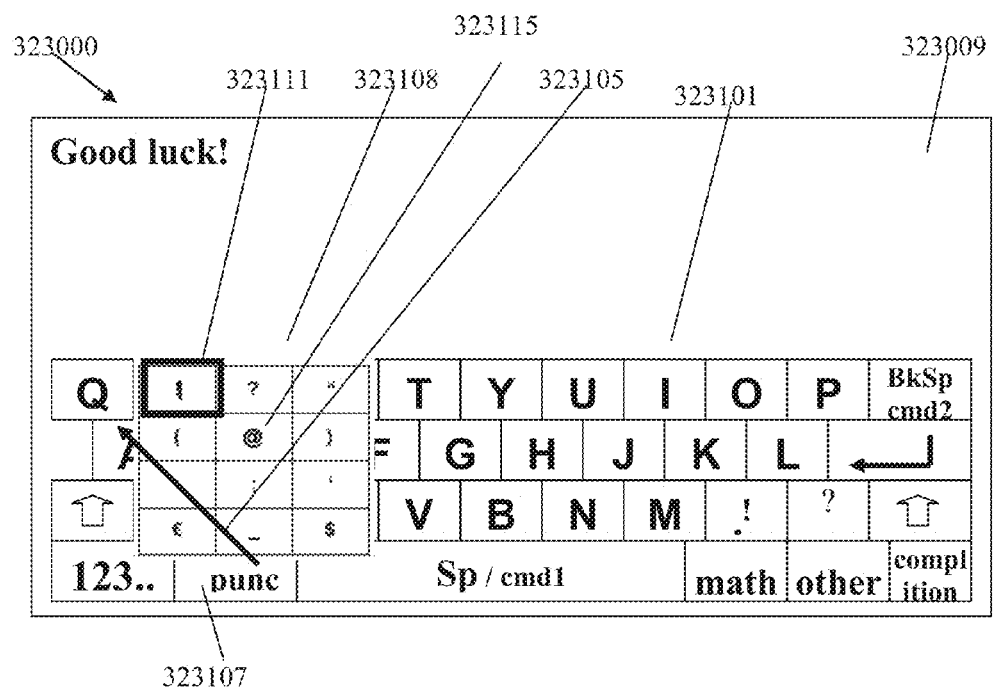

As described before, when user provides an interaction with a finger with a mode key such as punctuation mark key 323011, he may then provide a gliding action anywhere on the screen. For example, he may either provide said gliding action with another finger as was shown in FIG. 35, or he can provide a gliding action 323105 from the touched punctuation mark key 323107 itself as shown in FIG. 35a. During providing a gliding action the selected key 323111 of the second keypad of the invention which in this example is a telephone type keypad 323108 may be highlighted even if said keypad is shown on a location other than under the user's finger.

Figure 35B:
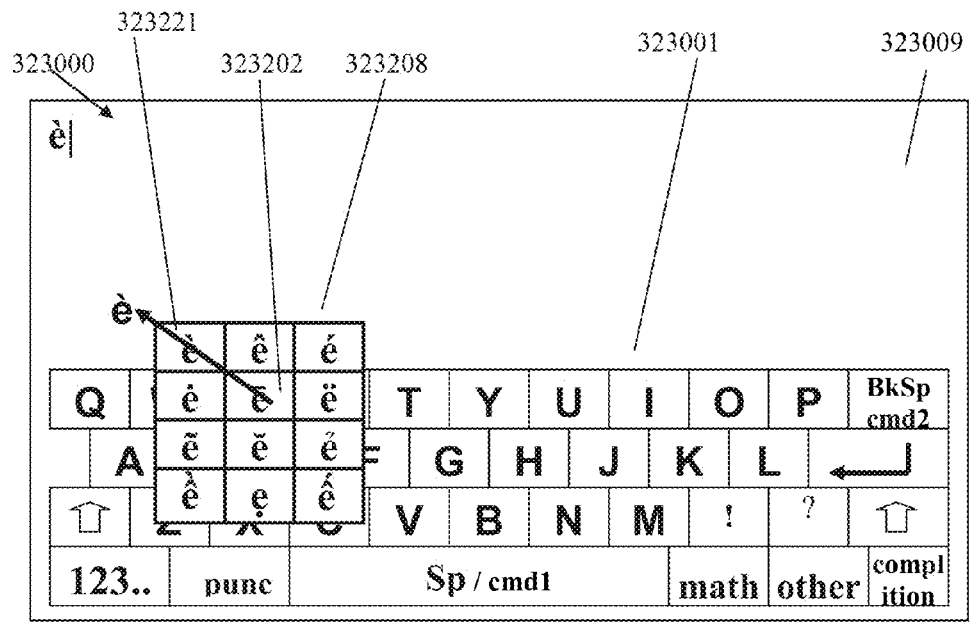

With continuous description of the current embodiment the derivations of any of the symbols assigned to a key may be entered in the same manner. For example, as shown in FIG. 35b, when user touches a key such as the key to which the character "e" is assigned, a second keypad such as a telephone type keypad 323208 may appear on wherein its keys include the accents of the letter "e". At this time the user may provide a gliding action such as 323321 corresponding to his desired accented character "e".

Figure 35C:
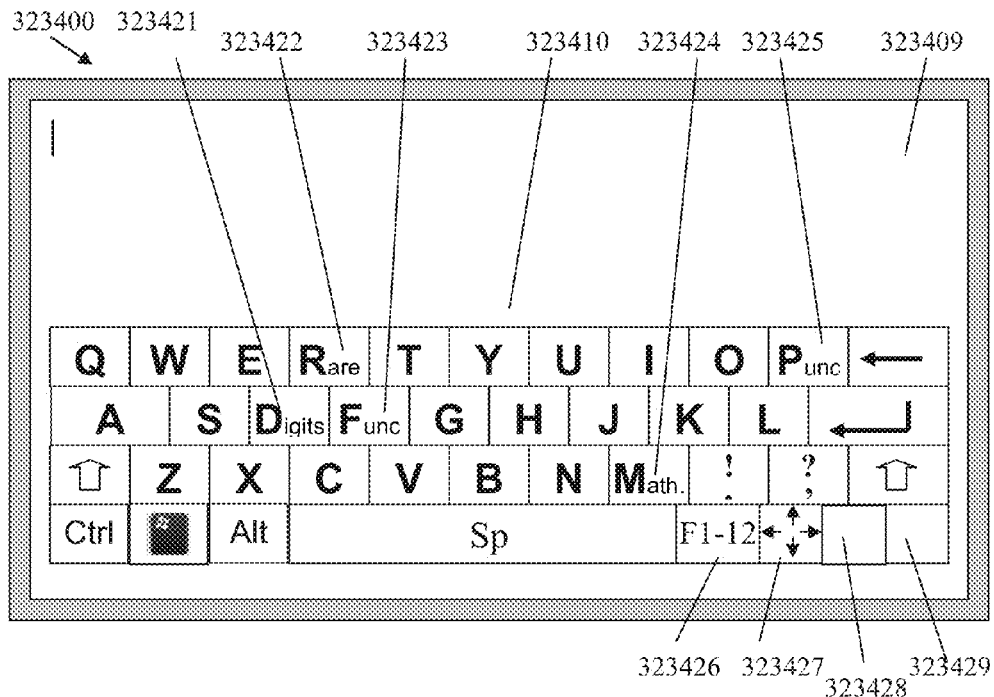
Figure 35D:
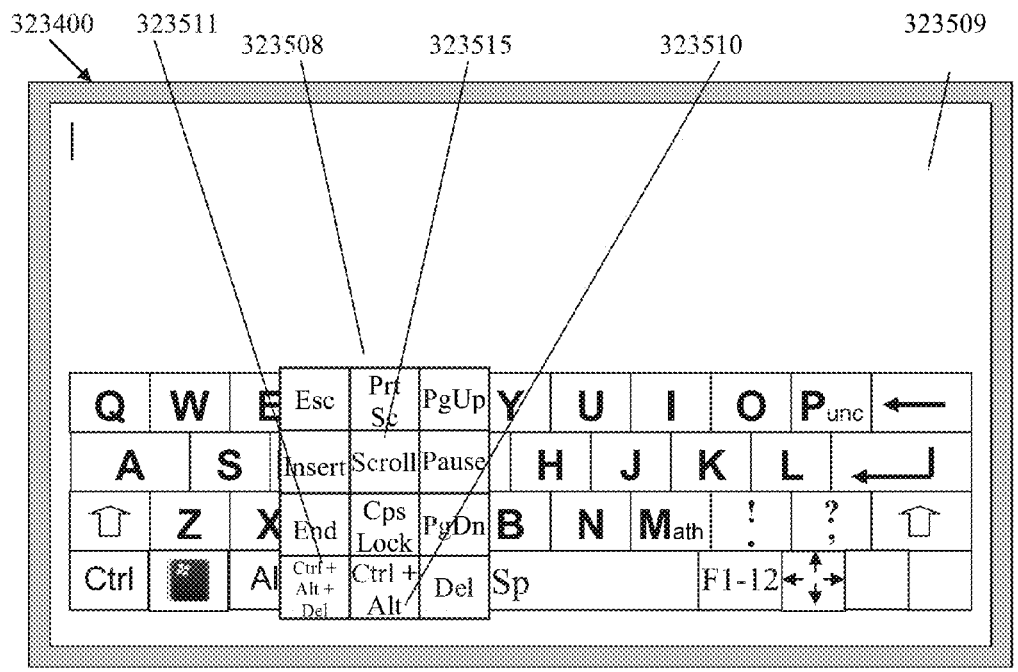

According to one embodiment of the invention at least some of the special characters modes and function modes may be assigned to the keys of the keyboard that also having their standard functionalities. For examples, said mode modes may be assigned to some of the letter keys. Preferably, the mode instances may be assigned to the letter keys to which the beginning letter of the mode instance is also assigned. According to one method, tapping on a key to which a mode is assigned may correspond to the original functionality of said key, and a gliding action departing from said key in a direction may correspond to entering a symbol of the mode instance assigned to the gliding action in said direction. According to one method, after the user provides a gliding action from said key the system enters into the mode instance of said key and shows the second keypad of the invention such as a telephone keypad to which the symbols of said modes are assigned. According to one method, a short gliding action on/from said key (e.g. preferably in a predefined direction such as upward) may correspond to interacting with the center key of the second keypad. At this time the system may show As an example, as shown in FIG. 35c, the digit mode may be assigned to the key 323421 to which the letter "d" is also assigned. Same can be applied to other mode instances such as PUNC mode being assigned to the key 323425 which also includes the letter "p", and so on. In this example the arrow functionalities are assigned to a separate key 323427. The arrow may be navigated within the text by touching the key 323427 and providing the corresponding gliding action preferably from that key. Also as an example FIG. 35d shows the device 323400 similar to that of the FIG. 35c. In this example after the user touches the FUNC mode key, the system may show the second keypad of the invention including most of the PC keyboard functions and some customized functions. In this example the second keypad is a telephone type keypad

323508 wherein functions are assigned to its keys. The user can select a desired function by providing the corresponding gliding action.

1st KP Alphabetical Order

Figure 36:
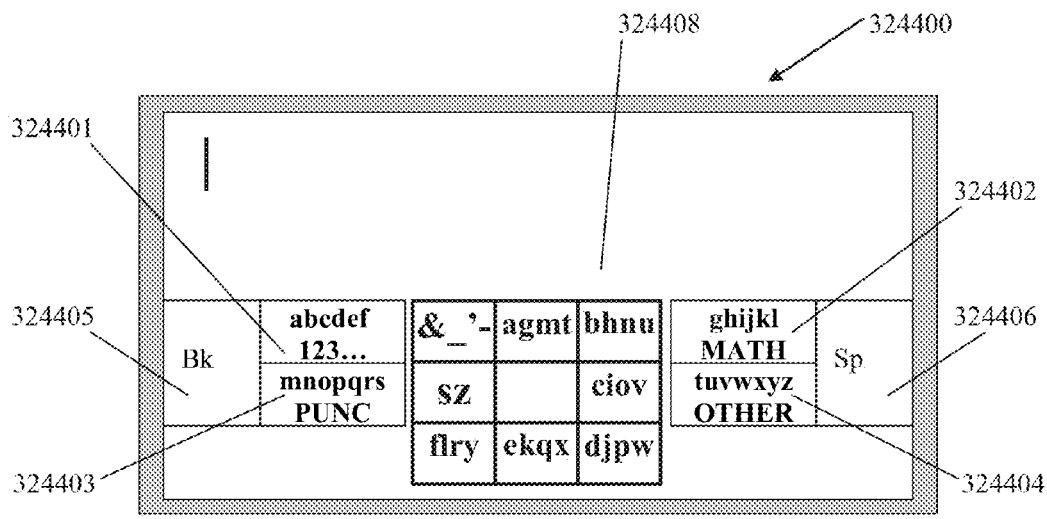
FIG. 36 is a schematic illustration of the first keypad of the invention having alphabetical letter layout, in accordance with some exemplary embodiments of the invention.

According to one embodiment of the invention, the letters on the keys of the first keypad may be arranged in alphabetical order. Preferably, the letters on the second keypad may be arranged such that a letter key of the first keypad and a letter key of the first keypad have at most one common character/letter. An example of such arrangement is shown in FIG. 36 wherein on the touch screen of the device 324000 the letters of an alphabet are arranged in alphabetical order on the keys 324001-324004 of the first keypad. Accordingly, according to an exemplary method, the letters of said alphabet are also arranged on the second keypad 324008 to correspond to the principles described. In this embodiment, some modifications in the order of arrangement of letters on the keys of the first and/or the second keypad may be considered to for example augment the accuracy of the word prediction by the system.

Hindi Language

In some languages such as the Indian language the text cy characters such as letters and accents include many characters and therefore when they are assigned to a keypad having a reduced number of keys, at least one of said keys may have more than four number letters and vowels are more than four characters. Therefore to at least one of the keys of the telephone keypad used for entering text more than four ambiguous characters may be assigned. In this case, a letter key of the first keypad having for example four letter keys and a key of the second keypad may have more than one character in common.

Figure 37A:
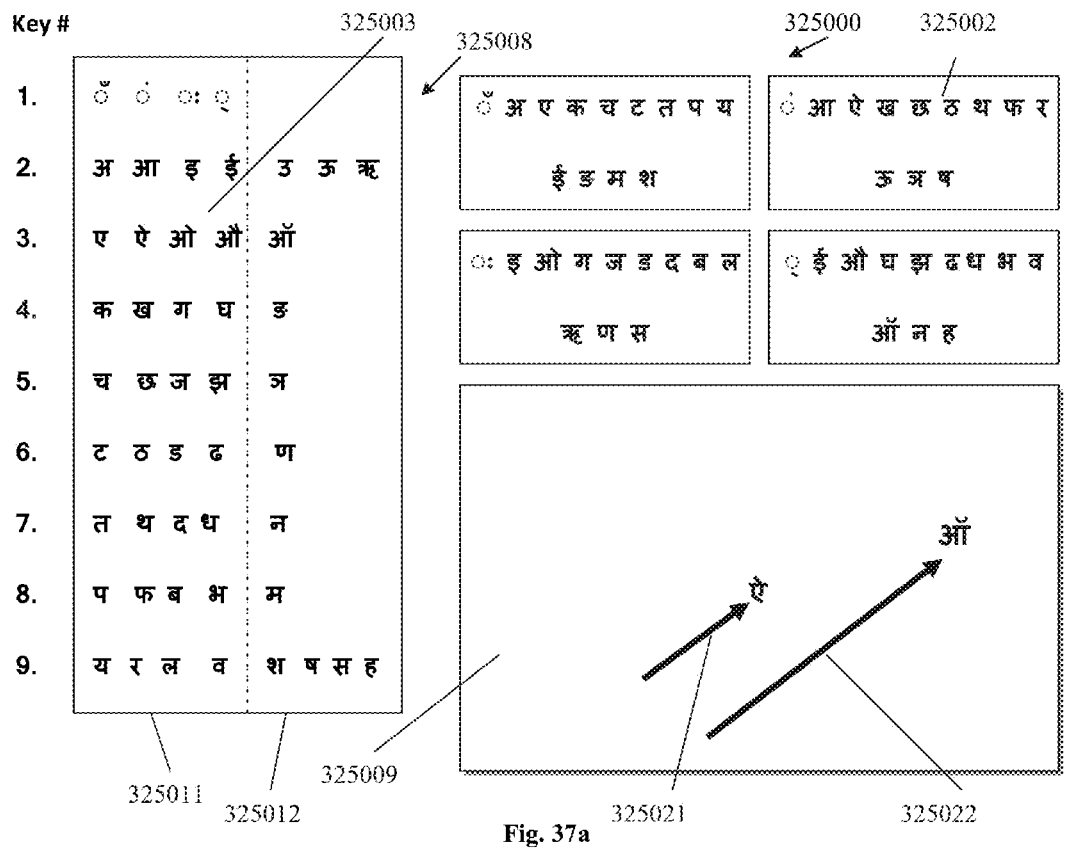
FIGS. 37A-37B are schematic illustration of the entry and correction of words in languages having many (alphabetical) characters, in accordance with some exemplary embodiments of the invention.

As an example, FIG. 37*a*, shows the distribution of the Indian characters 325008 on the telephone type keypad. In most cases a key of the telephone keypad has more than four characters. for example, the key 325003 of the Indian telephone keypad has five (ambiguous) characters. FIG. 37*a* also shows an exemplary first keypad 325000 of the invention having four letter keys to which the Indian characters are also assigned. In embodiments where the keypad has four letter keys, a key of the first keypad 325000 and a key of the second keypad 325003 of the invention in Indian language may have more than one character in common making the entry of certain letters through correction procedure of the invention and the direct entry of the Certain letters ambiguous. When a user types a word using the first the keypad of the invention 325000 and the system predicts a none desired word, if the user provides for example a gliding action to correct the predicted word, said gliding action may correspond to more than one character and the system may not know to which one of them the gliding action corresponds.

To overcome this problem, according to one embodiment, the length of the gliding action may define to which of said characters that gliding action corresponds. For example the key 325002 of the first keypad and the key 325003 of the second keypad have two common characters. As and example, a short gliding action 325021 on the screen 325009 may correspond to a first common character in the direction of the gliding action, and a second common character may correspond to a long gliding action 325022 in said direction. According to another embodiment, a timer may be used by the system to recognize the user's intention during a pressing or gliding action. For example, a gliding and removing action may correspond to a first common character, and a glide and holding action may correspond to a second common character.

Figure 37B:
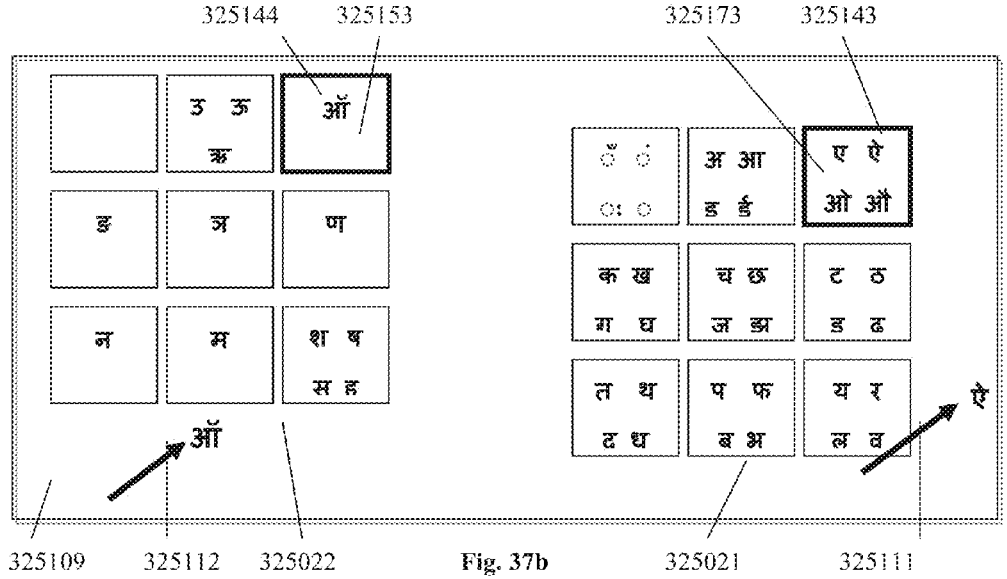

According to another embodiment as shown in FIG. 37*b*, the system may include two (preferably, similar) second keypads 325021, 325022, each having some of the characters of the (Indian) alphabet assigned to their keys such that a key of the first keypad 325000 and a key of any of the two second keypads 325021, 325022, have at most one character in common.

According to the first method a first type of interaction may correspond to interacting with a first second keypad and a second type of interaction may correspond to the second second keypad. For example the first second keypad 325021 may be assigned to the right side of the screen and the second second keypad 325022 may be assigned to the left side of the screen such that when user decides to correct a none desired word he may use the corresponding second keypad. for example, in order to enter the letter 325143 which is common between the key 325002 of the first keypad 325000 and the key 325143 of the first second keypad 325021 the use may provide the gliding action 325111 on the right side of the screen 325109, and in order to enter the letter 325144 which is common between the key 325002 of the first keypad 325000 and the key 325153 of the first second keypad 325022 the use may provide the gliding action 325112 on the left side of the screen 325109.

According to a second method, after entering into the correction procedure, when the user touches the screen the system may show the first second keypad and if his desired letter/character is not on said keypad then preferably without removing his first finger from the screen the user may touch the screen with another finger and the system may show the second second keypad to the user. The user then may provide his desired gliding action. After the user touches the screen with his second finger he may remove his first finger from the screen. It must be noted that the system will include more than two second keypads if necessary and the user can repeat the procedure of touching the screen with another finger if his desired letter is not on the current second keypad shown to him by the system.

The distribution of the Indian characters on the keys of the first keypad 325000 of the invention in FIG. 37*a* are based on alphabetical order which in this example is used for demonstrating the embodiments only. It must be noted that preferably the distribution of the letters on the keys of the first keypad may be such that to augment the accuracy of the predicted words by the system preferably without requiring proceeding through the correction procedure of the invention.

The procedure of entering Certain characters by replacing the Uncertain characters through the correction procedure of the invention is not the only way to enter precise characters. The user can add a Certain characters directly by providing gliding actions from the corresponding key of the first keypad as described for English language. In this case after the user touches a corresponding key of the first keypad and the system shows a first second keypad if the desired letter is not on the first second keypad then without removing his first finger from that key the user can touch anywhere on the screen with his other finger and the system shows to him a second second keypad including other characters assigned to said key and so on until the user's desired letter/character is shown on a proposed second keypad, and the user then may provide the corresponding gliding action.

The data entry system of the invention can be used for entering data such as text in every language. For example, in can be used for entering text in languages having phonetic alphabet such as the Chinese or Japanese language.

Chinese/Japanese

In Chinese language words include one or more ideographic symbols. Each symbol is defined by a pinyin which is a chain of Roman based characters (e.g. English Characters) which defines phonetic characteristic of the symbol. The data entry system of the invention can be used to enter Chinese text. According to one embodiment each word of the database of the system may include a set of pinyins corresponding to a set of symbols constituting the word. The user can enter the key interactions corresponding to one or more pinyins corresponding to a word and the system may propose a corresponding word to the user. In most cases a same pinyin corresponds to several different symbols, and a set of pinyins may correspond to several words. Each of said corresponding words may have its own frequency of use.

According to one embodiment of the invention, after the user provides the key interactions corresponding to Uncertain (e.g. and Certain) letters/characters of pinyins of a word, the system may propose/show the predicted sets of pinyins of the word, and accordingly, a predicted word consisting of the corresponding ideogram symbols constituting the predicted word, wherein preferably, said proposed word has the highest priority among the words corresponding to said predicted pinyins. According to one method, If the proposed word is the desired word the user can continue typing for example by entering a space character to confirm the proposed word.

If the predicted sets of pinyins are not the desired sets of pinyins, the user may proceed to the correction procedure of the invention by using the second keypad of the invention. Even if the system proposes the desired sets of pinyins, said proposed pinyins still may correspond to more than one word. However, at any moment, if the proposed word is not the desired word, according to one method, the user may provide a predefined interaction such as touching a location on the screen (or on a key) and the system may open a keypad such as a telephone type keypad wherein its keys include the other words corresponding to the proposed sets of pinyins. At this time, if the desired word is on one of the keys of the opened keypad, the user may provide the corresponding gliding action. If there are more words to propose by the system, while holding his finger in touch with the screen, he can touch the screen with another finger and the system may open another keypad including additional proposed words, and so on.

The correction procedure is provided during the entry of the pinyins so that to help the system to predict correctly the desired pinyin similar to the procedure of the correction described throughout this application for entering the desired alphabetical chain of characters such as a alphabetical word.

It must be noted according to one method the pinyins of the system may include different Chinese sounds which are generally defined by digits from 1 to 4 while according to another method they may not include the sounds.

According to one embodiment of the invention, during the entry of a word in a language having Hieroglyph characters such as Chinese language, when a user provides the key interactions such as key presses on the keys of the first keypad for entering Uncertain letters, and if necessary also provides gliding actions for the entry of Certain letters, etc., corresponding to providing the desired set of Pinyins corresponding to the word, if there are more than one options of set of Pinyins, then the system combines all of words corresponding to all of the options and preferably, proposes the word having the highest priority to the user. If the proposed word is not the desired word, according to a first method, the user may provide a correction procedure to reduce the number of the corresponding Pinyins such that the system proposes another word to the user. According to a second method, the user may provide an alternative information regardless of the correction procedure such as navigating within a list of corresponding words and selecting one of them.

According to one embodiment of the invention, during the entry or correction procedure of the pinyin(s) of a word, the system selects the first Uncertain character of the predicted Pinyin(s). This is because the number of Pinyins in Chinese language are limited to several hundreds only and a letter of the (predicted) Pinyin(s) entered through the first keypad may have only one choice in a letter position within said Pinyin(s). Said letter in said position may be considered by the system as a Certain letter. After correcting the selected Uncertain letter (and said Pinyin), the system may select the next Uncertain letter within the predicted Pinyin(s) which may not be the following letter of said Pinyin(s).

Only the Symbols of the Selected Pinyin May be Shown to the User

According to one embodiment of the invention, after the Pinyin(s) is predicted by the system, the system may select and show only the (Hieroglyphic) words corresponding to the predicted Pinyin(s).

Selection on Opposite Side of the Screen

According to one embodiment of the invention, during the entry of a word, a swiping action provided on a predefined zone such as a first side of the screen may correspond to correction procedure of predicted Pinyin(s), and a swiping action provided on another predefined zone such as the opposite side of the screen may inform the system to propose/show to the user the (Hieroglyphic) words corresponding to the predicted Pinyin(s). The shown words may be of any kind. According to one method, when the user touches the screen on for example, said opposite side, the system may show a second keypad of the invention wherein each of at least some of its keys include one of said words. If the user's desired word is printed on one of said keys, the user may provide the corresponding swiping action with said finger on said side, if not, according to one method, the user may provide a predefined interaction such as a gliding action provided in direction of for example one of said keys informing the system to show another second keypad including at least some of the remaining words corresponding to the predicted Pinyin(s). And so on. Obviously, a predefined interaction such as a gliding action provided in direction of for example another key may inform the system to show the previous words second keypad.

Calibration

Different calibration procedures regarding defining the location of the dynamic first keypad of the invention have been described before. According to one embodiment of the invention before beginning to enter text on a location on the screen, the user may provide a predefined word such as the word "this" such that to touch four different locations on the screen. The system then may assign to base of said locations one of the (corresponding) keys of the keypad. If the user desires to enter said word then he continues typing if not according to one method he may provide a backspace. The system then may erase the world entered but will consider the locating of the four keys.

Standalone external KP able to be attached to any device

Figure 38A:
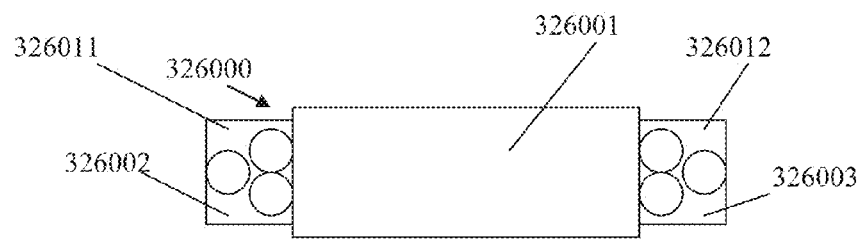
FIGS. 38A-38C are schematic illustration of a data entry unit to be attached to a corresponding device, in accordance with some exemplary embodiments of the invention.
Figure 38B:
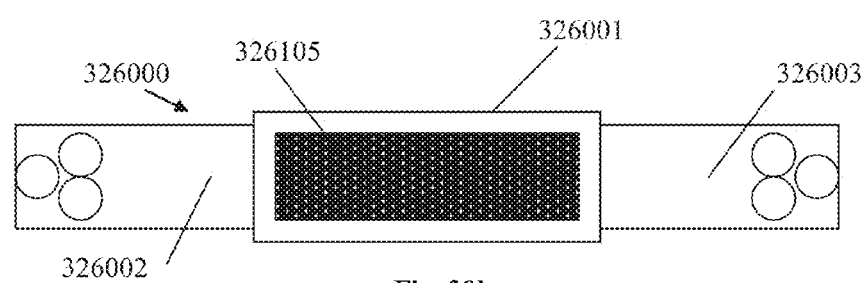
Figure 38C:
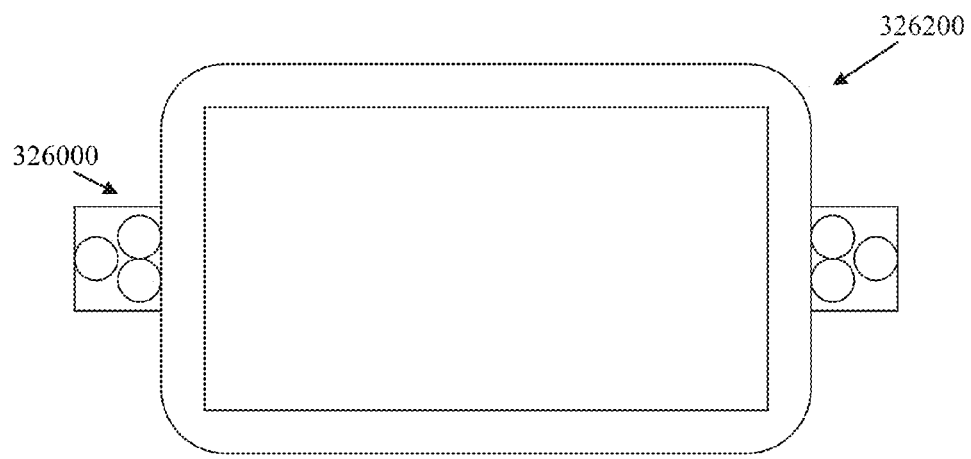

According to one embodiment of the invention, external first keypad of the invention having hard keys may be used with the system. in order to provide said such that to be used with any device without requiring device's hardware modification, said keys may be located on an external supporting hardware. As an example, FIG. 38a shows a supporting hardware 326000 in form of a bar wherein the split keypad of the invention having two portions 326011 and 326012, are located on opposite sides of the bar. Said bar may be extendable formed of several pieces 326001-326003. FIG. 38*b* shows said supporting hardware in extended position. Additionally said supporting hardware may also include an attaching mechanism such as a sticking hardware to stick a device on said supporting hardware. FIG. 38*c* shows a device such as a handset attached on the supporting hardware. The supporting hardware in this example is extended such that the keys of the split keys are extended from have side of the device.

Showing Characters Corresponding to a Key Press

Figure 39:
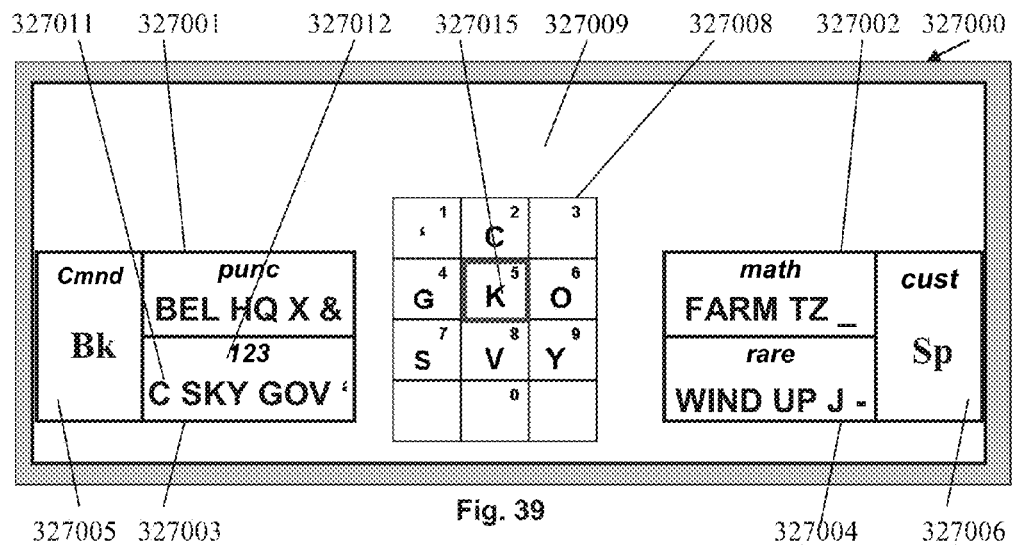
FIGS. 39-39E are schematic illustrations of a method of displaying the characters and functions on the second keypad, in accordance with some exemplary embodiments of the invention.
Figure 39A:
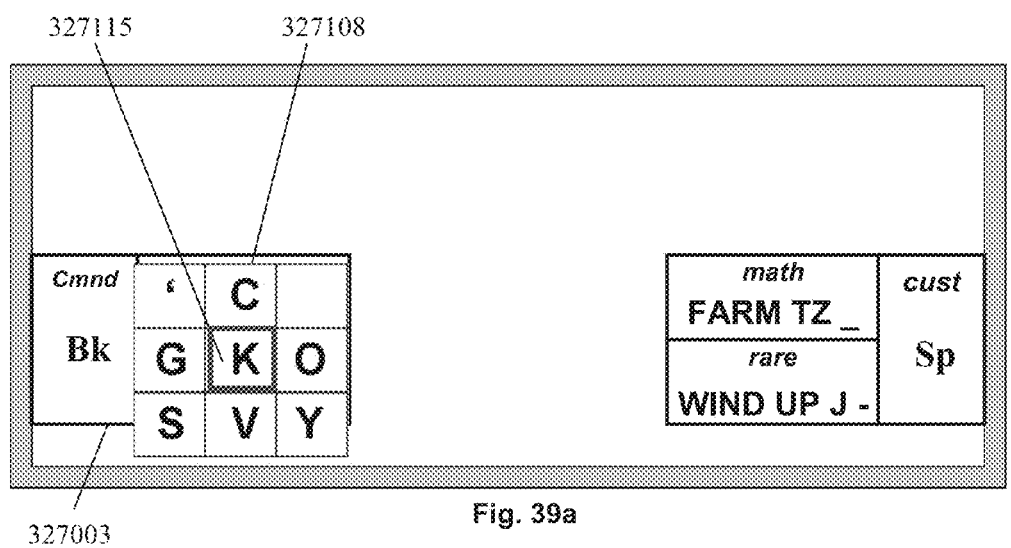

According to one embodiment of the invention, when a user touches a key of the first keypad, mainly/only the symbols (e.g. letters, special characters, functions, etc.), of that key in for example, normal and mode instances (e.g. similar to symbols assigned to Shifted and non-Shifted instance of the key of PC QWERTY keyboard), may be shown on the corresponding keys of the second keypad of the invention. As an example, FIG. 39 shows a device 327000 having the first keypad of the invention including the keys 327001-327006 wherein four of said keys 327001-327004 include letters. In this example the name of the mode instances are printed on the top of each key of the first keypad. After the user touches the key 327003 of the first keypad, the second keypad of the invention 327008 (e.g. also called "reference keypad") may change to mainly show the letters and the mode special characters (e.g. in this example, digits) of said key 327003 of the first keypad on the keys of the second keypad 327008. As shown in this example, each key of the second keypad 327008 shows at most one corresponding letter and/or one corresponding special character which in this example is a digit. For example, the center key 327015 has the letter "k" and the digit "5". This way the user can see his desired character on the second keypad before for example providing a desired gliding action. At this time preferably:

On one hand, if the user desires to enter a letter, as described earlier, he can provide a gliding action by his finger which is on the key of the first keypad. According to one method, immediately after staring the gliding action, knowing that the user intends to enter a Certain letter, the system provides a new second keypad of the invention having only the letters (e.g. preferably, in larger font) of that key of the first keypad of the invention under the finger of the user such that the center key of the second keypad positions under the fingertip of the user. This way the user can easily provide the appropriate gliding action in the correct direction without or with a minimum of mental effort. In the current example, as shown in FIG. 39*a*, when the user begins to move his finger on the key 327003 to for example provide an appropriate gliding action to enter a precise character, the system removes the reference/second keypad 327008 of FIG. 39 and replaces it by the new reference keypad 327108 having mainly/only the appropriate letters preferably with larger font. The center key 327115 of the reference keypad is preferably located under the user's fingertip. Now, for example, a beginner user of the system can easily provide his desired gliding action on the reference keypad 327108.

Figure 39B:
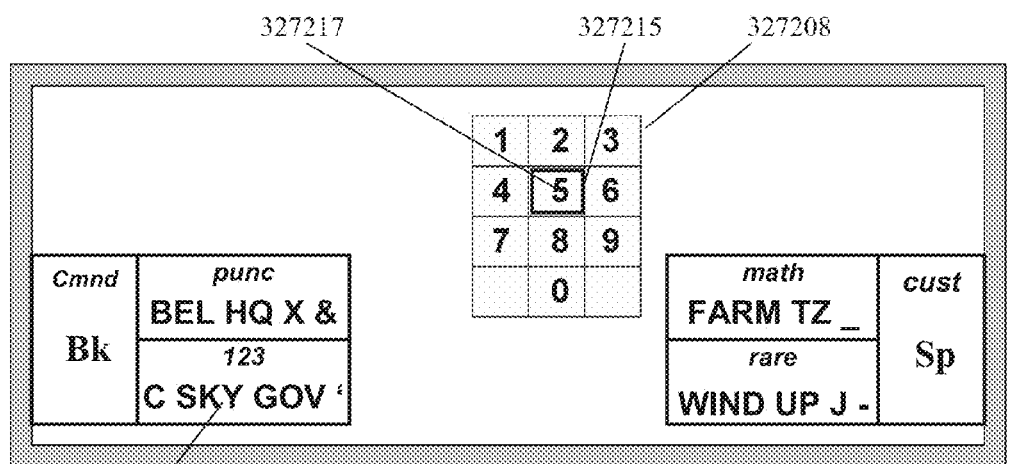

On the other hand, if the user desires to enter a special character, (e.g. while touching the key of the first keypad), preferably, with another finger, he may touch a location on the screen outside said key of the first keypad. At this time the system may show a new second/ reference keypad of the invention, having only/mainly symbols such as special characters of said key of the first keypad in mode instance (e.g. preferably, in larger font), under the finger of the user such that the center key of the second keypad positions under the fingertip of the user. This way the user can easily provide the appropriate gliding action in the correct direction. In the current example, as shown in FIG. 39*b*, while holding the key 327003, the user may touch a location 327217 of the screen and the system may redefine the second keypad of the invention 327208 such that to include only the digits, preferably with larger font, belonging to the mode instance interaction with the key 327003, and locates said second keypad under the finger of the user such that the center key 327215 locates under his fingertip. Now, for example, a beginner user of the system can easily provide his desired gliding action on the reference keypad.

In both cases described above, preferably, when the system shows the new second keypad, it removes the former second keypad from the screen.

In this embodiment, at the beginning the user can see his desired character on a second keypad which is far from his finger, therefore, he may know in advance the direction of the gliding action for his desired symbol. Then, by locating the second keypad under the user's finger, the system helps the user to provide his interaction (e.g. swipe) with more precision and with a minimum mental requirement.

Figure 39C:
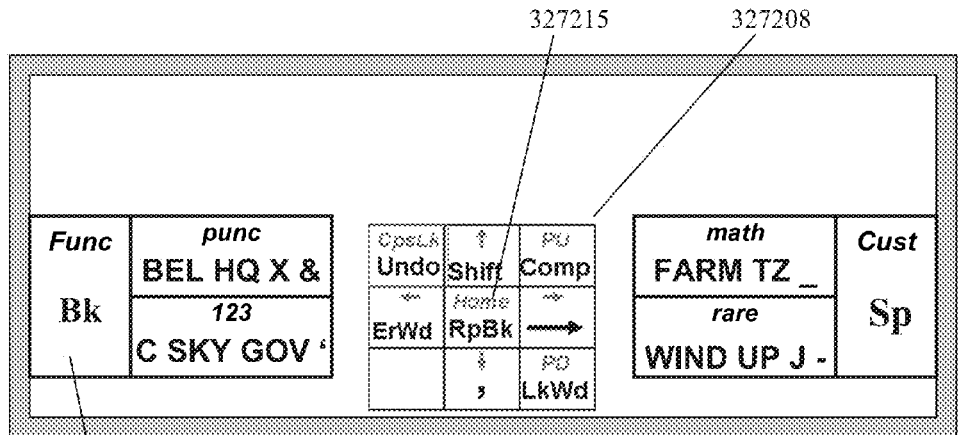

The current embodiment may be applied for the entry of any other symbol such as functions. In the current example, as shown in FIG. 39*c*, taping on the keys 327005 and 327006 may respectively provide Backspace function and Space character. As for the letter keys, to different types of interactions with the keys 327005 and 327006 different group of symbols such as standard and customized functions may respectively be assigned. As an example, if the user touches the key 327005, the reference keypad 327008 in a first (e.g. predefined) location 327215 such as the center of the screen may change to show the characters and functions that are assigned to said key in both normal and mode instance (e.g. similar to characters assigned to Shifted and non-Shifted instance of a key of PC QWERTY keyboard). As described for the letter keys, and shown in FIG. 39*d*:

on one hand, if the user glides his finger on said key 327005, the system may show under the user's finger 327415 a second keypad of the invention 327418 having the symbols of the key 327005 of the of the first keypad in normal (e.g. non-mode) instance. The user then may provide the desired gliding action as described for the letter keys.

on the other had, if the user (e.g. preferably with a second finger) touches a location 327425 on the screen outside the key 327005, then as described for the letter keys, the system may enter into the mode instance of the key 327005 and show on a new second keypad of the invention 327428 mainly/only the symbols that are assigned to said key 327005 in the mode instance. The center of said keypad 327428 preferably will be located under the fingertip of the user's second finger. The user then may provide the desired gliding action (e.g. with the second finger).

Figure 39D:
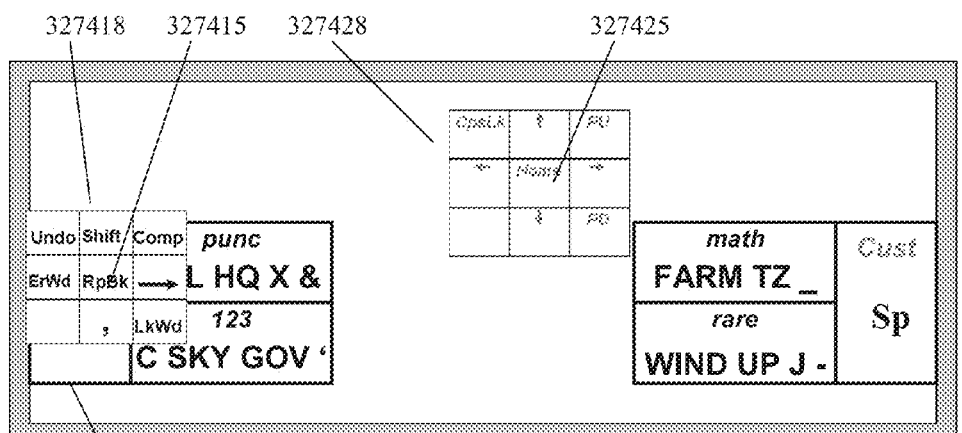
Figure 39E:
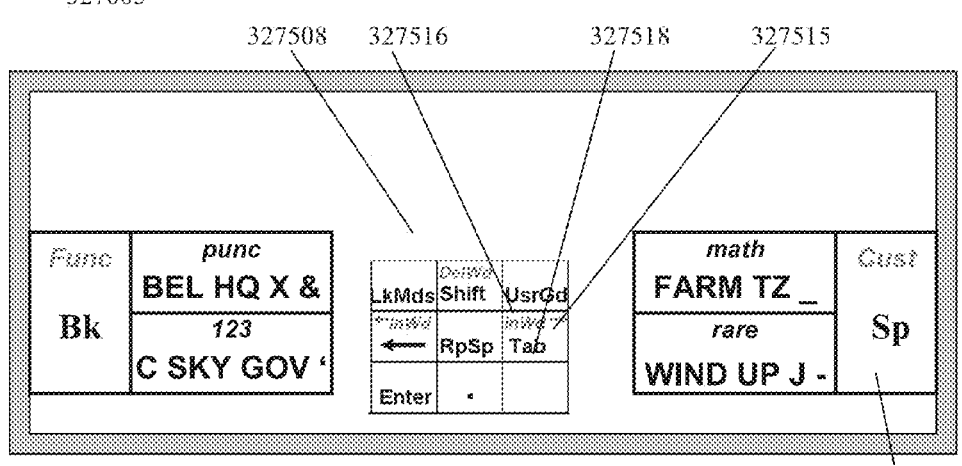

FIG. 39*e* shows the symbols such as characters and functions that are assigned to different types of interactions with the space key 327006. They may be entered as described for entering symbols of other keys of the first keypad. In this example, when the user touches the space keys 327006, the system shows a modified second keypad 327508 arranged in similar manner as described for other keys, wherein each key said keypad shows at most one symbol in non-mode instance and/or one symbol in mode instance related to the key

327006. For example, the key 327516 of the reference keypad 327508 relates to "Tab" function 327518 if the key 327006 is interacted in a non-mode manner (e.g. the user provides a corresponding gliding action departing from the key 327006), and said key 327516 relates to the In-Word function 327515 if the key 327006 is interacted in a mode instance manner (e.g. the user provides a corresponding gliding action departing from outside of the key 327006).

Current Letter Multiple Colors

According to one embodiment of the invention; at least in the current word each Uncertain character may be shown in the color or in the background color of its corresponding key of the first keypad and each Certain character may be represented by another color or background color such as grey color. The Uncertain character selected automatically by the system (e.g. the first Uncertain character of the word) or the Uncertain or Certain character selected manually by the user may be shown differently from other by for example using means of blinking and/or having larger font or background, etc.

Figure 40A:
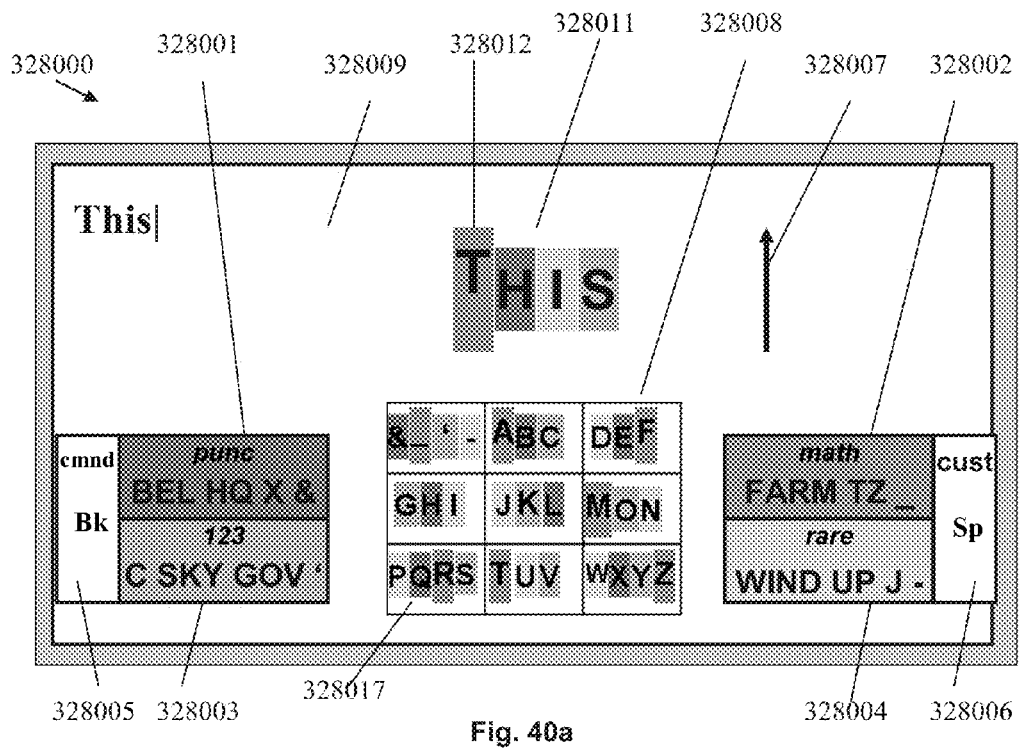
FIG. 40A-40B are schematic illustration of using colors for the current word, in accordance with some exemplary embodiments of the invention.

As an example, FIG. 40a, shows a device 328000 having a touch screen 328009 and the first keypad of the invention wherein each letter key has a different color. For example, the key 328001 is red, the key 328002 is green, the key 328003 is blue, and the key 328004 is yellow. In this example, when the user enters the word THIS 328011 by taping on the appropriate keys of the first keypad, the system shows each of the Uncertain letters of the current word 328011 with the background color of its corresponding key of the first keypad. Therefore, in this example, the letters T, H, I, S, have respectively, green, red, yellow, and blue, backgrounds. The first Uncertain letter T 328012 is selected by the system for further correction if needed and it is highlighted/blinking.

Preferably, the same character on the first and on the second keypad may have the same color or the same background color. For example, on the second keypad, the letters P, Q, R, and S, on the key 328017 may respectively have the background colors, yellow, red, green, and blue, which are the background colors of the same letters on the keys of the first keypad. Other letters of the second keypad may follow the same rule.

According to one embodiment of the invention, before the user begins to enter a word, the system may show the second keypad of the invention wherein preferably each of its letters has the color or the background color of its corresponding, key of the first keypad. Before entering a word those characters on the second keypad have preferably the same font and size (or have the same background size). When the user provides a current word, on the appropriate keys of the reference/second keypad the system may show the characters of the key of the first keypad corresponding to the first Uncertain letter in highlighted appearance. At the same time, said first Uncertain characters of the current word may be highlighted too. With the continuous description of the current embodiment, when the user desires to proceed to the correction procedure, he can see in advance, for example before touching the screen to provide an appropriate gliding action, all of the corresponding letters of the key relating to the highlighted Uncertain letter of the current word, in highlighted appearance on the reference keypad. Preferably, when the user touches the screen to provide the desired gliding action, the system shows the second keypad with only the appropriate letters under the user's finger as described before.

According to one method, each time the user touches a key of the first keypad, on the second keypad the system shows all of the corresponding letters in highlighted appearance. When the user releases said key, the system may preferably show, in highlighted appearance, the letters of the second keypad corresponding to the key of the first Uncertain letter (or selected letter) of the current word.

With continuous description of the current embodiment through FIG. 40a, during the entry of the word THIS in addition to the highlighted (green background of) the character T 328012, the system also may highlight (the green backgrounds of) the corresponding characters (e.g. _AFMRTZ) of the second/reference keypad 328011. When the user proceeds to the correction procedure of the invention by touching the screen, for example outside the keys of the first keypad, for providing the gliding action 328007, the system preferably, replaces the reference keypad 328008 by a new one (not shown) having only/mainly the corresponding characters of the key of first keypad relating to said Uncertain letter. Said new reference keypad may preferably be provided under the user's finger.

Figure 40B:
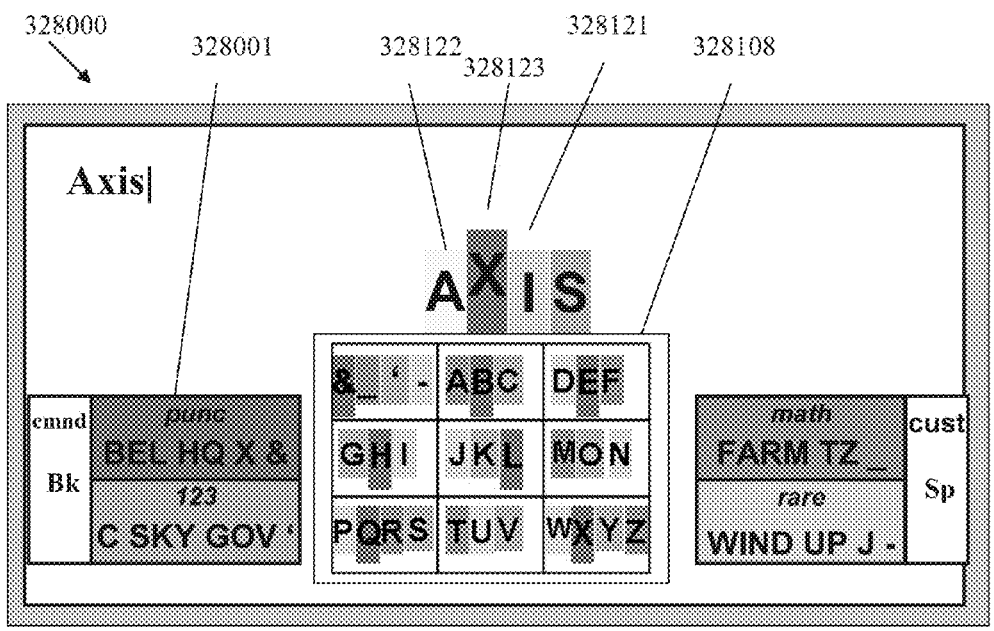

With continuous description of the current example, after the user provides the gliding action 328007, the system may replace the first Uncertain letter "T" 328012 of the current word THIS 328011, by a Certain letter "A" 328122 as shown in FIG. 40b, and' proposes another word "AXIS" 328121. The Certain letter 328122 has now another background color such as a grey background, and the next Uncertain character 328123 became highlighted, and preferably the letters (e.g. & BEHLQX) of its corresponding key 328001 of the first keypad, on the second keypad 328108 may preferably become highlighted According to one method, when the user uses the In-Word selection means manually to select a letter within a word for, for example, further correction, the system preferably shows the selected letter in highlighted (and/or blinking) appearance and shows it in the color of its corresponding key of the first keypad even if said letter is a Certain letter. If the user selects another letter of the word, then again said Certain letter will have his original Certain background color (e.g. a grey color).

According to one embodiment of the invention, instead of the gliding actions on the screen outside the keys of the first keypad, one virtual or hard key (e.g. an existing key such as the space key, or an additional key, may be assigned for the departure of the gliding actions relating the correction procedure. This way the system more easily distinguishes between the correction and mouse interactions on the screen.

According to one embodiment of the invention, a key or a predefined interaction such as a gliding action for example on or from a key may enter at least all of the letter keys of the first keypad into their mode instances. In this case, each gliding action departing from a (e.g. letter) key of the first keypad may correspond to its corresponding symbol in the corresponding mode of said key. According to one method, the next same predefined interaction may exit the at least letter keys from the mode instance.

On the keys of the second keypad in FIGS. 39c to 39e some customized functions assigned to the gliding actions on/from the Space and BackSpace keys are being printed in abbreviation. Hereafter the list of some of them and description of their function if needed (some of them are auto explicative:

| Comp | Word Completion | described before |
|---|---|---|
| ErWr | Erase Word | erases the word before the cursor in the text |
| RpBk | Repeat Backspace | |
| LkMds | Lock Modes | enters all of the letter keys into their mode instance |
| UsrGd | User Guide | |
| RpSp | Repeat Space | |

| | | |
|---|---|---|
| DelWd | Delete Word | Deletes word before the cursor from the dictionary |

Colors of the Current Word

According to one embodiment of the invention, in the current word presented to the user, the certain letters or their background may have a unique color (e.g. grey) being different than the color of any of the keys of the first keypad (e.g. different than red, green, blue, yellow). The selected uncertain character may have the color of its corresponding key. Other Uncertain letters may have a unique color or background color (e.g. light grey, white, etc.) being different from the colors of the certain letters and the selected Uncertain letter.

As mentioned throughout this application, providing a gliding action departing from a (e.g. letter) key of the first keypad may correspond to selecting a precise character of a predefined group of characters (letters) assigned to said key, and press (and holding) said key and providing a gliding action (e.g. in all of the zone, or in a predefined zone) outside said (e.g. letter) key on the screen may correspond to entering a corresponding character of another predefined group of characters (e.g. special characters such as digits 0-9, "NUMB" group) assigned to said key, or vise versus. Accordingly, a switching means or an interaction may be used to change the order of the assignment. For example, if each of the letters assigned to a key of the first keypad is designated to be entered precisely by providing a corresponding gliding action alone on or departing from said key, and each of the digits 0-9 assigned to said key is designated to be entered precisely by pressing (and holding) said key and providing a corresponding gliding action from a location outside said key, then by using said switching means this order my be reversed (e.g. back and forth). In this case and example, by using said switch once, each of the digits 0-9 assigned to said key will be designated to be entered precisely by providing a corresponding gliding action alone, on or departing from said key, and each of the letters assigned to said key will be designated to be entered precisely by pressing (and holding) said key and providing a corresponding gliding action from a (e.g. any or a predefined) location outside said key.

Correction on Sp/BkSp Key

According to one embodiment of the invention, the departing point of the gliding actions corresponding to the correction procedure of the invention is predefined to be provided on or from a predefined zone of a touch sensitive surface such as a (an on-screen) key (e.g. the Space key of the first keypad, its Backspace key, an added key, etc.). Said zone may also be a (e.g. all of the) zone between the split keys of the first keypad (e.g. on the screen).

Edit Functions in One Group

Figure 41A:
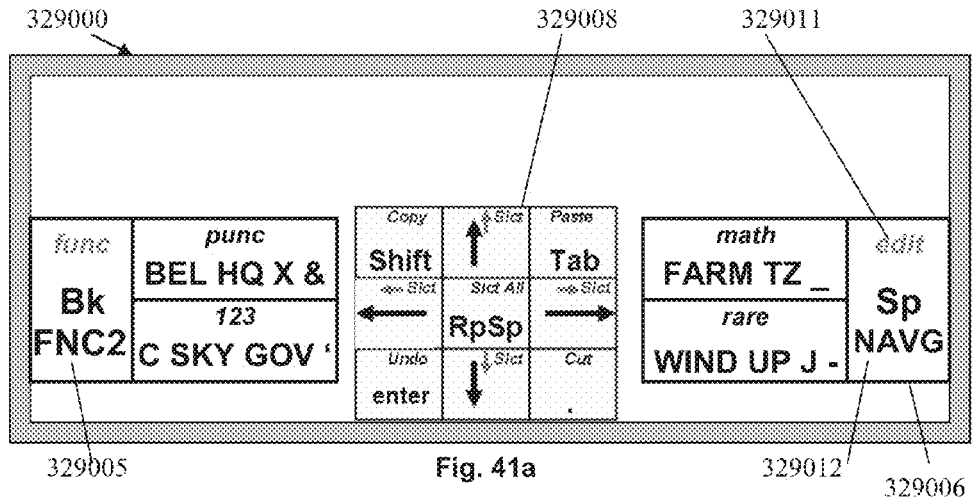
FIGS. 41A-41B are schematic illustration of the entry of functions, in accordance with some exemplary embodiments of the invention.

According to one embodiment of the invention, the system may include a group of symbols at least mainly including symbols of editing text such as select, copy, paste, etc. Said group may be assigned to a predefined type of interaction with a predefined key of preferably the first keypad. As an example, FIG. 41*a* shows device 329000 having the first keypad of the invention wherein different groups of symbols are assigned to different predefined types of interaction with the Space key 329006 of the first keypad. A first group is a group 329012 preferably called "NAVG" mainly including navigating symbols/functions. The name of each of the symbols of said group is printed on the bottom of each key of the reference keypad, In this example, in order to be entered, the symbols of NAVG group are assigned to providing corresponding gliding actions on or departing from the space key (e.g. the procedure of gliding actions from a key has been described in detail). The second group 329011 is a group preferably called "EDIT" mainly including text editing symbols/functions. The names of its symbols are printed on the top of each key of the reference keypad. In this example, in order to be entered, the symbols of EDIT group are assigned to pressing (e.g. and holding) the Space key and providing corresponding gliding actions outside the space key (e.g. the procedure of gliding actions in combination of pressing a key has been described in detail).

Figure 41B:
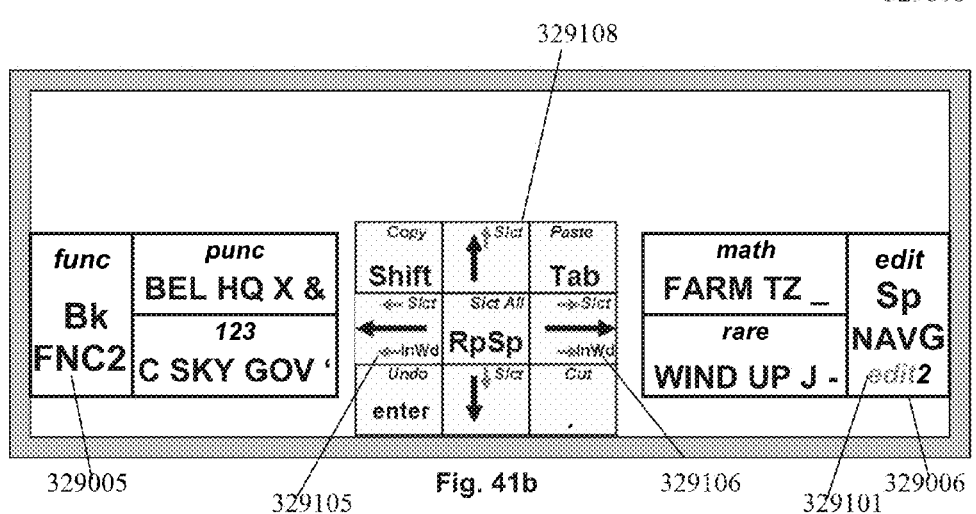

Additionally, other groups of symbols may be considered and be assigned to other type of interactions with the Space key. FIG. 41*b* shows two symbols 320105 and 329106 of such third group of symbols 329001 which their names are printed on the lower side of on the keys of the second keypad. As an example, entering a symbol 320105 of a third group of symbols 329101 may be assigned to pressing (e.g. and holding) the Space key 329006, and providing a corresponding gliding action on or departing from outside the Space key.

Fingers+Directions Blinking

Figure 42:
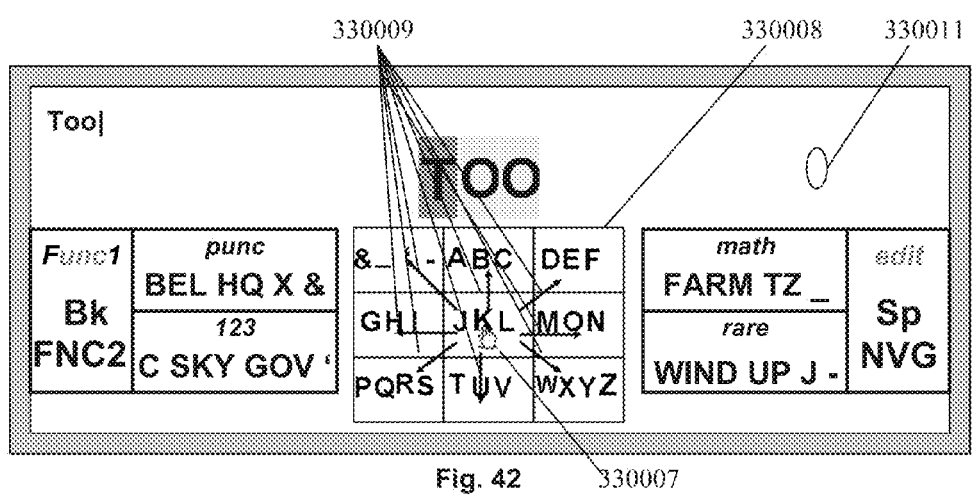
FIG. 42 is a schematic illustration of a method indicating the center of the second keypad, in accordance with an exemplary embodiment of the invention.

According to one embodiment of the invention, preferably if the center of the reference keypad is provided in a location other than the touching point of the user's finger with the touch sensitive surface, then the system may show an icon in form of a user's finger on the center key of said keypad and also show indicative arrows in the direction of the other keys from said center key to indicate to the user the parallel direction of his gliding action from said touching point towards the desired key as if the center key was under his fingertip. FIG. 42 shows as an example, a said touching point 330011, a said icon 330007, and said indicative arrows 330009.

According to one embodiment of the invention, at any moment the user may use a word already entered for modifying it. Said modification may be in different ways:

- if the user locates the cursor/caret at the end of an already entered word and enters new characters, said characters will be added as a new separate word at the end of said already entered word.
- if the user locates the cursor/caret at the end of an already entered word and provides a predefined interaction such as a press/gliding action on/from a key such as the backspace key informing the system to use said word, and enters new characters, then the system considers the characters of said already entered word as Certain characters of the beginning of a word including said new characters and behaves according to the principles of the data entry system of the invention when the user adds said new characters to said Certain characters.
- if the user selects an already entered word and provides a predefined interaction such as a (e.g. the same) press/gliding action on/from a key such as the backspace key informing the system to use said word, and enters new characters, then the system considers the characters of said already entered word as Uncertain characters of the beginning of a word including said new characters and behaves according to the principles of the data entry system of the invention when the user adds said new characters to said Uncertain characters.

Simplified Interface

Figure 43A:
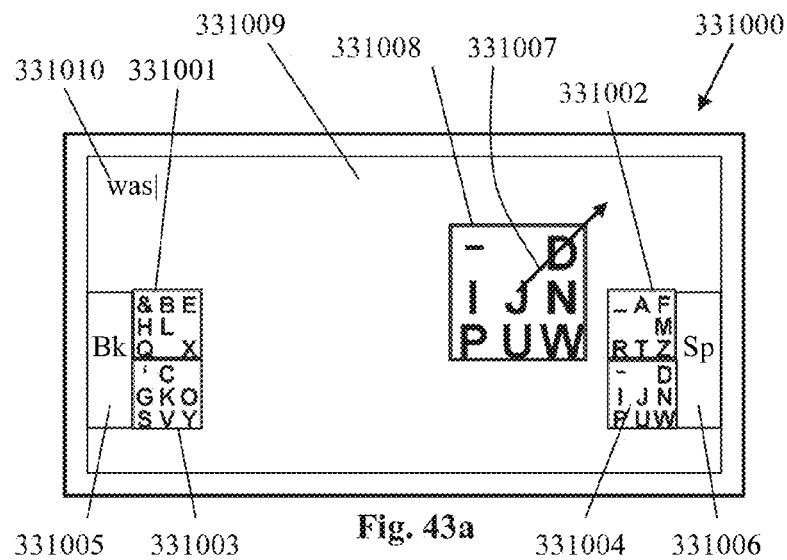
FIGS. 43A-43D are schematic illustration of simplified user interface, in accordance with an exemplary embodiment of the invention.

According to one embodiment of the invention, a simplified user interface based may be created for the data entry system of the invention. FIG. 43*a* shows as an example, a device 331000 having a touch screen 331009 and the first keypad of the invention similar to some of those described earlier having the letter keys 331001-331004, the backspace key 331005, and the space key 331006. In this example, there is no Reference keypad on the screen.

The letters of the alphabet distributed among each of the letter keys 331001-331004 of the first keypad of the invention may be printed on said key as was described earlier and shown through FIGS. 20-21, such that each letter occupies the same location relating to the other letters on said key, as it does with said letters on a standard telephone keypad.

As an example, after the user taps anywhere on the keys 331004, 331002, and 331003, the system may propose the word "was" 331010 having the highest priority among the words corresponding said tapping actions. If this is not the desired word, the user may proceed to the correction procedure of the invention by pressing preferably anywhere on the screen outside the keys of the first keypad. At this time, an (enlarged) copy 331008 of the key 331004 of the first keypad corresponding to the first Uncertain letter of the proposed word may locate under the user's finger such that its center key being under the user's fingertip. Said copy 331008 of the key 331004 may be enlarged enough such that the user be able to see at least some of the letters of that key around his finger. The user then slides/glides his finger toward the first character "d" of his desired word (e.g. in this example, the word "day") and the system may proposes the word "day" which in this example is the word with highest priority among the words corresponding the Certain character "d" just entered and the ambiguous tapping actions already provided on the keys 331002, 331003. After providing said gliding action, said copy 331008 of the key 331004 may disappear.

Figure 43B:
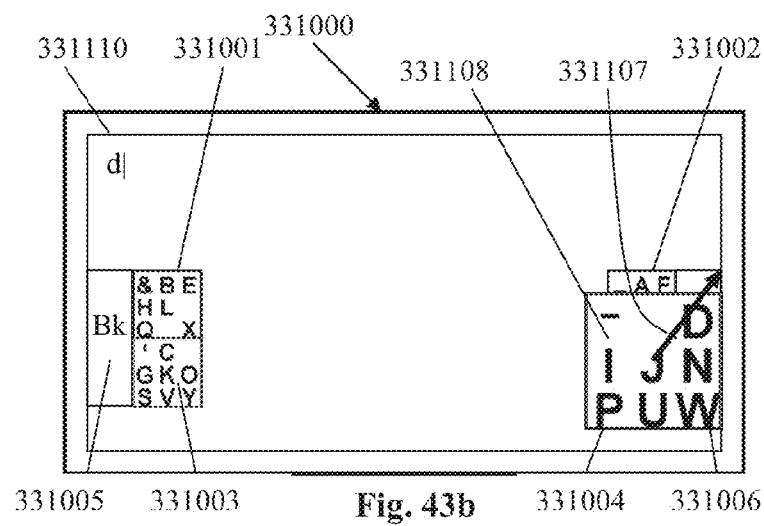

Accordingly, as described before, the user may also enter Certain characters/letters by providing gliding actions on or departing from a letter key of the first keypad. With continuous embodiment of the invention, as shown in FIG. 43b, as an example, if the user presses (e.g. and holds) on a key such as the key 331004, the system may preferably enlarge said key such that the center of said key being under the user's fingertip. At this time the user may provide a desired gliding action in the direction of a desired letter on said key to enter (insert) it precisely (at the cursor position in the current word). As an example, the user may provide the gliding action 331107 to enter the letter "d" precisely. He may then tap on the keys 331002, 331003, and the system may predict the word "day".

For entering a letter in the center of a key or on the center of its copy, the user may provide a slight gliding action for example upward.

Figure 43C:
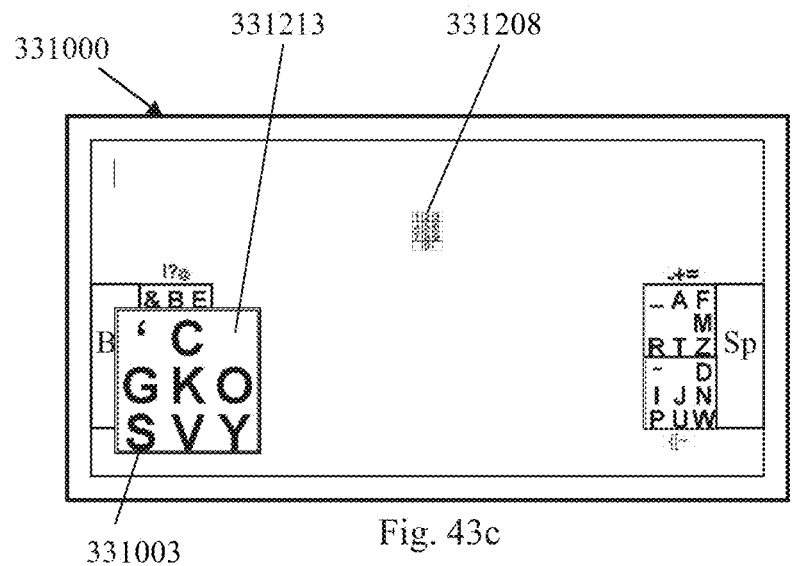
Figure 43D:
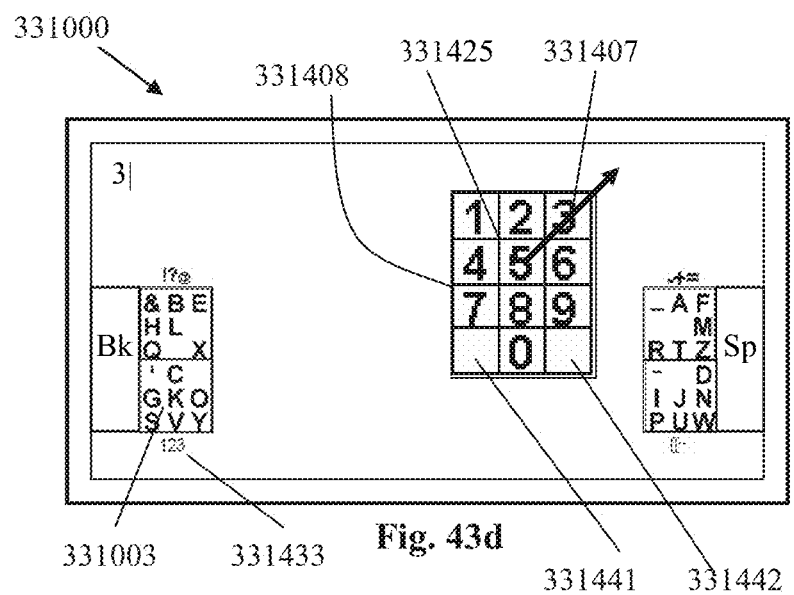

With continuous description of the current embodiment, according to one method, as shown in FIG. 43c, when user presses (e.g. and holds) on a key such as the key 331003 (hidden) of the (first) keypad of the device 331000, (e.g. in addition to enlarged picture 331213 of said key) the system may show an (a small) icon 331208 on the screen showing a copy of a picture of the second keypad of the invention preferably including the symbols of said key 331003 in the corresponding mode instance (e.g. said second keypad may be a picture wherein said symbols are arranged according to the arrangement of the keys of a telephone keypad). Then (preferably by holding said key 331003 in pressing position), as shown in FIG. 43d, if the user touches preferably anywhere on the screen with for example a second finger, the system may open an enlarged (picture of the) second keypad 331408 of the invention (e.g. enlarging that icon) in the corresponding mode (in this example, the NUMBER mode) and locates it under the user's second finger such that its center key 331425 may preferably locate under the use's fingertip. The user then may enter a desired symbol of said enlarged second keypad for example by providing a corresponding gliding action (in this example, 331407) as described throughout this application.

According to one method, after the user enters a symbol in a mode instance, the system continues to show said (picture of) the second keypad in that mode until the user provides an interaction with one of the keys of the first keypad. Meanwhile, the system remains in said mode instance and providing gliding actions on the screen may correspond to entering additional symbols of said mode.

According to one method, the name or some of the symbols of each mode instance (e.g. 331433) may be printed on or next to each key of the first keypad.

If the symbols of a mode instance include additional symbols, the user may provide a predefined interaction such as a long gliding action towards the lower right location 331442 of the (picture of the) second keypad and the system will print the next symbols of said mode instance on said or on a new (picture of the) second keypad, and so on. Providing a gliding action towards the lower left location 331441 may show the (picture of the) second keypad with the previous symbols.

As described before, same types of interaction applied with/on the letter keys may be provided with the space and backspace key, or maybe other additional keys if any. In the current embodiment, when the user presses (and holds) one of said keys, said key may be enlarged such that the center of the enlarged key being under the user's finger tip. The user then may provide a desired gliding action towards his desired symbol such as a special character or a function on said key. Similarly, when the user presses (and holds) one of said keys, in addition to enlarging said key, the system may show a (picture of the) second keypad of the invention on the screen relating to symbols assigned to mode key of said key. The user then may press (and hold) anywhere on the screen with a second finger and the system may locate an enlarged (picture of the) second telephone keypad under the user's finger wherein its center is under the user's fingertip. The user then may provide the desired gliding action based on principles described throughout this application.

It must be noted that a gliding action towards a symbol on a key from its center may end on said key or outside it.

Full Keyboard (QWERTY)

According to one embodiment of the invention, the letters on the keys of the first keypad may be distributed based on a standard keyboard (e.g. QWERTY) layout. Accordingly, the letters on the keys of the second keypad preferably may be arranged such that a keys of the first keypad and a keys of the second keypad have at most one common character.

Figure 44A:
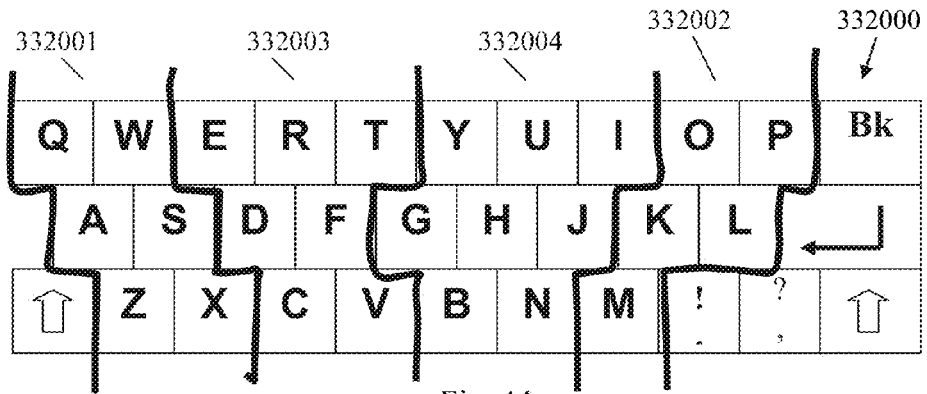
FIGS. 44A-44C are schematic illustration of QWERTY-based letter layout of the keys of the first keypad, in accordance with an exemplary embodiment of the invention.
Figure 44B:
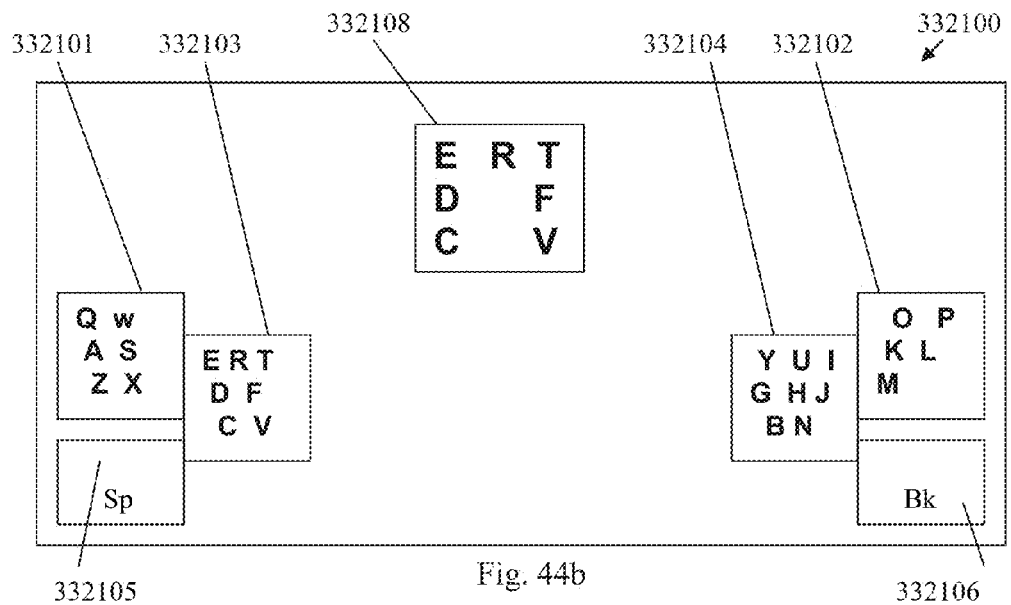
Figure 44C:
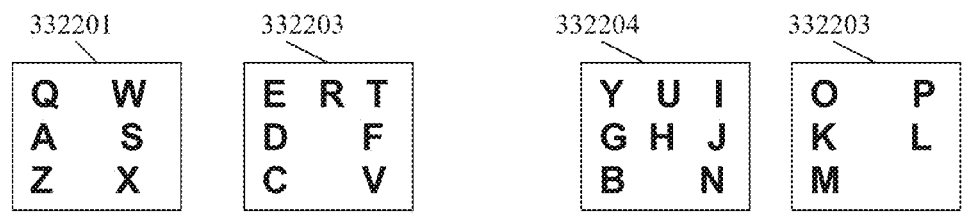

As an example, FIG. 44 shoes a QWERTY keyboard 332000 wherein its letter keys are divided into four groups 331001-331004. Each of said groups of letters may be assigned to one of the keys of the first keypad of a device 332100 as shown in FIG. 44b wherein each of the four keys of the first keypad 332101-332104 has one of said groups of letters 332001-332004, respectively. During the correction procedure of the invention or during the inserting precise characters the letters on the corresponding second keypad instance (e.g. 332108) of a key (e.g. 332103) of the first keypad may be arranged slightly differently to facilitate showing the direction of the gliding movements direction of the user's finger on the screen. FIG. 44c, shows as an example the arrangement of the letters on the second keypad in each correction instance 332201-332204 of the four keys 33101-332104 of the first keypad.

It must be noted that any other kind of division of the letters based the QWERTY arrangement or others may be considered. For example, M and N can be in the group 332002. Also, the letters on the keys of the second keypad may have other configurations preferably as long as they respect the principles of the system.

Different Input Signals for Different Interactions

Providing a gliding action from any point on the screen towards a first predefined direction preferably provides a first input signal, and providing a gliding action from any point on the screen in a second predefined direction preferably provides a second (different) input signal. As described in this and other patent applications filed by this inventor, said input signals may correspond to interacting with appropriate keys/zones on the screen, or of an imaginary keypad model.

According to one method, two gliding actions in a same direction provided differently such as with different gliding lengths, or with different level of pressure on the screen, etc., may correspond to two different input signals.

It must be noted, that during the correction procedure, an instance of the second keypad of the invention including the letters of its corresponding key of the first keypad may appear on the screen. Obviously, a gliding action in the same direction in another instance of the second keypad of the invention corresponding to interaction with another key of the first keypad may correspond to another letter assigned to that gliding action. As described, an input signal of the first keypad and an input signal of the second keypad may have several letters assigned to each of them preferably such that they have at most one character in common.

Selecting a Letter in Current Word Manually (for Correction)

According to one embodiment of the invention, a character of a word (e.g. of the current word) may manually be selected for being corrected. Preferably, the corresponding word of that character may be/become enlarged such that the user can easily select that character. Based on the correction procedure type, said letter may be replaced using the first and/or the second keypad keys. These procedures have been described before.

Complex Words as a Word (e.g. Email Address)

According to one embodiment of the invention, some of the words of the database may include at least some characters such as @ and dot. Said characters may be assigned to both the keys of the first and the second keypad of the invention. This way, email addresses and URLs may form a word of the dictionary of the system and may be entered through the word predictive system of the invention.

Calibration

Figure 45:
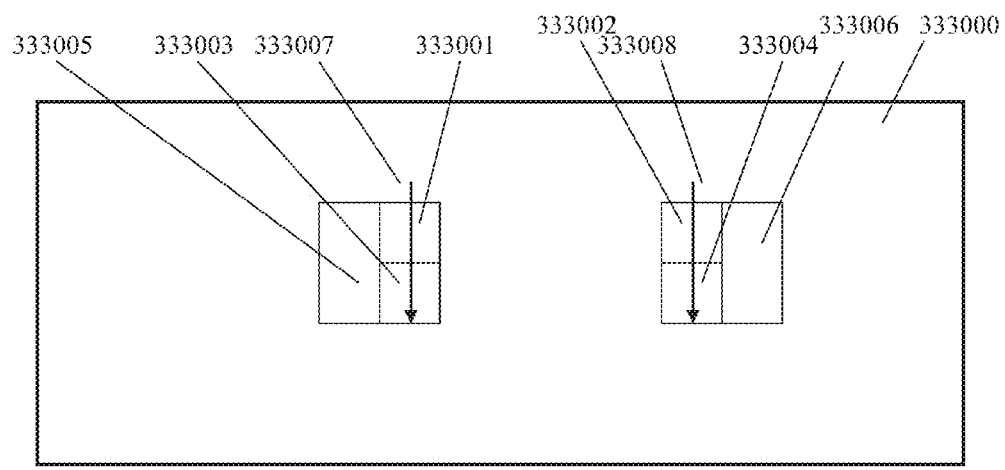
FIG. 45 is a schematic illustration of a key calibration method, in accordance with an exemplary embodiment of the invention.

According to one embodiment of the invention, the system may include a method of calibrating the keys of the (firs)t keypad. The user may provide two (parallel) straight lines, preferably vertically and preferably simultaneously, with two of his fingers (e.g. two thumbs) on the screen. The system will dynamically allocate a pair of zones defining a pair of keys on and/or around each of said lines to define the location of the four letter keys of the first keypad. The system may also define one key on the side of each of said pair of keys, for example, relating the space and backspace keys of the first keypad of the invention. FIG. 45 shows as an example, a touch screen 333000 wherein the user provides two straight line 333007, 333008, as described above and wherein the system allocates the appropriate keys 333001-333006 as just described.

Frames to Find Letters (of $1^{st}$ KP)

Figure 46:
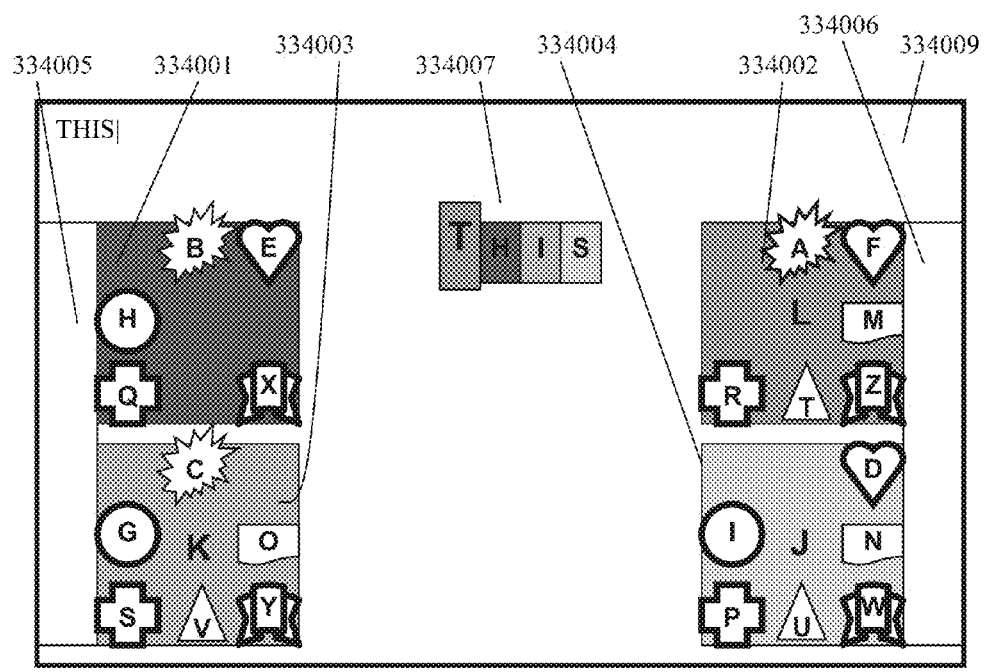

In order to quickly find and memorize the location of the letters of the first and/or second keypad of the invention, each of the letters of the first keypad relating to a group of characters of a key of the second keypad may be shown in a similar frame being different from the frames of each of the letters of the group of the characters of other letter keys of the second keypad. As an example, as shown in FIG. 46, each of the letters "ABC" (which are assigned to the same key of the second keypad of the invention (e.g. a telephone-type keypad)) on the keys 334002, 334001, 334003, of the first keypad has a similar frame which is different from the frames of the other letters. Same applies to the other groups of letters of the keys of the second keypad. (e.g. "DEF", "MON", etc.). In this example, the letters of the center key of the second keypad (JKL) on the keys of the first keypad do not have a frame.

According to one embodiment of the invention, each of the ambiguous letters of the current word 334007 may have the background color of its appropriate key of the first keys pad, and preferably a precise letter of the current word may have another background color preferably the white color.

Subjects to Find Letters (of the $1^{st}$ KP)

In order to help a beginner user to quickly beginning typing on the keys of the system, according to one embodiment of the invention, the characters of each of the keys of preferably the first keypad may define one of the items/subject of a different group of items/subjects having at least one common characteristic. For example, said groups may be the title of the songs, name of the movies, names of animals, name of the cities, etc. preferable, each of the keys may be designed and/or shown in a form factor in a manner to reflect the characteristic of its corresponding group. For example, the key of the names of a group of animals may be the image of an animal Preferably, each of the keys may have a different color or background color as described before.

According to one embodiment, the user can define his own groups of subjects for each key and design the appearance of the appropriate key on the screen. For example, one of said groups may be the name of the friends of the user each beginning with one of the characters of the corresponding key. As such, the user may define his own groups for each of the keys such that to faster memorize the distribution of letters on the keys (e.g. of the first keypad).

According to one embodiment of the invention, each time the user presses one of the keys a sound relating to one of the elements of that key or a sound representing the characteristics of that key may be played by the system. For example, if the corresponding group of a key is the titles of the songs, each time the use presses that key, a short music may be played.

Preferably, the appellation of the characteristic of the group may be one of the elements of the group.

Figure 47A:
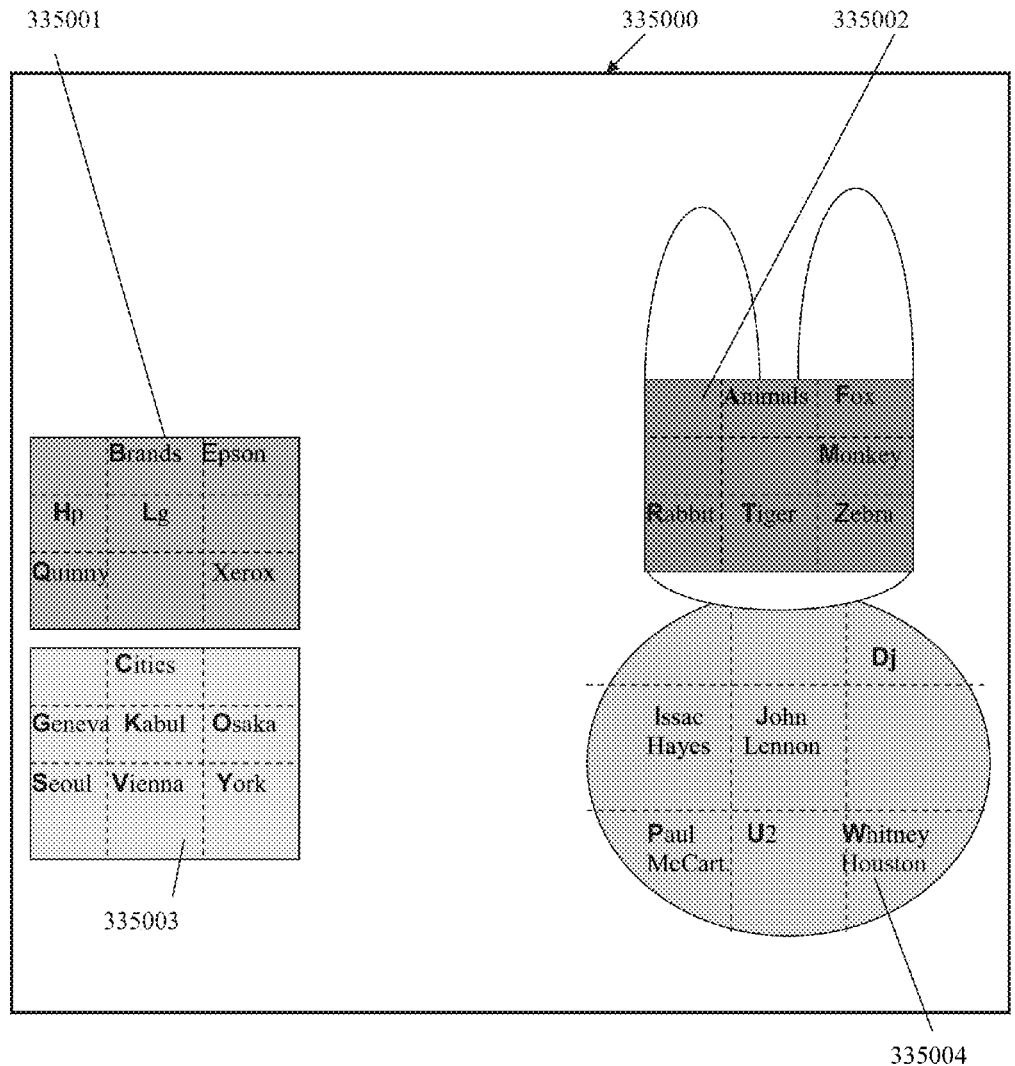

FIG. 47a, shows as an example, the four letter keys of the system 335001-335004, wherein each representing the a corresponding group of items as just described. Some of the keys such as the key 335002, and the key 335004, are represented with a background, respectively of a reabbit and a CD, reminding the corresponding group. In this example, each of the letters of the key 335001 represent the beginning letter of a brand name. In this example, the appellation (e.g. "Brand") is one of the elements of that group. Accordingly, each of the letters of the key 335002 represent the beginning letter of the names of some animals, each of the letters of the key 335003 represent the beginning letter of a city name, and each of the letters of the key 335004 represent the beginning letter of the name of a singer or a music group. In this example, the name of the group is DJ and it is one of the elements of the group which relates to that group because that group reminds music.

Japanese

The data entry system of the invention can be applied to all of the languages based on letter alphabets or phonetic alphabets. It can be applied to Roman-based languages and the languages such as Korean, Chinese, Japanese, Hundu, etc.

As an example, a word in Korean language is composed of one or more Hanguls which are entered by entering Jamos.

Usually, each Hangul is composed more that one Jamos. Jamos may be considered similar to the letters and be distributed on the keys of the first and the second keypad based on the principles of the system. Preferably, an end-of-the-word-signal may be provided at the end of the entry of a word.

According to one method, words in Japanese language may be entered based on their phonetic alphabets through an English/roman keyboard (e.g. Romaji). In this case, as for the Pinyins in the Chinese language, the user can enter portions of a word until it ends entering the word. He may either provide According to one method, during the entry of the word, the system may print on the screen the corresponding Roman characters he is entering and/or predicted by the system. The user may correct the predicted word/portion of the word, if desired.

If the corresponding Japanese word (or a portion of the word) proposed based on the Roman characters is not the desired word, the user may select another word for example as described for the Chinese language.

According to one embodiment of the invention, each time the user presses a key of the first keypad, the key enlarges and shows an image of the reference keypad of the invention on that key so that the user can easier find his next desired letter and its corresponding key. According to one method, the pressed key will remain enlarged until the user interacts with another key.

It must be noted that the examples of groups, the name. shape, etc, have been shown only to describe the embodiments. Other groups, shapes, ideas based thereon can be considered by people skilled in the art. For example, the items corresponding to the letters of a key may not be written. According to another method, the items may be printed bt pictures. For example, instead of writing the name of an animal, its picture may be entered on the key.

Portion of a Word

According to one embodiment of the invention, a predefined interaction with a key (of the first keypad) may correspond to entering a (e.g. an ambiguous) portion-of-word/stem. Preferably, said interaction may correspond to any of both, a precise character of a word or a (an ambiguous) portion of a word preferably beginning with said precise character. The portion-of-a-words/stems and their assignment to the appropriate keys has been described in previous patent applications filed by this inventor. As an example, the portion-of-a-words/stems beginning with a same character may generally be assigned to the key to which said character is assigned.

According to one embodiment of the invention, a word can be entered by combining different types of interactions such as taping actions on and/or gliding actions on or departing from each of the keys of the first keypad. According to one method, the predictive system may relate the taping actions ambiguously to the characters on the corresponding keys, and may relate the gliding actions to either precise characters or (ambiguous) portions-of-a-word assigned to said keys. The system then may consider those interactions to the related letters and/or portions and may propose/predict one or more words to the user.

According to one method, preferably, part of a word including some of the characters such the (few) beginning characters of a word may be entered by taping on the corresponding keys, and the other portions of that word may be entered by providing gliding actions corresponding to the beginning character of each of said other portions. It is understood that the part of the word entered character by character by taping actions provided on the ambiguous keys may also be any other part of the word such as the middle or end part, and the other portions may be entered by the gliding actions.

As an example, by considering the letter keys 331001-331004 of the first keypad of FIG. 43a, in order to enter the word "revolution", represented in the database as "re-vo-lution", the user may first provide the ambiguous key presses corresponding to the beginning letters "revo", and then provide the gliding actions on or departing from the appropriate keys for entering precisely the characters "l" and "t", respectively the beginning characters of the portions "lu", and "tion". By considering ambiguous key presses corresponding to those letters followed by the precise letters "l" and "t", the system may on one hand search for a word that begins with those ambiguous characters and ends by said precise characters. The system on the other hand may also search for a word that begins with said ambiguous characters followed by two (ambiguous) portions that begin with said two precise characters. According to one embodiment, the system may propose the word having the highest priority among the words selected by the system in both cases. In this example, the word "revolution", may be proposed by the system.

In the embodiments above, the correction procedure of the system may correct the letters as usual according to the principles of the correction procedure, and the system may change the proposed word to another as described above. According to one method, proposed word may be based on all of the user's interactions corresponding to entering a word including ambiguous key presses, precise characters, and precise or ambiguous portions entered by the user.

Location of Letters Based on Shape Characteristics

The embodiment just described, may be useful for entering long words with few key interactions but with very high accuracy. It can also help people that are not sure about the spelling of a word, and also reduces the output fluctuations while entering long words through word predictive systems.

Words in the dictionary may be arranged based on portions that are divided by a separator type such as a special character.

According to one method, a precise character and a portion of word beginning with that character may be assigned to two different input-signals/key-interactions.

If each of one or more of the keys of a keyboard has only one character assigned to a pressing action on it (e.g. such as a QWERTY keyboard), then, according to one embodiment of the invention, a pressing action on one such key may correspond to that character precisely and another type of interaction such as a gliding action on or departing from said key may (ambiguously) correspond to a portion of a word for example beginning with said letter as described above. If said key if a key of an on-screen (e.g. QWERTY) keyboard, then, depending on the accuracy of the location of the finger's impact of a pressing action on said key, the system may relate said pressing action precisely to said letter assigned to said pressing action on said key or it may relate said pressing action ambiguous to a group of characters including said letter and/or any of the letters assigned to pressing on the keys adjacent to said key and/or said impact.

According to one method, the word database may be arranged on a portion-based for each word. According to one method, said portions may be defined based on the syllables of the word, or according to any other predefined word dividing principles into portions known by people skilled in the art.

One of the factors of distribution and arrangement of the letters of the keys of the first keypad that may be considered is a method of distribution such that at least the beginner user can easily find his desired letter on a corresponding key. According to one embodiment of the invention, the letters may be grouped in a number of (e.g. four) different groups such that letters of each group generally/substantially have a resembling appearance characteristic of at least a portion of them (e.g. a portion of the letters of a corresponding group in their capital font). As an example, letters of a Roman alphabet (e.g. English) may be grouped in four groups and each of said groups being assigned to a different key of the four letters keys of the first keypad of the invention. Preferably, the letters are distributed on the keys of the first keypad based on the principles of the data entry system of the invention. For example, the letters on a key of first keypad and the letters on a key of the second keypad have preferably at most one common letter in common.

Figure 48:
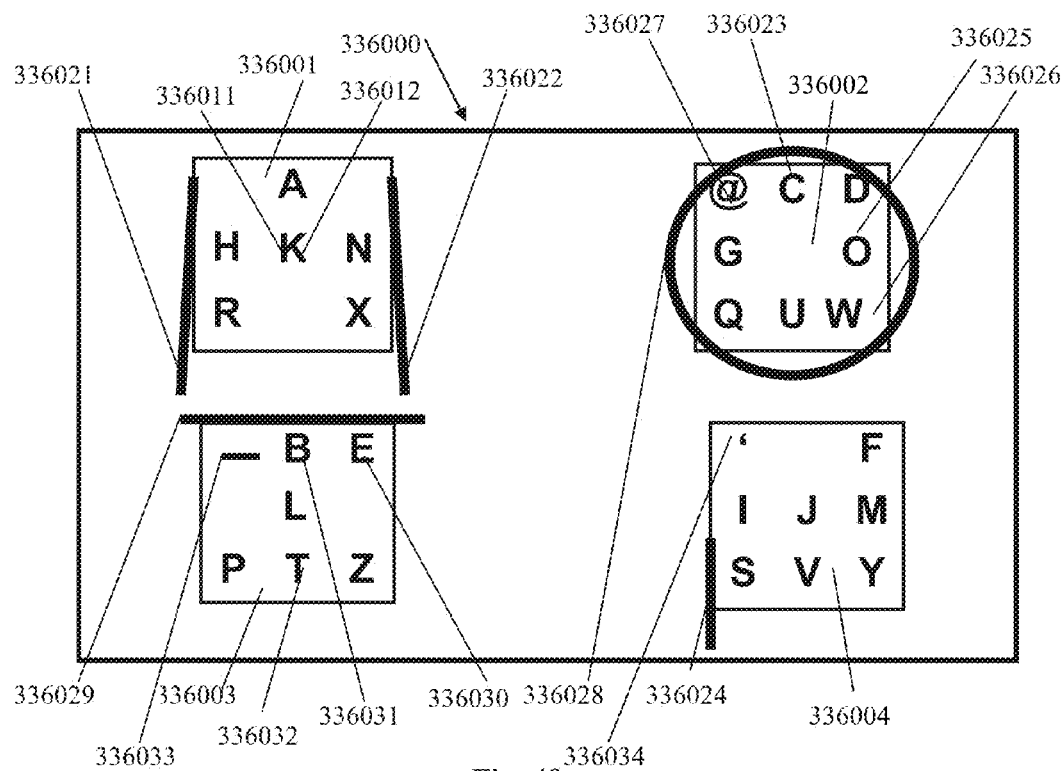
FIGS. 48-50D are schematic illustrations of shape-based letter arrangement on the keys and different methods of insertion and correction, in accordance with some exemplary embodiments of the invention.

As an example, FIG. 48 shows four letter keys 336001-336004 of a device 336000, wherein each of said keys ambiguously represents several letters of the alphabet based on the similar appearance of a portion of each of said letters as described. As an example, each of the letters "AHKNRX" which are assigned to the key 336001 have two legs (e.g. if they were objects to stand on a surface, they would have had two touching point on that surface). For example, letter "K" has two legs 336011, 336012. In this example, a second group of letters is assigned to the key 336002. Each of the letters of this group has the characteristic in which it has substantially the form of a complete (e.g. 336025) or non-complete (e.g. 336023) circle. In this example, this group has an exception because the letter "W" 336026 which has 2 legs is assigned to the key 336002 because there was no place for that character in the previous group wherein the character "X" which also has two legs was assigned to it. By considering a telephone-type keypad as the second keypad of the invention, letters "X" and "W" preferably should not be assigned to a same key as described before because they are on the same key of the telephone keypad.

With continuous description of the current embodiment, a third group of letters is assigned to the key 336003. Each of the letters of this group has the characteristic in which a horizontal line constitutes a portion of its shape. In this example, a fourth group of letters is assigned to the key 336004. Letters of this group have a common characteristic in which if they were objects to stand on a surface, they would have had other than two touching point on that surface. In addition they do not have the form of a circle and substantially non of them has a horizontal lined portion except the letter "F". In this example, all of those letters have one touching point, except the letter "M" which has three touching points. In this example, character "F" could have been assigned to the previous key 336003, but because the letter "E" was assigned to that key 336003, character "F" is assigned to the current key 336004.

It must be noted that each of some special characters used as a portion of a word may also be assigned to a key of the first keypad wherein its letters have a similar characteristic with that special character. For example, character "@" 336027 may be assigned to the key 336002, character "-" 336033 may be assigned to the key 336003, etc.

According to one method, each of the keys of the first keypad may have a shape to remind its group of letters. For example, the key 336001 itself may have two legs 336021, 336022, and the key 336002 may have a circle 336028 or itself being a circle, etc.

The arrangement of letters according to this embodiment may result in slightly lower accuracy of prediction by the system when entering word only through ambiguous key presses, but it has clearly a faster learning curve for memorizing/finding a letter on a key therefore resulting in faster data entry system and adoption of the system by the beginners. Once the user gets used to the data entry system of the invention and sees its merits, he may then switch to another letter arrangement on the keys of the first keypad with higher accuracy as described and shown before.

Figure 49:
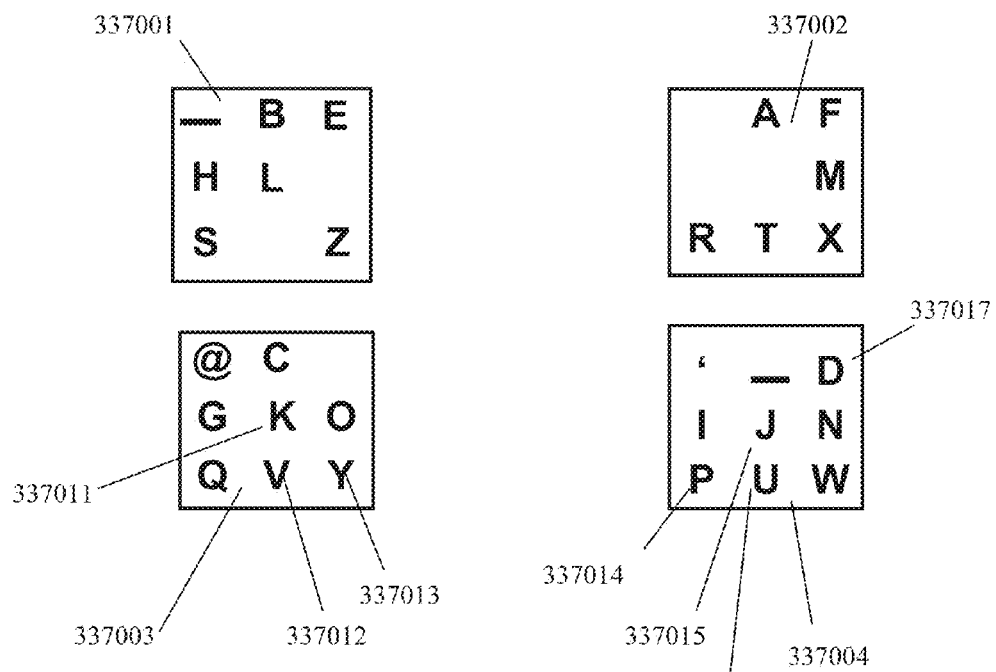

According to one embodiment of the invention, combined different characteristics may also be used to find/memorize a letter assigned to a key. As an example, FIG. 49 shows the four letter keys 337001-337004 of the first keypad wherein the letters are assigned to those keys based on different characteristics. For example, each of the letters of the group of letters assigned to the key 337001 have the characteristic in which a horizontal line constitutes a portion of its shape, except the letter "S". The characteristic of the letters assigned to the second key 337002 are in which that it forms two words "FARM", and "TX" (e.g. "Texas"). The key may have green color therefore user can easily remember those words/letters. In this example the third letter key 337003 includes all of the letters forming complete and non-completer circles. It also includes letters that at least a portion of them resembles to the letter "V" (e.g. "Y", "V", "K"). The fourth key 337004 includes other letters that a portion of the is non-complete circle and straight line(s). It also includes the letters "D" and "J", remembering DJ. The key may have the shape of a disc. In this example, the user has more freedom to assign the letters to the keys such that the accuracy of the text entry based on ambiguous key presses being very high.

It must be noted that the characteristics such as similar appearance of portions of the letters, number of group of characters/letters, number of keys to which said groups are assigned, and the methods of assignments to the keys may be considered differently be people skilled in the art, and the examples shown and described in the embodiments above are used for description of the principles only.

According to one embodiment of the invention, instead of assigning the group of letters to the keys as described above, the user may provide four different finger gestures such as ∧ ○ ⇀ ⌊ on a surface or in the air. As such the word predictive system may relate each of said gestures to its corresponding group of characters as shown and described before and predicts a corresponding word. For example, by considering the first keypad of the invention of FIG. 48, providing gestures ⇀ ∧ ⌊⌊ may provide the word "this".

Figure 50A:
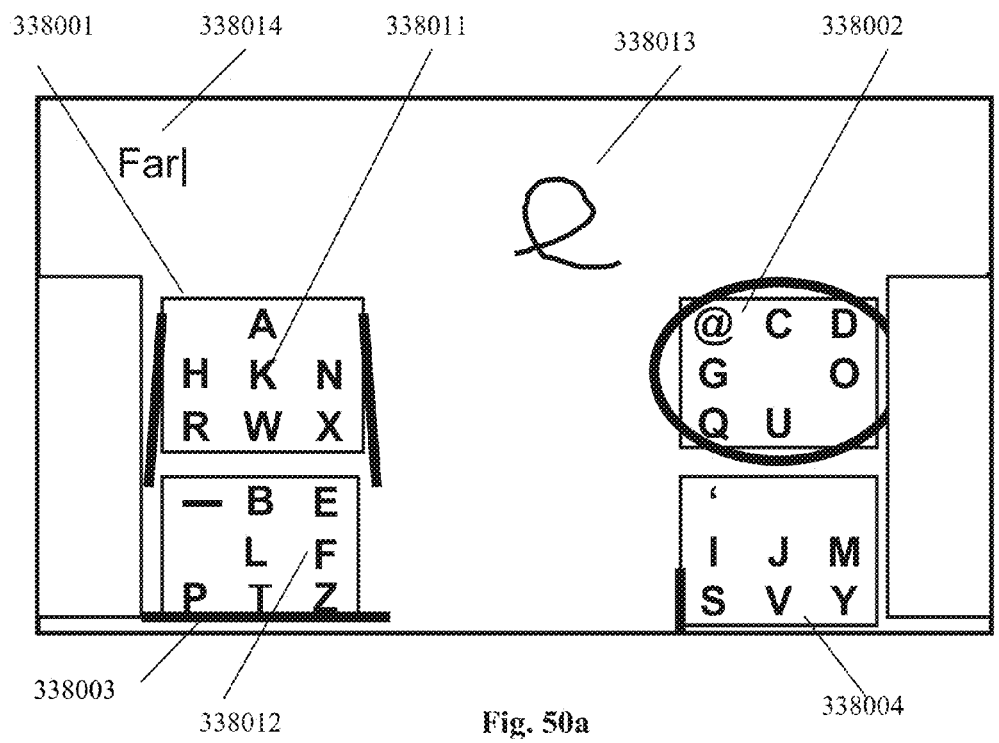

FIG. 50*a* shows a slightly different arrangement of the letters of the alphabet on the keys of the of the (first) keypad based of on principles described before compared to their arrangement on the keys of the (first) keypad of FIG. 48. In this example, letter "W" 338011 is moved to the key 338001, and the letter "F" 338012 is moved to the key 338003. Now, all of the letters of the key 338001 have two touching point on an imaginary surface if they were objects standing on said surface (e.g. each of them has two legs), all of the letters of the key 338002 have the shape of a complete or non complete circle, all of the letters of the key 338003 have a horizontal-lined portion, and each of all of the letters of the key 338004 has a number of touching point on the imaginary surface which is different than two touching points (e.g. letter "M" has three touching points and all others have one touching point). In this example, if the second keypad of the invention is a telephone-type keypad then the letters W and X, which are on the same key of the telephone keypad and also on the same key of 338001 of the first keypad may be ambiguous when the user provides a corresponding gliding action in order to enter a precise letter during the Correction procedure or during the Insertion procedure. In this case, according to one method, the user may shorter or longer gliding actions in the same direction for entering respectively one of said letters.

According to another method, the second keypad may be considered as being any type of known or customized keypad.

Figure 50B:
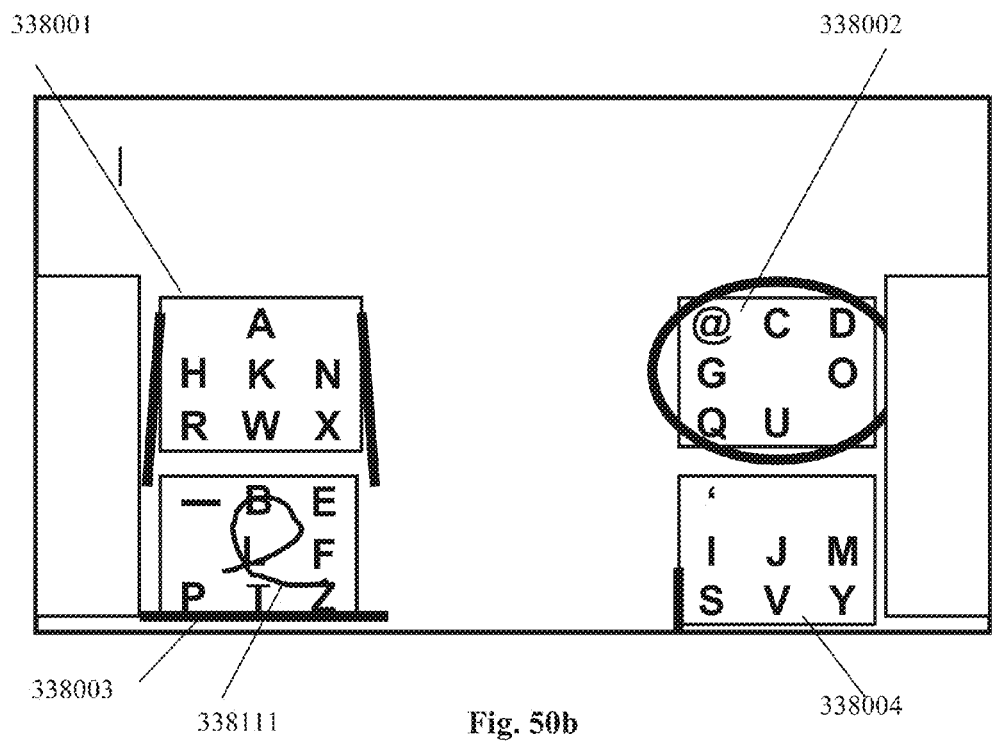
Figure 50C:
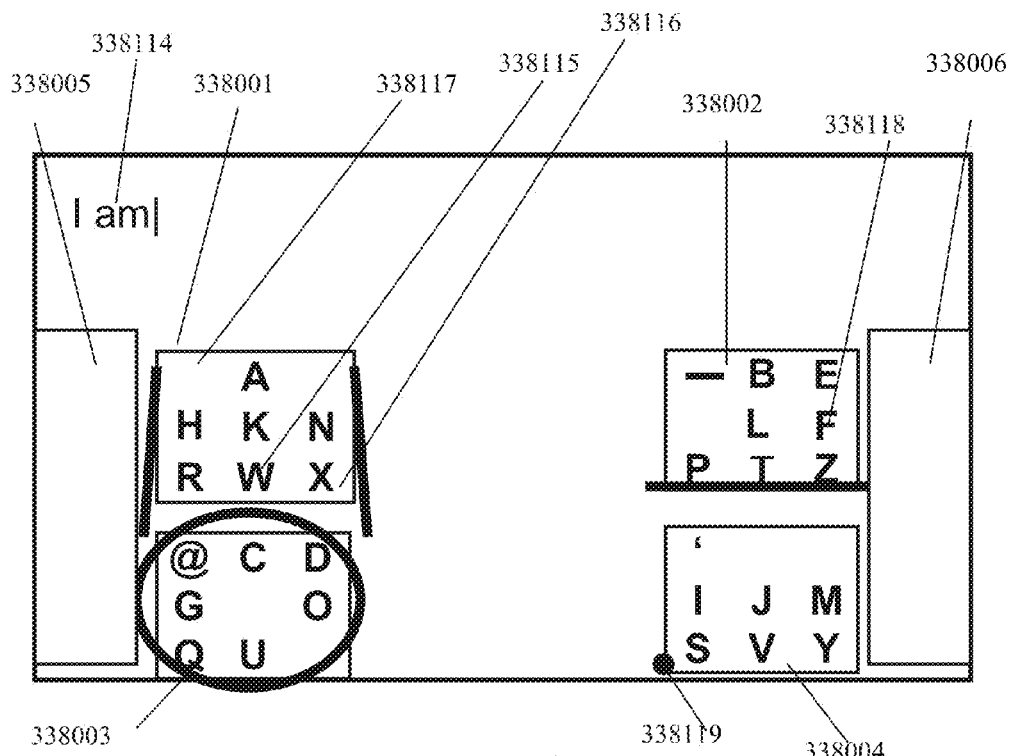

FIG. 50c shows as an example, the keys of the FIG. 50a in another key arrangement such that when the user enters a text in for example the English language he may type on different keys preferably evenly. In this example, the key 338004 is identified by a dot 338119 which is based on its main principle which is if the letters on said key were objects that are standing on a virtual surface, substantially all of them except the letter "M" may have a single contact point with said surface.

The second keypad of the invention may be of any type such as a known keypad or a customized keypad. As an example, the second keypad may be a slightly modified telephone-type keypad with slight exceptions as was shown in FIG. 50a and is shown in FIG. 50bc (e.g. said keypad itself is not shown here, but the arrangement of its letters as printed on the keys of the first keypad reminds the assignments of letters to the keys of that keypad), wherein its key to which the letters "TUV" are assigned may also include the letter "W", and its key to which the letters "MNO" are assigned may also include the letter "F". In this example, the lower-center position of the keys of the first keypad include the letters "TUVW", and the center-right position of the keys of the first keypad include the letters "MNOF".

With continuous description of the current embodiment, during the correction procedure of the invention, in order to enter precisely the letters "W" 338115 or "F" 338118, the user may provide the corresponding gliding action (e.g. beginning outside the keys of the first keypad), downward or rightward, respectively. Providing gliding actions in the same directions respectively, on or departing from the corresponding keys of the first keypad may Insert said letters, respectively. The location of the letters as described (e.g. W, X) on the keys of the second keypad may be changed/swapped according to parameters such as the language. For example, in English language, the locations of the letters "W" 338115 and "X" 338116 may be swapped, and when using the French language the locations of said letters may be maintained as shown in FIG. 50a or 50c. This is because for example, the letter "X" is rarely used in English language, so it is corrected less. Same may apply to the letter "W" in French language.

According to one embodiment of the invention, during the instead of using gliding actions during the Correction procedure or during the Insertion procedure for entering a precise character such as a letter, the user may handwrite the letter on the screen outside the keys or on the keys, respectively.

As an example, by considering the FIG. 50a, by pressing on the keys 338002, 338001, 338001, the system may propose the word "far". The user then may proceed to the Correction procedure of the invention using handwriting for entering a precise character and write the letter "e" 338013 on the screen out side the keys. The system may consider said letter as being the first letter of the desired word and may propose another word, "ear" in this example.

In the example of the FIG. 50b, for entering the same word, through the handwriting method, the user may write the letter "e" preferably on the key to which said letter is assigned. This way, the user may enter the letter "e" precisely. He then may press on the keys 338001, 338001, ambiguous corresponding to the remaining characters of the desired word. Based on these combined interactions, the system may propose the word "ear" without the Correction procedure.

It must be noted that entering precise letters during Correction and/or Insertion procedures may be provided on (other) different predefined sensitive zones (e.g. on said screen or on separate touch sensitive surface(s) than what described above.

According to one embodiment of the invention, out-of-dictionary words may be entered precise letter by precise letter through the handwriting system.

As mentioned before, one of the ambiguous characters assigned to the keys of the first keypad may be the space character. As such a word of the dictionary may also include an ambiguous space (e.g. " ") character. In this method, a word of the dictionary may also be defined to be formed from several single words. This is beneficial to reduce the number of corrections. For example, by considering the FIG. 50c, if the ambiguous letter " " 338117 is assigned to the key 338001, then by considering the letter layout of FIG. 50c, normally, if the user desires to enter the words "I am" by pressing the space key 338006 between said words during entering them, the system may propose the words "I as", because the word "as" has higher priority than the word "am". In order to avoid the correction procedure, the user may enter the words "I am" as a single combined word by using the ambiguous space character 338117 between said words by pressing the key 338001 instead of the key 338006 between said words. For that, in this example, the user may press the keys 338004, 338001, 338001, 338004. In this example, the chances are very high that the combined longer word "I am" 338114 may be the one which has the highest priority among the (e.g. combined or single) words having the same key presses in the dictionary used by the system and may be proposed by the system without Correction. The system may propose said combined word as a single word without the need of correction. Obviously, if a correction is needed, at least during the entry of the combined word the system preferably considers said combined word as a single word and may act accordingly.

In the current embodiment, the system may not include said combined words, but every time the user enters an ambiguous space character " " 338117, the system may create a corresponding combined word on the fly when the user enters the remaining keypresses of the desired combined word.

With continuous description of the current embodiment, in order to not confuse the user, according to one method, the ambiguous space character may be shown to the user differently from the space character (which is generally not seen), for example, by a color or gray shading, by a unique shape and/or by another character infrequently used, such as "~". This display of the ambiguous space character may be presented on the key or otherwise in the key description for the user on the first and/or the second keypad and/or may be displayed on the screen when the ambiguous space character is entered, at least during the entry of a combined word. Even after the confirmation of the system's proposed word by the user, said connecting character (e.g. "~") may remain between the words of the combined word in the document. As such, according to one method, if the user desires to re-use (i.e., re-edit) said combined word, the system may use all of the words of the words of the combined word for said er-editing procedure. Eventually, for example on completion of writing a document, the connecting space characters are converted into regular space characters, automatically or by a user command.

When the user knows that a phrase including two or more words is in the dictionary or will be used often and should be entered into the dictionary, the user may use the connecting space character instead of the regular space, to indicate that the words of the phrase should be handled in the accessing the dictionary as a combined word.

According to one method, during the entry of a combined word, the user may enter the whole and/or a portion of at least some of the words of said combined word preferably each word/portion being separated by said connecting character. For example, the user may press/glide on the keys corresponding to one or more beginning characters of each of the words of the combined word while entering the ambiguous or precise connecting character (e.g. "~") between the pressing actions corresponding to each of the words of the combined word.

By considering the combined input information, and knowing that after each connecting character or the ambiguous pressing action corresponding to the connecting character, the system may predict a desired combined word.

Alternatively to the connecting space character representing only a space character, the connecting space character may represent several characters which the system is to guess based on a matching word or phrase including a plurality of words in the dictionary. Optionally, the connecting space character in this embodiment is interpreted as representing a completion of the current word and the space following the word.

As an example, in the combined word is the phrase "have~a~good~day" which is a combined word of the dictionary, then as an example, by considering the first keypad of FIG. 48, the user may press the keys 336001 (ambiguously for "H"), 336001 (ambiguously for "A"), 336001 (ambiguously for "~"), 336001 (ambiguously for "A"), 336001 (ambiguously for "~"), 336002 (ambiguously for "G"), 336001 (ambiguously for "~"), 336004 (ambiguously for "D"). By considering said input information, and considering that each of the last ambiguous key press 336001 between different key presses may correspond to the connecting character, and that each sequence of key presses between said (ambiguous) connecting characters may correspond to at least the beginning characters of a word of a desired combined word, the system may be able to propose the desired combined word.

It is noted that, preferably, the connecting character may be entered as a an ambiguous character which the system selects from one of a plurality of characters of an actuated key or as a precise character by for example, providing the desired gliding action on/from its corresponding (ambiguous) key.

According to one method, the connecting character may be assigned to a key other that said ambiguous letter keys of the first keypad so that to be more easy recognizable by the system.

Preferably, according to one method, the combined words of the dictionary appear in the dictionary with said connecting character (e.g. "~").

According to one method, if the second keypad of the invention is a telephone-type keypad, in addition to being assigned to a key of the first keypad, then the connecting character may preferably also be assigned to the key of the second keypad to which the digit "1" is generally assigned. In this case, according to this method, in order to insert said connecting character or correct an ambiguously proposed character relating to pressing the corresponding key of the first keypad to said connecting character, the user may provide a corresponding gliding action towards upper-right on the screen, respectively, from the corresponding key of the first keypad or from outside the keys of the first keypad.

According to one method, because the combined word may be considered as a single word, the system may use the word completion system to propose a word before the user provides the input (as described above) corresponding to all of the words of the combined word.

According to one embodiment, instead of or in addition to the word database of the system, the system may use word databases of other resources such as those available in its corresponding device or on the Internet.

If the combined word entered by the user is not in the dictionary, the system may add it to the dictionary.

According to one embodiment of the invention, each time the user enters the input information of a current (single) word, the system considers/combines said input information with (input information) of one or more previous words and provides/creates a combined word based on the combined words of the dictionary.

Figure 50D:
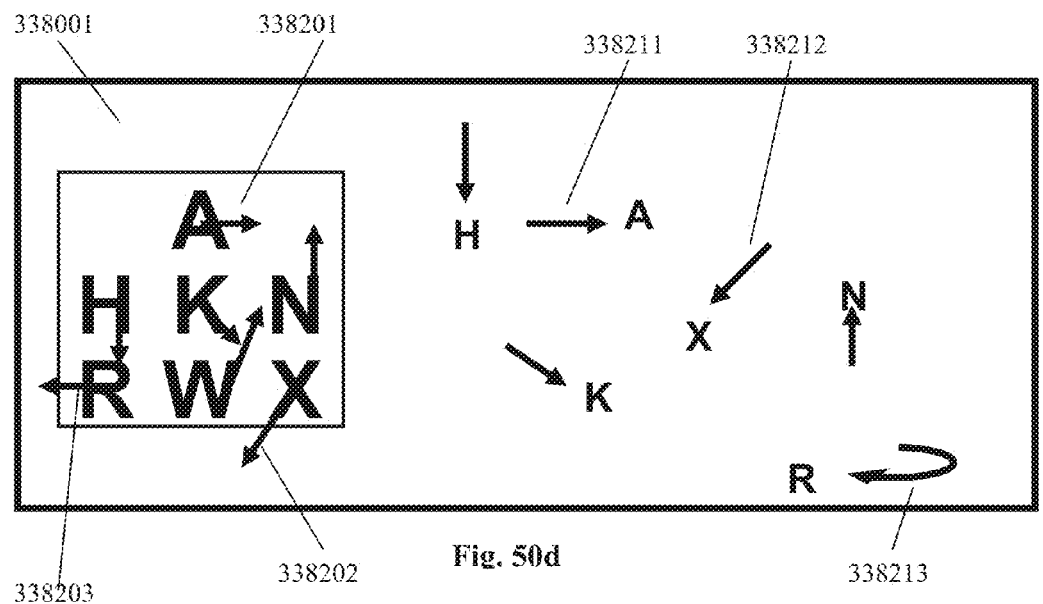

According to one embodiment of the invention, the gliding actions for entering precise character during Correction or by Insertion may be provided in predefined directions other than based on a telephone keypad arrangement. For example, the gliding action may be in direction of the ending portion of a letter when it is written by hand. As an example, FIG. 50*d* shows the letter key 338001 being shown in enlarged position for describing this embodiment. The ending portion of the letters on the key 338001 are shown by arrows in different directions. For example, letters "A, X" end by two gliding actions in different directions 338201 and 338202, respectively. During the Correction or Insertion procedures said letters may be entered precisely by providing gliding actions 338211, and 338212, according to said ending portions, respectively.

In the current embodiment, there may be some exceptions to consider. For example, the letters "K" and "R" may end in the same direction when writing them. In this case, for example, the gliding action corresponding to the letter "R" may be considered to be in a different direction 338203 relating to other letters on sad key, or as another example, it may be considered to include a curved trajectory 338213 to remind a portion of the letter "R". Other letters on each of the other keys may follow similar principles based on how described and as may be known by people skilled in the art.

According to one embodiment of the invention, during the correction and/or insertion procedures, the user may combine gliding actions as described above and handwriting method for entering different characters of a key precisely. For example, as shown on the key 338002 of FIG. 50*c*, the letters "L" and "Z" may end in the same gliding direction. In this case, as an example, a gliding action rightward may correspond to entering the letter "Z", and the user may provide a compound gliding action "gˡacti" that resembles to handwriting the letter "L".

In the embodiments and examples described throughout this application, a first group of symbols (e.g. letters) to a key of the first keypad has been described to be selected by a first predefined type of interaction with a key (e.g. taping, double-taping, gliding on or from said key (if on screen key), press and holding, taping on said key and touching a zone of the screen outside said key, etc.) of the first keypad. Then, said selected symbols had been assigned to the keys of a second keypad of the invention. One of said symbols could be entered by a predefined interaction with (the appropriate key of) the second keypad. The same procedure was described for a second group of symbols (e.g. special characters such as digits 0-9) assigned to said key of the first keypad, wherein said second group of symbols could be selected by a second predefined type of interaction with a key of the first keypad, and one of said symbols could be entered as described foe the entry of the symbol of the first group as just described. Clearly, the examples of the embodiments have been provided to describe the procedure of the entry of a symbol through the data entry systems of the invention. It is understood that the order of the assignment of said groups of symbols to the key of the first keypad may be reversed (e.g. the digits group being selected by said first type of interaction, said letters group being selected by said second type of interaction) by people skilled in the art.

Additionally, many types of interactions with a key (of the first keypad) for assigning a different group of characters to each of them may be considered by people skilled in the art. For example, each of, touching a key and preferably touching another key, touching a key and touching a different predefined location on the screen, touching a key and touching any location on the screen, etc, may be considered as a different type of interaction with said key.

Thus, while there have been shown and described and pointed out fundamental novel features of the invention as applied to alternative embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto. It is to be understood that the drawings are not necessarily drawn to scale, but that they are merely conceptual in nature. It must be noted, that any of the systems, features, means, methods, etc., described in this patent application may be used separately or being combined with systems, features, means, methods, etc., of other different embodiments of the invention.

It must be noted that the number of keys, configuration of letters on said keys, key arrangements, type of keys, etc., are being described as examples. They can be designed differently by people skilled in the art by considering the principles of the invention. It must also be noted that a touch sensitive surface may be touchpad, a touch screen, etc.

It must be noted that although during this application there has been described that a user may touch/press on a key such as the center key of a keypad to provide a gliding action, as described in detail before, if the second keypad of the invention is a dynamic keypad, then the user may touch anywhere on the screen/surface or anywhere on a dedicated zone on the screen/surface (e.g. such as the zone not including one or more keys of the first keypad as described in some embodiments), and that touching point may predefined to correspond to the center of said keypad which, preferably, may dynamically form under the touching point or on another location on the screen. The user then may provide the desired corresponding gliding action.

It must be noted that although in some embodiments through this application for describing the principle of the data entry system of the invention, a touch screen has been used as an example, obviously, any type of touch sensitive surface may be considered for the same purpose.

It must be noted that the data entry system preferably in some cases uses more than one interaction with a key and/or zone simultaneously by for example press/glide and holding on/from a first key and pressing/gliding on/from another key/zone. Obviously, if the user desires to use one hand only with the system, then according to one method, the user may first press/glide on/from said first key and remove his finger. Then he may provide said pressing/gliding on/from said another key/zone.

It is noted that, although according the preferred principle/embodiment of the invention a full set of the letters of a language are distributively assigned to few (e.g. four) keys of a first keypad and another same full set of the letters of the same language are distributively assigned to few keys of a second keypad (e.g. to eight keys of a telephone-type) such that any key of said letter keys of said first keypad and any key of said letter keys of said second keypad have at most one common letter, however, minor modifications/variations may be considered/provided to this principle by people skilled in the art. For example, one (or more) of the (e.g. ambiguous) keys of the first keypad and one (e.g. ambiguous) key of the second keypad (e.g. as just mentioned above) (for some reason) may have more than one common character (although this may augment the ambiguity and slow down the recognition capacity of the system requiring more user's input information).

The input system of the embodiments of the present invention may be used with substantially any electronic and/or computerized device, such as cellular phones, GPS devices, remote controls, hand held devices, television sets and music players. This input system is particularly useful for small sized and/or portable devices on which it is inconvenient to place an entire keyboard. In addition, these input devices may be used on appliances not primarily intended for data input, such as washing machines, refrigerators and the like, which conventionally do not include large keyboards.

It is noted in many paragraphs a first and a second keypad have been named to be used with the data entry system of the invention, obviously. The system may instead use a first and a second group of (different) input signals for the same purpose.

It must be noted that although in this patent application "key" and "(predefined) type of interaction with key" has been used to demonstrate different embodiments and methods as described, obviously, any (predefined) input means (e.g. providing a first and a second group of input signals) and any (predefined) type of interaction provided through said input means to provide a (predefined/different) input signal may be used for the same purpose. For example, instead of distributively assigning the set of letters of a language to the keys of a first keypad, said letters may be assigned to a first predefined type of interaction (e.g. single-pressing action on said keys) with each of said keys of said keypad. Also, instead of distributively assigning another set of letters of said language to the keys of a second keypad, said letters may be assigned to a second predefined type of interaction (e.g. double-pressing action, pressing (e.g. and holding) a mode key and single-pressing, etc.) on/with each of said keys of said first keypad. Obviously, based on the principles of the data entry systems of the invention as described above, the distribution/assignment of the letters to said first and second type of interaction with said keys may be such that letters assigned to the first type of interaction with any on the keys of said keypad and letters assigned to the second type of interaction with said key of said keypad have at most one common character.

It must be noted that the features such as keypads, key arrangements, number of keys, assignment of a set of characters of a language to each of a first and second set of keys (e.g. or to each of a second and a second type of interactions with one set of keys), type of keys, type of interactions, etc., as described and shown in this patent application are shown as examples to describe different embodiments of the invention. Obviously, other type of such features can be considered by people skilled in the art.

It must be noted that the first and the second keypad of the invention can have any number of keys. For example, in some embodiments, the second keypad is shown to be a telephone-type keypad having nine keys and in some other embodiments it is shown to have twelve keys.

It must be noted that in addition-to or in replacing-of the correction procedure of the invention, the system may include a method to propose to the user words other that the one predicted by the system. For example, if the predicted word is not the desired word, the user may provide a predefined interaction for example on the screen and the system may show a second keypad wherein its keys include the other words (e.g. having less frequently of use) that correspond to the input information provided until that moment by the user for entering a desired word. Then if the user's desired word is one of said proposed word, the user then may for example provide the corresponding gliding action for selecting/entering his desired word. If any of the words proposed by the system is not what the user desires to enter, then, preferably while holding his finger on the screen, the user may touch another location on the screen and the system shows another second keypad with additional corresponding words (e.g. having less frequently use). And so on.

It must be noted that the procedure of entering a symbol of a group of symbols through the second keypad of the invention wherein the number of symbols of said group of symbols are more than the keys of the second keypad by providing multiple touches to provide multiple second keypads of the invention until the second keypad includes the user's desired symbol as described may be used for any symbol. for example it may he used for entering any punctuation mark character even if the number of the characters of the group is more than the keys of the second keypad. by using such procedure the there is no limit to the number of symbols that a each group may include. The same method may also be used for providing words during the word completion procedure. For example after the used enters into the world completion procedure, if he touches the screen the system may show the second keypad of the invention including some of the words beginning with the user's key presses. As an example if the desired word is not on a key of the presented second keypad, then preferably while holding that finger in touching positing on the screen the user may touch with another finger a location on the screen and the system may open another second keypad with more words. The user may repeat this procedure if the system does not show his word on said another second keypad.

As mentioned, according to one method, in embodiments such as the media search and word completion, a gliding action in a direction may correspond to a list of words or elements. If the list of the words/items/stems in a gliding action direction is long, then according to one method, several gliding actions in said direction may be provided wherein each of said gliding actions may correspond/include some of said words/items/stems. The order of said words/items/stems may be based on a predefined principle such as frequency of use or alphabetical order.

According to one embodiment of the invention, one of the groups of symbols assigned to a predefined interaction with a key of the first keypad such as the backspace key may be called MENU to which menu functions such as User Guide, Language, Reset Settings, etc. may be assigned.

It is noted that the first and second groups of keys may include substantially any suitable number of keys which may be hard or soft keys or combinations of hard and soft keys. The keys may be organized in various configurations and the characters and symbols may be assigned to the keys in any suitable manner. The symbols of the system may be grouped in any number of symbol modes based of any (e.g. arbitrary) category. Optionally, the first group of keys has fewer keys than the second group, as mainly the first group of keys are intended to be used in entering text.

The term key is meant to include any device which identifies finger actuations including pressure sensors, thermal sensors, acceleration sensors, optical systems for tracking movements of the finger, finger caps and gloves with sensors. The sweeping gestures of embodiments of the invention including embodiments for dialing telephone numbers may be identified using various touch sensitive surfaces including internal or external touch screens and a mouse pad. Alternatively, sweeping gestures may be identified by an electronic stylus, acceleration sensors and/or other sensors for identifying user finger movements. The sensors may be mounted on a surface, on finger caps, on gloves and/or on any other suitable mount. The keys or touch screen may be included with processor 130 in the same housing or may be included partially or entirely in a separate unit connected through wires or wirelessly (e.g., using Bluetooth or Wi-Fi) to the unit including processor 130.

According to one embodiment of the invention the sweeping gestures may be provided in the air and are detected by suitable sensors such as a camera and/or acceleration sensors.

In some embodiments of the invention, the data entry systems are adapted to provide synthesized voice feedback on the letters or symbols entered and/or the current symbol mode such that the user need not look at the screen while entering data.

While the above description relates to the Latin alphabet, the principles of the invention may be implemented on other alphabets.

The special characters on the second keypad may be assigned mainly to a same key so that the user may easily remember their location. If the second keypad is a standard telephone-type keypad said special characters may be assigned to the key to which the digit "1" is assigned.

The data entry device in accordance with any of the above described embodiments may be included in a mobile phone, a PDA, a computer or any other device.

CONCLUSION

It will be appreciated that the above described methods may be varied in many ways, including, changing the specific elements used and their layout. It should also be appreciated that the above described description of methods and apparatus are to be interpreted as including apparatus for carrying out the methods and methods of using the apparatus. The present invention has been described using non-limiting detailed descriptions of embodiments thereof that are provided by way of example and are not intended to limit the scope of the invention. Many specific implementation details may be used. The above embodiments may be implemented in hardware, software, firmware or combinations thereof.

It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art. Furthermore, the terms "comprise," "include," "have" and their conjugates, shall mean, when used in the claims, "including but not necessarily limited to."

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims.

The invention claimed is:

1. A system for capturing an event provided from an edge of a touch screen comprising:
   a device having a touch screen;
   at least one window located in the touch screen on an edge of the touch screen, wherein said at least one window functions independently of an interface of an application in use on the touch screen; and
   a processor;
   wherein a gliding action provided from outside of the touch screen towards inside of the touch screen, said gliding action at first interacting with said at least one window on the touch screen, is processed by said processor to cause an action assigned to said window, and wherein said at least one window is located on the touch screen before said gliding action begins.

2. The system of claim 1, wherein the system relates said gliding action to a function which is not related to a mouse function.

3. The system of claim 1, wherein said at least one window comprises at least one bar located on said edge of the screen.

4. The system of claim 3, wherein said at least one bar extends along a substantial portion of an edge of the touch screen.

5. The system of claim 3, wherein said bar is in a form of a line.

6. The system of claim 5, wherein said action is displaying an interface on the screen.

7. The system of claim 5, wherein said action is displaying a portion of an interface on the screen.

8. The system of claim 7, wherein during said gliding action, a length of the portion of the interface being displayed is substantially equal to a length of the gliding action.

9. The system of claim 3, wherein said action is displaying an interface on the screen.

10. The system of claim 3, wherein said action is displaying a portion of an interface on the screen.

11. The system of claim 10, wherein during said gliding action, a length of the portion of the interface being displayed is substantially equal to a length of the gliding action.

12. The system of claim 1, wherein upon detecting said gliding action, the system displays an interface on said touch screen.

13. The system of claim 12, wherein upon detecting said gliding action, the system relates said gliding action to setting the location of said interface on said touch screen.

14. The system of claim 1, wherein said action is displaying an on-screen keyboard before or after said gliding action is completed.

15. The system of claim 1, wherein said at least one window comprises more than one window located on one or more edges of the touch screen.

16. The system of claim 15, wherein said at least one window extends along a substantial portion of an edge of the touch screen.

17. The system of claim 1, wherein during providing said gliding action, the system dynamically drags and shows an interface or a portion of an interface on the touch screen.

18. The system of claim 1, wherein the processor relates a gliding action provided towards any arbitrary direction inside the screen to presenting a same interface.

19. A system for capturing an event provided from an edge of a touch screen comprising:
    a device having a touch screen;
    a zone in form of a bar located in the touch screen on an edge of the touch screen; and
    a processor;
    wherein a gliding action provided from said zone of the touch screen towards any arbitrary direction inside the touch screen at first interacts with said zone, and wherein the processor executes a function related to said zone, and wherein said zone is present on said edge regardless of the interface of an application on said touch screen, and wherein said at least one window is located on the touch screen before said gliding action begins.

20. The system of claim 19, said function displays a predefined interface on said screen and wherein said interface is an on-screen keyboard displayed before or after said gliding action is completed.

21. The system of claim 19, wherein upon detecting said gliding action, the system relates said gliding action to setting the location of an interface on the touch screen.

22. The system of claim 19, wherein said bar comprises more than one bar located on one or more edges of the touch screen.

23. The system of claim 19, wherein said zone is in a form of a visible or invisible line.

24. The system of claim 23, wherein said function is displaying an interface on the screen.

25. The system of claim 23, wherein said function is displaying a portion of an interface on the screen.

26. The system of claim 23, wherein said function is displaying a portion of an interface on the screen, and wherein a length of said portion of the interface is substantially equal to a length of the gliding action.

27. The system of claim 19, wherein said bar is visible or invisible.

28. The system of claim 27, wherein said function is displaying an interface on the screen.

29. The system of claim 27, wherein said function is displaying a portion of an interface on the screen.

30. The system of claim 29, wherein during said gliding action, a length of the portion of the interface being displayed is substantially equal to a length of the gliding action.

31. The system of claim 19, wherein during providing said gliding action, the system dynamically drags and shows an interface or a portion of an interface on the touch screen.

32. The system of claim 19, wherein said function is displaying a same interface for any said gliding action, said gliding action interacting with any portion of said zone.

33. The system of claim 32, wherein said gliding action is provided from outside the touchscreen towards inside the touch screen, wherein said gliding action at first interacts with said zone on said touch screen.

34. The system of claim 19, wherein said function is displaying a portion of an interface on the screen.

35. The system of claim 34, wherein during said gliding action, a length of the portion of the interface being displayed is substantially equal to a length of the gliding action.

36. The system of claim 19, wherein said zone extends along a substantial portion of said edge.

* * * * *